US011115111B1

(12) United States Patent
Bakr et al.

(10) Patent No.: US 11,115,111 B1
(45) Date of Patent: Sep. 7, 2021

(54) SYSTEM ARCHITECTURE AND METHOD FOR HIGH MOBILITY NETWORKING INCLUDING AIR BASED NODES AND COMPUTING DEVICES

(71) Applicant: Tarana Wireless, Inc., Santa Clara, CA (US)

(72) Inventors: Omar Bakr, Santa Clara, CA (US); Dale Branlund, Santa Clara, CA (US)

(73) Assignee: Tarana Wireless, Inc., Santa Clara, CA (US)

( * ) Notice: Subject to any disclaimer, the term of this patent is extended or adjusted under 35 U.S.C. 154(b) by 0 days.

(21) Appl. No.: 16/505,650

(22) Filed: Jul. 8, 2019

Related U.S. Application Data

(63) Continuation of application No. 14/968,700, filed on Dec. 14, 2015, now Pat. No. 10,348,394, which is a
(Continued)

(51) Int. Cl.
*H04W 4/00* (2018.01)
*H04B 7/185* (2006.01)
(Continued)

(52) U.S. Cl.
CPC ....... *H04B 7/18504* (2013.01); *H04B 7/0408* (2013.01); *H04B 7/0417* (2013.01);
(Continued)

(58) Field of Classification Search
CPC .............. H04B 7/18504; H04B 7/0408; H04B 7/18515; H04B 7/18506; H04B 7/0417;
(Continued)

(56) References Cited

U.S. PATENT DOCUMENTS

| 6,122,260 A | 9/2000 | Hui et al. |
| 6,219,561 B1 | 4/2001 | Raleigh |

(Continued)

FOREIGN PATENT DOCUMENTS

| EP | 1865642 | 1/1917 |
| EP | 2071745 | 2/2011 |

(Continued)

OTHER PUBLICATIONS

Clark, Martin V., entitled, "Adaptive Frequency-Domain Equalization and Diversity Combining for Broadband Wireless Communications" IEEE Journal, (Oct. 1998), 11 pp.
(Continued)

*Primary Examiner* — Chuong T Ho
(74) *Attorney, Agent, or Firm* — Dorsey & Whitney LLP

(57) ABSTRACT

A wireless communication network and wireless communication method are disclosed. The network has a plurality of transceivers forming a wireless communication network in which the plurality of transceivers include one or more central nodes and each end node capable of connecting to the one or more central nodes and forming a link. At least some of the transceivers of the network having a plurality of antennas and an array processing element coupled to the plurality of antennas and at least some of the transceivers are housed in an aerial communication node that may be a mini-satellite, a balloon or a drone.

22 Claims, 77 Drawing Sheets

Related U.S. Application Data continuation-in-part of application No. 14/214,229, filed on Mar. 14, 2014, now Pat. No. 9,735,940.

(60) Provisional application No. 62/091,266, filed on Dec. 12, 2014.

(51) Int. Cl.

| | |
|---|---|
| *H04W 16/24* | (2009.01) |
| *H04W 4/06* | (2009.01) |
| *H04B 7/06* | (2006.01) |
| *H04B 7/0417* | (2017.01) |
| *H04B 7/0408* | (2017.01) |
| *H04L 12/28* | (2006.01) |
| *H04W 36/30* | (2009.01) |
| *H04L 5/14* | (2006.01) |
| *H04W 48/16* | (2009.01) |
| *H04W 84/06* | (2009.01) |

(52) U.S. Cl.
CPC ....... *H04B 7/0695* (2013.01); *H04B 7/18506* (2013.01); *H04B 7/18515* (2013.01); *H04L 5/14* (2013.01); *H04L 12/2854* (2013.01); *H04W 4/06* (2013.01); *H04W 16/24* (2013.01); *H04W 36/30* (2013.01); *H04W 48/16* (2013.01); *H04W 84/06* (2013.01)

(58) Field of Classification Search
CPC .... H04B 7/0695; H04W 36/30; H04W 16/24; H04W 4/06; H04W 48/16; H04W 84/06; H04L 12/2854; H04L 5/14
USPC .......................................... 370/329, 330, 331
See application file for complete search history.

(56) References Cited

U.S. PATENT DOCUMENTS

| | | |
|---|---|---|
| 6,289,062 B1 | 9/2001 | Wang et al. |
| 6,580,328 B2 | 6/2003 | Tan et al. |
| 6,771,985 B1 | 8/2004 | Linuma |
| 6,795,424 B1 | 9/2004 | Kapoor et al. |
| 6,865,169 B1 | 3/2005 | Quayle et al. |
| 7,003,310 B1 | 2/2006 | Youssefmir et al. |
| 7,054,292 B2 | 5/2006 | Hall et al. |
| 7,155,183 B2 | 12/2006 | Abraham |
| 7,187,723 B1 | 3/2007 | Kawanabe |
| 7,333,455 B1 | 2/2008 | Bolt et al. |
| 7,340,279 B2 | 3/2008 | Chen et al. |
| 7,366,120 B2 | 4/2008 | Handforth et al. |
| 7,469,152 B2 | 12/2008 | Cetiner et al. |
| 7,493,129 B1 | 2/2009 | Mostafa et al. |
| 7,502,355 B2 | 3/2009 | Bednekoff et al. |
| 7,567,543 B2 | 7/2009 | Cao et al. |
| 7,603,081 B2 | 10/2009 | Karabinis |
| 7,636,552 B2 | 12/2009 | Monk |
| 7,640,020 B2 | 12/2009 | Gutowski |
| 7,646,752 B1 | 1/2010 | Periyalwar et al. |
| 7,688,739 B2 | 3/2010 | Frei et al. |
| 7,693,482 B2 | 4/2010 | Eade |
| 7,720,444 B2 | 5/2010 | Darabi et al. |
| 7,839,856 B2 | 11/2010 | Sinha et al. |
| 7,953,389 B2 | 5/2011 | Coleman et al. |
| 8,195,224 B2 | 6/2012 | Saban et al. |
| 8,238,318 B1 | 8/2012 | Kegus |
| 8,340,235 B2 | 12/2012 | Mohammad et al. |
| 8,416,872 B2 | 4/2013 | Higuchi et al. |
| 8,488,728 B2 | 7/2013 | Mohammad et al. |
| 8,502,733 B1 | 8/2013 | Negus et al. |
| 8,531,471 B2 | 9/2013 | Chen et al. |
| 8,654,815 B1 | 2/2014 | Forenza et al. |
| 8,670,390 B2 | 3/2014 | Shattil |
| 8,811,348 B2 | 8/2014 | Rangan et al. |
| 8,837,305 B2 | 9/2014 | Nanda et al. |
| 9,124,381 B2 | 9/2015 | Karabinis et al. |
| 9,131,529 B1 | 9/2015 | Ayyagari et al. |
| 9,252,908 B1 | 2/2016 | Branlund |
| 9,325,409 B1 | 4/2016 | Branlund |
| 9,332,465 B2 | 5/2016 | Valliappan et al. |
| 9,356,358 B2 | 5/2016 | Chang et al. |
| 9,386,465 B2 | 7/2016 | Forenza et al. |
| 9,456,354 B2 | 9/2016 | Branlund |
| 9,502,022 B2 | 11/2016 | Young et al. |
| 9,735,940 B1 | 8/2017 | Bakr et al. |
| 9,819,083 B1 | 11/2017 | Chen |
| 9,853,668 B2 | 12/2017 | Corbalis et al. |
| 9,854,408 B2 | 12/2017 | Suthar et al. |
| 9,923,657 B2 | 3/2018 | Forenza et al. |
| 9,973,246 B2 | 5/2018 | Forenza et al. |
| 10,056,963 B1 | 8/2018 | Au |
| 10,164,698 B2 | 12/2018 | Forenza et al. |
| 2001/0028675 A1 | 10/2001 | Bierly |
| 2002/0042290 A1 | 4/2002 | Williams et al. |
| 2003/0035468 A1 | 2/2003 | Corbaton et al. |
| 2004/0142701 A1 | 7/2004 | Abraham |
| 2004/0192199 A1 | 9/2004 | Eade |
| 2005/0141624 A1 | 6/2005 | Lakshmipathi et al. |
| 2005/0245192 A1 | 11/2005 | Karabinis et al. |
| 2006/0119440 A1 | 6/2006 | Isobe et al. |
| 2006/0135070 A1 | 6/2006 | Karabinis |
| 2006/0268769 A1 | 11/2006 | Pan |
| 2008/0117101 A1 | 5/2008 | Pan |
| 2008/0130496 A1 | 6/2008 | Kuo et al. |
| 2008/0214196 A1 | 9/2008 | Sambhwani |
| 2008/0214218 A1 | 9/2008 | Lakshmananiram |
| 2008/0233967 A1 | 9/2008 | Montojo et al. |
| 2008/0247388 A1 | 10/2008 | Horn |
| 2008/0261602 A1 | 10/2008 | Livneh |
| 2008/0278394 A1 | 11/2008 | Koh et al. |
| 2008/0317014 A1 | 12/2008 | Veselinovic et al. |
| 2009/0110033 A1 | 4/2009 | Shattil |
| 2009/0310693 A1 | 12/2009 | Baker et al. |
| 2009/0316675 A1 | 12/2009 | Malladi |
| 2010/0035620 A1 | 2/2010 | Naden et al. |
| 2010/0046595 A1 | 2/2010 | Sikri et al. |
| 2010/0048217 A1* | 2/2010 | Deshpande ........... H04W 48/16 455/446 |
| 2010/0056059 A1 | 3/2010 | Lakshmanan et al. |
| 2010/0067476 A1 | 3/2010 | Periyalwar et al. |
| 2010/0087149 A1 | 4/2010 | Srinivasan et al. |
| 2010/0093391 A1 | 4/2010 | Saban et al. |
| 2010/0195619 A1 | 8/2010 | Bonneville et al. |
| 2010/0215032 A1 | 8/2010 | Jalloul et al. |
| 2010/0248644 A1 | 9/2010 | Kishi et al. |
| 2010/0254295 A1 | 10/2010 | Ahn et al. |
| 2010/0296459 A1 | 11/2010 | Miki et al. |
| 2011/0034200 A1 | 2/2011 | Leabman |
| 2011/0039509 A1 | 2/2011 | Bruchner |
| 2011/0051731 A1 | 3/2011 | Mang et al. |
| 2011/0075601 A1 | 3/2011 | Zheng |
| 2011/0105054 A1 | 5/2011 | Cavin et al. |
| 2011/0142025 A1 | 6/2011 | Agee |
| 2011/0269410 A1 | 11/2011 | Tsujimoto et al. |
| 2011/0274032 A1 | 11/2011 | Leng et al. |
| 2012/0094679 A1* | 4/2012 | Rao ...................... H04W 48/16 455/450 |
| 2012/0108257 A1 | 5/2012 | Kwon et al. |
| 2012/0129539 A1 | 5/2012 | Arad et al. |
| 2012/0202546 A1 | 8/2012 | Nakayama et al. |
| 2012/0319844 A1* | 12/2012 | van Doorn ............. G01S 13/003 340/541 |
| 2013/0044028 A1 | 2/2013 | Lea et al. |
| 2013/0094522 A1 | 4/2013 | Moshfeghi |
| 2013/0095747 A1 | 4/2013 | Moshfeghi |
| 2013/0109372 A1* | 5/2013 | Ekici ..................... H04W 24/10 455/422.1 |
| 2013/0142136 A1 | 6/2013 | Pi et al. |
| 2013/0207841 A1 | 8/2013 | Negus et al. |
| 2013/0237261 A1 | 9/2013 | Bazzi |
| 2013/0259113 A1 | 10/2013 | Kumar |
| 2013/0272132 A1* | 10/2013 | Heo ...................... H04W 76/19 370/236.2 |

(56) References Cited

U.S. PATENT DOCUMENTS

| | | | |
|---|---|---|---|
| 2014/0162667 A1* | 6/2014 | Mueck | H04W 72/04 |
| | | | 455/450 |
| 2014/0206367 A1* | 7/2014 | Agee | H04W 28/0236 |
| | | | 455/450 |
| 2014/0269492 A1 | 9/2014 | Forenza et al. | |
| 2014/0269502 A1 | 9/2014 | Forenza et al. | |
| 2014/0328423 A1* | 11/2014 | Agee | H04L 5/0044 |
| | | | 375/267 |
| 2015/0124713 A1 | 5/2015 | Salhov et al. | |
| 2015/0244458 A1 | 8/2015 | Erkmen | |
| 2016/0119052 A1 | 4/2016 | Frerking et al. | |
| 2016/0255605 A1 | 9/2016 | Kyeong et al. | |
| 2017/0013476 A1 | 1/2017 | Suthar et al. | |
| 2017/0163325 A1* | 6/2017 | Kang | H04B 7/0617 |
| 2018/0249453 A1 | 8/2018 | Nagaraja et al. | |
| 2018/0262936 A1 | 9/2018 | Zhou et al. | |
| 2018/0279316 A1 | 9/2018 | Mueck et al. | |
| 2018/0287833 A1 | 10/2018 | Kennedy | |
| 2019/0068235 A1 | 2/2019 | Branlund | |

FOREIGN PATENT DOCUMENTS

| | | |
|---|---|---|
| GB | 2350265 | 11/2000 |
| JP | 2010-522516 | 7/2010 |
| JP | 2010-525678 | 7/2010 |
| JP | 2010-183573 | 8/2010 |
| WO | 199820633 | 5/1998 |
| WO | 205493 | 1/2002 |
| WO | 2063896 | 8/2002 |
| WO | 2005101882 | 10/2005 |
| WO | 2007082142 | 7/2007 |
| WO | 2008033369 | 3/2008 |
| WO | 2009119463 | 10/2009 |
| WO | 2010003509 | 1/2010 |
| WO | 2010013245 | 2/2010 |
| WO | 2012037643 | 3/2012 |

OTHER PUBLICATIONS

Savvides, Andreas et al., entitled, "The Bits and Flops of the N-hop Multilateration Primitive for Node Localization Problems" UCLA, (Sep. 28, 2002), 10 pp.

"Echo Cancellation and Channel Estimation for On-Channel Repeaters in DVB-T/H Networks" by Karim M. Nasr et al.; Brunel University; dated after Jan. 2006 (6 pgs.).

"Load- and Interference-Aware Channel Assignment for Dual-Radio Mesh Backhauls" by Michelle X. Gong et al.; IEEE Communications Society; dated 2008 (6 pgs.).

"Signal Acquisition and Tracking with Adaptive Arrays in the Digital Mobile Radio System IS-54 with Flat Fading" by Jack H. Winters; IEEE Transactions; dated Nov. 4, 1993 (8 pgs.).

* cited by examiner

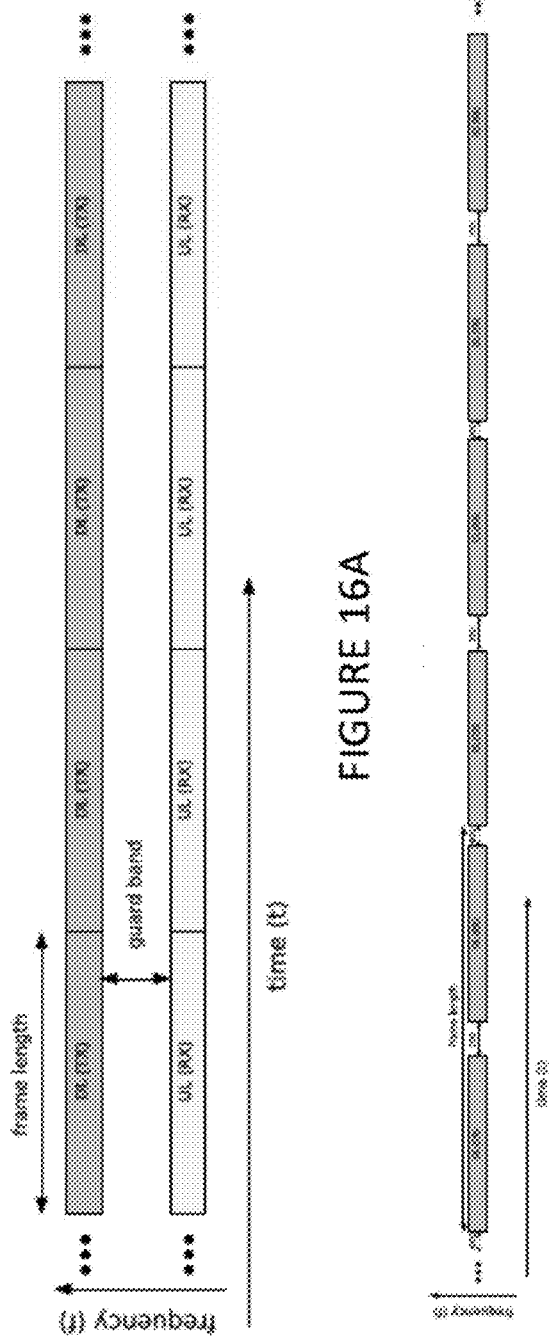
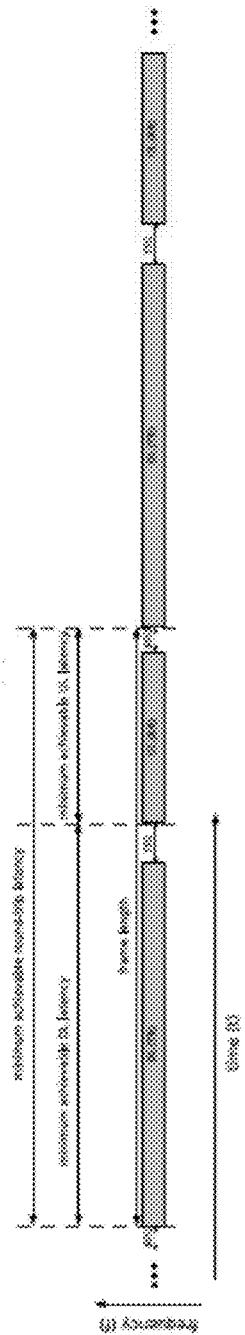
FIGURE 16A
FIGURE 16B
FIGURE 16C

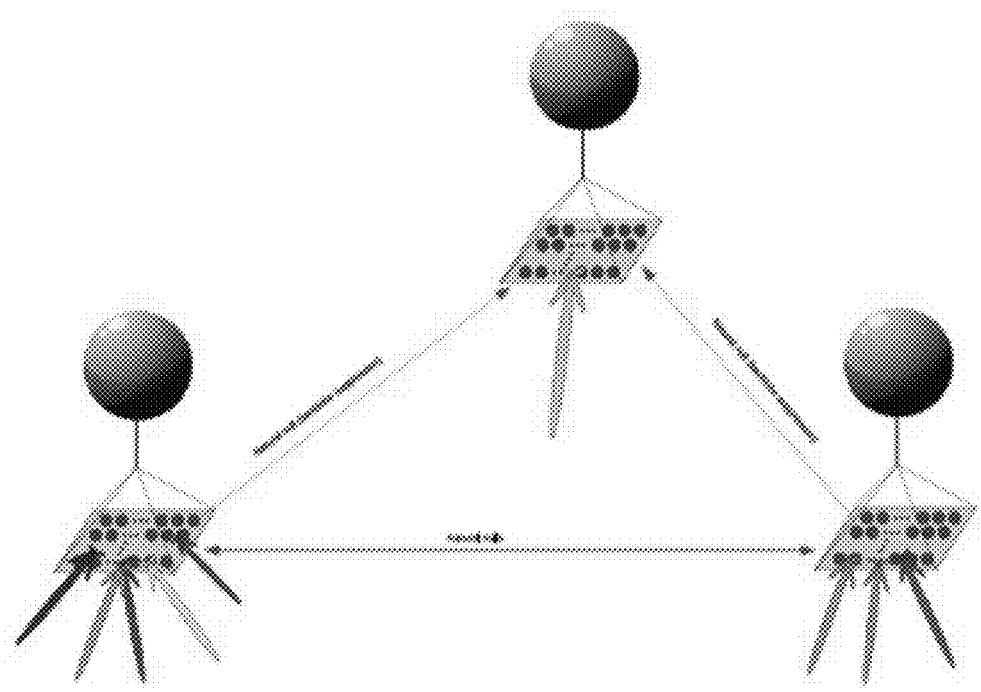
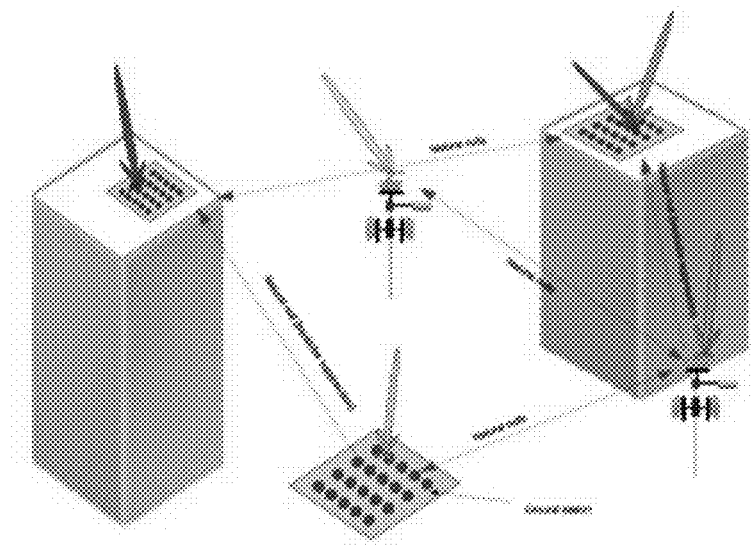
FIGURE 54

SYSTEM ARCHITECTURE AND METHOD FOR HIGH MOBILITY NETWORKING INCLUDING AIR BASED NODES AND COMPUTING DEVICES

PRIORITY CLAIMS/RELATED APPLICATIONS

This application is a continuation of and claims priority under 35 USC 120 to U.S. patent application Ser. No. 14/968,700 filed Dec. 11, 2015 that in turn claims the benefit under 35 USC 119(e) and the priority under 35 USC 120 to U.S. Provisional Patent Application Ser. No. 62/091,266 filed on Dec. 12, 2014, and entitled "System Architecture For Enhancing Wireless Networks With Mini-Satellites And Pseudolites And Adaptive Antenna Processing", which is incorporated herein by reference. This application also is a continuation in part of and claims priority under 35 USC 120 to U.S. patent application Ser. No. 14/214,229, filed Mar. 14, 2014 which is incorporated herein by reference.

FIELD

The disclosure relates to a wireless network architecture. It describes techniques and architectures for incorporating/integrating multi-antenna adaptive processing, mini-SATs, and pseudolites/small cells in order enhance the capacity and economics of wireless infrastructure. This document will be serve as a basis for a network architecture patent.

BACKGROUND

Most techniques and network architectures employed in building wireless infrastructure and deploying wireless services today make it difficult to unlock the full potential of state of the art wireless technologies in both rural and urban areas.

Today's wireless networks suffer from capacity shortages due to the large proliferation of data-hungry devices like smart phones, tablets, and notebooks. The number of devices accessing the data-network is expected to increase at an exponential rate in the years to come. Even when the number of devices on the network begins to saturate, the applications driving the data demand will continue to grow. These applications include on-line gaming, video conferencing, high definition video, and file sharing vary in their latency and bandwidth requirements.

While most urban areas face a capacity crunch, rural areas remain largely underserved for a wide variety of reasons including long distance, poor infrastructure, and scarcity of skilled labor. The key aspect for these networks is to solve the connectivity problem while meeting the cost and power requirements.

Lots of the research in wireless technology is focusing on multi-antenna beamforming or space-time-adaptive-processing (STAP) (In this disclosure, the terms STAP, SFAP (space-frequency-adaptive processing), and STFAP (space-time-frequency-adaptive-processing) are used interchangeably, and all refer to the processing of degrees of freedom (DOFs) and channel equalization in all three dimensions (time, frequency, and space). See Section 2.3 for more details) and under-utilized frequency bands like mm-Wave for solving both urban and rural capacity and connectivity problems. STAP allows real-time dynamic beam-steering and pattern shaping. For rural areas, this means that long-distance links with highly focused beams can be established in minutes with little or no manual alignment required. For urban areas, this means that links can make better use of multi-path scattering and reflections in order to improve link distance, reliability, and coverage. It also improves the co-existence among links operating simultaneously in the same frequency channel, and thus increases the spectral efficiency of wireless networks. mm-Wave frequency bands have large chunks of open spectrum (on the order of several GHz) that remain extremely underutilized. These relatively open spectrum bands present a great opportunity to alleviate the spectrum congestion in lower bands.

There are several challenges that make it difficult to effectively leverage those techniques. The first challenge is the hardware limitation. STAP algorithms and mm-Wave bands require processing large chunks of data in real-time. The amount of data that needs to be processed scales linearly with the product of the signal bandwidth and the number of antennas (channels) that are connected to the digital baseband. The processing requirements scale approximately linearly with the product of the signal bandwidth and the somewhere between the square and the cube of the number of antennas depending on the STAP algorithm being used. The increase in capacity and link budget that comes with STAP is proportional to the number of antennas. At mm-Wave frequencies, the available bandwidth can be 10-100 times larger than what is currently available for systems operating in cellular and microwave bands. Therefore, the processing requirement becomes a lot larger when STAP is used in conjunction with mm-Wave frequency bands. However, the recent advances in integrated circuit (IC) technology, especially CMOS, seems to have addressed lots of these limitations. With the latest CMOS technology, it is possible to build high density digital circuits that can meet the processing requirements at low cost and power consumption.

Furthermore, the latest silicon technologies (e.g. CMOS, SiGe, BiCMOS) have enabled ICs to operate at high frequencies (e.g. mm-Wave) that were only attainable with expensive processes (e.g. GaAs), allowing tighter integration between RF/analog and digital components, which leads to higher cost reduction.

The second important challenge comes from the wireless channel, which is a function of how networks are currently being deployed. Most wireless data networks are either terrestrial or satellite based. The most prevalent example of outdoor terrestrial networks are cellular fixed and mobile access and backhaul networks (examples shown in FIGS. 22, 23, 25, and 26). In these systems, one or both end of a link is mounted on a tower or a pole or a building. In traditional macro-cellular networks (with sparse base-station deployments), base-stations are usually mounted on towers and rooftops of tall buildings to achieve wide coverage areas. However, with capacity becoming more of an issue recently, cellular carriers have been increasingly shifting their focus towards small cell deployments. Small cells are usually mounted on light poles, street lights, building walls, and rooftops of small buildings. In mobile networks, the other end of the link is usually indoors and/or at street level. In fixed wireless networks, the other end of the link is usually mounted on top of residential and office building. In P2P microwave networks, both ends of the link are usually mounted on tall towers or buildings in order to achieve LOS. In P2P and P2MP NLOS small cell backhaul networks, one end of the link will be on a tall tower or a building (at the macro-cell site) while the end will be on a light pole or a building wall (at the small cell site). One of the nodes (but usually not both) can also be mobile.

These types of terrestrial deployments present the following challenges for a wireless system:

Path Loss

The baseline path loss model for wireless links is governed by the Friis (free space) Equation:

$$L(r, \lambda) = \frac{P_r(r, \lambda)}{P_t} = \frac{\lambda^2 G_{Tx}(\lambda) G_{Rx}(\lambda)}{(4\pi r)^2} \quad (1)$$

The left side of the equation is the path loss (the ratio of the received power $P_r$ to the transmitted power $P_t$) as a function of distance r and wavelength $\lambda$. $G_{Tx}$ and $G_{Rx}$ are the Tx and Rx antenna gains respectively at the wavelength (i.e. frequency) of interest. (The antenna gains are unitless and are assumed to be computed at the direction pointing towards the other end of the link.) Equation 1 is also known as the square law equation since the received power is inversely proportional to the square of the distance. Equation 1 also assumes LOS only propagation in free space. To account for other mediums of propagation, the right hand side of Equation 1 is multiplied by an exponentially decaying term $e^{-o(\lambda)r}$, where a is capacity the loss coefficient of the medium and is a function of frequency (wavelength). When the medium of propagation is air, the exponential decay term is usually dropped (it only becomes significant at very long distances and high frequencies). Some frequency bands (e.g. 60 GHz) are more sensitive than others to $O_2$ and/or $H_2O$ absorption and thus can have a significant decay exponent (as large as 15 dB/Km). So $\alpha$ may not be a strictly increasing function with frequency even though that's what the general trend looks like. The presence of other signal paths of significant strength relative to the LOS path in addition to the LOS (either through reflection or diffraction) can lead to fading and thus renders Equation 1 invalid. Unfortunately, this assumption does not hold in terrestrial networks. First, in a large number of these networks, especially in urban areas, LOS hardly exists, and even when it does, it is hardly the only signal path. These links suffer from fading and shadowing as shown in FIG. 1. (Fading refers to the process in which the different signal paths (rays) arriving at the receiver add-up destructively. Shadowing refers to the process in which the different paths are obstructed either by walls, buildings, or trees.) which dramatically reduces the link budget. However, the most destructive phenomena is the ground reflection shown in FIGS. 2 and 3. Ground reflection, which is difficult to avoid, is harmful for several reasons. Because the ground surface is very large, the reflected path is almost of equal amplitude to the LOS path with a 180° phase shift cause by the reflection. Furthermore, as distance gets larger (with the heights fixed), the length of the reflected path starts approaching that of the primary path. Almost every ray that is reflected off of a building (or an object other than ground) will have a ground reflected ray associated with it, and thus, the attenuation of the aggregate will also follow a ~1/r4 model. The impact of ground reflection is to transform the effective channel loss from $\sim 1/r^2$ to $\sim 1/r^4$ with almost no frequency or spatial diversity.

The poor channel propagation characteristics in terrestrial networks, both urban and suburban, increases the cost and power requirements of the transceivers in order to make for the loss. This increase is not insignificant.

Frequency Dispersion

In addition to fading, one of the consequences of multipath is that different rays may arrive across multiple symbols, especially in high bandwidth systems, giving rise to what is known as intersymbol interference or ISI. ISI gives rise to a multitap channel response in the time-domain and a non-flat response in the frequency domain, which needs to be equalized. Equalization takes place either in the time domain (by applying some form of adaptive filter) or in the frequency domain (e.g. using OFDM). Either way, as a result of equalization, the system will take a hit in the power requirements, processing requirements, and performance. The processing requirements will scale by a factor that is proportional to the ratio of the effective length of the channel (e.g. in seconds) to the symbol (sample) width (in the same time units). The effective length of the channel or the delay spread is the time difference between the first arriving ray (path) with significant power and the last arriving ray with significant power, where the definition of significant is application specific. The symbol width or period is the inverse of the bandwidth. This is significant for both STAP and mm-Wave systems since the computation requirements are already large to begin with. On the power side, equalization algorithms usually result in signals with high peak-to-average power ratios (PAPR). When OFDM is used, the average PAPR increases with the number of subcarriers, which in turn increases with the length of the channel response. When equalization is used, the average PAPR increases with number of filter taps when the filter is applied to the transmitted signal (the filter length is proportional to the channel length). When the filter is only applied at the receive side, the impact will be in the form of noise amplification. The increase in PAPR further reduces the link budget, and thus increases the power requirements on the transceiver. With regard to performance, the amount training required to equalize the channel is proportional to the filter length, and thus adding additional overhead and potentially increasing latency. (The required number of training samples of time-bandwidth product (TBP) is proportional to the product of the number spatial degrees of freedom (DOFs) or the number of antennas and the number of temporal DOFs (i.e. number of filter taps.)

Time Dispersion

Another challenge for terrestrial networks is time varying channels. It's easy to see why the response of wireless channels would vary rapidly when one end of the link is mobile. However, even when both links are fixed, channels can also experience fast fading due movement of reflectors, especially in environments without a strong LOS component. The situation is much worse in high multipath environments since each path length can vary independently at a different rate. In order to cope with fast time variations, the wireless channel needs to be estimated at a much higher frequency. The consequence of this is increased processing requirements, higher overhead, and lower available TBP.

Channel Reciprocity

Implementing STAP at both ends in both directions of wireless link (i.e. both transmitters and receivers are beamforming) is essential to achieving near optimum performance (both the link budget as well as the interference mitigation load on the receiver arrays improve considerably when the transmitters are beamforming and minimizing their interference). Tx beamforming usually represents a bigger challenge since the data required to compute the weights reside on the other end of the link. However, when channel reciprocity holds, this data becomes mirrored locally (i.e. the same data used for Rx beamforming can also be used on the Tx side). Channel reciprocity is more reliable when both directions of the link share the same frequency channel (e.g. TDD). The different transceivers on the array need to be calibrated in order to take advantage of the channel reciprocity. Also, even in a TDD system, there can be a slight mismatch in the channel responses if the channel varies rapidly in time. In the absence of channel reciprocity, the Tx weights need to be learned via explicit feedback from the other end of the link, which may result in considerable overhead or may not be feasible if the channel is changing rapidly in time, or by settling a suboptimal solution (i.e. by estimating the direction(s) of arrival from the Rx weights and the array geometry). In large multipath environments, channel responses on different frequency channels become less correlated, and thus making Tx beamforming work in terrestrial networks only feasible in TDD systems.

Spatial Separation

To take advantage of STAP in order to reuse the spectrum spatially, the remote nodes must have unique spatial signatures that can be separated by the antenna array. In a free space (LOS) environment, the angular separation between every pair of nodes must be larger than the angular resolution of the array. In general, the ability of the array to separate signals with different spatial signatures depends on the size of the array, including the number of antennas. However, in terrestrial network deployments, the nodes are arranged in a single dimension: horizontally (see FIG. 4). This means that the horizontal dimension of the array contributes a lot more to the effective size of the array than the vertical dimension, which makes the array a lot less compact and more difficult to install and maintain.

Installation Challenges

Most wireless systems use one of two types of static-pattern antennas: directional or omni-directional. Omni-directional antennas radiate equally in all directions on a plane. In practice, antennas are classified as omni-directional when they have a wide beam pattern that covers almost 360°, even if the gain is not exactly equal in all directions on the plane of interest. Usually omni-directional antennas are trivial to install and maintain do not require alignment, except maybe for adjusting the plane of orientation. The drawback of using omni-directional antennas is poor range and capacity. Directional antennas require careful beam alignment in both dimensions (azimuth and elevation), and pretty poor in tracking dynamic channels. Beamforming provides significant improvements over static antennas (both directional and omni-directional), and achieves much better range, coverage, and capacity, and adjusts well to channel dynamics, and thus is much easier to install. However, even beamforming antennas can be classified, based on the coverage (steering range) they provide, as directional or omni-directional. Omni-directional beamforming arrays can be implemented by either using omni-directional antenna elements or directional antenna elements that are arranged such that their aggregate pattern provides omni-directional coverage. Omni-directional beamforming antennas sacrifice some system gain and capacity in order to improve coverage and ease of installation. Directional beamforming arrays have limited steerability range. The steerability is usually within a sector that is determined by the beam pattern of the antenna element. The limited steerability of the array will require additional installation effort in order to achieve near optimum performance.

Interference

One of the biggest challenges wireless systems have to deal with is interference, especially when it comes from sources that are external to the system. External interference presents a challenge to wireless system designers because it is difficult to control. Both the timing and power level of the interference signal are difficult to predict, which makes it difficult for the beamformer to cancel it out. In ideal scenarios, a beamformer expects all interfering signals to show up during the reference symbols in order to compute the directions of the nulls. If they only show up in the payload, then the beamformer is unable to cancel it out even if multi-pass beamforming with decision-direction is employed, especially if there are too many bit errors. Furthermore, the position and power levels of the interference cannot be controlled either. Unlike, in-network interference, where the relative positions of the nodes are chosen to maintain minimum distance and the Tx powers are controlled, nodes that are external to the network can be anywhere.

As shown in FIG. 4, the conventional terrestrial outdoor wireless networks, effective spatial separation only occurs in the azimuth plane, with very limited separation in elevation.

Site Acquisition

Every wireless cell needs to be hosted on a site. These sites vary depending on the required cell size (i.e. coverage area). Macro-cells are usually hosted on towers or tall buildings or towers mounted on building tops etc. Mini-cells are hosted on smaller towers and smaller building and so on. Small cells can either be indoors or outdoors. Outdoor small cells are mounted on either lightposts, street-lights, utility/electricity poles, rooftops, or building walls etc. Each of these sites requires real estate, the size and cost or which grows with the cell size. It's difficult to building a dense network of macro and mini-cells in urban areas because of cost and scarcity of real estate. In addition, cities and municipalities are increasingly passing laws that would limit the deployment of macro and mini-cells for aesthetic and environmental reasons. As a result, most wireless carriers are shifting their attention to small cells as a long term strategy for scaling their capacity. However, small cells present another set of challenges. While the small cell sites are readily available, the acquisition of those sites can still be a hassle. First, access to lightposts, street-lights, or utility poles requires dealing/interacting with several entities, both public and private. This usually includes both the municipality and the utility company. Second, the ownership and rules governing those sites varies from city to city and municipality to municipality. Also, many cities have strict rules on the size and power requirements for equipment mounted on these sites in order to preserve aesthetics. Third, while building walls and rooftops may not have the size/power restrictions associated lightposts, these sites are usually owned/run by different entities, even within the same municipality, with each entity having its own policies. Large network operators don't like dealing with many entities. (That also explains why big carriers usually choose a small number of suppliers for their network equipment, and let these suppliers aggregate and integrate solutions from other entities before they buy it from them.) Fourth and finally, there is the challenge of powering and backhauling those sites. Backhaul is bigger issue for small cells than it is for macro and mini-cells since it becomes a larger fraction of the overall site cost, and it is usually much harder to get LOS and pull fiber to those sites.

Network Bring-Up Time

In addition to cost, building terrestrial networks is a time consuming process. In addition to building the actual infrastructure (e.g. towers, poles . . . ), there is also the process of site acquisition, spectrum acquisition, and dealing with rules and regulations. This whole process makes the barrier to entry much higher and reduces the potential for competition. More importantly, it makes the response very slow in disaster recovery situations, especially when the existing infrastructure is destroyed (e.g. by an earth quake or hurricane).

Coverage

The goal of a wireless system, first and foremost, is to provide ubiquitous coverage to its users. In initial network deployments or in low population density areas, capacity is not the primary concern. In these circumstances, the goal is to achieve coverage with minimal infrastructure while meeting a minimum capacity target. For a terrestrial based infrastructure, achieving universal coverage is not always economically viable. First, the cell tower coverage area is proportional to the square root of its height, which drives up the cost (both capital and maintenance) of the tower. The curvature of the earth surface determines the upper limit on the coverage area. However, since the path loss increases as $r^4$, the effective coverage area is usually much smaller than the upper bound determined by earth curvature. That means that there is minimum number of towers required to achieve the desired coverage. This increases both the capital and operational cost of the network. Second, a large amount of the covered areas will have little or no usage, especially when high density areas are spread out.

The issues listed above can be mitigated when one or both links is up in the air. A link where one or both ends of the link is up in the air is referred to as an aerial link. An example where both ends of the link are in the air is satellite to satellite (or balloon to balloon or balloon to satellite) communication, and an example of the latter would be satellite (balloon) to ground communication. The definition is independent of the position of the satellite orbit (e.g. geo-stationary or leo-stationary). In these types of links, communication is mostly LOS or nLOS. Even when there is multipath, most paths are expected to be clustered around a very narrow angle. This has several major implications on propagation, time/frequency dispersion, reciprocity, spatial separation, installation/maintenance, and interference.

With regard to path-loss, aerial links become mostly LOS or arrive with very few reflections. Also, when a links are vertical to the ground, the length of the ground reflected path becomes independent of the direct path, and in many cases the angular separation between the two paths (i.e. direct and ground reflected) is large enough (usually close to 180°) such that at least one of these paths can be severely attenuated by the antenna pattern, and thus, the signal power for such links drops as $1/r^2$, as opposed to $1/r^4$ as in the case for terrestrial links (as shown in FIGS. 2 and 3).

When the channel is mostly LOS (or when most paths come from the same direction at similar delays), the channel response becomes mostly flat in the frequency domain. That means that time/frequency do-main equalization becomes either trivial or unnecessary. This results in significant reduction is processing requirements and TBP. Also, if the channel response is flat enough such that a short time domain filter is sufficient to equalize it, then the benefit from a multicarrier modulation like OFDM starts to diminish. When the channel response in the time domain is short, then a more optimal solution like Viterbi can be used. A single carrier signal provides much better latency, spectral and power efficiency (lower PAPR).

In a general STAP system, the maximum number parameters (DOFs) that need to be estimated equals the product of the number of spatial DOFs (i.e. antennas) and the temporal DOFs. The number of temporal DOFs required to effectively equalize the channel is proportional to maximum delay spread of the channel measured in samples. These parameters can change rapidly in a mobile environment. However, when one or both ends of the link are high up in the air, only a single parameter, the DOA, is required to capture the necessary channel characteristics, and this parameter is not expected to change rapidly, and if it does it will be in a controlled and predictable manner. Even when the nodes are mobile, given the distance between the two nodes, it takes significant time to produce a noticeable difference in the angle of arrival, as shown in FIG. 5.

Another side-effect of having a strong LOS path, the STAP algorithm boils down to DOA computation. The DOA is independent of frequency. So if the DOAs are known, the beamforming weights can be computed for any frequency off-line. The Rx weights can be mapped into Tx weights provided that the all transmitters and receivers are calibrated. Otherwise, it is not possible to map even in a TDD system. Also, for the mapping to work, the separation between any two frequencies has to be small relative to the center frequency in order to guarantee somewhat similar beam patterns. In any case, when the transceivers are accurately calibrated, both beam peaks and nulls can be accurately mapped from one frequency to another. In this case, channel reciprocity is not required, and the links can run in FDD mode in order to reduce the link latency.

When a radio node (master) is up in the air, and all the nodes (slaves) it communicates with are on the ground, and if the maximum horizontal distance from the master to each slave (i.e. cell radius) is comparable to the vertical distance (as shown in FIG. 6), then the master can pack (i.e. spatially multiplex) a lot more slaves with a smaller array than a terrestrial master. Compared to the terrestrial master, in the aerial master, both dimensions of the array are at work in the multiplexing and interference cancellation process as shown in FIG. 6. That means that more spatial DOFs (antennas) can be packed in a smaller area. Furthermore, the antenna alignment becomes trivial at both the master and slaves; antennas are pointed down (up) on the master (slave). Similarly, when both master and slaves are aerial, the elevation of slave relative the master can vary significantly to provide some elevation diversity. However, in the case of aerial links, all arrays must have a 360° field of view, since the nodes are expected to rotate while floating in the air.

Since the cost of increasing the height of an aerial node is marginal and negligible, universal coverage can be achieved with a lot fewer nodes than in the terrestrial case. This makes the economics of rural coverage a lot more attractive. After an initial deployment that achieves full coverage, the heights and densities of these aerial nodes can be changed in order to meet the changing capacity requirements. The cost and complexity of cell-splitting in an aerial network is a lot less than its terrestrial counterpart. More importantly, this eliminates most of the site acquisition costs, and significantly reduces the network bring up time, which is critical in disaster zones. Furthermore, the aerial infrastructure is inherently immune to many types of natural disasters like earthquakes and volcanos as well as ones that are man-made.

Finally, when a radio node is either floating in the air or is on the ground (pointing upwards), it becomes a lot less sensitive to terrestrial in-band or adjacent-band interference. That means that the linearity and out-of-band filtering requirements can be reduced significantly. The potential impact on the cost and power requirements of the system can be reduced further as a result. In the case of full aerial links (both ends are aerial), unlicensed bands can be used with little or no interference to terrestrial networks. This eliminates a large chunk of the spectrum costs, potentially increasing competition by lowering the barrier of entry.

Letting radios float in the air comes with several challenges. The biggest is the constant change in position rotation that often takes place due to wind and other factors. Also, once the nodes are in the air, maintenance becomes difficult. Therefore, adaptive antenna array technology is essential to making aerial networks work reliably without suffering significant outages. Otherwise, the network will experience significant performance degradation. (In this disclosure, the term aerial network is used to refer to networks made of links, where at least one end of the link is aerial.) Using static omni-directional antennas degrades the capacity by creating too much interference, while static directional antennas will result in frequent outages due to the poor coverage.

Modern day aerial networks are mostly built with satellites. Conventional satellite networks achieve more determinism in the satellite position by having satellites in very high orbits in the sky. While this takes care of challenges associated with motion and rotation, and achieves very good coverage with few satellites, it has very poor capacity and latency. The cost of satellite technology is still very high.

BRIEF DESCRIPTION OF THE DRAWINGS

FIG. 15 illustrates transmission intervals;
FIGS. 16A-16E illustrate duplexing techniques.

FIG. 54 illustrates an intra-aerial-node and intra-ground-node interference.

DETAILED DESCRIPTION OF ONE OR MORE EMBODIMENTS

New and innovative techniques and architectures for wireless network deployment are described. These network architectures are made up of hybrids of aerial and terrestrial infrastructure technologies. Three cutting-edge technologies (mini-Satellites (or mini-Sats), pseudolites, and smart (adaptive) antenna arrays) are the key ingredients/foundation of the techniques and architectures described in this disclosure. Together, these technologies enable wireless network providers to overcome economic challenges associated with coverage and capacity, and simplifies the integration of mm-Wave technology for future capacity enhancements.

Figure 8:
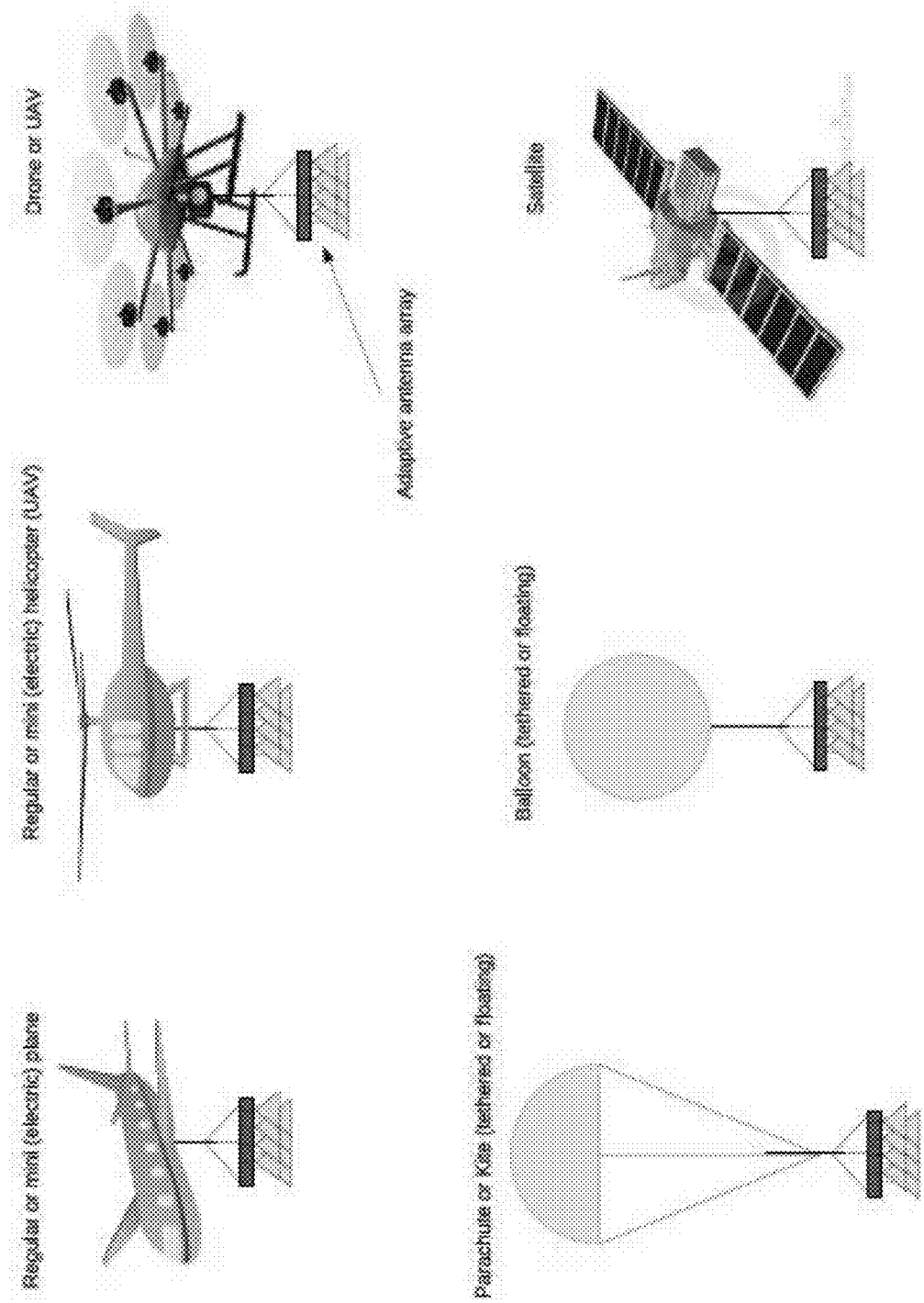
FIG. 8 illustrates mini-satellite types.

Mini-satellites or mini-Sats can be thought of as very low cost satellites with much smaller coverage footprint than conventional satellites. The definition is independent of the technology used to keep it afloat in the air. For example, a mini-satellite can be conventional low earth orbit (LEO) satellite, a balloon, a drone, or a plane as shown in FIG. 8. Also, the nodes can either be tethered or floating (see FIG. 8). As shown in FIG. 8, different devices can be used as mini-satellites. For example, a mini-satellite can a balloon (free or tethered), drone, plane, helicopter, parachute, or satellite. As long as the devices can keep the wireless equipment floating in the air for extended period of time, then it qualifies as a mini-satellite. Pseudolites refer to something, whether terrestrial or aerial, that performs a function (or functions) that is (are) commonly performed by satellites. For example, pseudolites can be small transceivers used for communication and/or locationing. Since the focus in this disclosure is almost exclusively on high speed communication, the term pseudolite is used to refer to small cells. The disclosure has a more detailed description of mini-Sats and pseudolites, as well as other components of the wireless network infrastructure and of different wireless network topologies that leverage AAS/STAP processing and/or mini-SATs/pseudolites. Radio/antenna/mini-Sat designs that improve cost, performance, and/or power efficiency of both mini-Sats and pseudolites are also presented in this disclosure.

In the disclosure, the following abbreviations may be used:

AAS—Adaptive Antenna System
ACLR—Adjacent Channel Leakage Ratio
ADC—Analog to Digital Converter
ADD—Any Division Duplexing
AM—Amplitude Modulation
AOA—Angle Of Arrival
AOD—Angle Of Departure
AP—Access Point
ARQ—Automatic Repeated reQuest
ASIC—Application Specific Integrated Circuit
AWS—Advanced Wireless Services
BPSK—Binary Phase Shift Keying
BS-Base station
CAZAC—Constant Amplitude Zero Auto Correlation
CDM—Code Division Multiplexing
CDMA—Code Division Multiple Access
CINR—Carrier to Interference and Noise Ratio
CIR—Carrier to Interference Ratio
CNR—Carrier to Noise Ratio
CN—Concentrating Node
CP—Cyclic Prefix
CPE—Consumer Premises Equipment
CPU—Central Processing Unit
CS—Cyclic Suffix
CSC—Cyclic Single Carrier
CSI—Channel State Information
CTC—Convolutional Turbo Codes
DAC—Digital to Analog Converter
DFT—Discrete Fourier Transform
DL—Downlink
DMI—Direct Matrix Inversion
DOA—Direction of Arrival
DOF—Degree Of Freedom
DOD—Direction of Departure
DPD—Digital Predistortion
DSP—Digital Signal Processing
DTN—Delay Tolerant Networking
EIRP—Effective Isotropic Radiated Power
EN—EndNode
EVD—Eigen Value Decomposition
EVM—Error Vector Magnitude
FDD—Frequency Division Duplex
FDM—Frequency Division Multiplexing
FDMA—Frequency Division Multiple Access
FFT—Fast Fourier Transform
FIR—Finite Impulse Response
FM—Frequency Modulation
FPGA—Field Programmable Gated Array
FSK—Frequency Shift Keying
GEO—Geosynchronous orbit
GPS—Global Positioning System
HARQ—Hybrid ARQ
HEO—High Earth Orbit
IC—Integrated Circuit
ICI—Intercarrier Interference
IDFT—Inverse Discrete Fourier Transform
IEEE—Institute of Electrical and Electronic Engineers
IF—Intermediate Frequency
IFFT—Inverse Fast Fourier Transform
IIR—Infinite Impulse Response
ISI—InterSymbol Interference
ISM—Industrial Scientific and Medical
LDPC—Low Density Parity Check Codes
LEO—Low Earth Orbit
LMS—Least Mean Square
LNA—Low Noise Amplifier
LOS-Line of Sight
LO—Local Oscillator
LTE—Long Term Evolution
MAC—Medium Access Control
MCS—Modulation and Coding Scheme
MDU—Multiple Dwelling Units
MGSO—Modified Gram-Schmidt Orthogonalization
MEO—Medium Earth Orbit
MIMO—Multiple Input Multiple Output
MMSE—Minimum Mean Squared Error
MP2MP—Multi-point to Multi-point
MP2P—Multiple Point to Point
MS—Mobile station
NLOS—non-Line of Sight
nLOS—near-Line of Sight
OAM—Orbital Angular Momentum
OFDM—Orthogonal Frequency Division Multiplexing
OFDMA—Orthogonal Frequency Division Multiple Access
P2MP—Point to Multi-point
P2P—Point to Point
PA—Power Amplifier PAM—Pulse Amplitude Modulation
PAPR—Peak to Average Power Ratio
PCB—Printed Circuit Board
PHY—Physical layer
PM—Phase Modulation
PSK—Phase Shift Keying
PtP—Peer to Peer
PU—Processing Unit
Q—Quality Factor
QAM—Quadrature Amplitude Modulation
QoS—Quality of Service
QPSK—Quadrature Phase Shift Keying
RF—Radio Frequency
RFPD—RF Predistortion
RLS—Recursive Least Squares
RMGSO—Recursive Modified Gram-Schmidt Orthogonalization
RN—Residential Node
RTG—Receive Time Guard
RTT—Round Trip Time
RX—Receive or Receiver
SFAP—Space-Frequency Adaptive Processing
SFC—space Frequency Coding
SFTAP—Space-Frequency-Time Adaptive Processing
SFTC—Space Frequency Time Coding
SINR—Signal to Interference and Noise Ratio
SIR—Signal to Interference Ratio
SNR—Signal to Noise Ratio
SoC—System on Chip
STAP—Space-Time Adaptive Processing
STFAP—Space-Time-Frequency Adaptive Processing
STC—Space Time Coding
STFAP—Space Time Frequency Adaptive Processing
STFC—Space Time Frequency Coding
SVD—Singular Value Decomposition
TCP—Transmission Control Protocol
TBP—Time-Bandwidth Product
TDD—Time Division Duplex
TDM—Time Division Multiplexing
TDMA—Time Division Multiple Access
TFS—Time-Frequency Synchronization
TG—Time Guard
TTG—Transmit Time Guard
TX—Transmit or Transmitter
UAV—Unmanned Aerial Vehicle
UL—Uplink
U-NII—Unlicensed National Information Infrastructure
WCS—Wireless Communication Services
WiFi—Wireless Fidelity
WiMAX—Worldwide Interoperability for Microwave Access
WLAN—Wireless Local Area Network
WOBA—Weighted Overlap Beamform and Add
ZDD—Zero Division Duplexing System Overview Wireless Network Infrastructure Components Different wireless infrastructure components are used for hosting cells of different levels of coverage. These are summarized in FIG. 7 that shows a satellite cell with a satellite and an adaptive antenna array, a mega cell using balloons, a plane or a satellite, a macro cell using antennae arrays on towers or buildings or a mini-satellite, a mini cell using antennae arrays on towers or buildings or a mini-satellite and a small cell using a light post, residential rooftop, wall mount or drone mini-satellite. A majority of wireless networks are built using some combination of aerial and terrestrial infrastructure. The aerial part of the network infrastructure is implemented mostly using satellites, and its primary purpose is to provide ubiquitous coverage, and as a broadcast medium. The terrestrial infrastructure is mainly implemented with radio towers, and its main purpose to provide high speed communication.

Satellites

Satellites are devices that move in fixed orbits around the earth. In order to maintain position in orbit, satellites must be placed outside earth's atmosphere. This places a lower bound on the height of satellites. This is the key factor, in addition to cost, that limits that capacity density that can be achieved with a network of satellites. Satellites are powered using solar cells, and communicate back to earth ground stations using directional antennas in order to conserve the transmit power. Satellites are sometimes equipped with arrays of antennas that form spot beams on the ground. However, these antennas are not adaptive. Since the nodes are stable in orbit, due to the lack of atmospheric effects, the antenna alignment with respect to the earth station is relatively stable as well. Satellites are classified into different categories based on their altitudes orbital periods. There are other classifications based on other criteria such as the shape and inclination of the orbit with respect to the equatorial plane. The three main categories are:

1. High Earth orbit (HEO) satellites:

Satellite orbits with radii that are larger than 35,000 km are classified as HEOs. Of particular interest are geo-synchronous satellites. A satellite is referred to as geo-synchronous when its orbiting is equal to that of the earth (i.e. 24 hours). This can only be achieved when the radius of the orbit is 42,164 km. If the satellite orbit lies on the same plane as the equator, the satellite is called a geo-stationary satellite since it always appears at the same point in the sky with respect to a static ground observer.

Geo-synchronous satellites have received lots of attention since they provide excellent coverage. The areas covered by a geo-synchronous satellite is approximate one third the surface area of the earth. So the entire earth can be fully covered with a few HEO satellites. Geo-stationary satellites are of particular interest since their locations are relatively static with respect to any point on earth. Therefore, any point on earth will connect to the same satellite all the time (i.e. no need for satellite switching and/or handoff). However, the entire earth surface cannot be covered by geo-stationary satellites alone as their coverage is poor in areas near the poles. To cover these spots, satellites with different types of orbits are required. For this purpose, highly elliptical orbit satellites are used.

The excellent coverage provided by Geo-synchronous satellites makes them ideal for many applications. One popular application is broadcast television, since the same content is shared among many users and is tolerant to latency. Another application is a relay between two points on earth. They are also used for rural coverage. There are also military and geo applications.

Geo-synchronous satellites have several limitations. Given the large distance from the earth, there is always high latency associated with communicating via these satellites (the RTT between any two points on earth communicating via satellites is at least 0.5 sec. This minimum latency cannot be improved as it is limited by the speed of light. So, geo-synchronous satellites are not optimal for voice and real-time applications. Furthermore, since these satellites cover large areas, they have very poor capacity densities. While this is not a limitation for broadcast applications, it performs very poorly in unicast communications. Geo-synchronous satellites divide up there coverage area into smaller areas using spot beams. These spot beams are implemented using steerable antennas. However, the geographic area covered by a spot beam is still very large and covers a large number of users, which does not improve the capacity density by much. Finally, the large distance makes using geo-synchronous satellites difficult to use for mobile applications. To compensate for the path loss, highly directional antennas on both ends of the links need to be used.

2. Medium Earth Orbit (MEO) Satellites:

MEO satellites, as the name suggests, exist in lower orbits than HEO satellites (typical altitudes range between 2000-20000 km), which results in smaller coverage areas and shorter orbit periods. MEO satellites with a half-day orbiting period may be referred to as semi-synchronous. Covering the earth with MEOs will require a larger number of satellites than HEOs.

The Global Positioning System (GPS) used for navigation is the most popular application based on MEO satellites. MEOs are also used for high coverage data networks. MEO satellites, especially those at low orbits, address the latency issue inherent to HEO-satellites. However, typical MEO constellations do not provide the capacity densities sufficient to support high throughput Internet data access.

3. Low Earth Orbit (LEO) Satellites:

LEO satellites occupy the region bounded from above by MEOs and below by the earth's atmosphere. Satellites need to be in the regions where the atmosphere density is very low in order to avoid turbulence. It is unrealistic to avoid the atmosphere completely since it exists well above 700 km off the surface of the earth. Both MEOs and LEOs complete several revolutions in their orbits per day, and a given area will receive service from several satellites per day (only one or two simultaneously). Therefore, the coverage area of these satellites must have some degree of overlap in order to ensure continuity in coverage. LEOs provide much better capacity densities than MEOs at the expense of a larger satellite constellation. This makes LEOs suitable for mobile telephony and medium to low density data networks as well as rural coverage.

The cost of satellites has improved dramatically in recent years, especially LEOs and MEOs. Due to their lighter weights, multiple LEO satellites can be launched into orbit at one time, compared to HEO satellites, where only one or two can be launched with a single launch with the best technology available today. However, the continuous movement of these satellites (relative to the earth) presents several challenges. First, the network must continuously adapt the signal routing between satellites in order to minimize the latency between terminals. In a network of LEO satellites, multiple hops are usually required to transport the signal from source to destination. If the routes are not chosen properly, it can lead to high latency and jitter, one of the key problems that are supposed to be solved with LEO satellites. This involves handing over connections from one satellite to another as they move below the horizon. Also, due to the high speed of rotation, systems must cope with high Doppler shifts. Finally, because these satellites do not remain static over a given, they are best suited for global coverage and well-suited for regional coverage if the goal is to provide continuous high capacity network coverage to a small region only. Then this cannot be achieved with a single LEO satellite; an entire fleet is still required in order to ensure that at least one satellite is in view as any given time. However, in applications where high delays (i.e. hours or even days) can be tolerated (such is sometimes referred to as delay-tolerant (or store-and-forward) networking (DTN)), satellites (both HEOs and LEOs) are great vehicles for carrying this type of traffic. For HEO satellites, the high latency and low capacity become a non-issue since traffic can be scheduled and shaped to minimize the load on these satellites. For LEO/MEO satellites, a much smaller constellation is sufficient to support these kinds of traffic patterns.

Figure 10:
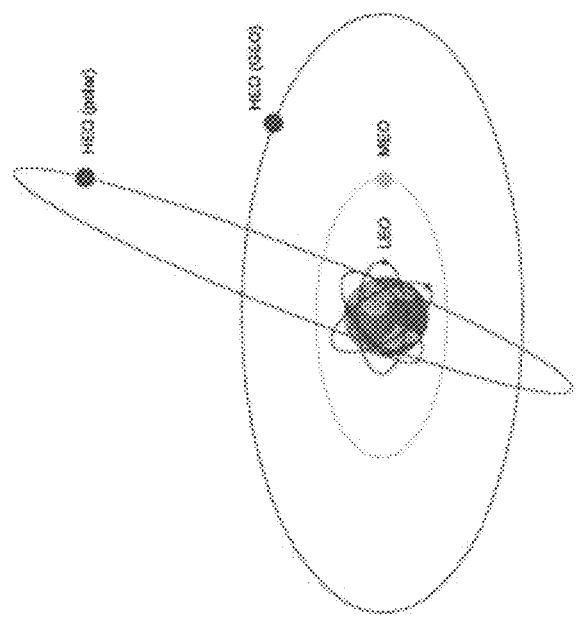
FIG. 10 illustrates various types of satellite orbits.

The different satellite orbits discussed above are shown in FIG. 10. To summarize, while the cost of satellite technology has improved considerably in recent years, it is still remains an expensive option for providing high capacity coverage.

Cell Towers

Terrestrial infrastructure, cellular or broadcast television, is predominantly implemented using towers. Towers vary in size and height depending on the required coverage. There heights can sometimes be as large as 400-500 m (common for TV towers), and as little as 20-30 m. The tower coverage area is limited by the curvature of the earth and is proportional to the square root of the tower height, while the tower cost increases at least linearly with tower height.

In cellular networks, large towers are used to achieve "macro cell" coverage, and smaller towers (20-30 m) are used for mini-cell (large towers (macro cells) are used to cover suburban areas and freeways, while mini-cells are used in urban areas. Mini-cells also result from cell-splitting of macro-cells). Sometimes wireless carriers try to eliminate some of the tower costs by either leveraging tall buildings as cell sites or placing smaller towers on building tops. This is mostly done in urban areas, where there is little or no real estate for towers.

One of the key requirements for cellular towers that further drives the cost is that they need to be stable and climbable. Stability is mostly required by P2P microwave (and mm-Wave) links that rely on very narrow beams that require very precise alignment. Even slight movement (e.g. due to wind) can result in misalignment that can cause outage (even in the absence of microwave links or alignment precision requirements, the stability requirements is also driven by the amount radio gear that needs to be placed on the tower). However, if stability is the only requirements, then light weight guyed towers (poles) are sufficient. However, the towers must be easily climbable in order to perform initial (and subsequent) alignment of these microwave links. The stability and climbability, together with the tower height, significantly increase the cost of the tower. This also makes traditional towers unsuitable for solving the rural coverage problem.

Small Cells/Pseudolites

Tower-based infrastructure has failed to keep up with the recent surge in wireless data demand. The increase in demand, together with spectrum scarcity, is driving the need for a high density cell deployment that would not be economically feasible with towers. The large cost and footprint of towers limit the density of deployments. Instead, the trend is moving towards small cells that would be deployed on street furniture (e.g. light-posts, street-lights, rooftops, building walls), which would eliminate a lot of the capital infrastructure costs. While it eliminates a large component of the infrastructure cost, a network architecture based on terrestrial small cells brings up another set of challenges. The biggest and most important of these challenges is the backhaul. Other challenges include coverage and intercell interference, which are also shared with conventional macro cell deployments.

RAN/Fronthaul

In some cases, network operators opt for some form of a RAN technology (e.g. C-RAN or D-RAN) instead of small cells. A RAN consists of a network of remote radio heads (RRH). Each radio head replaces or plays the role of a small cell. The main difference between RAN and small cells is that while small cells send/receive packets back and forth to the core network, RAN RRHs send/receive baseband (I/Q) data back and forth to the core network. All of the baseband processing occurs at the core network. Since RRHs do little if any baseband processing, they are naturally neutral to standards. Therefore, their upgrade cycle can be much longer than small cells, which makes them attractive to network operators. However, since they exchange raw baseband data with the network, their backhaul capacity requirements are usually much higher than small cells, and the latency requirements are much tighter. The term fronthaul is more common than backhaul when referring to RAN. That's why most RAN deployments today are restricted to areas with high fiber penetration.

Mini-Satellites

The rising cost of infrastructure is driving the need for alternatives that can deliver high density cover at much lower cost. A new set of technologies, still in their early stages, which shall be referred to in this disclosure collectively as mini-satellites, are beginning to receive more attention from carriers. Mini-satellites are floating objects that are much lighter weight than conventional LEO satellites at much lower altitudes (in the 1-50 km range). Mini-satellites can be implemented using different technologies such as different variants of balloons, drones, or small planes, examples of which are shown in FIG. 8. These mini-satellites have many advantages. First, they provide most of the advantages of aerial communications and networking listed above. Second, mini-satellites are a lot cheaper to build and cheaper to launch than LEO satellites, and they don't move as often (they remain in view of a given point for periods of days). Third, they can cover much smaller areas than LEOs, providing better capacity density and lower latency.

Mini-satellites combine the coverage and flexibility of satellites with the capacity density of terrestrial networks at lower cost. They can be used for both access and backhaul applications. Because of their superior propagation characteristics, they can leverage bands at high frequencies (e.g. mm-Wave) much better than both terrestrial and conventional satellite infrastructure, which allows even more capacity. However, there are some challenges with mini-satellite deployments. First, since these mini-satellites exist at altitudes where the atmospheric density is relatively high, they are more susceptible to drag than normal satellites. Second, since they are smaller and lighter than satellites, they size of the power source which they can support is also limited. Finally, conventional satellites rely on their motion to provide a centripetal force to counter gravity in order to stay in orbit. Mini-satellites on the other hand do not have such a motion and must rely on other means to stay afloat, which may also require energy. This also limits the weight that they can support. While there are techniques that have been developed to address those issues, they still present a challenge and place new constraints on system design. For example, the instability in position and rotation makes it difficult to use conventional static beam antennas as discussed below.

Figure 7:
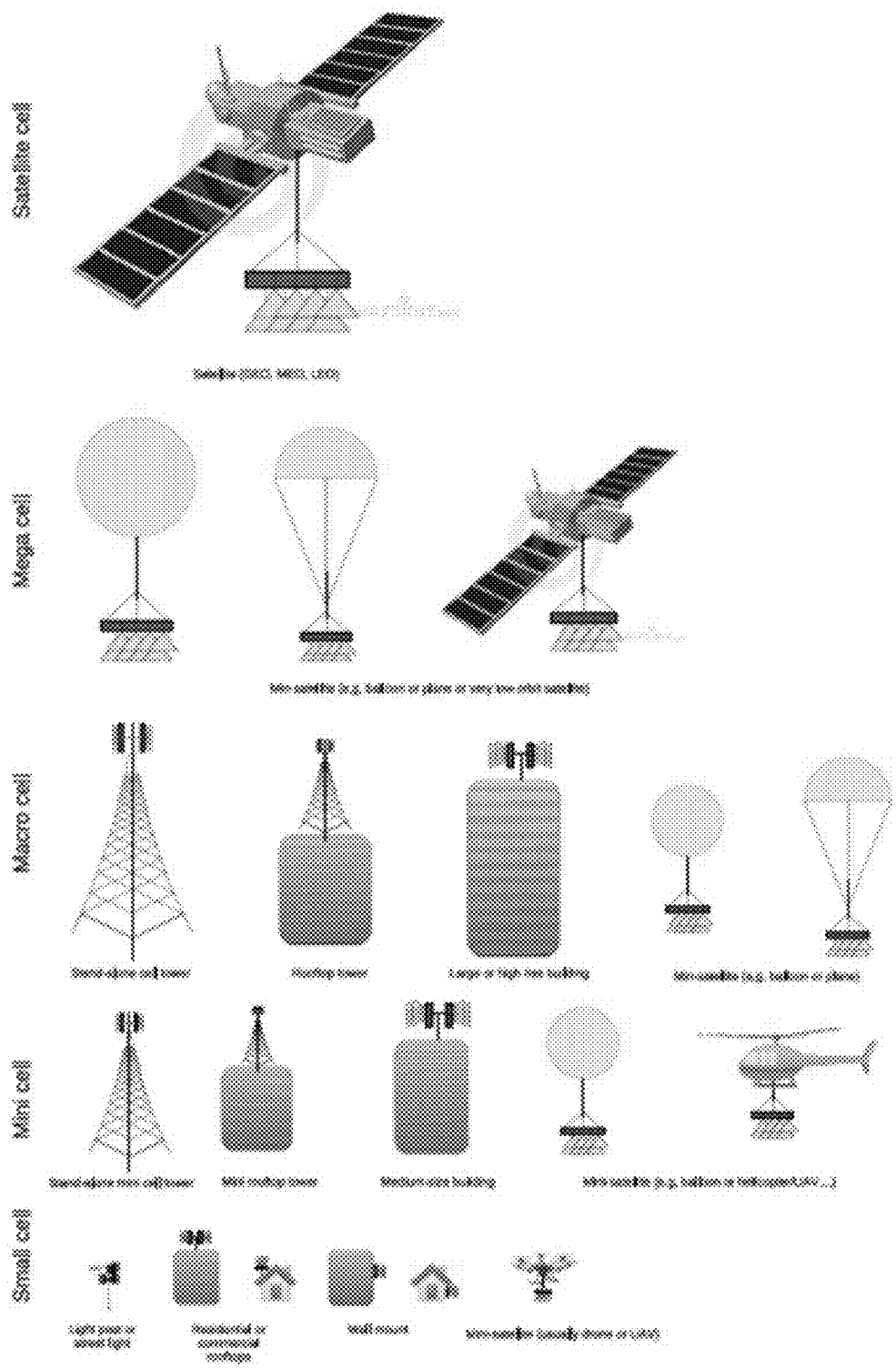
FIG. 7 illustrates different types of cellular sites.

The key infrastructure components, both aerial and terrestrial, are summarized in FIG. 7 that shows the various cell sizes and the components with adaptive antennnas that can achieve the functionality of each cell size.

Antennas and Coverage

Antennas are basic components in wireless systems as they serve as the interface between the air and the wire. Antennas can be classified into different categories based on their radiation patterns. Two of the main categories are described next in this section.

Static Beam Antennas

Most conventional antennas have static beam patterns. Antenna radiation patterns are classified based on their coverage into one of the following categories. Not all antenna patterns can be classified as directional or omni-directional. In fact many antennas exhibit patterns that fall in-between these two categories. For example, antennas with large main lobes or antennas with multiple lobes.

Figure 11A:
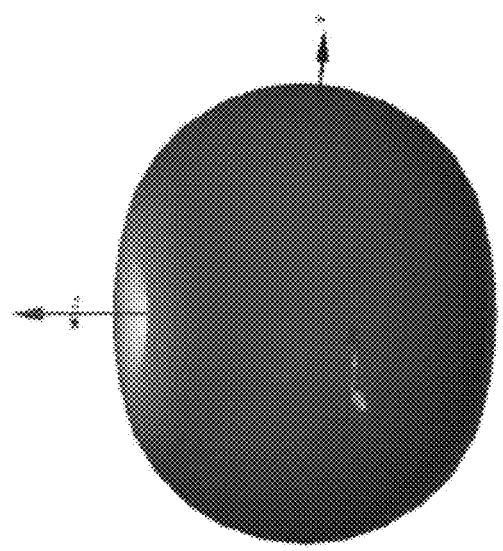
FIGS. 11A and 11B illustrate antenna radiation patterns.

1. Omni-Directional:

Omni-directional antennas are defined by radiation patterns that deliver peak (or close to peak) gain in all directions in a given plane (e.g. the azimuth plane), as shown in FIG. 11a. Omni-directional antennas should not be confused with isotropic antennas. Isotropic antennas radiate equally in all directions in a 3-dimensional space and are not realizable in practice. Since they radiate almost equally in a plane, they require little or no manual alignment during either installation and maintenance, and provide very good coverage. This convenience comes with price. First, since energy is dispersed almost equally in all direction in a plane, the range will take a big hit. The coverage is further degraded by fading and shadowing. Second, using wide beams means that more users share the same beam, resulting in inefficient spatial reuse, and thus degrading the overall system capacity. Radios at cell edges experience a combination of poor coverage and high intercell interference, which reduces the capacity even further.

Omni-directional antennas are usually used in early stage cellular network deployments, where coverage is the primary concern. They also common in WiFi access points and client/handheld devices where the orientation of the device is expected to be random and any given time.

2. Directional Antennas

Figure 11B:
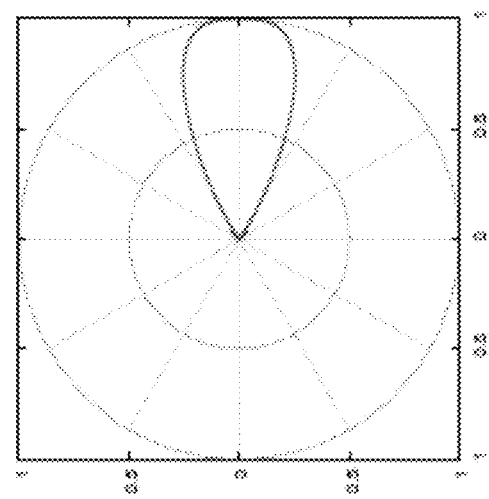

Directional antennas are defined by radiation patterns that are focused in a single direction as shown in FIG. 11b. The beam focused at the direction of maximum antenna gain is usually referred to as the main lobe. Sometimes antennas with multiple lobes with gains comparable to the main lobe are also referred to as directional antennas, provided that the sum of the widths of these lobes is significantly less than that of an omni-directional antenna (i.e. 36°). If the main lobe is wide (e.g. 60° or more), then the antenna is sometimes referred to as a sector antenna. Sector antennas are often used in cellular networks to enhance overall capacity. Typically, cells are divided into multiple sectors by replacing a single omni-directional antenna with multiple sector antennas. The capacity of each sector will be close to that of the omni-directional cell. Together, the sectors provide a full omni-directional coverage. On the other hand, highly directional antennas (i.e. 10° or less) are used for P2P communications, most commonly used for microwave and mm-Wave backhaul and rural communication (even used for satellite communication as well).

Directional antennas are a lot more power and spectral efficient than omni-directional antennas. Since the transmit power is focused in narrow beams, less energy is wasted. That means the transmit power can be reduced and there will be less interference to the outside environment, which greatly improves spatial reuse. They also offer the advantage of range increase. However, the price to pay for directional antennas is limited coverage area and high installation and maintenance costs required for aligning those narrow beams. The narrow beam and precise alignment requirements also has an implication on the capital cost and the tower structure as discussed above. Sector antennas are not used usually used for high range applications. Instead, they mainly to increase the capacity of systems that would typically use omni-directional antennas. However, there is a diminishing return of capacity gain off of sectoring. As the number of sectors increases, so does the intercell/intersector interference. At some point, the system will become interference limited. The optimal number of sectors in practice ranges from 4-6. The gain is not linear in the number of sectors. The other challenge with sectoring is antenna size. As the size of the sector gets smaller, the size of the antenna becomes larger proportionately, and so does the number of required sectors. So the overall area of the equipment that needs to be mounted is inversely proportional to the square of the sector size.

Adaptive Beam Antennas

Both directional and omni-directional antennas are static beam antennas. With static beam antennas, there is an inherent tradeoff between coverage, range, and capacity. Dynamic or Adaptive beam antenna technology refers to a class of antennas, as the name suggests, that can dynamically configure their radiation patterns to optimize the performance for a given environment. Dynamic or adaptive beams are typically implemented using an array of antennas, collectively referred to as an adaptive antenna array. In an adaptive array, the beam pattern can be shaped dynamically by controlling the signal excitation (i.e. phase and amplitude) at each antenna independently. There are many other flavors of adaptive beam antennas, including switched beam antennas and switched parasitic antennas, all which leverage an array of antenna elements or resonators, but differ on how they drive those elements. However, a fully adaptive antenna array, where the signal excitation at each antenna element is adapted, provides the tightest over the beam pattern. While this class of beamforming antennas is the focus of this disclosure, the ideas presented here apply to other beamforming architectures as well. It's also important to note that not all phased-arrays or beamforming antennas can be classified as adaptive or smart antennas. Such antennas may have controllable beam patterns, but may not have the processing capability to dynamically optimize the beam pattern in real-time. While these antennas are not adaptive, they cannot be classified as static either. With the capability to dynamically configure the beam pattern. A system that leverages adaptive arrays can realize the benefits of both omni-directional and directional antennas:

Since it can steer the beam in any direction, it has omni-directional coverage. This assumes that the aggregate beam pattern of the individual antennas in the array covers all directions.

At any given time, the beam can be focused in any given direction, in which case it is acting as a directional antenna.

Adaptive arrays have several other advantages over both directional and omni-directional antennas. An adaptive array system can transmit multiple signals simultaneously on the same frequency channel by giving each signal a unique set of antenna excitations (i.e. beamforming vectors). If the excitations are chosen such that the different signals form orthogonal beam patterns, then each beam will experience little or no interference from the other beams. This technique is referred to as spatial multiplexing. Also, the antenna array exhibits both spatial and pattern diversity that makes it more resilient against both shadowing and fading. This feature is important for NLOS communication. Also, the ability to shape the pattern in order to reduce external interference can improve the performance the cell edge considerably.

A lot of the challenges associated with terrestrial deployment, both towers and small cells, can be greatly alleviated by leveraging adaptive antenna array technology, but does not eliminate them entirely as discussed in section (introduction). First, with spatial multiplexing, a single base station can serve multiple streams simultaneously at full capacity and significantly reduce intercell interference, and the thus, can deliver an order of magnitude more capacity than a traditional multisector cell. This means that the target network capacity can be achieved with a lot fewer cells (towers). Second, the superior NLOS coverage improves the cell edge performance, and solves the small cell backhaul problem. The combination of spatial multiplexing and NLOS coverage allows small cells to be placed virtually anywhere and every-where. This flexibility gives wireless carriers and network operators more power to negotiate cheaper site rental agreements since they have a lot more options than they had before. Third, automatic steerability significantly reduces the installation and network maintenance costs and gives network operators more flexibility in choosing antenna mounting structures and locations. For small cells, this means that antennas can be deployed anywhere on lightposts, building tops, or building walls. For macro cells and mini-cells, this means that bulky and expensive towers can be replaced by cheaper and lightweight towers (e.g. guyed towers) or with mini-satellites. mm-Wave and unlicensed bands and spectrum costs.

Adaptive arrays can, in many ways, save wireless carriers a lot of money on in spectrum licensing fees. First, the superior spectral efficiency of adaptive array systems enables network operators to meet their target capacities with a lot less spectrum compared to conventional systems. Second, the interference mitigation capability of adaptive array systems also extends to out-of-network interference as well. This enables wireless carriers to leverage large chunks of unlicensed spectrum (e.g. those used for WiFi) for their network deployments. Finally, adaptive arrays can be used to improve the propagation characteristics at high frequencies (e.g. mm-Wave bands), and thus making those bands usable for both outdoor and indoor wireless access as well as backhaul.

Adaptive antenna systems are missing link between mini-satellites and the terrestrial infrastructure.

Degrees of Freedom

The total amount of data that can be transferred (i.e. the data volume) is a function of the available degrees of freedom (DOFs). The DOFs can be exploited in three orthogonal dimensions: time, frequency and space. The spatial dimension itself is made up of three orthogonal dimensions x, y, and z or azimuth and elevation and radial. Exploiting the temporal dimension means increasing the time period of communication (i.e. increasing the length of the pipe), which allows more data to be transferred. Exploiting the frequency dimension means transmitting data at a higher rate (e.g. single carriers) or increasing the number of channels over which data can be transferred (i.e. multi-carrier), which is equivalent to increasing the width or cross-section area of the pipe. Exploiting the spatial dimension means enabling several data streams (i.e. parallel pipes) to be transmitted simultaneously. The spatial dimension is the combined effect of both spatial multiplexing and spatial reuse. Therefore, the total number of DOFs is the product of all three dimensions: temporal, frequency, and spatial. The spectral efficiency (measured in b/s/Hz) is the average the number of bits that can be transmitted over the channel per time and frequency units. The data density (measured in $b/m^3$ or $b/m^2$) is the average number of bits transmitted per unit volume or unit area. The data rate (measured in b/s) is the average number of bits that can be transmitted per unit time over the desired channel. The capacity density (measured in $b/s/m^3$ or $b/s/m^2$) is the average data rate per unit volume or area. The spectral efficiency density (measured in $b/s/Hz/m^3$ or $b/s/Hz/m^2$) is the average spectral efficiency per unit area or unit volume.

The different dimensions can be divided into slices. The slices in the time and frequency domains are easy to visualize since they naturally orthogonal and disjoint, and the amount of data that can be transmitted is directly proportional to the widths of these slices, the spatial domain is bit more complicated and more difficult to visualize. Whereas, the time and frequency domains are continuous, the spatial domain is inherently discrete. The spatial domain can be exploited by increasing the number of transmitters and receivers. These transmitters and receivers. The minimum of the transmitters and receivers places an upper bound on the number of available DOFs. The effective number of DOFs also depends on other factors that include the density and distribution of the transmitters and receivers, the physical environment (e.g. positions and distribution of reflectors etc.), and antenna properties (e.g. pattern/polarization/OAM). Also, unlike time and frequency, there is no direct one-o-one correspondence between the DOFs and the transceivers; the data from/to these transceivers needs to be processed or per-processed in order to extract the DOFs (i.e. streams). In the time and frequency domains, the processing required to separate the different slices is simple and straightforward, and static (i.e. independent of a particular environment or setting). For example, separating two different disjoint time slots can be done by sampling at different times, and two separate frequency bands can be isolated using static filters. On the other hand, the processing required to extract the DOFs spatially is dependent on the particular environment and distribution that is usually time varying. Therefore, this processing needs to be adaptive.

Spatial Multiplexing and Spatial Reuse

Figure 14A:
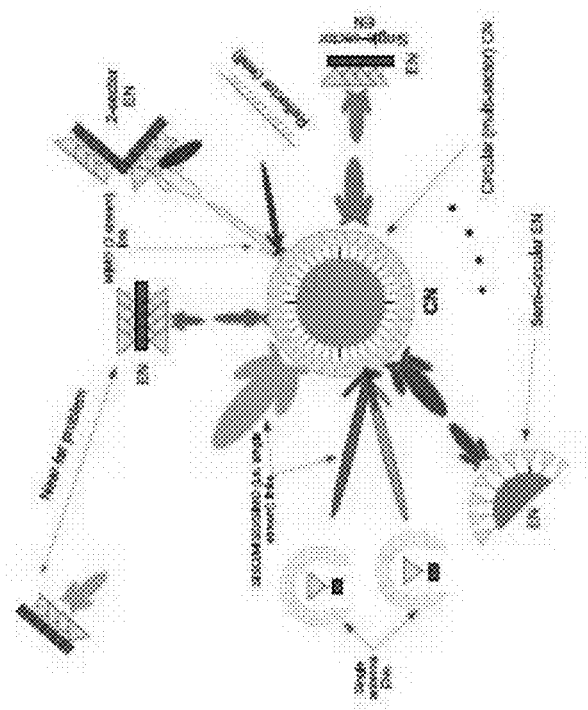
FIGS. 14A-14B illustrate spatial multiplexing and spatial reuse.
Figure 14B:
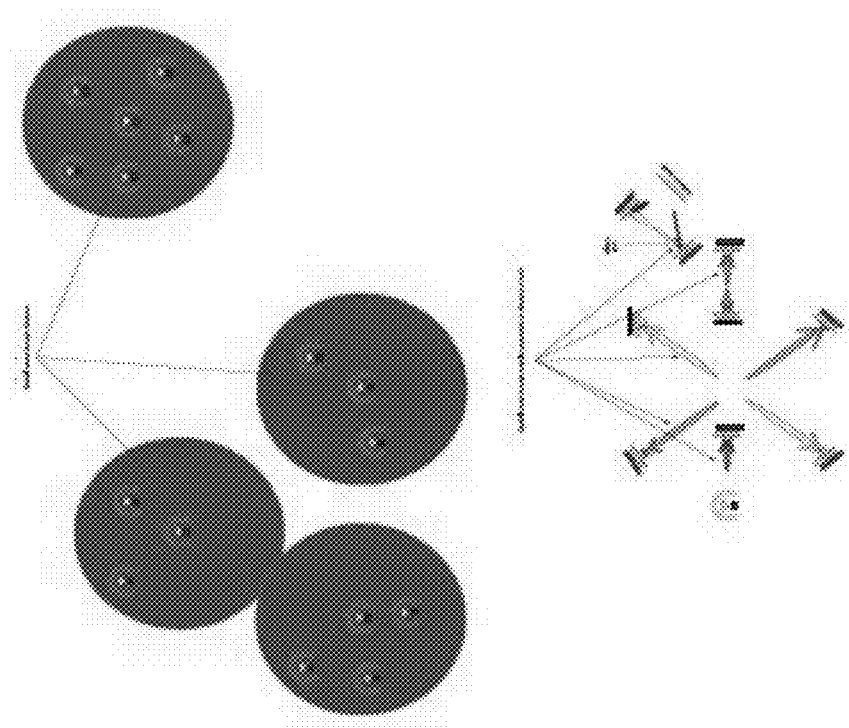
Figure 20:
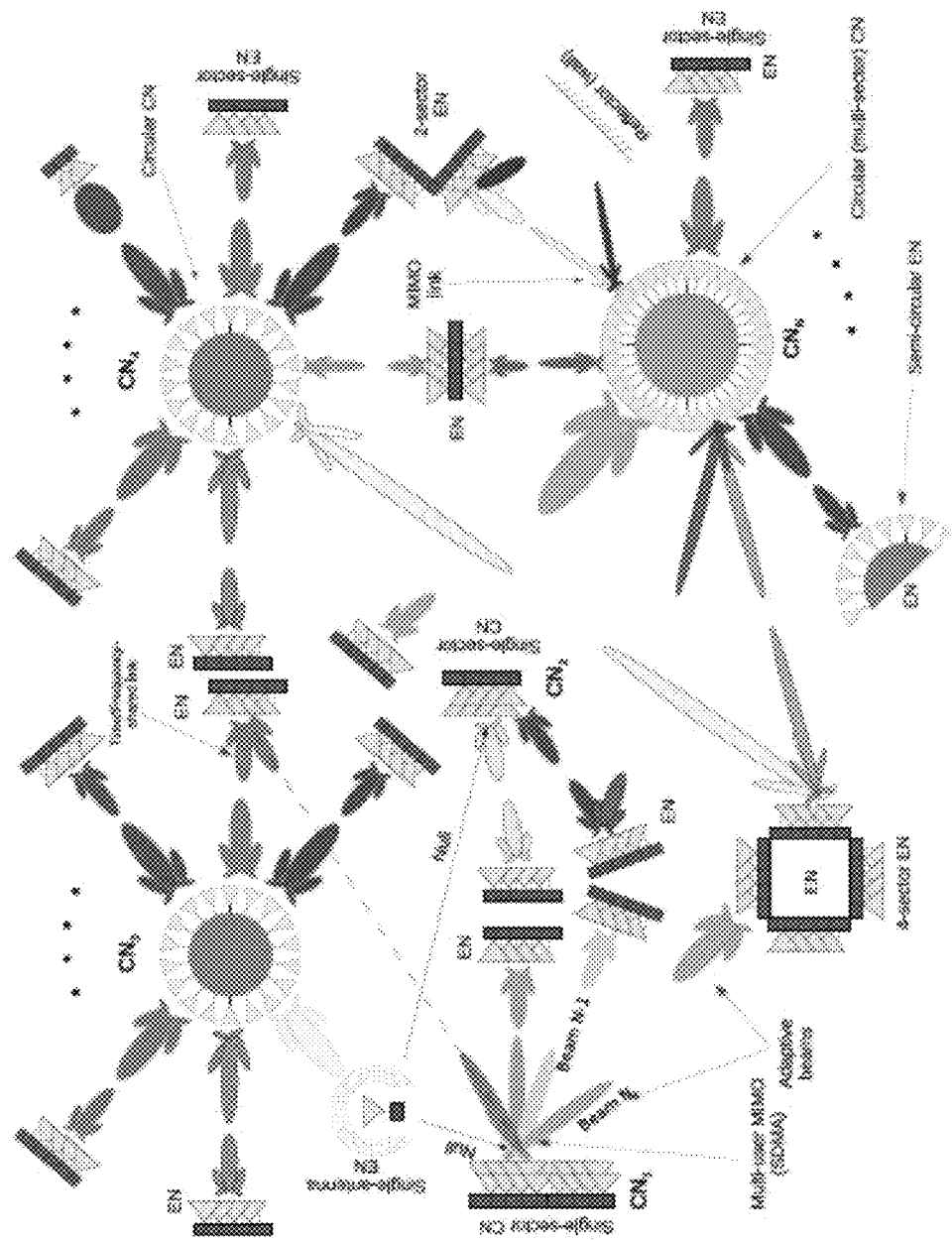
FIG. 20 illustrates an example of a network topology.

The spatial dimension can be exploited in one of three ways: spatial (angular) multiplexing and spatial reuse or a combination of both. In all cases, multiple spatial streams are transmitted simultaneously using the same channel resource (i.e. time/frequency slice). Spatial multiplexing usually refers to one of two modes of communication: one-to-many (P2MP) and one-to-one (P2P). In both cases, the transmitter (receiver) is a node equipped with an array of antennas, and produces multiple beams, up to the number of antennas. Each beam is optimized for a particular receiver (transmitter) and is orthogonal to the other beams. Orthogonality or separation in the spatial domain can be achieved through one or more antenna properties. These properties include beam pattern and/or polarization, which are the most common, and to a lesser extent orbital angular momentum (OAM). In a LOS environment, beam pattern orthogonality is based on angular separation either in azimuth or elevation domains or both of the target receivers. That means that each beam must have a null in the directions of receivers (transmitters) other than the target. The situation is similar in a rich multipath environment, but it's more difficult to visualize in the angular domain. In this case, the channel responses from the different receivers (transmitters) are best modeled as vectors in the complex Euclidean space, whose dimension equals the number of antennas. Each beam is produced by a set of complex excitations that are orthogonal to the channel responses of receivers other than the target. In both cases, the maximum number of simultaneous beams is equal to the number of antennas, and is achieved when there is sufficient spatial or angular separation between every pair of receivers. Pairwise separation is not sufficient; the separation must be mutual. The required separation depends on the antenna geometry and the environment. While the number of mutually orthogonal beam patterns is equal to the number of antennas, the maximum number of orthogonal polarizations cannot exceed two. Depending on the antenna design, the pattern and polarization may or may not be coupled. OAM is similar to polarization, except that the number of modes, in theory, is infinite. However, achieving more than four modes is difficult in practice. Furthermore, beam patterns and OAM modes are usually coupled. The target receivers (transmitters) can be located in the same node (i.e. a centralized array of antennas) or different nodes. If they are co-located in the same node, then this mode of communication (one-to-one) is known as multi-input/multi-output or MIMO. If they are located on different nodes (i.e. one-to-many), the mode of communication is called multi-user MIMO or MU-MIMO. The individual links between can be either MIMO or SISO. Both forms of spatial multiplexing are shown in FIG. 14a. Spatial reuse refers to many-to-many communication (MP2MP). In this mode of communication, multiple pairs of nodes communicate simultaneously. These nodes can either be equipped with single (omni-directional or directional) antennas or arrays of antennas. The individual links can either be MIMO, MISO. SIMO, or SISO. If the links or some of them are MIMO, then the system combines both spatial reuse and spatial multiplexing. The simultaneous communication between these pairs of nodes is enabled by one following: either the distance or the shadowing between the links is high enough, such that the path loss guarantees little or no interference between any two links, or the different links use narrow beams or beams that are orthogonal to one another. Examples of each scenario are shown in FIG. 14b. FIG. 20 shows a network topology that leverages all modes (spatial multiplexing and spatial reuse) of communication simultaneously.

Figure 1:
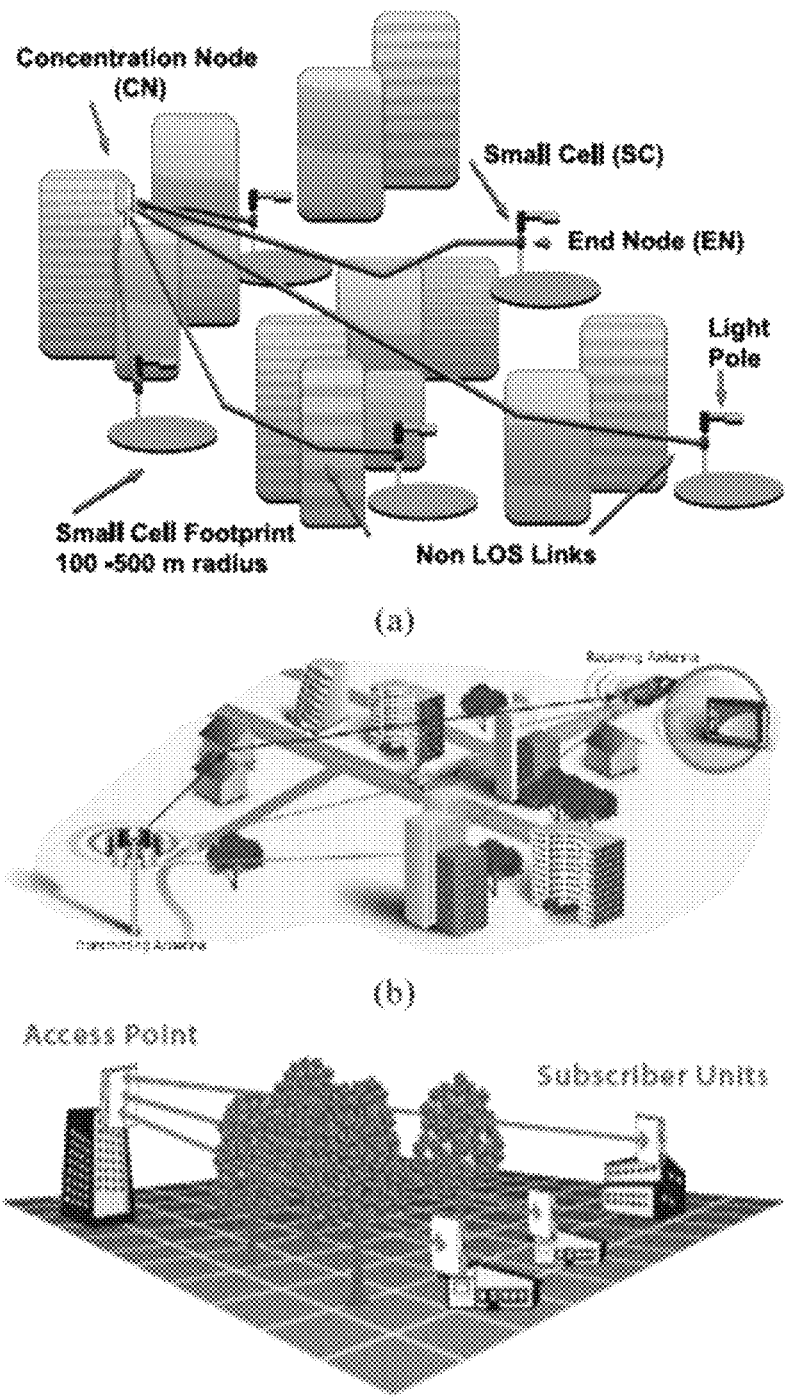
FIG. 1 illustrates NLOS and nLOS links.
Figure 2:
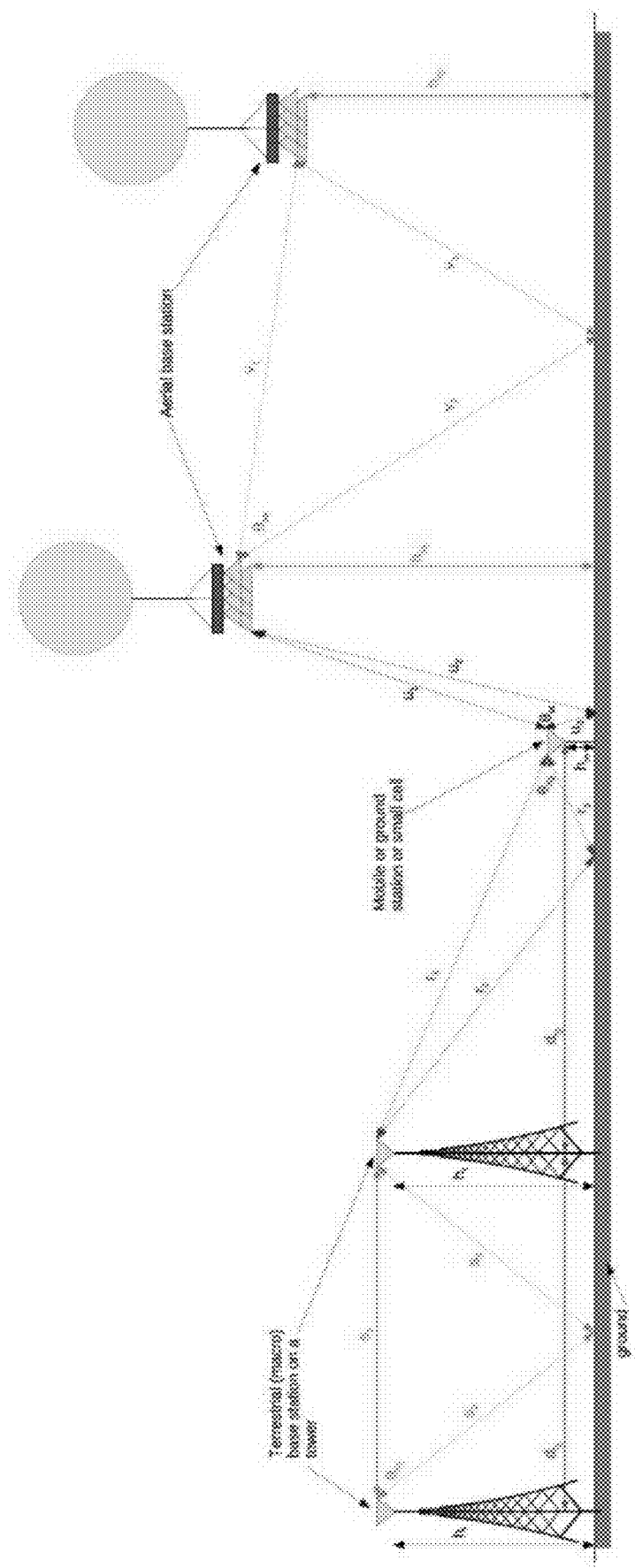
FIG. 2 illustrates the effects of ground reflection on terrestrial and aerial links.
Figure 3:
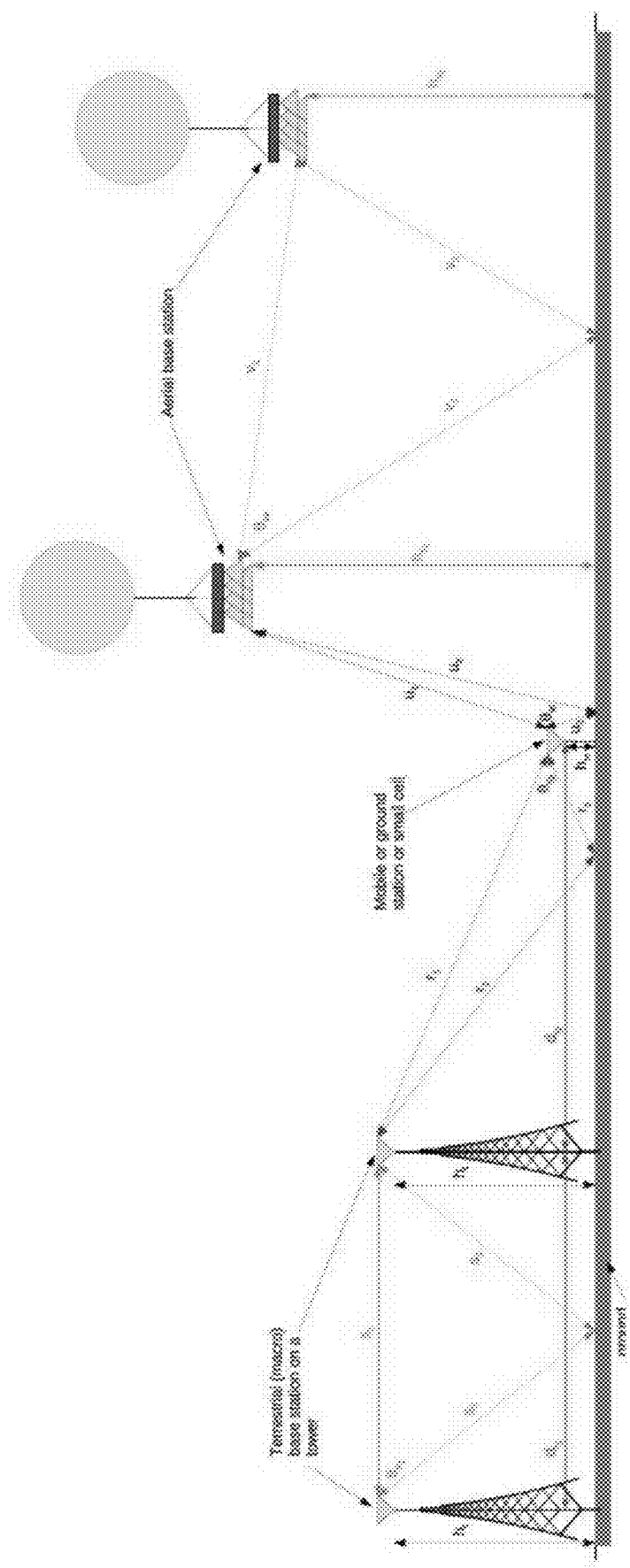
FIG. 3 illustrates the effects of ground reflection on terrestrial and aerial links (rotated view)

As shown in FIG. 20, a heterogeneous many-to-many (MP2MP) network topology utilizing adaptive antenna arrays to enhance network capacity. The network is composed of a collection of CNs and ENs. Each CN talks to one or more EN, and each EN talks to one or more CNs. The entire network shares the same channel resources (i.e. time and frequency). The network is heterogeneous since the ENs and CNs can different capabilities in terms of number antennas/DOFs, array geometry, number of independent beams. The nodes can also be mobile or stationary. The connections between a CN and its associated ENs can be either spatially multiplexed (i.e. each connection fully reuses the channel resource without any time or frequency sharing), broadcast (i.e. time/frequency shared), or a hybrid. Same applies for the ENs as well. Each link between a CN-EN pair can either be composed of a single beam (SISO) or multiple beams (MIMO). The links can also be LOS, nLOS, or NLOS (the different types of links are shown FIG. 1), connection Note that the topology is independent of carrier frequency or channel bandwidth (e.g. the network can be operating at 2 GHz, 20 GHz. or 60 GHz etc.).

Although the space-time-frequency dimensions are orthogonal to one another, they are closely coupled. For example, the time and frequency domains are related via Fourier transform. This duality places a limit on the resolution that can be simultaneously achieved in both time and frequency, also known as the uncertainly principal (i.e. the time slices and the frequency slices cannot be both arbitrarily small). For example, when the bandwidth is low, the signal period, which is the inverse of the bandwidth, will be high, the length of this period places a lower bound on how small a time slice can be. Similarly, the size of the time slice places a lower bound on the bandwidth (i.e. frequency slice). Therefore, there is a time/frequency tradeoff. In environments, where the impact of frequency dispersion (i.e. large delay spreads) is likely to be higher than time dispersion, using multiple small sub-bands or subcarriers (i.e. small frequency slices and larger time slices) is preferred. It is still possible to use a single or a few large carriers, and equalize the response in the time domain to make the channel look narrow band. However, it is easier and more efficient to implement multiple access using multiple carriers. In a high time dispersion (i.e. Doppler spread), using a single or a few large carriers (large frequency domain slices) with small symbol durations yields better performance. The spatial domain is also related to the frequency domain in that the higher the frequency (i.e. low wavelength), the higher the spatial resolution and vice-versa. The minimum spatial coherence distance is $\lambda/4$, where $\lambda$ is the carrier wavelength, and the minimum practical spacing between antennas in an array is $\lambda/2 \sim \lambda$ (to reduce coupling). Therefore, antennas can be more densely packed at higher frequencies. Also, the channel variation in time is due to the movement of transmitters, receivers, and reflectors in space. Therefore, temporal variations are really spatial variations.

Capacity Calculations

Figure 12:
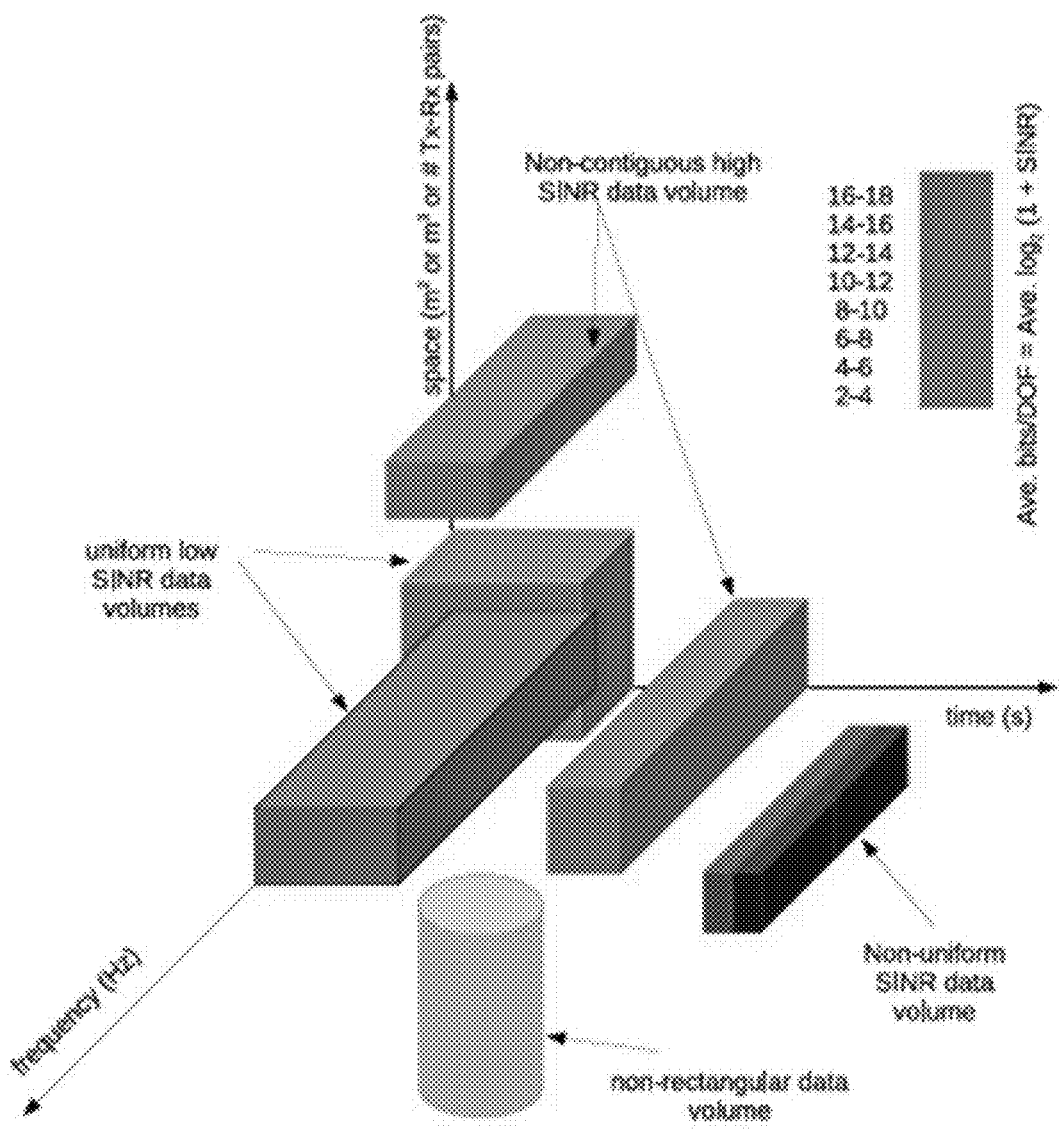
FIG. 12 illustrates data capacity as a function of time, frequency and space.
Figure 13A:
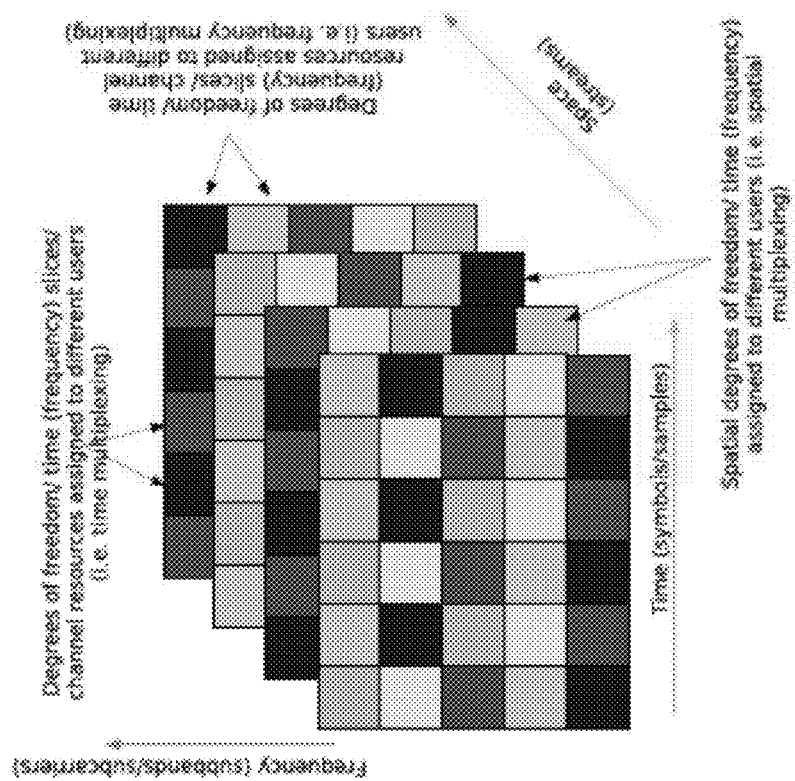
FIGS. 13A-13C show multiplexing data in time, frequency and space.
Figure 13B:
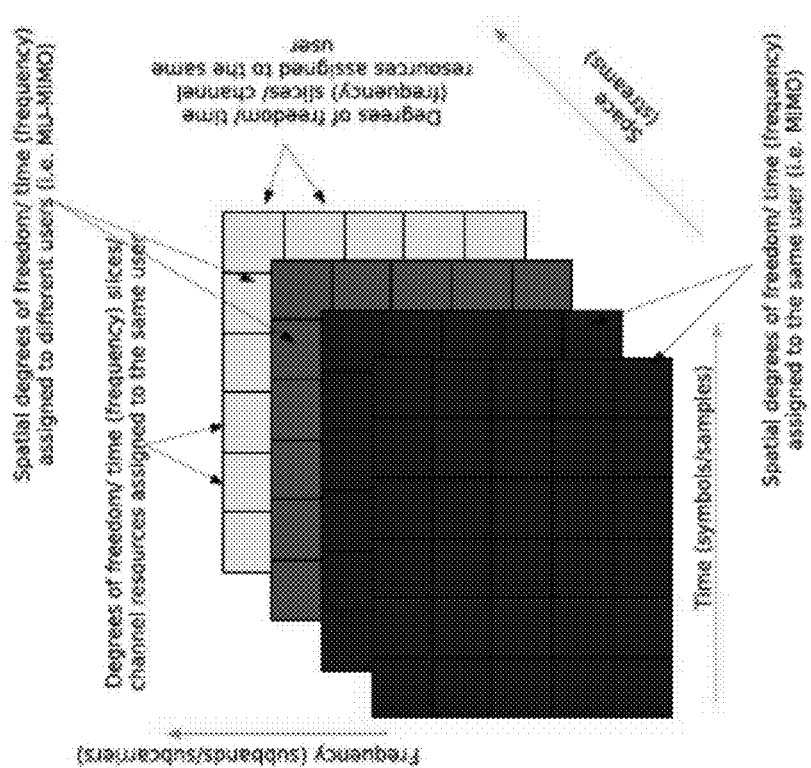
Figure 13C:
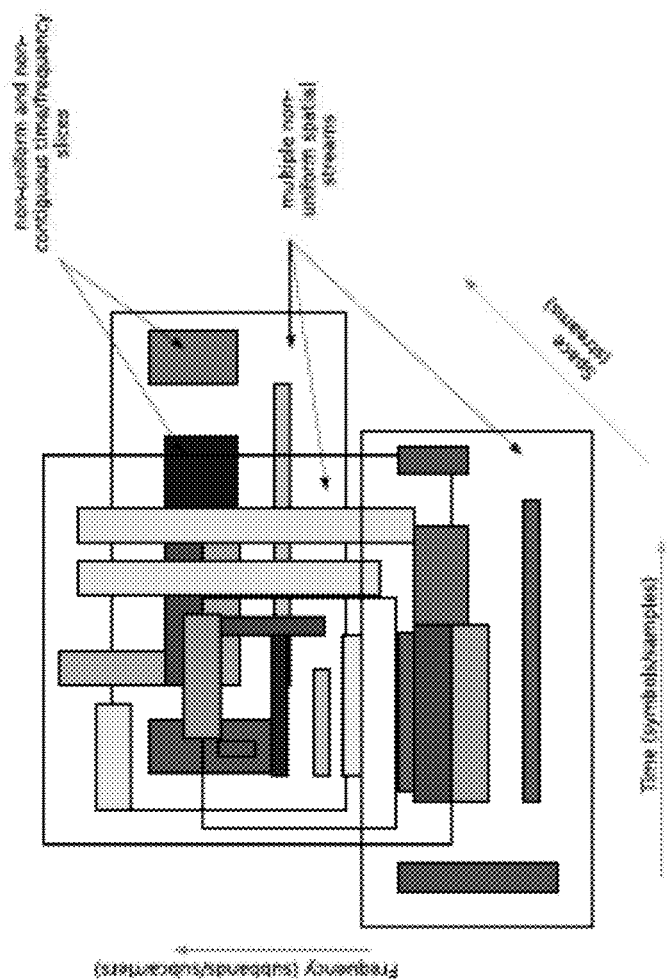

The available DOFs can be thought of as a region in the space formed by the three orthogonal dimensions (time/frequency/space) as shown in FIGS. 12 and 13. This region can be contiguous or non-contiguous, rectangular or non-rectangular, uniform or non-uniform. In order to simplify exploiting the available DOFs, the region that is occupied by the DOFs must be divided into smaller subregions such that the channel properties are constant over those subregions. In particular, the time and frequency dimensions must be divided into slices, small enough to ensure the flat channel property. An example is shown in FIG. 13abc. The slices do not need to be uniform in size or shape. However, for most practical applications, they are uniform. For simplicity, each of these units or subregions represents a degree of freedom or DOF.

The set of bits that is transmitted over a DOF is referred to as a symbol. The amount of data (capacity) that can be carried in a symbol of is a function of the TBP of the DOF and the SINR at that DOF. The capacity is linear in the TBP and logarithmic in the SINR. This relationship is known as the Shannon formula:

$$c_{i,j,k} = \Delta_{t_{i,j,k}} \Delta_{f_{i,j,k}} \log_2(1+SINR_{i,j,k}) = \Delta_t \Delta f \log_2(1+SINR_{i,j,k}) \quad (2)$$

where $c_{i,j,k}$ is the amount of data (capacity), measured in bits, that can transmitted (with close to zero bit error probability) over the DOF (i, j, k). i, j and k are integers that index the time and frequency slices and the Tx-Rx pairs (post-transformation) respectively. $SINR_{i,j,k}$ is the unitless SINR at DOF (i, j, k). $\Delta_t$ and $\Delta_f$ are the widths of time slice (measured in seconds) and frequency slice (measured in Hz) per DOF respectively. If the slices are not chosen uniformly, then they need to be indexed by (i, j, k). However, for simplicity and without loss of generality, they are assumed to be uniform (provided they are chosen small enough). If the slices are not small enough such that the channel properties are uniform, then if possible, they must be divided into smaller subslices (in both time and frequency) such that the channels are constant over these subslices, at which point Equation 2 is applied to each of the subslices, and summed up. Note that the time and frequency slices are all assumed to be disjointed. The total amount of data C that can be transmitted over all DOFs can be expressed:

$$\overline{C} = \sum_{i=1}^{N}\sum_{j=1}^{M}\sum_{k=1}^{K} \Delta_{t_{i,j,k}} \Delta_{f_{i,j,k}} \log_2(1+SINR_{i,j,k}) = \Delta_t \Delta f \sum_{i=1}^{N}\sum_{j=1}^{M}\sum_{k=1}^{K} \log_2(1+SINR_{i,j,k}) \quad (3)$$

where C is the total capacity or data volume measured in bits, N is the total number of slices in the time domain, M is the total number of slices in the frequency, K is the total number of spatial DOFs.

The data rate B (measured in b/s) is the average number of bits that can be transmitted per unit time, and can be expressed as function of C as follows:

$$B = \frac{C}{\Delta_T}, \text{ where } \Delta_T = N\Delta_t \quad (4)$$

where $\Delta T$ is the aggregate length of the slices on the time axis. The specification of the time period, over which the data rate is averaged, is application dependent. For some applications, time period starts from the initial transmission and ends at the final transmission, regardless of the gaps in between. In other applications, these gaps are taken into consideration when computing the average data rate. This is illustrated in FIG. 15. When the slices are uniform, the expression becomes simple as shown in Equation 4. The spectral efficiency (measured in bits/sec/Hz) is the average date rate per unit spectrum (Hz), and can be expressed as:

$$\overline{C} = \frac{\sum_{i=1}^{N}\sum_{j=1}^{M}\sum_{k=1}^{K} c_{i,j,k}}{\Delta_{TF}} \quad (5)$$

where $\Delta TF$ (measured in s×Hz) is the aggregate TBP (i.e. the total area of the projection of the DOFs onto the time-frequency plane).

The capacity density is the data capacity per unit area (if the spatial DOFs are distributed in a plane) or unit volume (if the spatial DOFs are distributed in 3-dimensional space). In order compute this quantity, a region R, over which the capacity density is to be computed, must be specified first. Let V be the volume (or area) of the region. Then the capacity (data) density $\underline{C}$ (measured in b/m$^2$ or b/m$^3$) can be expressed as follows:

$$\underline{C} = \frac{\sum_{i=1}^{N}\sum_{j=1}^{M}\sum_{k \in R}^{K} c_{i,j,k}}{V} \quad (6)$$

In addition to dividing by V, the other difference between Equation 6 and Equation 3 is that only the spatial DOFs in the region R are considered. The spatial DOFs are either TX-Rx pairs or just transmitters. In the latter case, $\underline{C}$ denotes that maximum available capacity density that can be achieved by placing more receivers in the region. The spatial density of other quantities (e.g. throughput, spectral efficiency) can also be defined similarly. Graphical representations of these quantities are shown in FIGS. 12 and 13.

Given a node with $N_{S_{Tx}}$ transmitters (antennas), and allocated $N_T$ time slices per transmitter, and $N_F$ frequency slices per time slice, then the total number of available DOFs is $N=N_{S_T} \times N_T N_F$, which is also the total number of symbols that can be transmitted by this node. This assumes that for each time-frequency block, there exists NS symbols mapped to this block. Based on Equation 2, the capacity of each symbol is proportional to the product of the width of the time slice and the width of the frequency slice assigned to it. For simplicity and without loss of generality, the time and frequency blocks are assumed to uniform in size and width. Also, the channel properties are also assumed to flat for each DOF. If the DOFs were orthogonal in all dimensions, then the problem of transmitting the N symbols becomes simple and straightforward: map each symbol to a DOF. However, as discussed above, the DOFs are, in general, not orthogonal in the spatial domain. Therefore, these DOFs need to be first orthogonalized. The orthogonalization process transforms the set of N DOFs that are not orthogonal into a new set of N orthogonal DOFs, to which the symbols can be assigned directly. This mapping can take place at the transmitter (pre-processing) or receiver (post-processing) or both. The optimal pre-processing of the DOFs depends on the available channel state information (CSI) at the transmitter. This mapping of symbols to DOFs is usually referred to as space-time-frequency adaptive processing or coding (STFAP or STFAC). The word adaptive is inserted in order to reflect the fact that the mapping is optimized for specific environment and channel conditions. The spatial component of the processing is sometimes called beamforming. Each DOF enables the transfer of a separate block of data that is proportional to the time-bandwidth product of that DOF. However, as mentioned earlier, extracting data from the DOFs requires either pre-processing at the transmitter (e.g. pre-coding, Tx beamforming), or post-processing at the receiver (e.g. receiver beamforming, decoding), or for optimum performance a combination of both. The most common technique used is linear beamforming. In most cases, a linear mapping is sufficient to achieve near optimum performance. For example, if S is the set of pre-transformed DOFs, and Ṡ is the set of DOFs post-transformation, then each DOF in Ṡ can be written as a linear combination of the DOFs in S as follows:

$$S'[i', j', k'] = \sum_{i=1}^{N_{S_{Tx}}} \sum_{j=1}^{N_T} \sum_{k=1}^{N_F} w_{i,j,k}^{i',j',k'} S[i, j, k] \quad (7)$$

where $S'[i', j', k'] \in$ is the transformed DOF indexed by the three dimensional ordered pair of integers (i', j', k')[57], $S[i, j, k] \in S$ is the pre-transformed DOFs indexed by the three dimensional ordered pair of integers (i, j, k) (i is the antenna index, j is the index of the time slice, k is the index of the frequency slice), $w_{i,j,k}^{i',j',k'}$ is the complex scalar weight that gets multiplied by S[i, j, k] to produce S'[i', j', k'] (after the summation with other weighted DOFs). When each DOF is exploited to transmit a unique data symbol, then the set S' also contains N elements, and the mapping/transformation of DOFs is reversible. The total number of complex parameters that need to be stored and computed is $N^2$ or N per DOF[58].

Note that the DOFs available over the entire network are distributed (divided) among the nodes that make up the network. The optimum performance is achieved when all the DOFs available to the network are processed jointly. However, this is rarely practical. In practice, each node processes its own DOFs locally. There many well-known adaptive algorithms for processing and transforming the DOFs (i.e. computing the optimum complex weights), both locally and jointly.

The total capacity depends on both the number of DOFs as well as the SINR of each DOF. In many circumstances, that channel conditions maybe severe enough, that it may be necessary to sacrifice some DOFs in order to in order to improve the over SINR, which may yield an overall increase in capacity and/or reliability. This may also be necessary when there is a lot of channel uncertainty. In this case, the mapping (transformation) of the DOFs will not be one-to-one. That means that if N' is the size of (number of elements in S'm then N'<N which also means that the mapping is not reversible. Also, N' is guaranteed to be less than N when there are less receivers than transmitters (or on the receiver side if there are less transmitters than receivers). This technique improves the overall the SINR of the remaining transformed DOFs by increasing the diversity and/or power per DOF. The optimum performance is achieved when all the DOFs available to the network are processed jointly. However, this is rarely practical. In practice, each node processes its own DOFs locally.

In this document, the terms STAP, SFAP, SFTAP, and STFAP are used interchangeably, and all refer to the utilization and adaptive processing of DOFs in all dimensions.

Channel Duplexing

The vast majority of wireless communication systems are made up of links that are bi-directional (i.e. the two ends of the links both transmit and receive), with a few exceptions such as radio or television broadcast. The traffic distribution between the two directions can be anywhere from a uniform distribution (i.e. roughly equal amount traffic in both direction), as in many P2P and PtP networks, to a uni-directional link, as in TV broadcast. One of the main purposes of wireless systems is to connect end-users to a core network (e.g. the Internet). Traffic that flows from the core of the network to the end-user is usually referred to as the downlink (DL) or DL traffic, and traffic flowing in the direction (from the end-user to the core) is referred to as the uplink (UL). There is usually more traffic on the DL than the UL. There is increasingly more activity on the UL as users start sharing pictures and videos. Also, many mobile applications that gaining popularity like video conferencing and online gaming have symmetric traffic patterns. However, even if most of the content is being pulled from the core network, some Internet protocols like TCP require a minimum UL:DL ratio in order to main good performance on the DL. However, typical UL:DL ratios are 1:3-1:4.

Each direction of the link requires separate channel resources. This resource allocation is known as channel duplexing. This can happen either in time or in frequency or a combination of both. The most popular techniques are discussed in this section.

Frequency Division Duplexing (FDD)

The most popular way to separate the DL and UL is to put each on a separate frequency band, also known as frequency division duplexing (FDD) (shown in FIG. 16a). FDD is very popular for many reasons. First, it is compatible with legacy analog systems. FDD is the only possible option for analog systems. Second, both ends of the links transmit and receive simultaneously, and thus reducing the link latency. Because of this simultaneous transmission and reception feature. FDD is sometimes referred to as full duplexing. However, in this disclosure, the term full duplexing shall be reserved for links that simultaneously transmit and receive on the same frequency channel and time slot. Also, multiple FDD links can co-exist without requiring global network synchronization. FDD systems are usually symmetric (i.e. both DL and UL have the same bandwidth). It can also be non-symmetric, either by choosing one band wider than the other (FIG. 17a) or aggregating multiple separate bands (FIG. 17b). Both figures show a larger DL relative to the UL, which is the more common case (more traffic downstream (from the core of the network) than upstream). However, the other case is possible as well and is as easy to implement. In most systems, without loss of generality, the lower band(s) is (are) assigned for the UL and the upper is (are) assigned to the DL. This choice is made because base stations (BS), which usually transmit on the DL, can transmit at much higher power the client stations. Therefore, they are assigned to transmit on the upper band, which usually has slightly poorer propagation characteristics. This feature is especially important for satellite systems. The latter is gaining more popularity in the latest cellular protocols (e.g. LTE-Advanced) that use channel aggregation.

FDD also has disadvantages. First, channel reciprocity is usually lost when the DL and UL are on separate frequency channels. The exception is when the wireless channel is LOS or has a very strong LOS component. One of the key advantages of aerial networks is that most of the links are close to LOS, and multipath (if any) is confined to a very narrow angle of arrival. SFTAP algorithms rely heavily on channel reciprocity. Without channel reciprocity, explicit feedback is required, which does not scale very well. Second, FDD requires spectrum bands to be paired. These bands must have sufficient separation in order to isolate the transmitter and receiver. The closer the bands, the bulkier and more expensive the filters become. Finally, with FDD, the resource allocation is fairly static, and is difficult to change without changing the hardware. This is very restrictive, especially since traffic patterns are expected to evolve over time.

Time Division Duplexing (TDD)

Figure 16D:
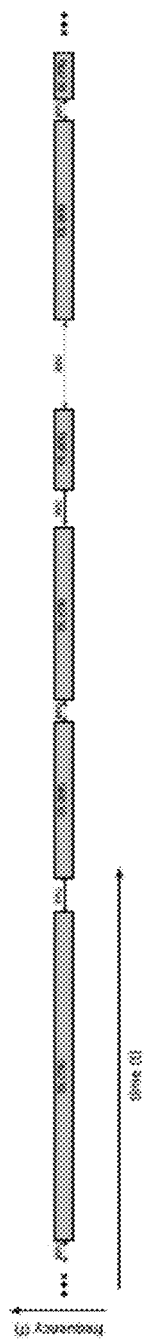
Figure 17A:
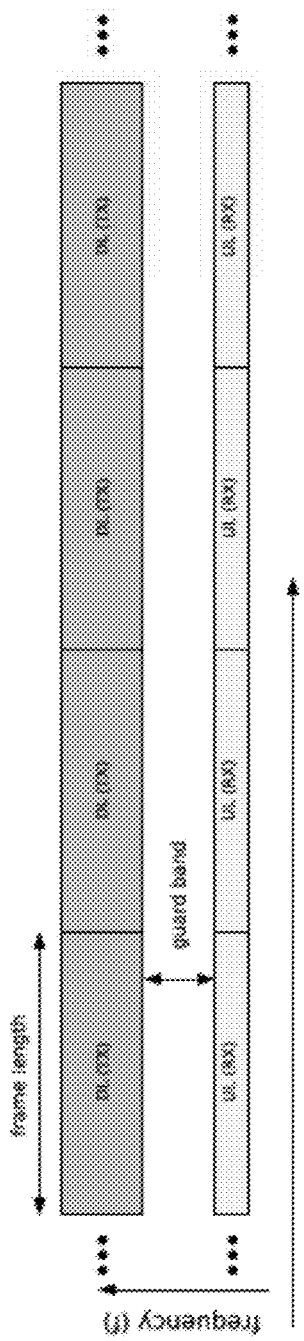
FIGS. 17A-17B illustrate asymmetric FDD.
Figure 17B:
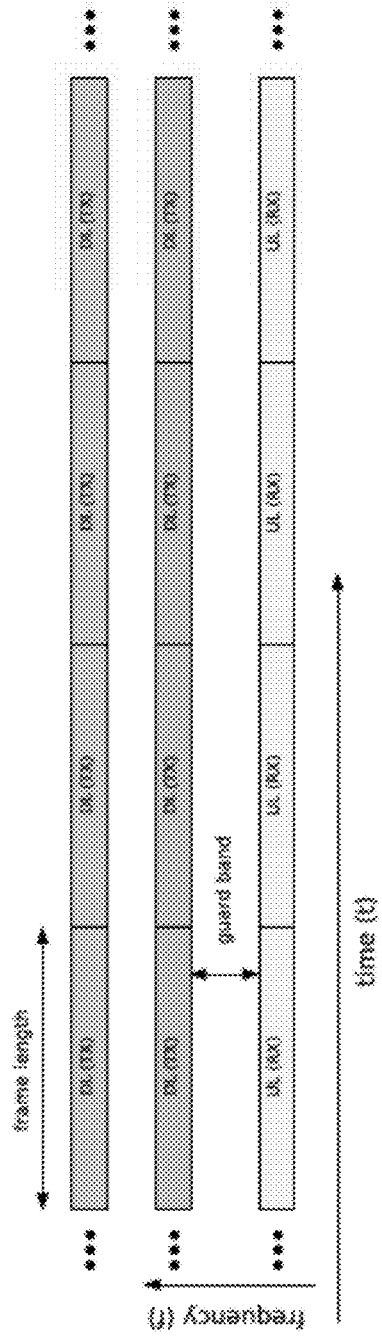

As the name suggests, time division duplexing (TDD) separates the DL and UL by assigning them different non-overlapping time slots (see FIG. 16bc). TDD has several advantages. First, only a single frequency channel is required. Unpaired spectrum is usually much cheaper than paired spectrum. Second, and most important in the context of this disclosure, TDD preserves TX/RX channel reciprocity, which makes it ideal for SFTAP. Third and finally, it is much easier to adjust the DL:UL ratio in a TDD system (FIG. 16b shows a symmetric TDD frame while FIG. 16c shows a frame with larger DL). TDD comes in two flavors: synchronous (FIG. 16bc) and asynchronous (FIG. 16d). In synchronous-TDD, the DL/UL slot assignment is static or quasi-static and the DL:UL ratio remains for a long period of time. Unlike FDD, the assignments are reconfigurable, but not dynamic. That means they can be re-configured by the network operator in response to changes in the general long-term statistics of the traffic patterns. However, this happens over long periods of time. That means that the change in assignments is not adaptive and does not happen in realtime. Synchronous-TDD is used in cellular systems and some fixed access networks (e.g. WiMAX and TDD-LTE). In this disclosure, unless otherwise noted, the term TDD is used to refer to synchronous-TDD. With asynchronous-TDD, assignments can change in real-time in response to traffic demands, asynchronous-TDD is used in CSMA based networks (mostly found in PtP networks and those using unlicensed spectrum like WiFi).

TDD has several drawbacks as well. Unlike FDD transceiver, TDD transceivers do require a bulky duplexer/diplexer, which is usually composed of a pair of sharp-cutoff bandpass filters. Instead, they have an RF switch, which is a lot smaller and cheaper, for transitioning between Tx and Rx. The transition between Tx and Rx is not spontaneous. As shown in FIG. 16bc, a short time period (guard) must be inserted at every transition between DL and UL (and UL and DL). The minimum length of this period is proportional to the time of flight between the two ends of the link. In addition to the time of flight, the transceiver electronics, especially PAs, need some time to settle to a steady state. These time guards add to the overall PHY overhead. This extra overhead can be reduced by increasing the frame size, which makes the time guards a smaller fraction of the frame. The second drawback of TDD is latency. Since a node in a TDD system does not transmit continuously, the data will incur some delay between transmits. The delay becomes worse as the frames become longer. So there is a tradeoff between latency and overhead. Also, latency due to TDD framing adds up in a multihop link, which is why TDD is rarely used in more than a few hops. Finally, TDD requires global network timing synchronization in order to avoid co-channel and adjacent channel interference. The network timing synchronization can be achieved with GPS or via a wired network. Without synchronization, interference can happen when two or more nodes that are supposed transmit/receive at the same time are near one another. The lack of synchronization can lead to one node transmitting while another is receiving, even if the reception is taking place in adjacent channel if the transmitter is too close. Global network synchronization is not required for asynchronous TDD since nodes usually sense the channel prior to transmitting.

Full Duplexing

Figure 18A:
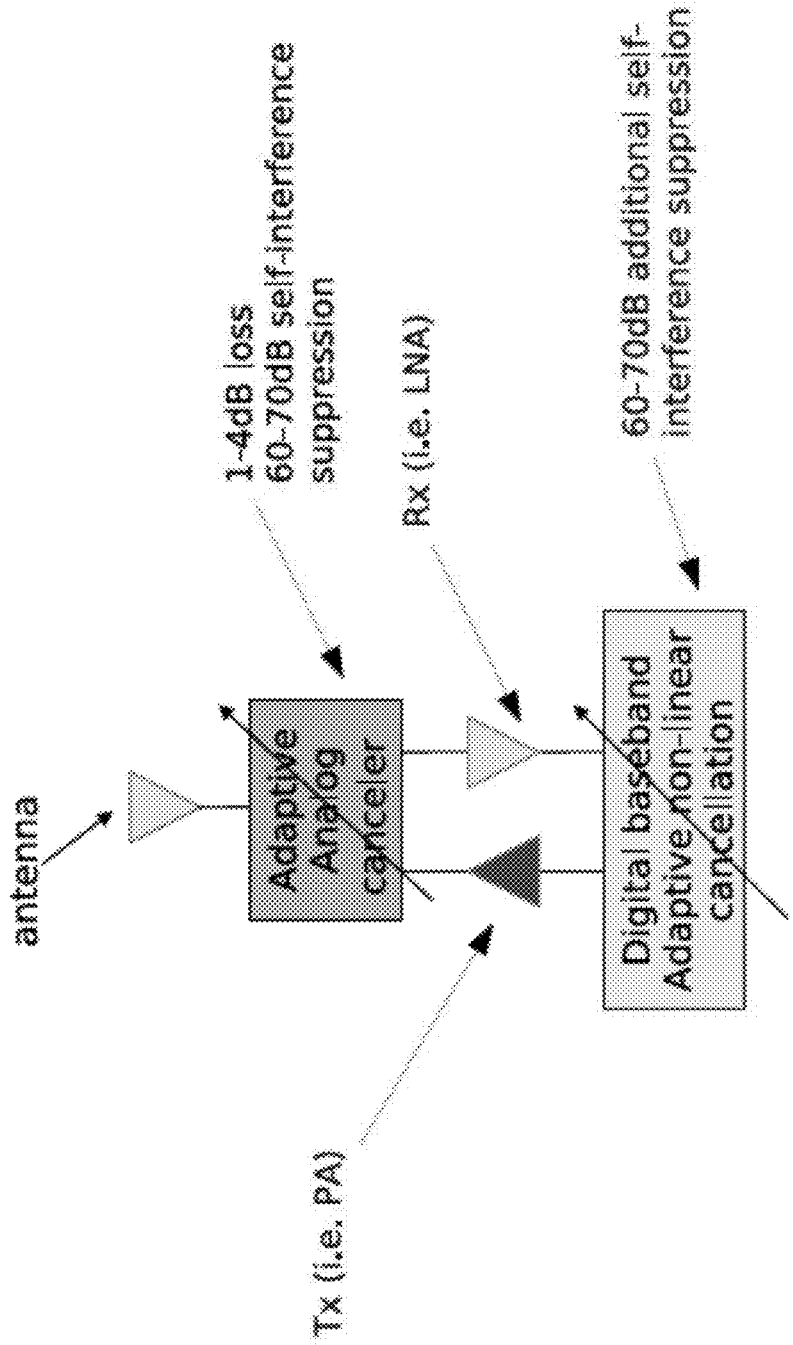
FIGS. 18A-18B illustrate self-interference cancellation for full duplexing.
Figure 18B:
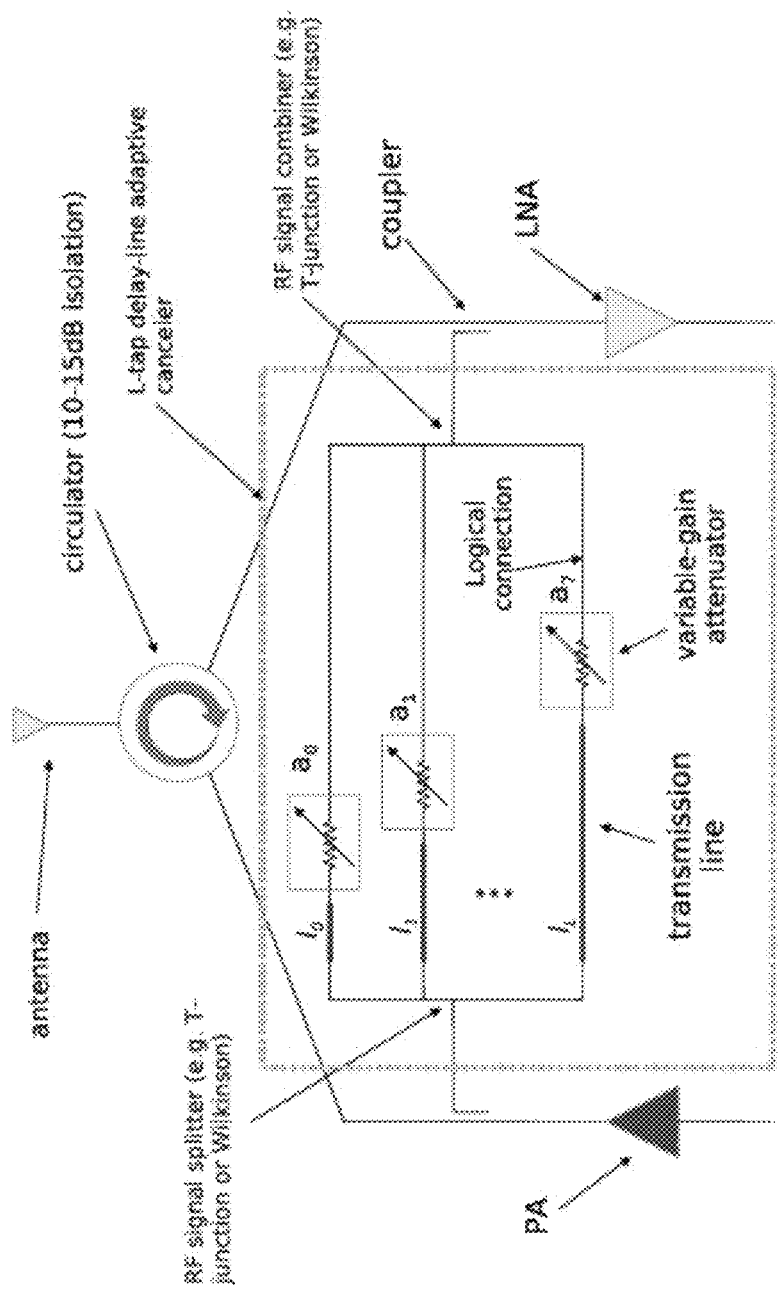

The strong transmit signal leaking into the receiver (known as self-interference) is the main reason that forces the DL and UL to be on separate disjoint frequency band or time slot. While the transmitted signal is known a priori, and in theory can be subtracted from the received signal, there are many factors that make this unpractical. First, the difference in power between the transmit and receive signals (usually in excess of 100 dB) is beyond the dynamic range of any practical receiver. Second, the transmit signal also comes with noise and distortion, which either cannot be predicted (noise) or requires complex non-linear processing (distortion). However, recently, several techniques that specifically address this problem (i.e. self-interference cancellation) have been developed. The most popular technique, shown in FIG. 18, involves a two-stage canceler. The first stage in the RF/analog domain, and the second stage in the digital base band domain. The purpose of analog cancellation is to knock down the noise and distortion components of the self-interference near or below the receiver noise floor, and knock the signal component into the linear region of the receiver. The amount of attenuation required to achieve this goal is usually of the order of 60-70 dB. This needs to be achieved minimum impact on the receiver noise floor. An example implementation of the analog canceler is shown in FIG. 18b. The overall analog attenuation is achieved in two stages. The first stage is a circulator that creates a 10-15 dB isolation between the transmitter and receiver with minimum insertion loss. There are other means for creating isolation between Tx and Rx like using two antennas (one for Rx and another for Tx) or using a Wilkinson combiner. In both cases, the insertion loss is at least 3 dB. In the two antenna case, the 3 dB loss comes from the lost beamforming gain that could have been achieved had the antennas been simultaneously transmitting or receiving. There is a potential loss in capacity for not using the antennas for MIMO, but this is a function of the wireless channel and may not always be available. The second stage is the adaptive RF canceler. In this stage, the transmit signal at the output of the PA is coupled (e.g. using a directional coupler). The coupled signal is split among several transmission lines of varying lengths. The signal through each transmission line goes through a variable attenuator that is programmed independently. The signals from the different transmission lines are then combined and coupled back into the receiver right before the LNA. The attenuation levels of the variable attenuators represent the coefficients of the analog filter. These coefficients are adapted until the couples signal into the receiver approximates the transmitted signal as close as possible with opposite polarity (phase). The use of delay lines enables wideband signal cancellation. The adaptive analog filter can achieve up to 50-55 dB additional suppression. The noise and distortion components get canceled as well since the canceler subtracts a copy of the signal coming directly from the PA (as opposed to generating a new copy from scratch). The digital stage canceler subtracts what remains of the transmit signal using an adaptive non-linear filter at the digital baseband stage. The amount of cancellation required in the digital domain varies, but usually ranges between 60-70 dB. More accurate cancellation is possible in the digital domain than the analog domain because it offers more flexibility and programmability. Both digital and analog filters need to be adapted frequently to account for changes in amplifier/antenna characteristics.

Figure 16E:
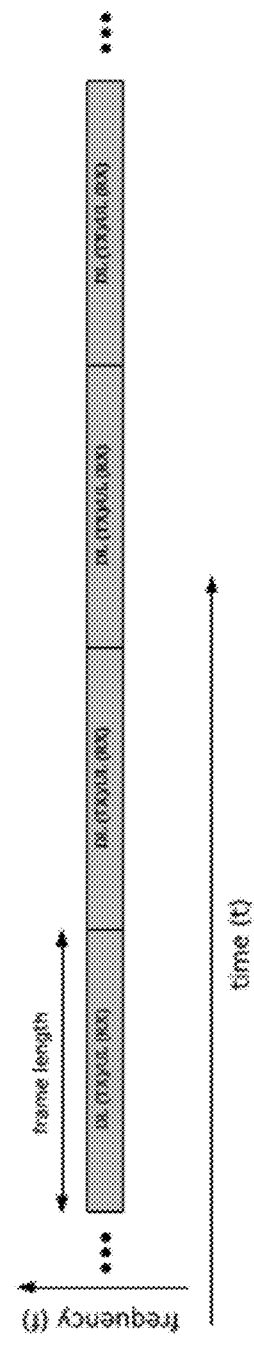

Self-interference paves the way towards simultaneously transmitting and receiving on the same frequency band, known as full duplexing (see FIG. 16). The term zero division duplexing or ZDD is sometimes used to describe full duplexing in order to reflect the fact that no division of channel resources between the DL and UL is required. More generally, self-interference cancellation enables any UL/DL frequency band configuration/overlap. For example, the DL and UL can be on adjacent channels. So the self-interference cancellation circuit would act like a universal diplexer that makes FDD frequency allocation a lot more flexible. The term any division duplexing or ADD is used to describe this wide range of possibilities.

Figure 19A:
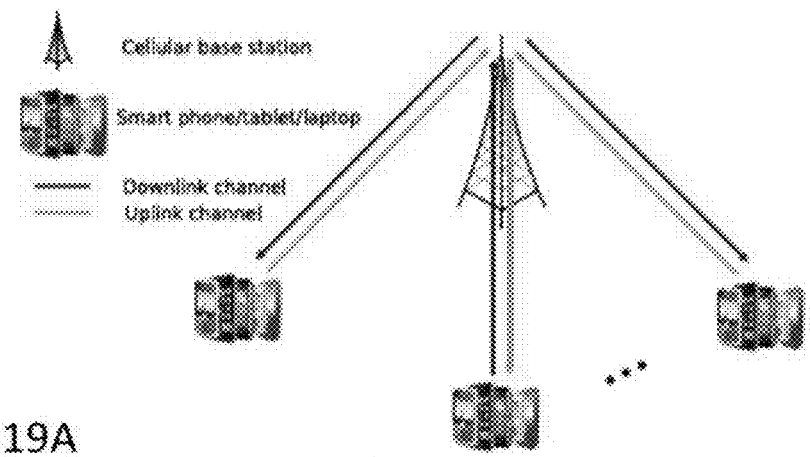
FIGS. 19A-19C illustrate duplexing and interference in cellular networks.
Figure 19B:
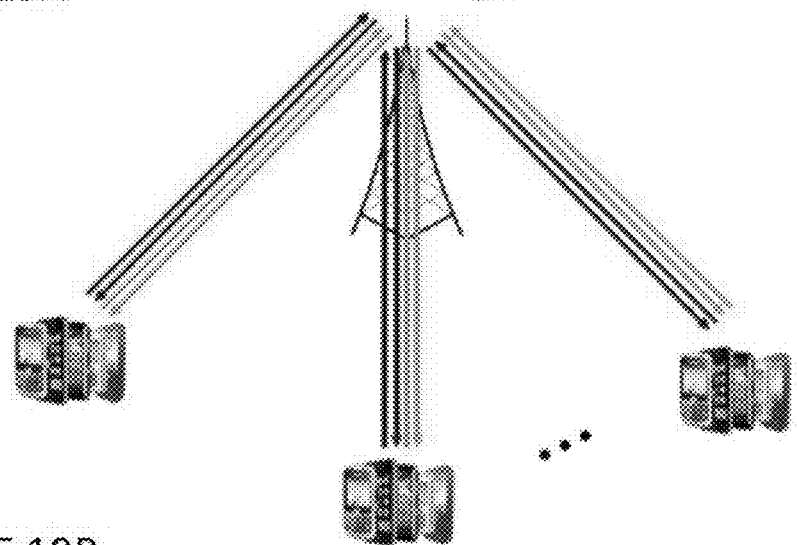
Figure 19C:
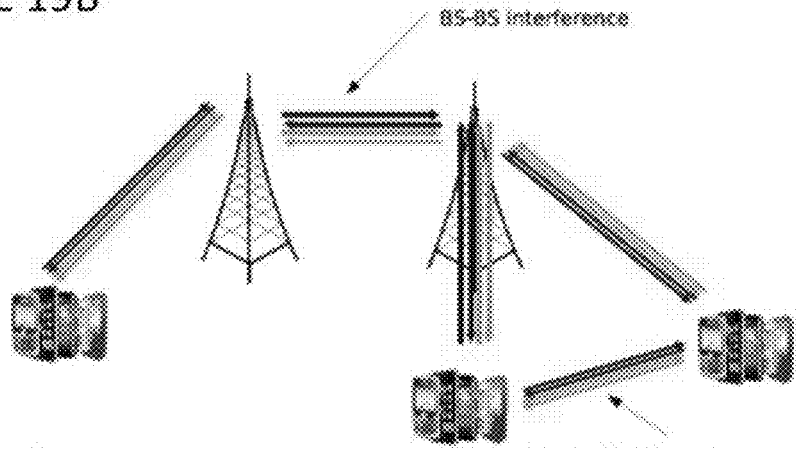

There are, however, several challenges that need to be addressed before true full duplexing becomes a reality (i.e. before a near 2× increase in capacity can be realized from reusing the same channel in both DL and UL). Cost is a big factor in determining the success of any technology. The circuit required for analog cancellation is still bulky and difficult to integrate into transceivers. This becomes a bigger issue when antenna arrays/beamforming and MIMO technology are taken into consideration. In this case, it is not sufficient to cancel self-interference, but the cross-interference between antennas needs to be canceled as well, which further complicates matters and adds to the cost. Multi-antenna technology cannot be ignored since it is one of the few economically feasible and effective ways to scale network capacity by orders of magnitude (compared to full duplexing, which improves capacity by a factor of 2× at best). Therefore, if full duplexing cannot be integrated into multi-antenna technology in an economically scalable and feasible manner, it will have difficult time achieving mass adoption. Second, full duplexing is not currently compatible with existing wireless protocols (e.g. LTE, WiMAX, WiFi). A lot of changes need to be made to standards in order to ensure backwards compatibility. Third and maybe more importantly, cost is not the only requirement self-interference cancellation is not the only requirement to get full duplexing work in a complete network setting. There are other system level issues that need to be addressed as well. Consider, for example, a simple cellular network shown FIG. 19a (only one cell is shown). In a conventional cellular system (i.e. FDD or TDD), the DL and UL are on separate channels denoted by the blue and green lines in FIG. 19a, respectively. In this setup, clients (e.g. smart phones) can only interfere with one another at the BS (see the multiple green arrows pointing towards the BS). This can be in the form of intra-cell interference or intercell interference (not shown in the figure). Similarly, the BSs can only interfere with one another at the clients (i.e. the client receives interference from other BSs). The client can be interfered by its own BS via streams intended for other clients connected the same BS if MU-MIMI/spatial multiplexing is employed. The same thing can happen at the BS on the UL as well. FIG. 19b shows the same network with full duplexing (ZDD), in which case both clients and BSs are transmitting and receiving simultaneously on both channels (the blue lines and green lines point in both directions). When ZDD is introduced, the amount of interference is doubled. The BSs will experience interference not only from clients, but also from other BSs. Similarly, clients will start experiencing additional interference from other clients. The picture becomes clearer when multiple BSs are shown (see FIG. 19c). Since BSs transmit at much higher power levels than clients, and have much better propagation characteristics towards other BSs (sine both are usually sitting on high points), the DL of a neighboring BS can completely overwhelm the UL of associated clients. The same thing happens at clients that are located near one another. This interference is difficult to avoid since each BS is surrounded by multiple BSs. A BS can employ multi-antenna beamforming to cancel interference from neighboring BSs. However, the presence of multiple antennas only complicates the implementation of self-interference cancellation. Furthermore, a multi-antenna BS can potentially yield more than 2× increase in capacity in a conventional TDD or FDD system (especially TDD), which defeats the main purpose of using full duplexing. Also, the multi-antenna solution is not feasible on the client due to size restrictions.

WiFi is another popular wireless system that is fundamentally different from cellular in the way the protocols operate. In this disclosure, the term WiFi is used to refer a class of WLAN protocols. Examples include IEEE 802.11abgn, and 802.11ad. Since WiFi operates in unlicensed spectrum, and there are no centralized operators, devices need to cooperate with another in sharing the spectrum. For this reason, WiFi devices rely on carrier sensing and collision detection/avoidance, as opposed to centralized scheduling, which is common in cellular systems. Carrier sensing ensures that only a single link is using the channel as any given time in a given "neighborhood". Once a link relinquishes the channel, other links are free to compete for it. The fact that only a single link is using the channel at any given time avoids the interference problems associated with cellular and makes it more friendly to full duplexing. In the case of WiFi, the change is more straight-forward. When a link acquires the channel, instead of one end transmitting while the other receives, both are allowed to transmit. However, since WiFi is statistical in nature, the probability that both ends of the link have large amounts data to transmit simultaneously is low. In cellular networks, all users are allowed to transmit simultaneously (on possibly different channel resources). Therefore, the probability of both UL and DL being simultaneously utilized is high. The users who are utilizing the majority of the DL may not be necessarily the same ones utilizing the majority of the UL. On the other hand, with WiFi when a user reserves one end of the link, the other end is automatically reserved. So even though the UL maybe available, the likelihood of it being utilized is low. Therefore, the overall increase in capacity ends up being less than 2×.

Despite those challenges, there are some niche application, where full duplexing can be readily integrated. A good example would be fixed LOS microwave and mm-Wave P2P links. These links use very narrow beams (with static antennas) at both ends, which takes care of the interference. Microwave nodes use a single directional antenna, which is sometimes dual-polarized. So the antenna has maximum two inputs, which simplifies the cross-interference cancellation. Standards compliance is not a major issue for P2P links. Also, these links are not very price sensitive since they do not sit on consumer premises. So the cost of the self-interference cancellation circuit becomes less of an issue. Also, in most applications where LOS microwave P2P links are used, the links are usually active in both directions near peak capacity most of the time (unlike WiFi).

System and Network Architecture

Network Topology

This section describes different network topologies for aerial-terrestrial hybrid infrastructure networks that leverage mini-satellites and STAP technologies. The section begins by defining the underlying STAP system that support the network, then maps the elements of the STAP system to different infrastructure components.

STAP System Topology

The STAP system in its most general form is a multi-point to multi-point (MP2MP) system, of which point to multi-point (P2MP) and point to point (P2P) are a subset. The term MP2P or multiple point to point is sometimes used to emphasize that the network is composed of a collection of point to point links that operate simultaneously and independently on the same channel and at peak capacity (full bandwidth), regardless of whether end points of different links share a common location/hardware. In this disclosure, the term MP2MP is used to also include MP2P as a subset. The basic topology, shown in FIG. 20, takes the form of a bipartite graph, and is composed of two types of nodes, a central or a concentrating node (CN), and an end node (EN). The CNs are usually closer to the core of the network (usually connected to the main wired network through some high capacity backhaul), while the ENs are usually closer to the edge (usually connect back to the wired network wirelessly through the CNs). Both CNs and ENs process multiple DOFs in space, time, and/or frequency. Each CN has one or more ENs attached to it, and each EN can associate with one or more CNs. Nodes of the same type need not be homogeneous (i.e. they differ in the number of DOFs and signal processing capability). ENs do not associate with other ENs, and CNs do not associate with other CNs. The CN multiplexes the data to its attached ENs either in space, time, code, frequency, or some combination of both. Similarly, the EN multiplexes its data to the CNs its attached to either spatially, or in time, frequency, or code or some combination of both. The EN associates with multiple CN either to increase its capacity or to improve its reliability and diversity. The link between an EN and a CN can either be composed of a single stream or multiple streams separated in polarization, OAM, space, or some other antenna property (i.e. MIMO if channel conditions permit), or in time/frequency/code or some combination of each. The CNs can either split or reuse the channel (e.g. spectrum) resources. The spectrum may also be unlicensed or shared with other applications. The network can be extended to include multiple hops). The network topology, and EN/CN designations are defined for a channel resource. If the network uses multiple channel resources (e.g. multiple frequency bands, time slots, or spreading codes), then each of these resources could have a different topology. For example, in a single TDD frequency channel, the network topology looks like a group of stars centered around the CNs on the DL. On the UL, the roles are reversed, different set of stars originate from the ENs. On a different frequency channel, the connections can be completely different. So while the network may look like a group of stars at a single frequency band/time slot, the overall network, taking into account all the channel resources, may look like a mesh. However, the additional hops do not increase the capacity of the network. A single bipartite network per channel resource shall be referred to as STAP-MP2MP.

For each link or stream between an EN and CN, there can be up to four STAP processors or beamformers (two for Tx and two for Rx). Each end of the links adapts both its Tx and Rx DOFs independently per stream. The number of Rx DOFs and the number of Tx DOFs need not be the same in any of the dimensions.

A super CN refers to a node is a member of multiple MP2MP bipartite graphs simultaneously, where is can be a CN in some of these networks and an EN in others. It also supports different types of networks: backhaul, fixed access, mobile access and so on.

Figure 22:
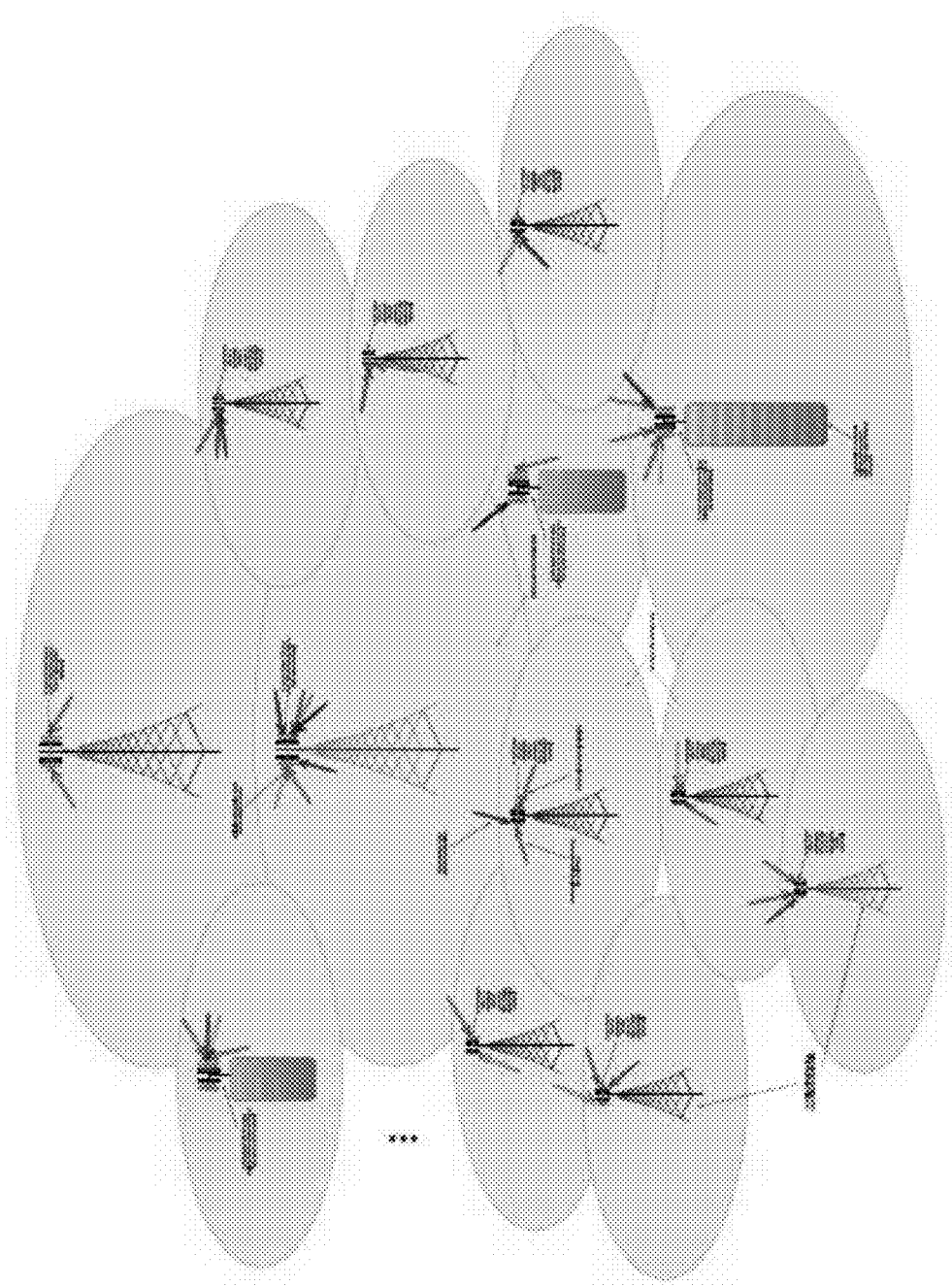
FIG. 22 illustrates conventional terrestrial macro-cellular network layout with state-of-the art STAP technology.
Figure 23:
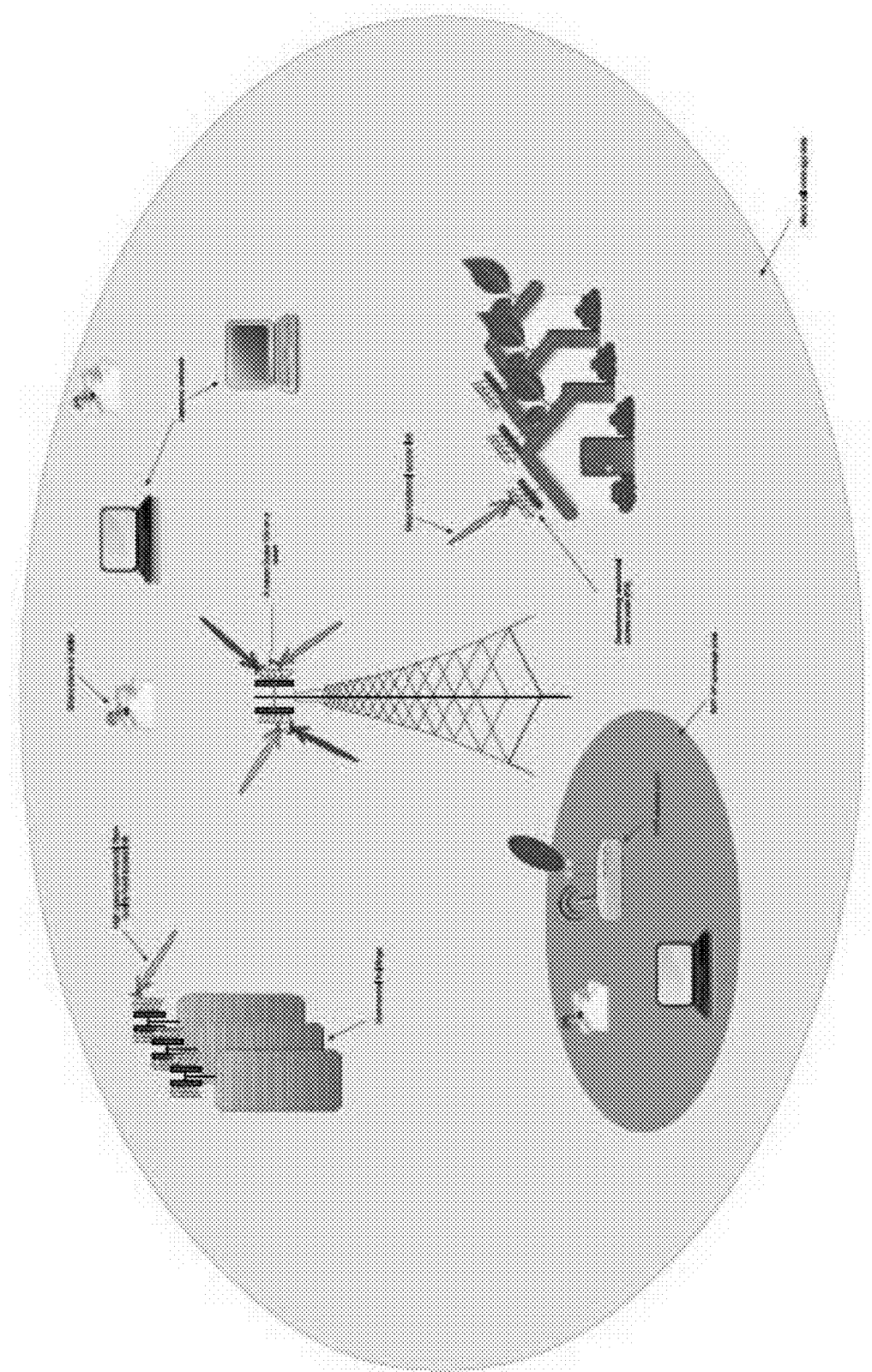
FIG. 23 illustrates terrestrial macro-cell with state-of-the art STAP technology.
Figure 24:
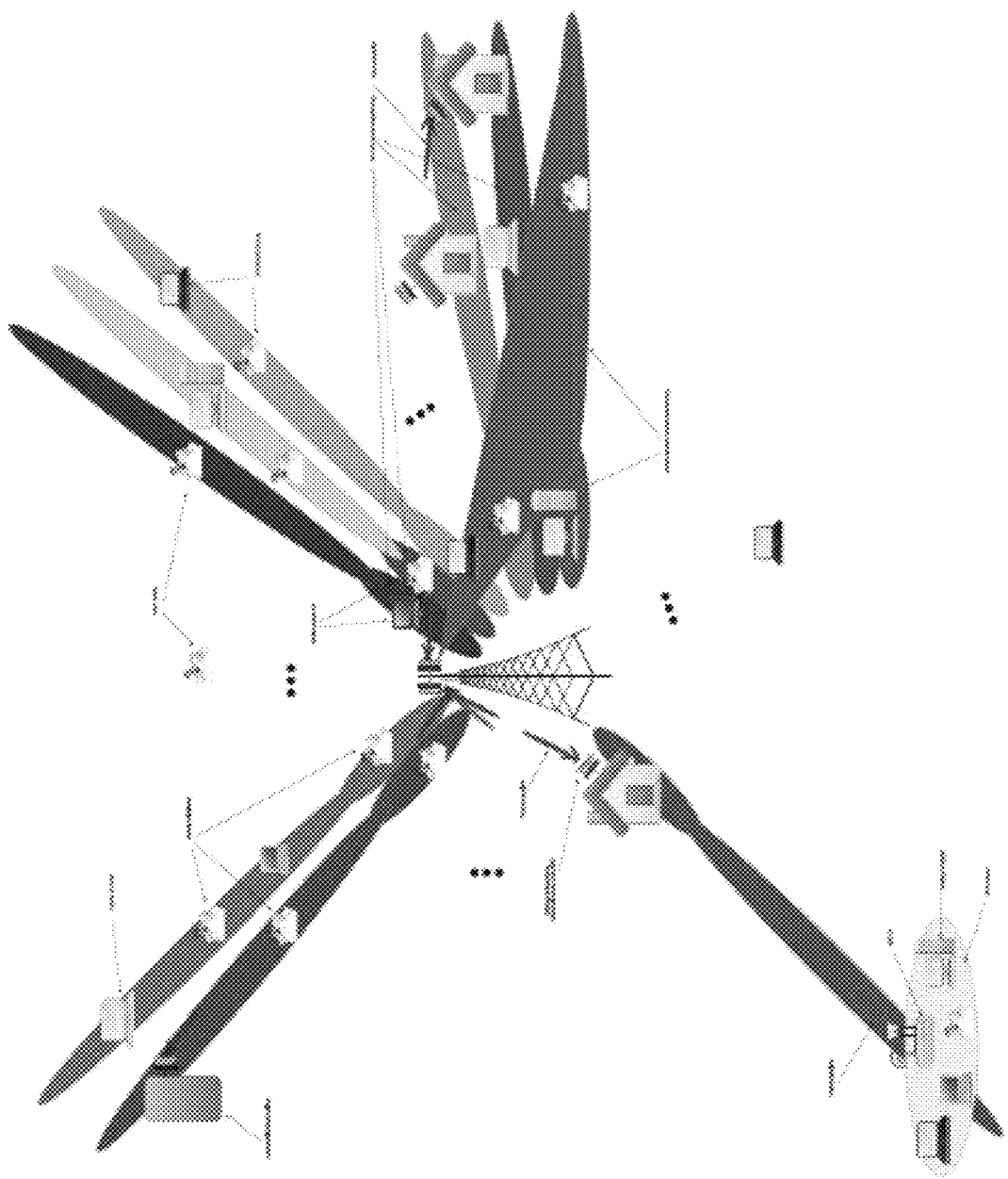
FIG. 24 illustrates a terrestrial macro-cell with state-of-the art STAP technology (beam coverage view)

FIG. 22 shows an example of the STAP-MP2MP network topology when applied to a conventional terrestrial macro-cellular network. The figure shows multiple macro and mini-cells on towers and buildings. In the figure, STAP-MP2MP is used to backhaul the cells. Multiple STAP-MP2MPs can be employed to create multiple hops, more redundancy, and increase capacity, as shown in the figure. Two different views of a single macro-cell, shown in FIGS. 23 and 24, show the STAP-MP2MP network on the access side. FIG. 22 shows macro-cells deployed on large towers or large buildings, and on smaller towers and buildings in case of cell splitting (i.e. mini-cells). Cells with access to high-speed fiber are marked in red. In this disclosure, the term fiber is used as a generic term to refer reliable, high speed, and low latency connections (wired or wireless) to wired networks (usually the Internet). Each cell is equipped with a super CN. The backhaul component of the super CN connects all the cells wirelessly to the fiber access locations. For macro and mini-cell sites most of those links are expected to be LOS and nLOS. Even in this scenario the STAP-MP2MP topology provides several advantages. In addition to the superior range and coverage, the automatic steering and the multibeam capability (e.g. spatial multiplexing) makes it easy to create multiple independent signal paths from each cell to the fiber network that would increase would capacity and reliability, as FIG. 22 shows. On the access side, each super CN establishes a variety of links: mobile access (e.g. cell phones, tablets, laptops), fixed access (e.g. residential nodes, WiFi APs), fiber extension (e.g. enterprise access). In each case, the ENs (i.e. cell phones, tablets, residential nodes) can associate with multiple cells for increased throughput and redundancy. Since mobile devices and residential nodes are always using the network, they don't get a dedicated beam from the CN (i.e. the beams switch on and off depending on the traffic demand).

Backhaul and fiber extension links usually operate near peak efficiency since both the network, links, and traffic patterns are either static or quasi static. Most of these links aggregate traffic from multiple different sources, and thus, on aggregate, the pipe is almost fully utilized with high probability. Furthermore, The ENs in these networks have the least cost, size and power restrictions. Fixed access links (e.g. residential) are slightly less efficient since link usage is more statistical and intermittent, which adds extra overhead for scheduling. Also, the ENs in these links are more limited in cost and size than backhaul. Mobile access is the least spectrally efficient since it adds the mobility dimension (in addition to the statistical nature of traffic), which adds more overhead and limits TBP. Mobile units are restrictive in size, cost and power than the rest.

Small cells (pseudolites) A backhaul network is a lot more spectrally efficient than a mobile access network. The difference in spectral efficiency can be up to (and sometimes exceed) 4×. In other words, if the networks shown in FIGS. 23 and 24 were strictly made up backhaul and/or fiber extension links, then they have up to 4× more in peak capacity. Furthermore, the superior link budgets of backhaul links relative to mobile access links make higher (and wider) frequency bands that are not fit for access (e.g. 10 GHz, 20 GHz . . . ), usable. That means that the increase in data rates can be much higher that 4×, and closer to 40×. The size and power restrictions of mobile devices makes difficult to utilize these higher frequency bands for mobile access.

Leveraging the high capacity and spectral efficiency of backhaul networks requires a shift in paradigm from macro cells to small cells. Each macro cell would be supplemented with 20-40 small cells that cover spots with highest network usage. The number of small cells per macro depends on the area of the macro and the desired capacity density. The base stations that serve small cells are much lighter weight than those deployed on towers, and can be deployed on street furniture (e.g. light posts, building walls, rooftops). The majority of access traffic goes through the small cells. The small cells connect back to the macro cell through high capacity backhaul links or high speed fiber if available as shown in FIGS. 25, 26, and 27.

Figure 25:
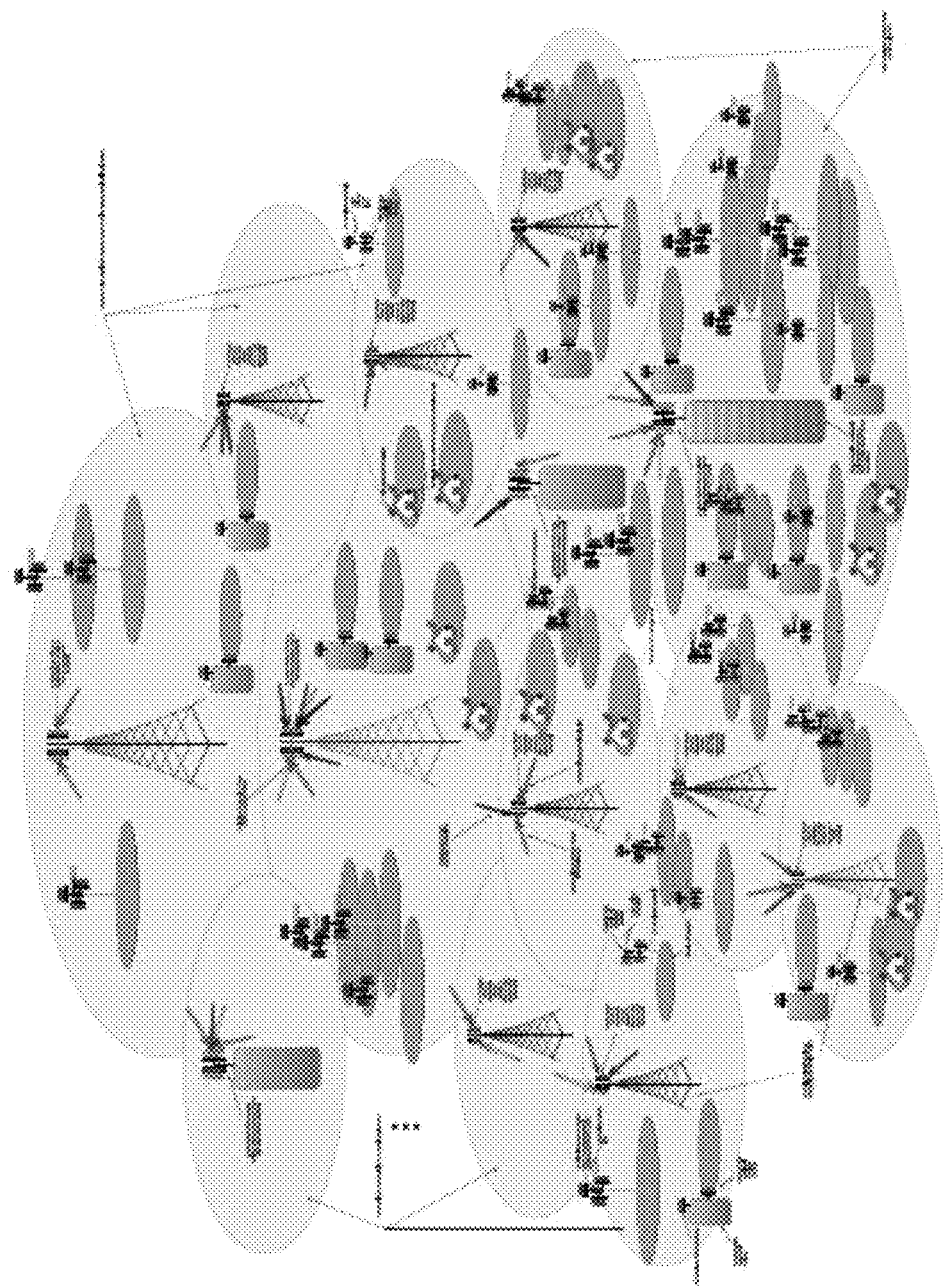
FIG. 25 illustrates a terrestrial small-cell-supplemented macro-cellular network layout with state-of-the-art STAP

FIG. 25 shows a terrestrial macro-cellular network with state-of-the art STAP technology that is supplemented with small cells. Towers and building with access to high speed backhaul (e.g. fiber) are marked in red. The small cell ENs and CNs are shown mounted either on lightposts or on rooftops or walls of small buildings. The majority of small cells are expected to be wirelessly backhauled via nearby macro-cells, and a few via fiber when economically viable. Each small cell (EN) can connect to multiple macro-cells (CNs) for increased capacity and reliability.

Figure 26:
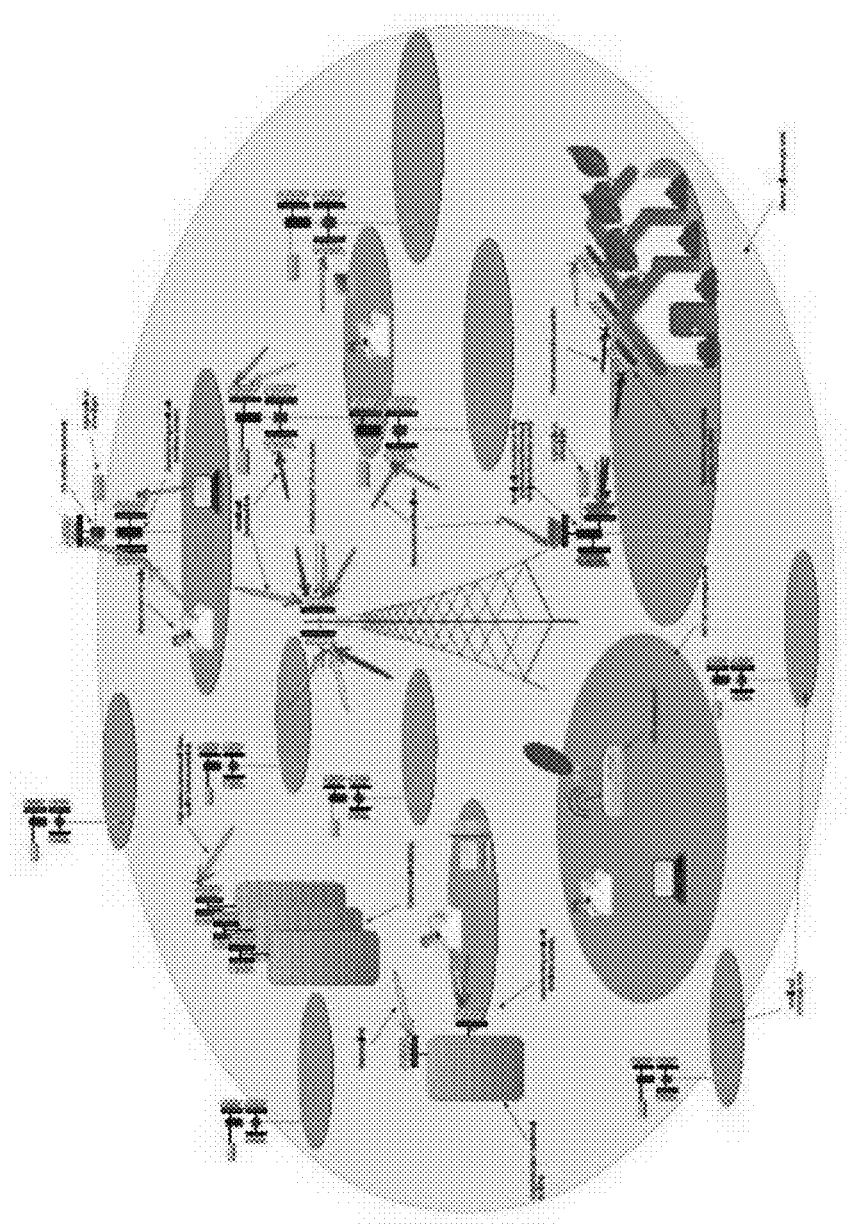
FIG. 26 illustrates a terrestrial small-cell-supplemented macro-cell with state-of-the art STAP technology.

FIG. 26 is a conventional small-cell-supplemented terrestrial macro-cell with state-of-the art STAP technology. The majority of access traffic (both fixed and mobile) goes through the small cells, while the macro cell handles backhaul and fiber extension and the remaining access traffic not covered by small cells.

Figure 27:
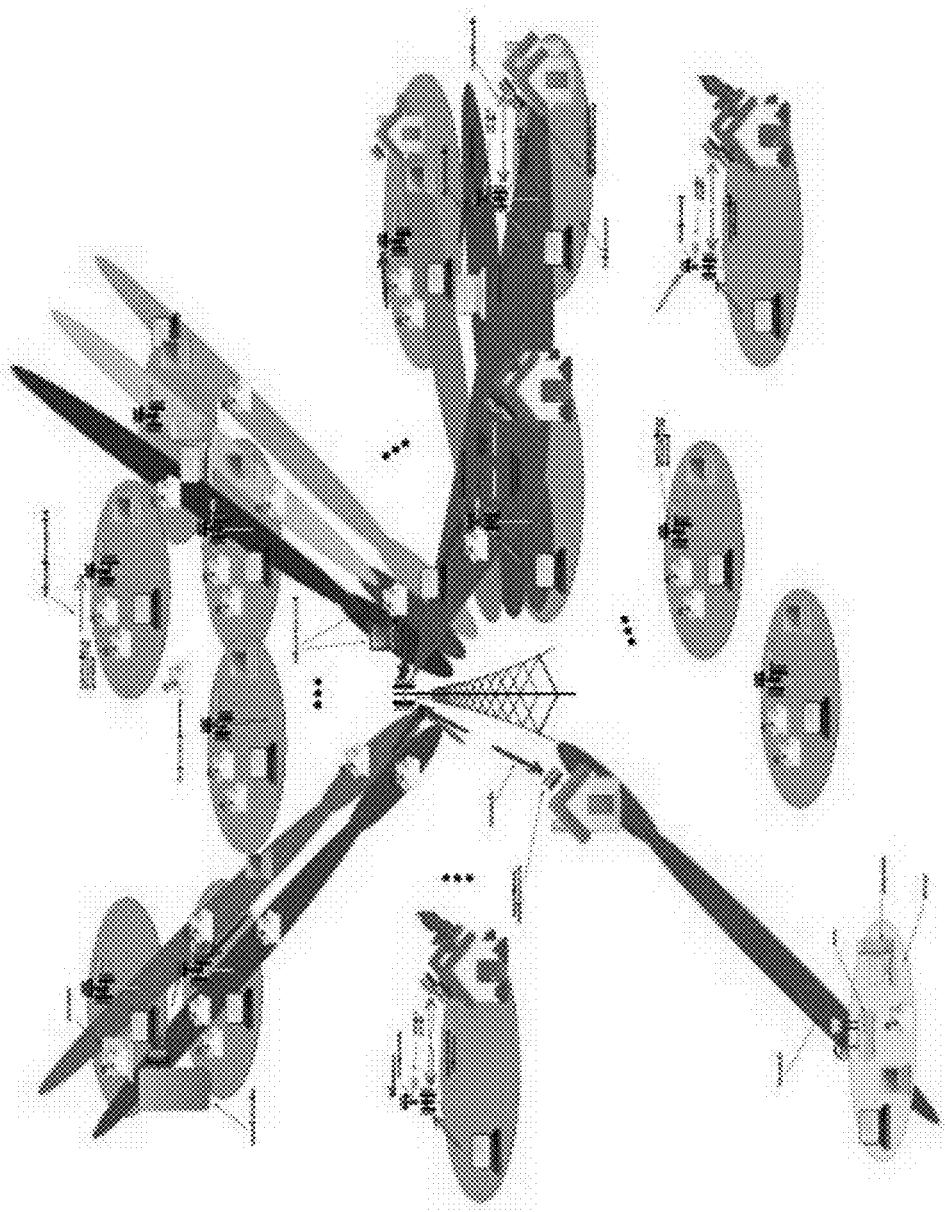
FIG. 27 illustrates a terrestrial small-cell-supplemented macro-cell with state-of-the art STAP technology (beam coverage view)

FIG. 27 is a conventional small-cell-supplemented terrestrial macro-cell with state-of-the art STAP technology. The majority of access traffic (both fixed and mobile) goes through the small cells, while the macro cell handles backhaul and fiber extension and the remaining access traffic not covered by small cells.

In addition to backhaul, the macro base station (CN) provides coverage to access traffic that is not covered by small cells. Each small cell provides access capacity comparable to the macro cell. The capacity of the small cell is a function of the number of antennas and DOFs of the CN. Small cells usually has more restrictions on the size and power consumption of the unit than macro cells, which often results in lower capacity. In addition, due to the higher density of small cell deployments, the intercell interference will likely be higher. On the other hand, small cells can incorporate short range wireless technologies like WiFi and mm-Wave that are difficult to incorporate in macro cells for access because of the range issue. Also, the mobile device needs less power to reach the small cell compared to the macro-cell. Therefore, on aggregate, each small cell can have more capacity and serve more users than a macro cell.

The small cells bring the connections much closer to the mobile units, so these units can meet the link budget requirements with less power. This improves the uplink performance and battery life of these devices. It also potentially makes communication over high frequencies (e.g. mm-Wave) viable for access channels at very high density small cell deployments.

Figure 28:
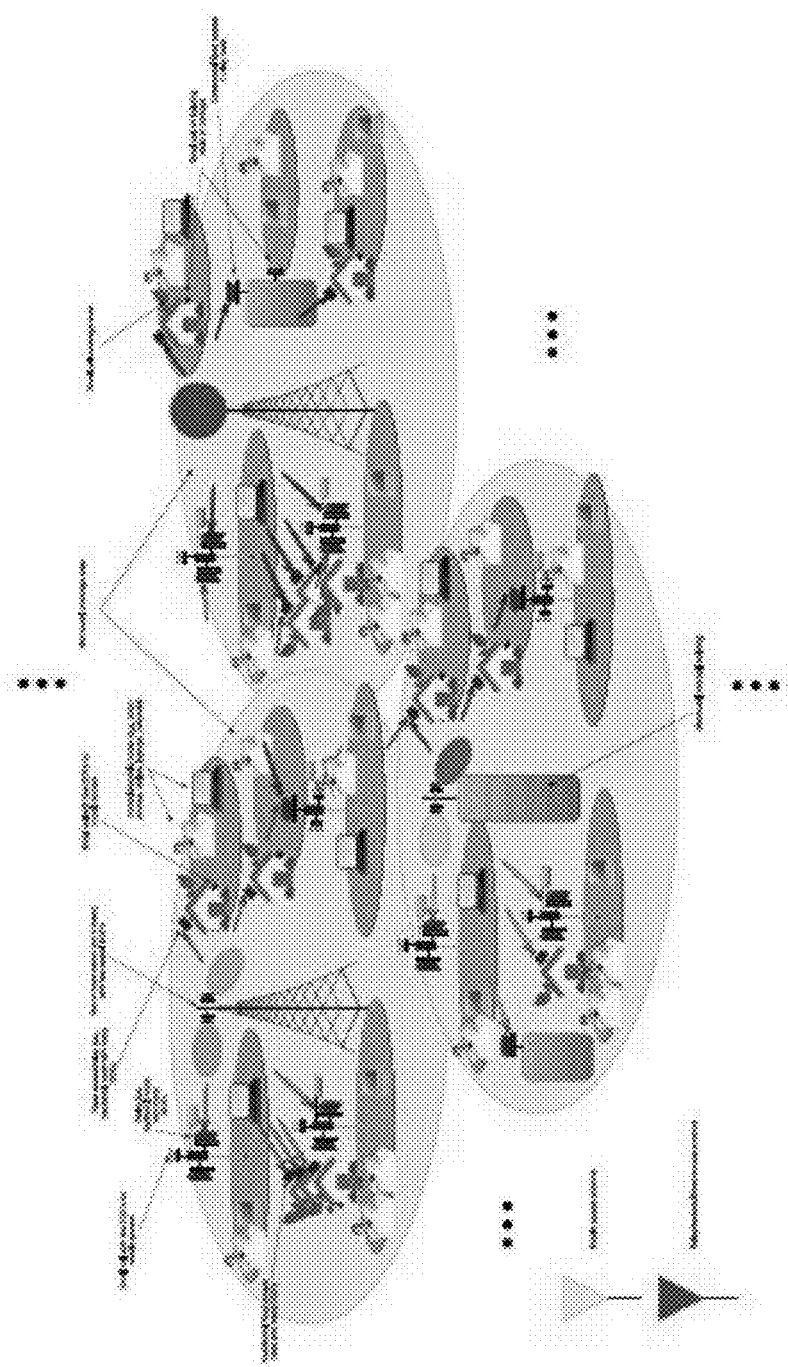
FIG. 28 illustrates increasing the capacity of legacy systems.

The small cell model also works well in legacy systems, especially where macro base stations (CNs) have few spatial DOFs. In cases like this, the mobile access capacity degrades significantly due to the lack of sufficient DOFs on both ends of the link. This results in high fading and intercell interference at cell edges. The achieved capacities of networks like these can sometimes be as low as one tenth the peak capacity achieved with an isolated single cell with short distance LOS links. When the mobile units are replaced by ENs with more spatial DOFs, these new (upgraded) ENs can cancel most of the out cell interference and significantly reduce fading, which allows the cell to operate at peak efficiency (i.e. up to 10× improvement). Therefore, it can still be advantageous to split the channel between the macro CN and the mobile units into two hops: one hop between the macro CN and the relay (EN) and another hope between a micro CN (can connect to the EN via wire (e.g. ethernet)) and the mobile and fixed access units. The multi-antenna ENs connected to the macro CN can either be relays or installed to customer premises to provide direct Internet access. ENs connected directly to customer premises are usually called CPEs. Even though the frequency channel is split into two parts, each part assigned to a hop, the net increase in capacity can be at least 2×. An example of such network is shown in FIG. 28.

Mini-Satellites Small cell or pseudolite deployment is the most realistic and scalable path towards meeting the growing demand for wireless data, as they require little additional spectrum since they rely mostly on spatial reuse and multiplexing, and they enable the use of wider bands (e.g. mm-Wave), and they are cheap and easy to deploy. However, the capacity of a terrestrial based small cell network relies heavily on the existing tower-based macro-cellular infrastructure and wired infrastructure, and thus the capacity of the small cell (pseudolite) network is limited by the backhaul capacity of the macro-cellular network and fiber penetration. The economics of buildings high capacity terrestrial-macro-cellular networks is limited by factors listed above. The cost of building a high density fiber network is even higher. Therefore, in order unlock the full potential of pseudolites, a different approach is required.

Aerial links that use mini-SATs can achieve similar coverage footprints as towers while avoiding most of the challenges associated with tower deployments. The flexibility and low cost makes mini-SATs the ideal replacement/supplement for existing tower-based wireless infrastructure, and the best candidate network infrastructure technology for supporting small cells and pseudolites. Mini-SATs can deliver much better coverage and capacity than towers based cells at a fraction of the cost. The capacity advantage comes from more effective spatial multiplexing and better propagation characteristics, which allows the use of higher frequency bands with wider spectrum. Mini-SATs can be used for direct access or as backhaul to pseudolites, which themselves can be mini-SATs.

The coverage area of a mini-SAT depends on its height. Since the marginal cost of increasing and decreasing the height of the mini-SAT is very small (unlike towers), these devices can be used to build cells with different coverage levels. In addition to the conventional macro, mini, and micro cells, mini-SATs can also be used for cells with wider coverage that conventional macro, which shall be referred to in this disclosure as mega cells. Mega cells are larger than a macro cell. A mega cell coverage area can be as large as one that is typically covered by 3-6 large macros. However, it is much smaller than what's typically covered by satellites. Since each cell served by a base station or a super CN deployed on a mini-SAT has higher capacity than an equivalent tower-based base station, mini-SATs can achieve the same coverage and capacity with much fewer cells than towers. Mini-SATs can also be used to host small cells or pseudolites. This can be done with both balloons and drones (both tethered and untethered).

Figure 29:
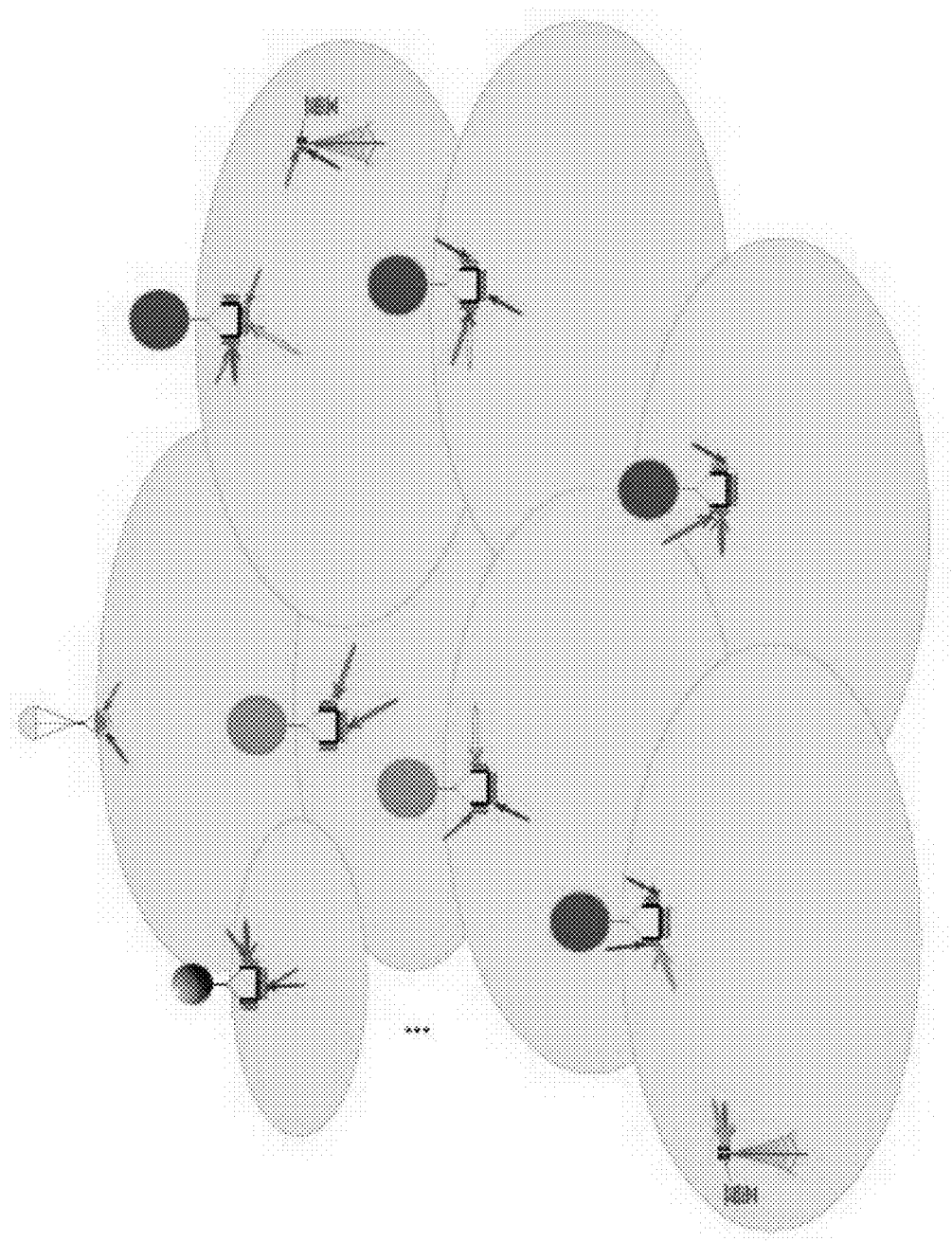
FIG. 29 illustrates aerial macro/mega-cellular network layout with state-of-the art STAP technology.
Figure 30:
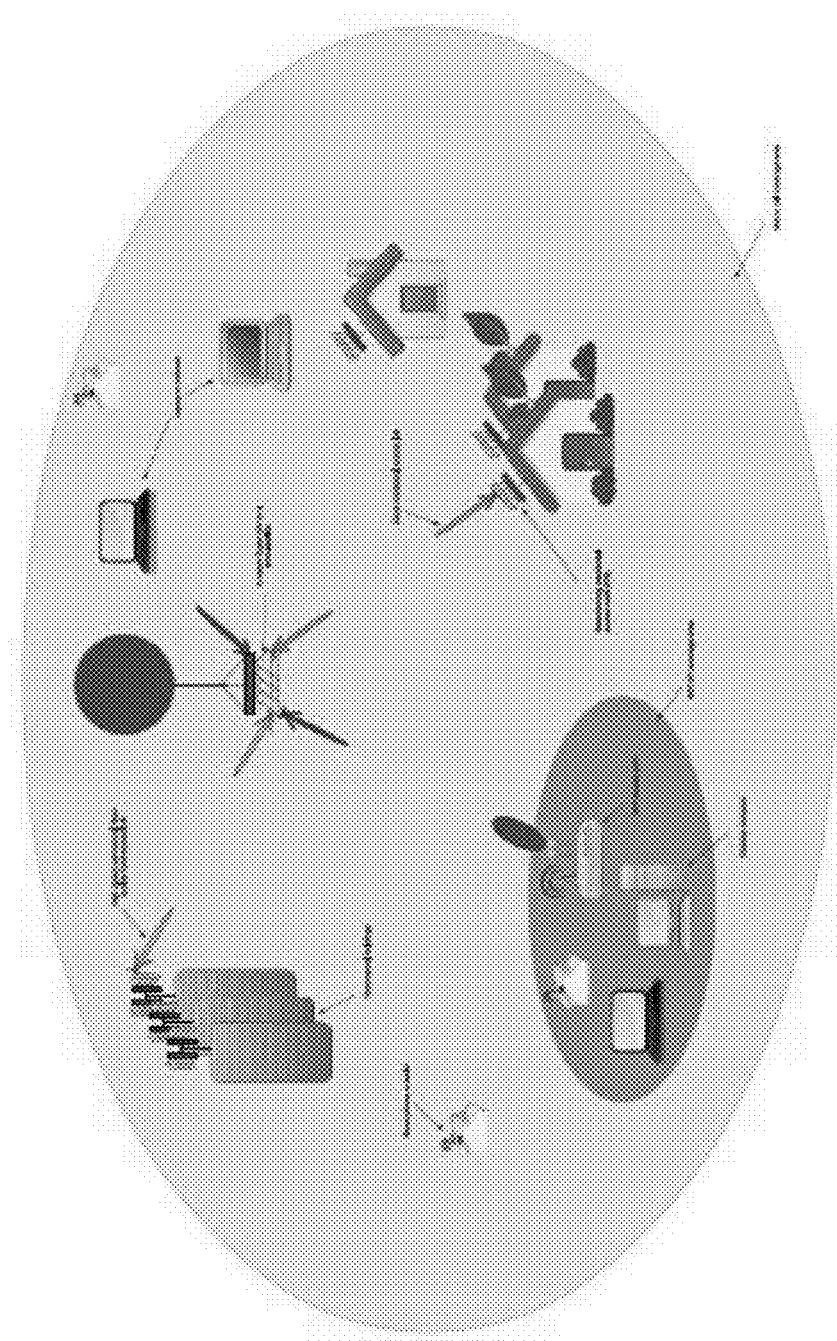
FIG. 30 illustrates an aerial macro/mega-cell with state-of-the art STAP technology.
Figure 31:
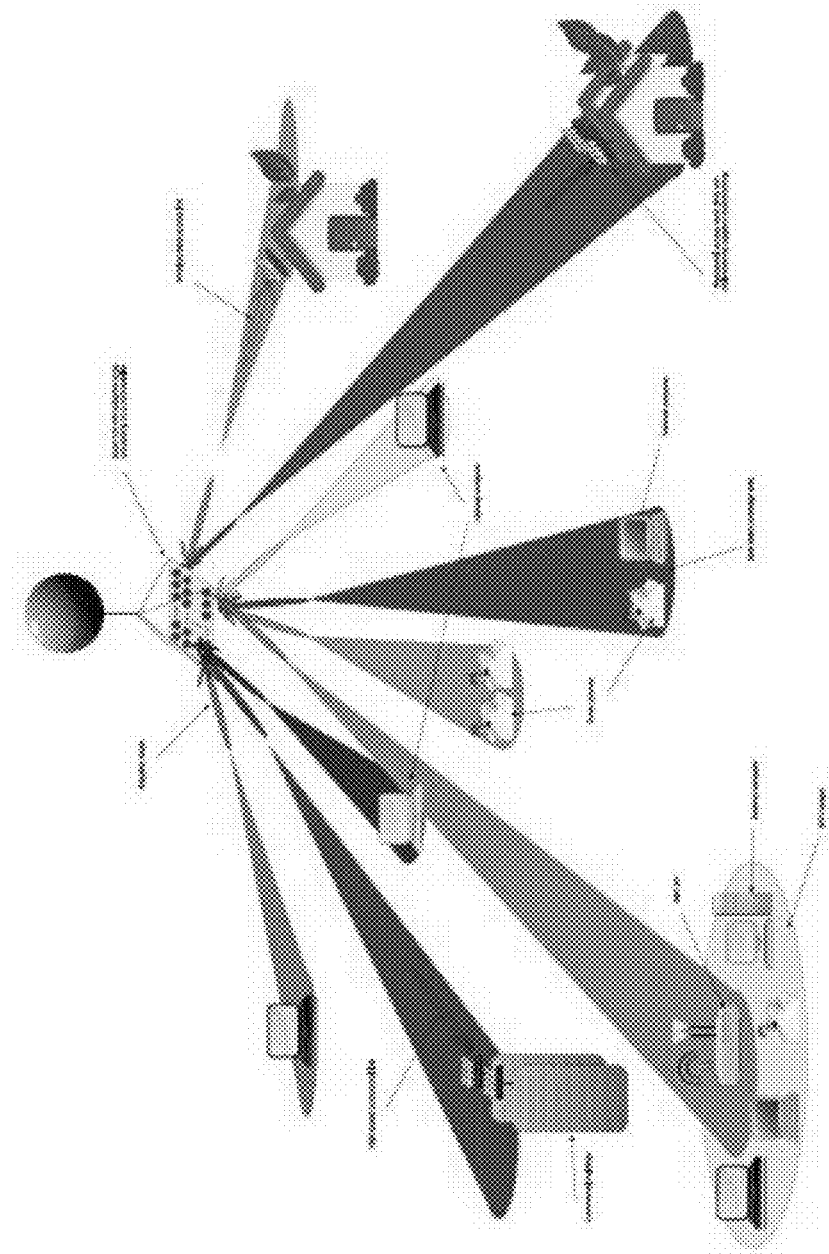
FIG. 31 illustrates an aerial macro/mega-cell with state-of-the art STAP technology (beam coverage view)

FIG. 29 shows the equivalent of the network in FIG. 22 using mini-SATs instead of towers as the vehicle carrying the wireless base stations or super CNs. In addition to replacing towers with mini-SATs, the figure also shows a larger the per cell coverage area the FIG. 22, and thus, an aerial macro/mega cellular network can achieve the same coverage as a terrestrial network with fewer cells. FIGS. 30 and 31 show the topology of a typical aerial macro/mega cell. In this case, the mini-SAT handles almost all access and backhaul traffic. FIG. 31 shows how a super CN can achieve better spatial reuse when mounted on a mini-SAT compared with a tower (FIG. 24).

Figure 32:
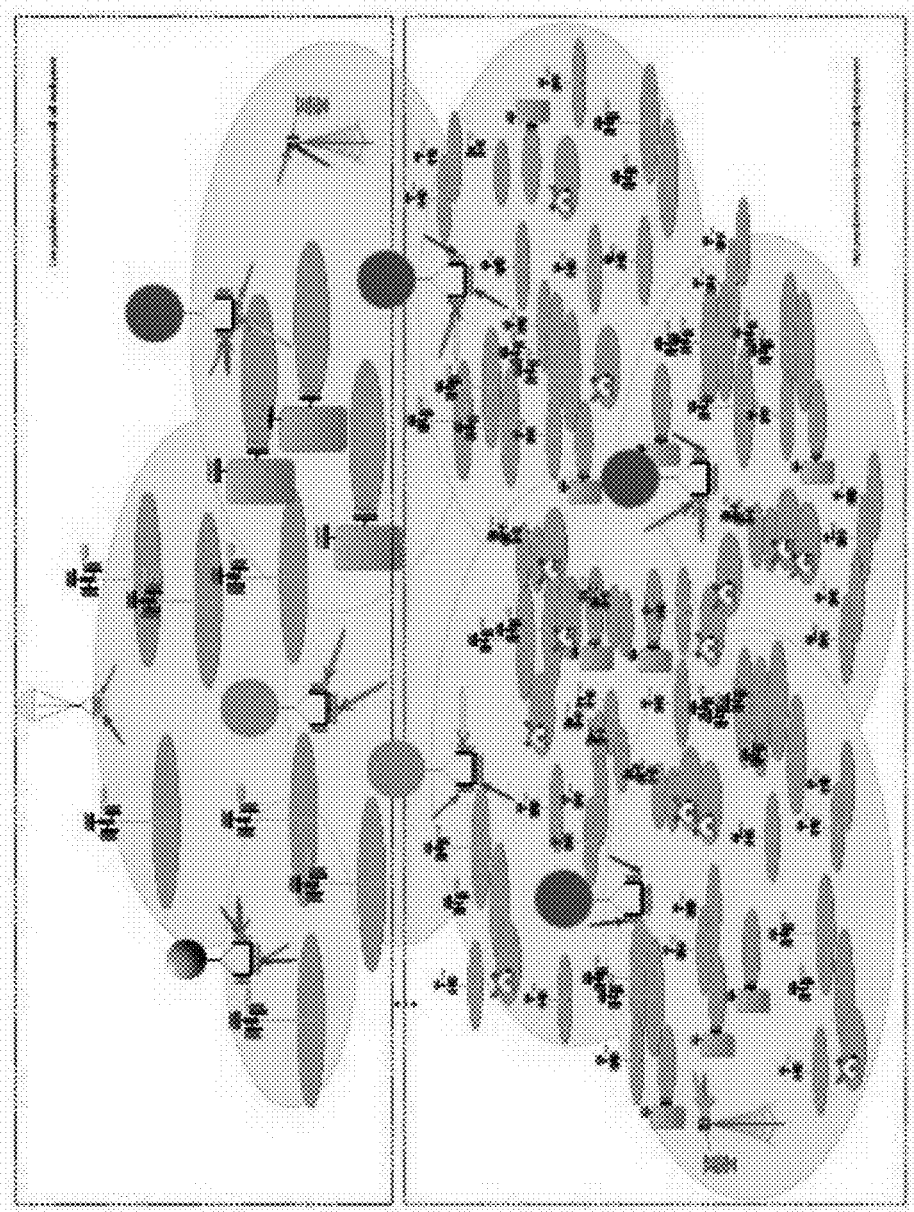
FIG. 32 illustrates an aerial small-cell-supplemented macro-cellular network layout with state-of-the-art STAP.
Figure 33:
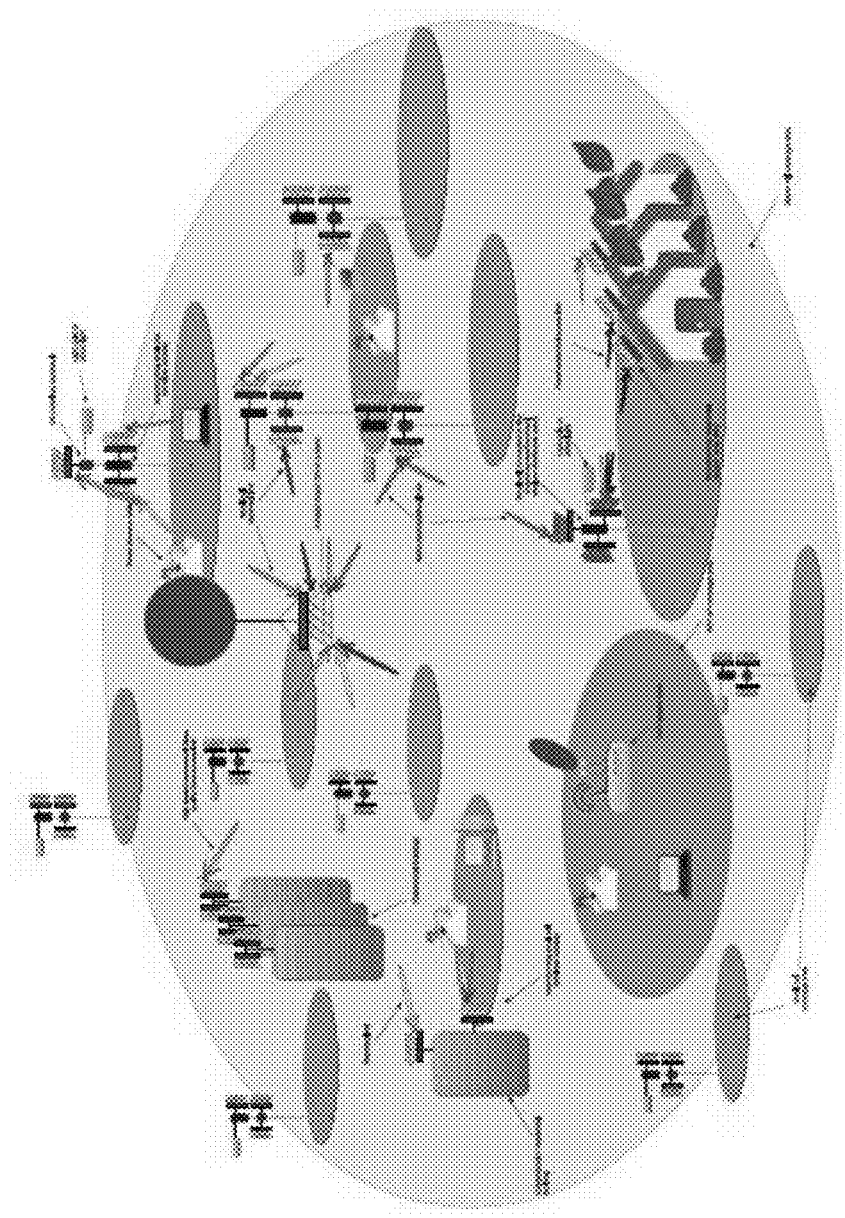
FIG. 33 illustrates an aerial small-cell-supplemented mega-cell with state-of-the art STAP technology.
Figure 34:
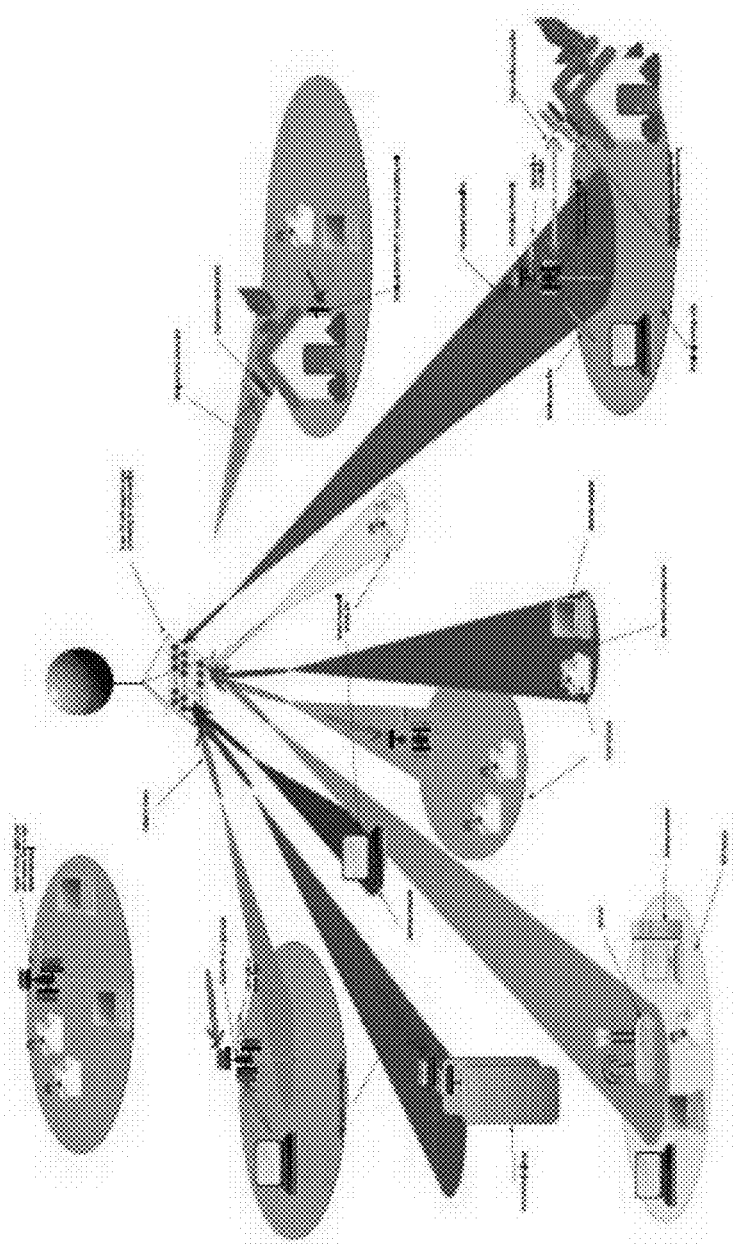
FIG. 34 illustrates an aerial small-cell-supplemented mega-cell with state-of-the a STAP technology (beam coverage view)

An aerial network can also be supplemented with small cells as shown in FIGS. 32, 33 and 34. The small cells can either be terrestrial or aerial. As in the terrestrial case, the small cells would handle all communication with end-user and client devices, while the macro/mega mini-SATs would handle the majority of backhaul/fiber extension traffic as well as client devices that are outside the coverage area of small cells. Client devices can achieve better capacity by connecting via small cells/pseudolites due to lighter load and shorter distance. Furthermore, it is more desirable for the mini-SAT to connect to the small cells rather than directly to user devices. Since the mini-SAT is up in the air, it usually relies on a portable power source. Thus, it needs to conserve energy. Communicating directly with client devices requires more power since these devices usually have smaller antennas and lower power transceivers.

FIG. 32 shows an aerial macro-cellular network with state-of-the art STAP technology that is supplemented with small cells. The small cell ENs and CNs are shown mounted either on lightposts or on rooftops or walls of small buildings. The majority of small cells are expected to be wirelessly backhauled via nearby macro-cells, and a few via fiber when economically viable. Each small cell (EN) can connect to multiple macro-cells (CNs) for increased capacity and reliability.

Wireless Distribution Ground Stations

One of the key advantages of aerial-terrestrial communication is that it makes the height of the terrestrial node almost irrelevant (provided that the vertical distance between the nodes is larger than the horizontal distance). This dramatically simplifies the process of providing backhaul connections to mini-SATs.

For terrestrial small cells, the backhaul connection usually requires the CN (or EN) to be deployed on a tower or large building (i.e. a macro-cell or mini-cell). If this infrastructure (i.e. towers and buildings) does not already exist, then building it from scratch requires a large amount of capital. If it does exist, it's usually at low density, especially in urban areas. Towers and high rise buildings are not ideal for high density deployment primarily due to cost, but also because of their large coverage areas will lead to intercell interference. For a very dense small cell deployment, one of the few options is to deploy CNs (and/or ENs) on small structures like light posts and street lights or building walls to provide backhaul (similar to the locations where small cells are typically deployed). The challenge with these sites is that they usually have strict size and power restrictions. Also, the channel propagation suffers from the factors listed in Section 1.2.

The cost of the sites required to backhaul mini-SATs is considerably reduced since height is almost eliminated from the equation. Since mini-SATs have LOS or nLOS coverage to most ground locations in its coverage area, the CNs/ENs used to backhaul the mini-SATs can installed directly in locations with fiber access. They can be laid flat on the ground or on rooftops facing the sky (like solar cells). An example is shown in FIGS. 35, 39, 44, and 45. Unlike small cells, the locations where these ground CNs or stations need to be deployed is independent of user and population densities. The main requirement is access to fiber or high speed Internet. This increases the flexibility and potential density of ground stations, which increases the backhaul capacity to mini-SATs. Since ground CNs/ENs are also SFTAP capable, they can form multiple beams and connect several mini-SATs.

Figure 35:
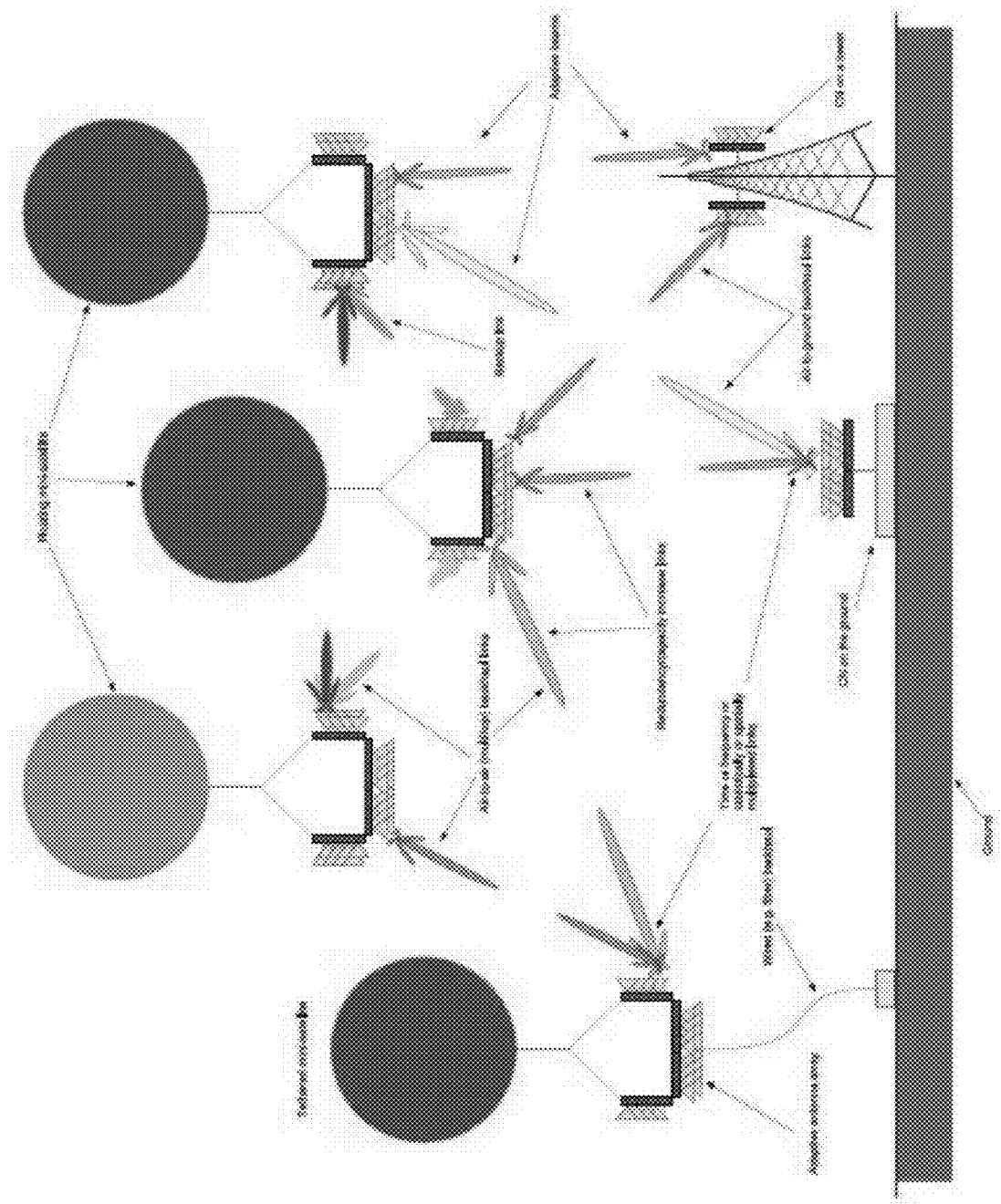
FIG. 35 illustrates mini-satellite backhaul options.
Figure 45:
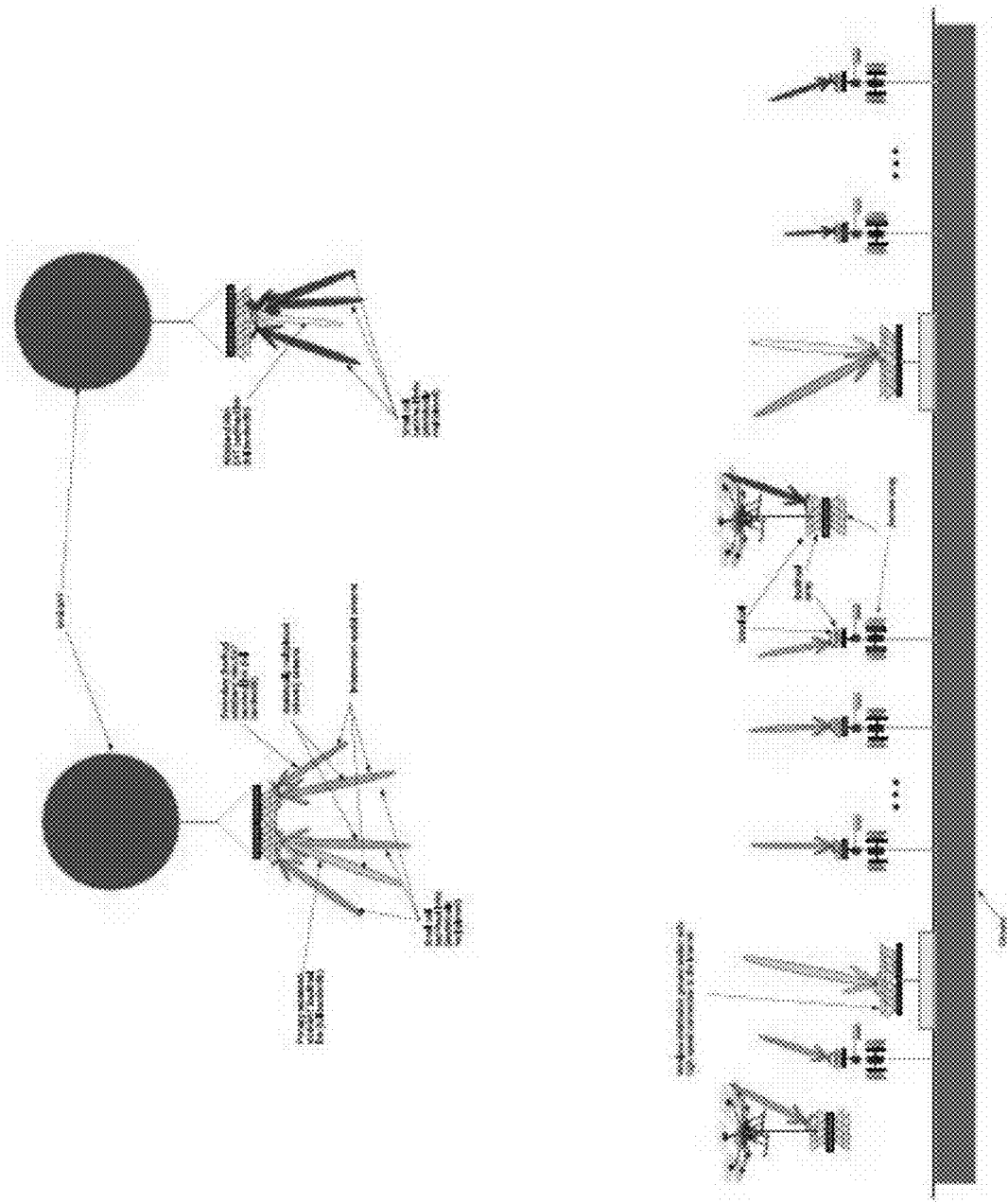
FIG. 45 illustrates the same channel (wideband) spatially/statistically multiplexed backhaul connections for small cells and mini-SATs.

FIG. 35 shows the different options for backhauling a mini-satellite. A mini-satellite can get its backhaul connection directly over the wire (i.e. fiber) (only if tethered) and/or wirelessly via another mini-satellite or satellite or a tower or a ground station or a pseudolite. A mini-satellite can combine one or more of these backhaul modes in order increase capacity and/or reliability. Although existing tower infrastructure can be used for backhauling mini-SATs, it is unnecessary for a green field deployment, where ground stations eliminate the need for towers. This is another advantage of mini-SATs. FIG. 45 shows mini-SATs using a wideband channel for backhaul, which reduces the number of required ground nodes of backhaul connections. The same backhaul channel can be spatially reused for access. However, the access stream is statistically multiplexed among several connections.

Summary of Network Topology

Wireless networks serve several functions: they can serve as a bridge between the end-user and a wired (or another wireless) network (e.g. the Internet), or as a bridge between two wired (or wireless) networks, or as local private network between users. The wireless infrastructure is a mixture of several components (e.g. satellites, mini-SATs, towers, light poles etc.). These components act as a host to both mega (e.g. mini-SATs), macro (e.g. mini-SATs, towers, and buildings), mini (e.g. mini-SATs, mini-towers, mini-buildings), small (e.g. mini-SATs, rooftops, lightposts) cells. Each cell can be part of several access/backhaul networks simultaneously. In each network, it can either be an EN or a CN. The three essential components for building high capacity wireless data networks that can scale are mini-SATs, pseudolites, and STFAP. Other components (e.g. towers and satellites) are optional, are either used for added redundancy or coverage or exist from old networks.

Mini-SATs can host both mega/macro/mini/small cell sites and/or act as relays. Mini-SATs receive backhaul connectivity in one of several ways. The most straightforward is directly to the wired network via copper or fiber. This option is only available to mini-SATs that are tethered. Tethering limits the potential height of mini-SATs. For mini-SATs that are not tethered, backhaul connectivity can be achieved wirelessly from towers or via multiple hops from other mini-SATs (or other mega or macro or mini cell sites). However, one of the biggest advantage of mini-SATs is that they do not require towers or tall buildings for backhaul, even the untethered ones, since mini-SATs are floating in the air, they do not need high rise building and towers to establish a line of sight or a good field of view. The backhaul connectivity can be established with a ground (wireless distribution) station as shown in FIG. 35. Therefore, mini-SAT technology does not require legacy terrestrial cellular infrastructure. Even though not common, mini-SATs can receive backhaul connectivity from small cells, especially small cells that have direct access to fiber. Several backhaul modes can be used simultaneously to improve capacity and reliability. The backhaul options for mini-SATs are summarized in FIG. 35.

Mini-SAT can also receive backhaul connectivity from satellites (GEOs, MEOs, or LEO). In this case, they would be mostly acting as relays without any significant benefit in capacity especially since satellites are usually capacity limited. This mode of operation has several advantages especially in rural areas with little access to wired infrastructure. First, connecting end-user devices directly to a satellite networks is challenging, mainly due to distance and antenna requirements, but also most end-user devices generally do not support satellite frequencies or protocols. Most end-user systems support cellular and WiFi protocols and frequencies. Building devices specifically for rural areas is not an economically viable due to the size of these markets. Therefore, any economically viable solutions for these regions must leverage equipment and technologies that are mass produced. Mini-SATs can act as an intermediary layer between satellites and end-user devices. Also, since mini-SATs have much better coverage than terrestrial infrastructure, they are better suited to serve as a bridge between satellites and rural areas.

Legacy infrastructure made-up mostly of cellular towers can also co-exist and support the aerial infrastructure by providing backhaul connectivity to mini-SATs and pseudolites, and mobile and fixed access connectivity to residential and commercial areas. Towers and buildings usually host macro and mini-cells. The backhaul connectivity for towers can be established in several ways, similar to mini-SATs. The most straightforward is by directly connecting the tower with fiber or copper. If wired connection is unavailable, the backhaul can be achieved with one more wireless hops either from neighboring towers or buildings or from mini-SATs. The backhaul options are summarized in FIGS. 22, 29, and 35. Similar to mini-SATs, towers can sometimes receive backhaul connectivity directly from satellites. This is most common in areas with poor wired infrastructure. Like mini-SATs, cells on towers and buildings can use more than one backhaul link for added capacity and reliability.

For both towers and mini-SATs, the backhaul links are mostly LOS. LOS links can be much longer distance than NLOS links, which means that the number of hops required to reach a fiber point is very small (one link is sufficient in most cases). Macro/mega cells can provide both access and backhaul service. However, the best utilization of these sites would be in the backhaul and fixed access, especially enterprise, spaces. Mobile access and some residential fixed access is best left to mini and small cells.

Small cells or pseudolites are usually the last hop before the end-user device, and are usually hosted on light-posts, building walls, rooftops, or mini-SATs. The majority of pseudolites are expected to be back-hauled wirelessly. The overhead of pulling fiber to every small cell location makes the network economics very unattractive. In most cases, this wireless backhaul would be provided by aerial mega/macro/mini-cells. A small fraction would be provided by terrestrial macro/mini-cells, and an even smaller fraction by a nearby smaller cells, especially those with direct wired access. Under very rare circumstances, a small cell may connect directly to a satellite. As with other types of cells, multiple backhaul connections can be established simultaneously per small cell for added redundancy and performance. Pseudolites are ideal for connecting homes and end-user devices due to their close proximity. End-user devices can connect to multiple cells for increased capacity. As discussed above, the presence of the small cell as an intermediate hop between the macro-cell (mega-cell) and the end-user device improves the overall system capacity in most cases even though an additional channel may be required to be allocated for the additional hop.

The same principles that apply to small cells in terms of backhauling, also apply to RAN fronthaul. However, the higher bandwidth and tight latency and low jitter requirements must be taken into consideration. This means that the fronthaul to each RRH must either consist of a single or few high bandwidth beam or many low bandwidth beams in order to provide CPRI like performance. Using multiple low bandwidth beams is a little tricky since the different beams must be synchronized.

Homes and end-user devices (e.g. phones, tablets, laptop and desktop computers) can access the network by connecting directly to a cell of either type (e.g. mega, macro, mini, small). However, best network performance (in terms of capacity, availability, and power efficiency) is achieved when these devices connect to smallest available cell. This cell will most likely be a pseudolite in a dense small cell deployment, and a macro or mini-cell (aerial or terrestrial) when small cells are sparse. In spots without small cell coverage, devices connect to larger cells.

Figure 21:
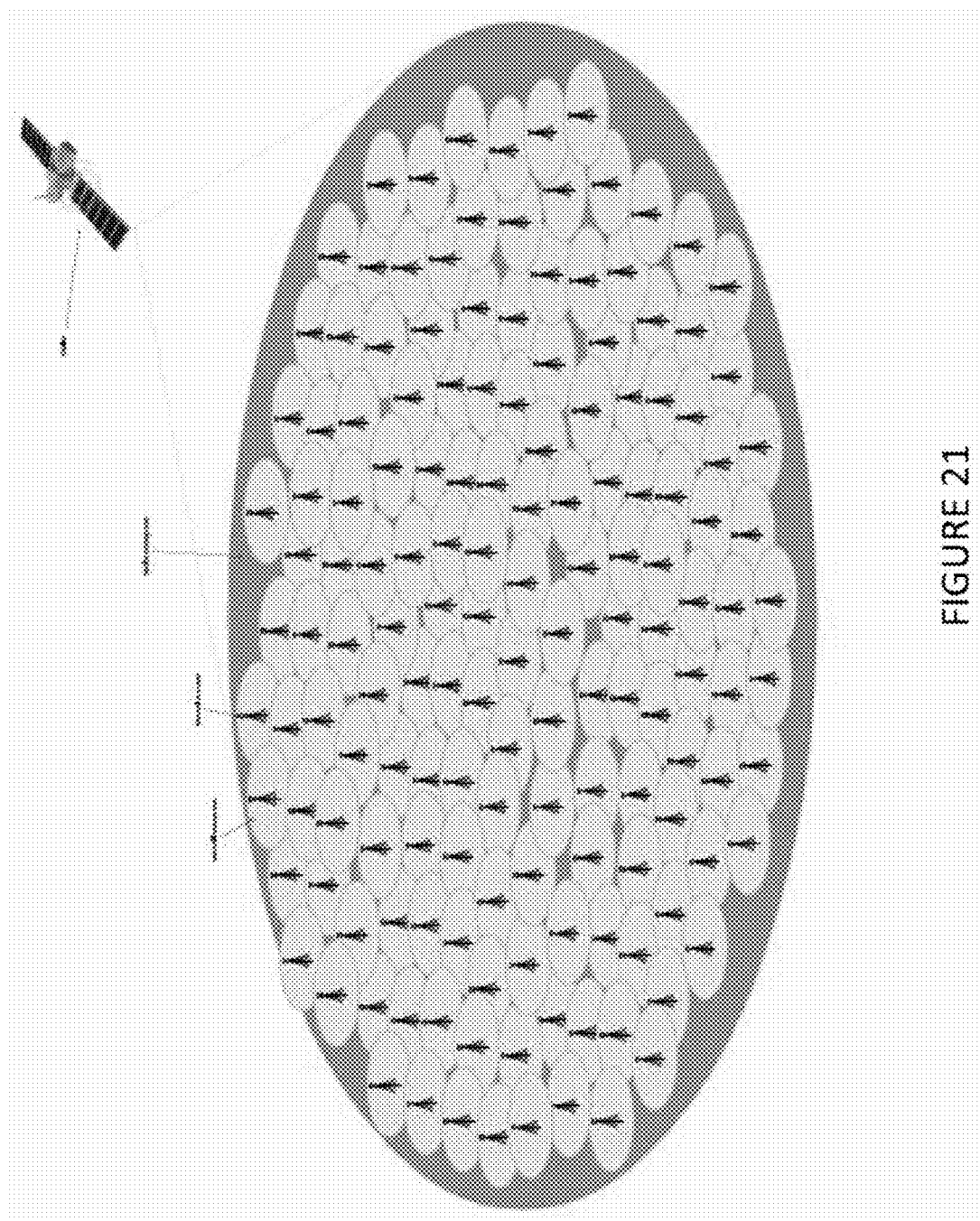
FIG. 21 illustrates a cell tower and satellite coverage areas.

The satellite network (GEO. MEO. LEO) provides blanket coverage, which helps fill in the gaps not covered by either macro (mini-SATs or towers) or mega cells as shown in FIG. 21. For a large fraction of rural areas, satellites are the only option for access. Section 3.5 discusses techniques for improving satellite network performance (especially LEOs) by incorporating STAP technology.

FIG. 32 is an aerial macro-cellular network with state-of-the art STAP technology that is supplemented with small cells. The small cell ENs and CNs are shown mounted either on lightposts or on rooftops or walls of small buildings. The majority of small cells are expected to be wirelessly back-hauled via nearby macro-cells, and a few via fiber when economically viable. Each small cell (EN) can connect to multiple macro-cells (CNs) for increased capacity and reliability.

FIG. 33 is a small-cell-supplemented aerial macro/mega-cell with state-of-the art STAP technology. The majority of access traffic (both fixed and mobile) goes through the small cells, while the macro (mega) cell handles backhaul and fiber extension and the remaining access traffic not covered by small cells.

FIG. 34 is a small-cell-supplemented aerial macro/mega-cell with state-of-the art STAP technology. The majority of access traffic (both fixed and mobile) goes through the small cells, while the macro (mega) cell handles backhaul and fiber extension and the remaining access traffic not covered by small cells.

FIG. 35 shows different options for backhauling a mini-satellite. A mini-satellite can get its backhaul connection directly over the wire (i.e. fiber) (only if tethered) and/or wirelessly via another mini-satellite or satellite or a tower or a ground station or a pseudolite. A mini-satellite can combine one or more of these backhaul modes in order increase capacity and/or reliability. Although existing tower infrastructure can be used for backhauling mini-SATs, it is unnecessary for a green field deployment, where ground stations eliminate the need for towers. This is another advantage of mini-SATs.

Figure 36:
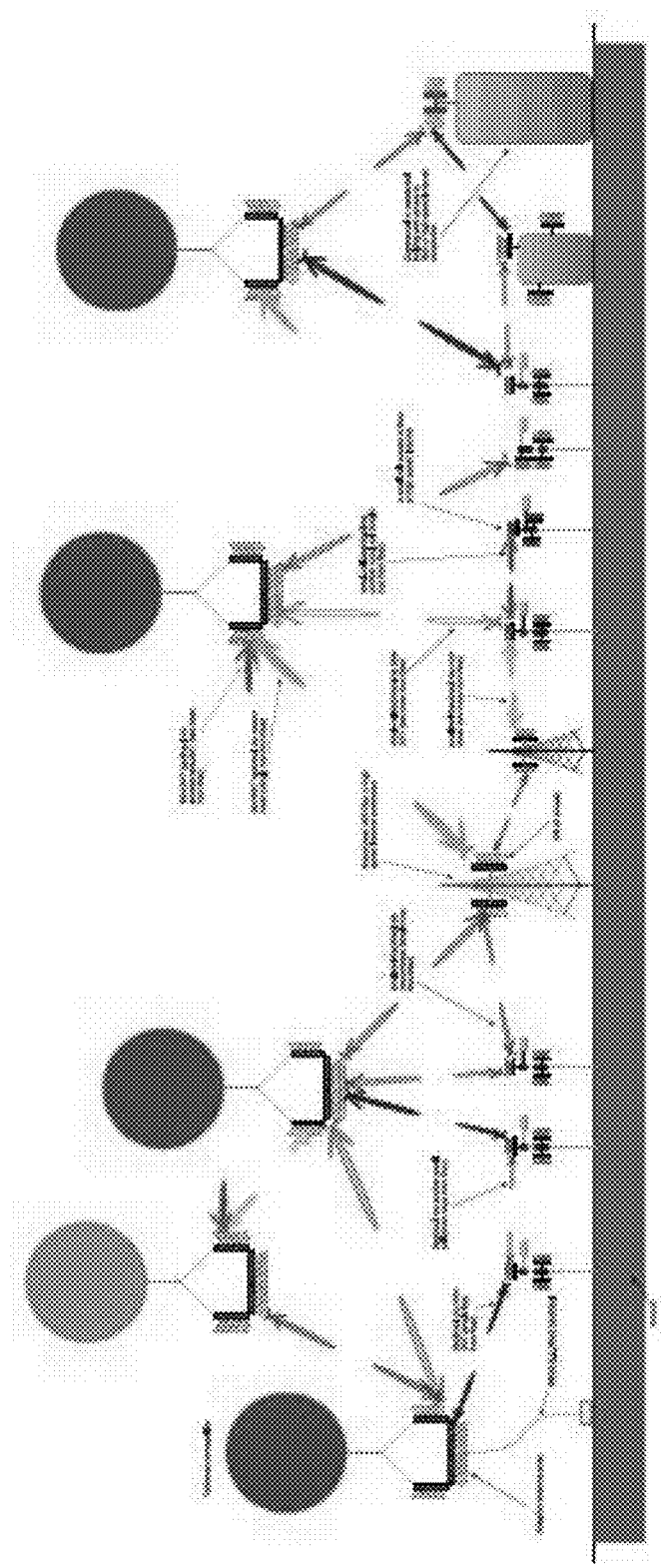
FIG. 36 illustrates backhaul options for pseudolites (i.e. small cells)
Figure 37:
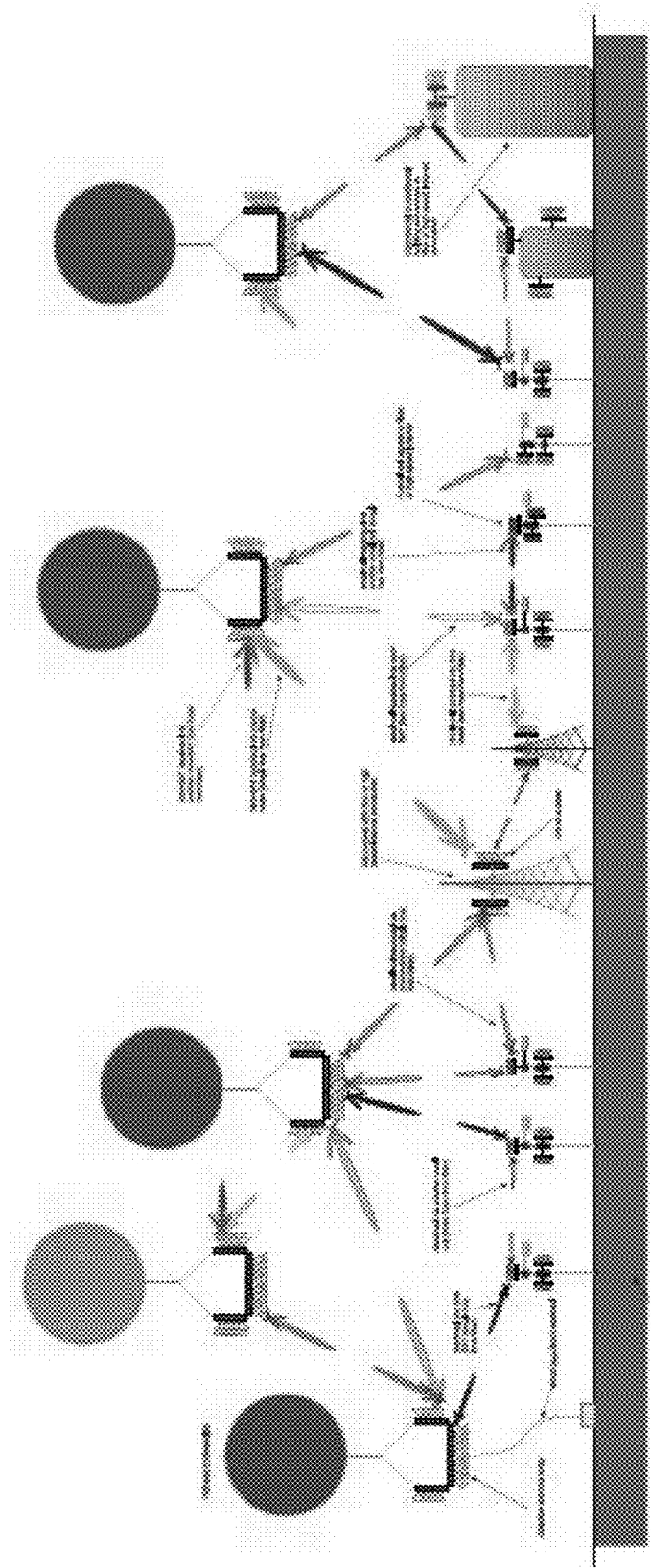
FIG. 37 illustrates backhaul options for pseudolites (i.e. small cells) (rotated view)
Figure 38:
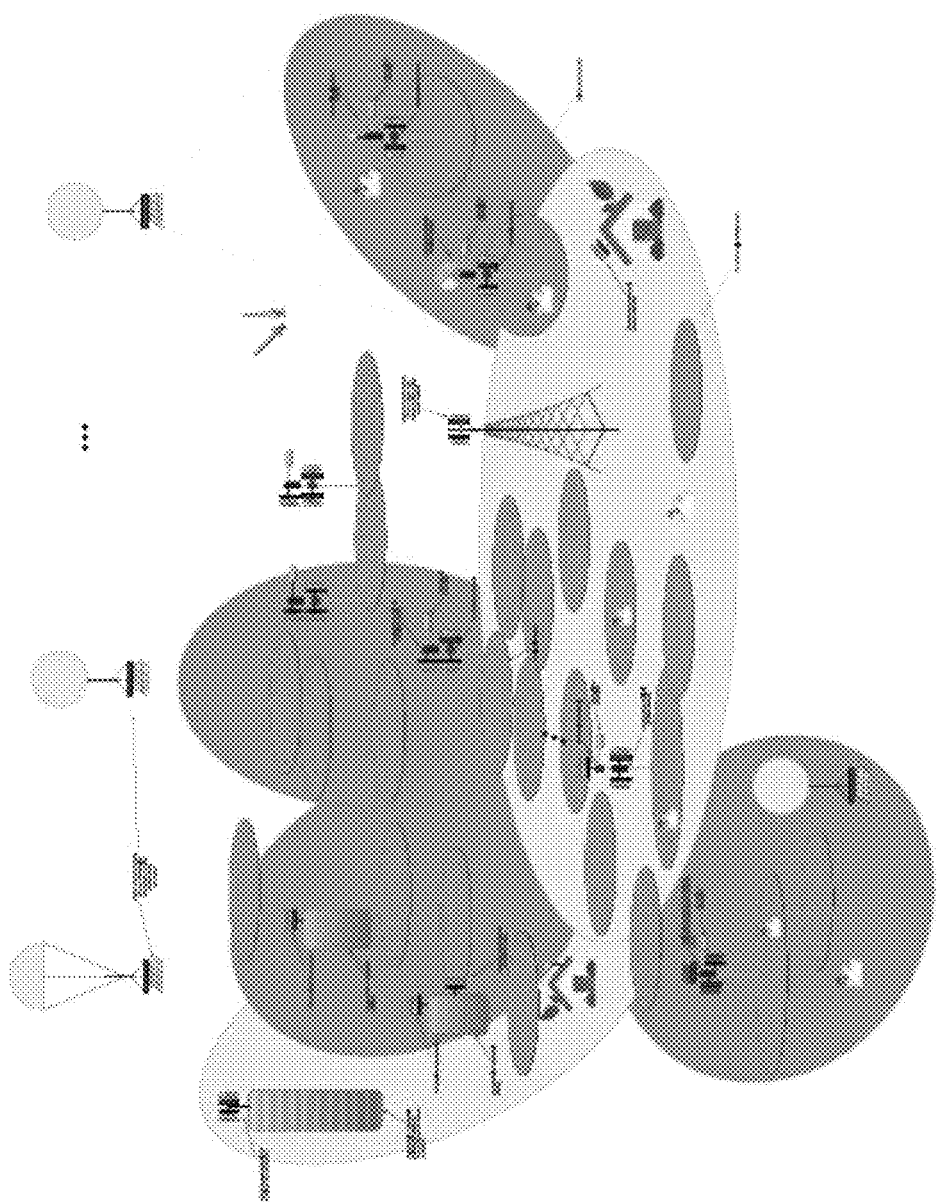
FIG. 38 illustrates a hybrid terrestrial/aerial network.

FIG. 36 shows different options for backhauling a pseudolite. A pseudo-lite can be backhauled directly over the wire (i.e. copper or fiber) and/or wirelessly via a macro/mega-cell (on a mini-SAT or tower or high rise building) or mini-cell (on a mini-SAT or mini-tower or building) or another small cell. Under rare circumstances, the small cell can also be backhauled via satellite (usually LEOs or MEOs). Like a mini-SAT a pseudolite can combine one or more of these backhaul modes in order increase capacity and/or reliability.

Aerial Node Architecture

The principles currently used for designing and packaging radio systems for terrestrial indoor and out-door installations cannot be applied to mini-satellites. The two main restrictions that are placed by mini-satellites are power ad weight limits, which go hand and hand. The key is that mini-satellites rely on portable power sources (e.g. solar cells) that are sometimes intermittent. Depending on the technology used for mini-satellites, the weight and power requirements maybe decoupled. For example, on one hand, balloons rely on buoyancy for floating, which may not require additional power, compared with drones, which need to be powered to stay up in the air. On the other hand, a large power source will also eat up some of the area and weight limit that the mini-SAT can support, leaving less room for the radio equipment. Even when a mini-satellite has access to a permanent power source, there is still a practical weight limit that cannot be exceeded. This section presents an architecture and set of techniques for optimizing the weight and power consumption of CNs and ENs on mini-satellites. Some of these techniques are only possible due to the superior properties of aerial links listed in Section 1, while others more are general.

The superior link-budget aerial links (i.e. LOS-like propagation and low PAPR) can be translated into aerial radio node power/energy consumption and weight/area reduction by leveraging the following:

Using highly efficient and low power (potentially low linearity) transceivers. Aerial links can tolerate lower linearity and power consumption than conventional links mainly due to the superior propagation and low PAPR, but also the low dynamic range requirements. Since most of the links are LOS or nLOS, and most are of comparable distance, most of the signals arrive at similar power levels. Furthermore, most of the co-channel or adjacent channel jamming signals are going to be too far to stretch the linearity of the receiver. Also, the transceivers do not necessarily have to handle the temperature ranges required of terrestrial nodes.

Using power efficient modulation schemes like single (or a few) carriers. Using multiple carriers might be required for data multiplexing and multiple access. Since the delay spreads for aerial links are much smaller than terrestrial links, low order linear equalizers are sufficient to remove the ISI.

Using digital pre-distortion (DPD) techniques if more linearity is required. DPD or DPD-like techniques can be used to improve linearity without sacrificing power efficiency. This technique is not special to aerial links. However, the computation of the DPD weights can be made a lot more efficient in aerial links due to slow changing conditions.

In addition, many general techniques and architectures that have been developed for low power transceivers can be leveraged in this context as well. For example, a high bandwidth application can use a set of parallel low power and low bandwidth data converters (ADCs and DACs) in place of a single high bandwidth (lower linearity) pair.

The slow channel variation property of aerial links as well as the low delay and angular spreads can be leveraged as follows:

Using low complexity STAP algorithms like Gradient descent (e.g. LMS) or take advantage of the fact that channel is almost LOS and use beam sweeping. The complexity and memory requirements for most of these algorithms is linear, and most can be implemented with simple vector operations.

Using lower order adaptive temporal filters. Since the delay spreads for aerial links are low, using few filter taps in time/frequency domains is sufficient to equalize the channel. Furthermore, using small temporal filters increases the available TBP. These filters don't need to be adapted very rapidly due to the slow changes in the channel. This can also have a dramatic impact on the power efficiency since the STAP computation can be spread over longer periods of time.

Another general technique both weight and power consumption of radio equipment is integration. While the antenna dimensions depend strictly on the desired gain and wavelength, a lot of the cost and power consumption can be saved integrating as much functionality into as few high efficiency SoCs as possible. The computation for adaptive array systems with digital beamforming requires large data transfers. The amount of data is proportional to the product of the number of antennas and the signal bandwidth. These data transfers usually consume the bulk of the digital power consumption. When functions are integrated on programmable ASIC or SoCs, the amount of data transfers from one chip to another across the PCB is minimized, resulting in power and cost savings. Furthermore, since most of the communications occur inside chips, circuit boards can be built with fewer layers, which can also result in weight and cost savings.

Several other optimization can be made at the system and network levels. For aerial to ground communication, since ground systems have better access to reliable power sources and less weight restrictions, the requirements on the aerial nodes can be loosened by placing more burden on the ground nodes. For example, increasing the antenna gains and Tx powers (and improving noise figure) on the ground nodes allows the system to meet link budget with looser requirements on the aerial node. The same goal can be accomplished by using more complex decoders on the ground node, and rely on less expensive techniques on the reverse link (e.g. simple error detection with ARQ and HARQ and network coding). Another technique for power savings is to restrict the aerial communication for backhaul and maybe fixed access, and minimize it for mobile access. Access applications, especially mobile, have stricter requirements on the power consumption and form factor, and thus place most of the burden on the base station. Also, the fact that channels are more dynamic that fixed links and the statistical nature of the traffic increases the complexity of the base station. Therefore, if further power and size optimizations are required for aerial nodes, it is best to restrict mobile traffic to small/macro cells and/or tethered mini-satellites or mini-satellites with looser power and size requirements, geometry and the environment. While the number of mutually orthogonal beam patterns is equal to the number of antennas, the maximum number of orthogonal polarizations cannot exceed two. Depending on the a and ARQ+Forward error correction and network coding.

The combination of low power consumption with superior heat dissipation at high altitudes can also result in minimizing or completely eliminating the heat sink, which results in significant weight reduction. In most cases, the heat sink makes up the bulk of the weight. Also, sharing as many components (e.g. antennas, PA, LNAs) as possible between different links also helps reduce the size. Finally, it is always recommended to use tethering whenever possible, as it provides a more reliable power source and eliminates the need for an independent portable power source on the mini-satellite.

An alternative to tethering, since it can be invasive sometimes, is to use multiple mini-SATs that take turns to serve the same location. This is especially helpful in the case where mini-SATs are used as pseudolites or small cells. For example, if drones are used to service an area, then these drones are replaced periodically. Each drone would serve for a period of time that depends on the available stored energy (i.e. battery life) and the power consumption levels. Before a drone is close to running out of energy, it descends to the ground or some charging station for recharging, but before it descends another drone takes over its duties to ensure smooth handoff. The number of drones required per site depends on the period a drone can stay in the air before requiring a recharge as well as the recharge time.

CN with Hybrid Access/Backhaul Support (Super CN)

The MP2MP network topology is arranged such that for a given channel resource (i.e. frequency channel and time slot), the network looks like a directed bipartite graph, where each physical node is either a transmitter or receiver, but not both. However, the same physical node can both transmit and receive using different channel resources (i.e. it can be a CN on one or more channel resources and an EN on others). Each network is also heterogeneous, which means that nodes differ in their capabilities and traffic demands. For example, nodes with few antennas (e.g. cell phones) degrade the performance of the entire network since they do not have enough degrees of freedom to cancel interference, which forces other nodes in the system to consume their DOFs to cancel the interference from weaker nodes. Similarly, access networks have lower capacity than backhaul networks due to the statistical nature of the traffic pattern. Thus, if a CN needs to support both access and backhaul on the same channel resource, then the access component will degrade the performance of the entire network (on that channel resource), including backhaul. The same argument applies to mobility as well since it limits time-bandwidth product.

Furthermore, the different types services have different power and processing and QoS requirements.

In order to support multiple heterogeneous services (networks), while maintaining optimal performance and maximum flexibility without compromising performance, the technique proposed in this disclosure is to partition/allocate separate resources for different types of services, so that the performance on a channel resource is optimized for the service it is allocated to serve. The key criteria for classifying traffic are the following:

The minimum number of DOFs, especially spatial DOFs, on both the CNs and the ENs.

Traffic statistics: for example, backhaul links are active at full capacity almost all the time, while access links are only active intermittently.

The maximum available TBP: this is related to both the number of DOFs as well as time (mobility) and frequency dispersion.

QoS requirements: this includes the latency and bandwidth guarantees.

Power and processing requirements: this is a function of all the above as well as the distance/path-loss model.

The resource allocation can be localized and dynamic, and can be controlled by an external server/controller on Internet. The rate at which resources need to be re-allocated can be very slow (i.e. on the order of minutes or hours or even days). Also, the different traffic classes may be different at different parts of the network. Therefore, optimal resource allocation needs to be performed locally (i.e. on per CN or group of neighboring CN basis). The resource allocation includes not only channel partitioning, but setting other parameters as well (e.g. maximum Tx power and maximum target SINR level for each channel resource).

In this disclosure, a CN that supports both access and backhaul traffic and can self-backhaul its own traffic back to the core network, all in one box, is referred to as a super CN. In other words, a super-CN can be viewed as a hybrid access/backhaul and a hybrid CN/EN box.

Same Channel Access/Backhaul

The objective of placing both access and backhaul (or multi-hops of backhaul) on the same channel is to maximize the reuse of antennas and RF components, thus, saving cost, space, and power. The challenge for combining or overlapping access and backhaul is minimizing loss in performance. This section presents several system architectures that achieve the dual access/backhaul on the same channel, and discusses the pros and cons of each.

A basic and simple, but not necessarily the most cost effective or power efficient, configuration for a multi-homed node includes a separate band and hardware for each home network. For example, the inter-face for Network A, which could represent the access network, would use channel $f_A$, and the interface Network B would use channel $f_B$. The term channel in this section refers to a frequency band, either single (e.g. TDD) or paired (e.g. FDD or dual-TDD) as described elsewhere in more detail. If $f_A$ and $f_B$ are two bands that are well separated, the hardware can be optimized independently for each network. In addition to channel separation, there is also a band-width/capacity constraint in choosing $f_A$ and $f_B$. If for example, Network B represents the backhaul, then the capacity over the interface to Network B must be greater than or equal to the capacity over the interface to Network A. This assumes that the majority of the traffic is intended for Internet. Intra-network traffic or peer-to-peer traffic does not require a backhaul. Since each network interface can support multiple simultaneous streams, the capacity over an interface is the sum of the capacities of the individual streams that can be supported by the interface. The streams can be separated in time/frequency/space or a combination or both.

The capacity calculations are discussed in detail elsewhere. For simplicity, it can be assumed that Interface A supports $M_A$ independent spatial streams at full bandwidth $W_A$ and an average b/s/Hz per stream of $c_A$, and Interface B supports $M_B$ independent spatial streams at full bandwidth $W_B$ and an average b/s/Hz per stream of $c_B$. Then these parameters must satisfy:

$$M_A W_A \bar{c}_A \leq M_B W_B \bar{c}_B \qquad (8)$$

Since networks typically branch out they get closer to the edge (i.e. end-user devices). $M_B$ is usually much smaller than $M_A$. Therefore, the backhaul part of the link must rely on a few fat pipes (i.e. spatial streams) as opposed to many small ones. In other words:

$$W_B \bar{c}_B >> W_A \bar{c}_A \qquad (9)$$

For example, the backhaul link (Network B) could be a wideband (several GHz in bandwidth) mm-Wave (e.g. 60 GHz or 80 GHz) link between a ground station and a mini-SAT. The mini-SAT could also be connecting to than one ground station or tower. The access link between the mini-SAT and pseudolites (i.e. backhaul for the pseudolites) could be a narrower band link (tens or hundreds of MHz) at lower frequency bands (e.g. 6 GHz or 10 GHz) that is spatial multiplexed. The access link can also be wide band (several GHz) at mm-Wave frequencies and statistically multiplexed in time and/or frequency.

In both cases, Networks A and B would use a low latency duplexing scheme. FDD offers the lowest latency, and in the case of aerial networks, decent channel reciprocity as well. Dual-TDD offers better channel reciprocity (same as TDD) and nearly that same latency as FDD. Both require two separate bands, one for the DL and another for the UL. Since both links are low latency and operate independently, the overall network latency will also be low. TDD is a single band approach that offers great channel reciprocity, but higher latency and overhead. Duplexing techniques are discussed below.

The advantage of this architecture is that the two networks can be designed and optimized independently (i.e. the choice of spectrum, antenna and array size and geometry, radio transceiver bandwidth and power and dynamic range). However, while this ensures maximum flexibility and performance, it is not optimized for cost (both hardware and spectrum) and power. First, there is little component sharing, which increases the effective size and power consumption of the array. Second, the architecture does not use spectrum efficiently as it requires four separate frequency bands (or two pairs).

The first step towards size reduction is antenna sharing. Although antennas can be made relatively wideband, sharing antennas places some restrictions on the distance between the bands used for access and backhaul. The bandwidth of the antenna is usually proportional to its size. If it becomes very big, it places restrictions on the array geometry that can result in sub-optimal beam patterns. Therefore, the antenna and array design is simplified considerably when the bands close to one another. This may require some additional filtering in order to ensure frequency isolation between bands. However, by intelligently choosing the bands and controlling the timing of transmit and receive in TDD and dual-TDD, the number of filters can be cut in half, and the remaining filters don't have to be very narrow band. Antenna sharing leads to a more compact form factor.

In some cases, even when antennas are not shared, the additional overhead in area may not be that significant. In practice, the spacing between antennas is usually larger (on the order of $3\lambda/4 \sim \lambda$) than the minimum spacing required by antenna theory (on the order of $\lambda/4$), which creates some gaps between the antennas in the array which can potentially be filled with antennas tuned to a different frequency. For example, if Network A uses 6 GHz and Network B uses 60 GHz, the 60 GHz antennas can be potentially placed in the gaps between the 6 GHz antennas.

The next step is sharing components of the radio transceiver chain and the baseband processor. The process of component sharing is greatly simplified by the band selection. There are several criteria for band selection that are illustrated with the following examples. The key thing to consider is the bandwidth restriction placed on the transceiver blocks, particularly data-converters. The target data can be met with a wideband channel (i.e. large W) or a narrow band channel with many spatial streams (i.e. large M but small W). The aggregate data rate, which is proportional to the product M W, remains almost the same in both cases. The main advantage of using a narrow band channel is of course spectral efficiency. The other advantage is that data converters run at a much lower rate, which means that the amount of data that needs to be processed is also small. The disadvantage is that the maximum rate of a single link is capped by the maximum rate of a single of a few streams. Since the angular spread is low for most aerial links, the only way to increase the number of spatial streams per link needs to take advantage of the antenna properties like polarization or OAM. In practice, the number of streams that be extracted from these properties is limited. Even for terrestrial links, in most practical outdoor deployments, the number of streams achieved from angular/spatial separation does not exceed 3 or 4. However, at very high frequencies (e.g. mm-Wave), where the wavelength is very small, the diversity rank can be much higher at both ends of the link, making possible to achieve a larger number of MIMO streams. However, at such frequencies, there is little or no spectrum scarcity. So the ability to squeeze a large number of spatial streams in a single link may not be such a big advantage.

Figure 39:
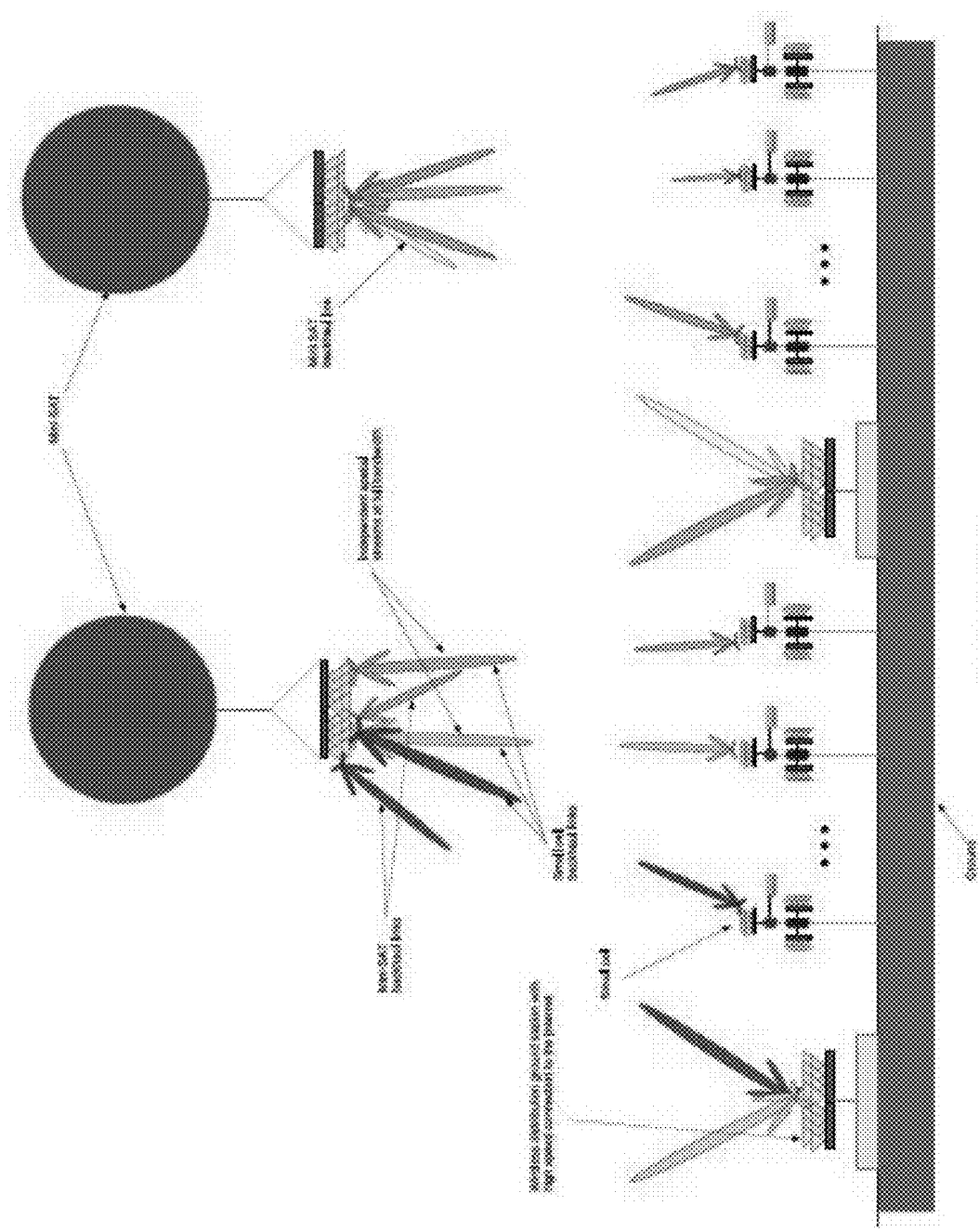
FIG. 39 illustrate the same channel spatially multiplexed backhaul connections for small cells and mini-SATs.

Consider the example illustrated in FIG. 39. The mini-SAT uses a single dual-TDD (or FDD) channel for both network interfaces (access and backhaul). Any duplexing scheme would suffice. However, in this scenario are dual-TDD or FDD is preferable due to the low latency requirements. In other words, $W_A = W_B$. The mini-SAT supports many simultaneous beams at full bandwidth in this channel. Some of the beams are used for access (i.e. connect to residential or commercial building or small cells), while others are used to backhaul the mini-SAT (i.e. connect to ground stations or towers). All beams have the same bandwidth whether their used for access or backhaul. This approach has several advantages. First, the access and backhaul completely share a single array, all the way from the antenna to the baseband. Second, the use of many spatial beams lowers the bandwidth requirements, which not only improves the spectral efficiency, but also the power requirement by reducing the required rate of data converters, and thus reducing the amount of data that needs to be processed. Therefore, from a size, cost, and power efficiency standpoint, this architecture is near optimal. The main drawback is that the backhaul capacity can only be increased by increasing the number of backhaul beams and/or the spectral efficiency of these beams. One of the advantages mini-SATs, discussed in Section 3.1.4, is that it provides cheaper options for backhaul compared to traditional terrestrial cells. In particular, the ability of the mini-SATs to connect to nodes deployed flat (face-up) on the ground and on rooftops. These ground stations can be deployed at high densities. To solve the backhaul bottleneck (i.e. to ensure that the mini-SAT has sufficient capacity on Interface B (e.g. its backhaul interface) to handle traffic from Interface A (e.g. small cell backhaul)), several scenarios need to be considered. In the first case, Interface A is used to backhaul nodes with deterministic capacity requirements (e.g. small cell backhaul, enterprise/MDU access). These nodes require dedicated beams. In this case, the spectral efficiencies of these beams is expected to be high since the links are static, with no statistical multiplexing overhead, and high gain beamforming antennas on both ends of the link. In these types of links, it is expected that $c_A \cong c_B$. The ground stations may have higher gain antennas and higher power/quality transceivers compared to small cells. The capacity gains are expected to be marginal since the capacity only grows logarithmically with the link SINR. For this scenario, the options are limited. The main option is to deploy ground stations at densities comparable to small cells (i.e. $M_B \cong M_A$). Each ground stations can form multiple beams towards several mini-SATs. This option may not be always economically feasible since is requires a large number of ground stations. The ground stations are required only for external traffic (e.g. traffic bound for the Internet or the cloud), which is the majority of the traffic. Traffic for one small cell intended for another small cell, for example, need not go through the backhaul connection of the mini-SAT. This is only true for small cells connected to the same mini-SAT, which makes the "local" traffic a small fraction of the total traffic. The scope of "local" traffic can be expanded by connecting mini-SATs to one another (in a PtP fashion) through an all aerial network (example shown in FIG. 40). In this case. "local" traffic constitutes traffic between any pair or group of small cells connected to the mini-SAT network. This alleviates the load on the mini-SAT backhaul connection.

Figure 40:
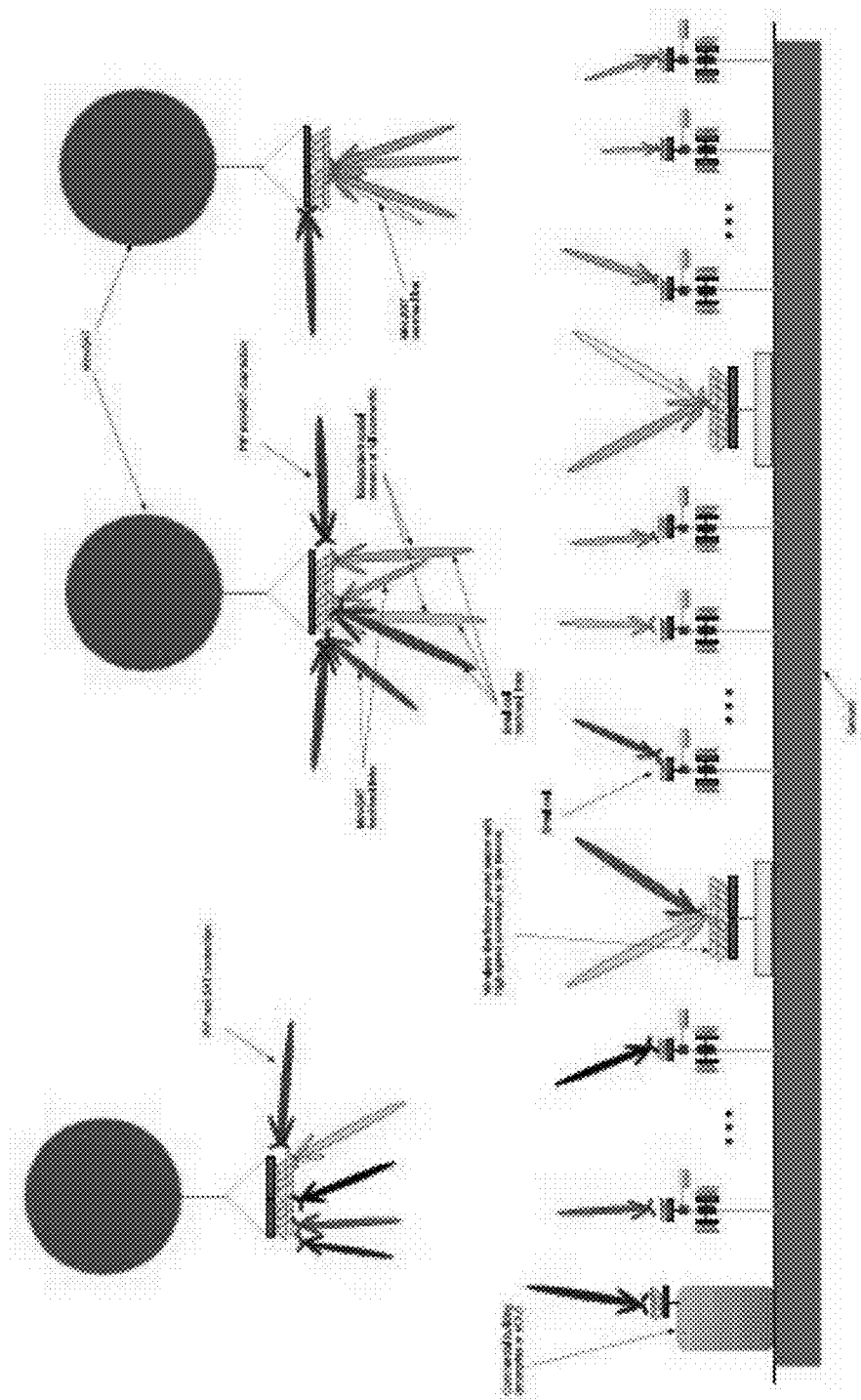
FIG. 40 illustrates a mini-SAT PtP network for reducing backhaul load.
Figure 41A:
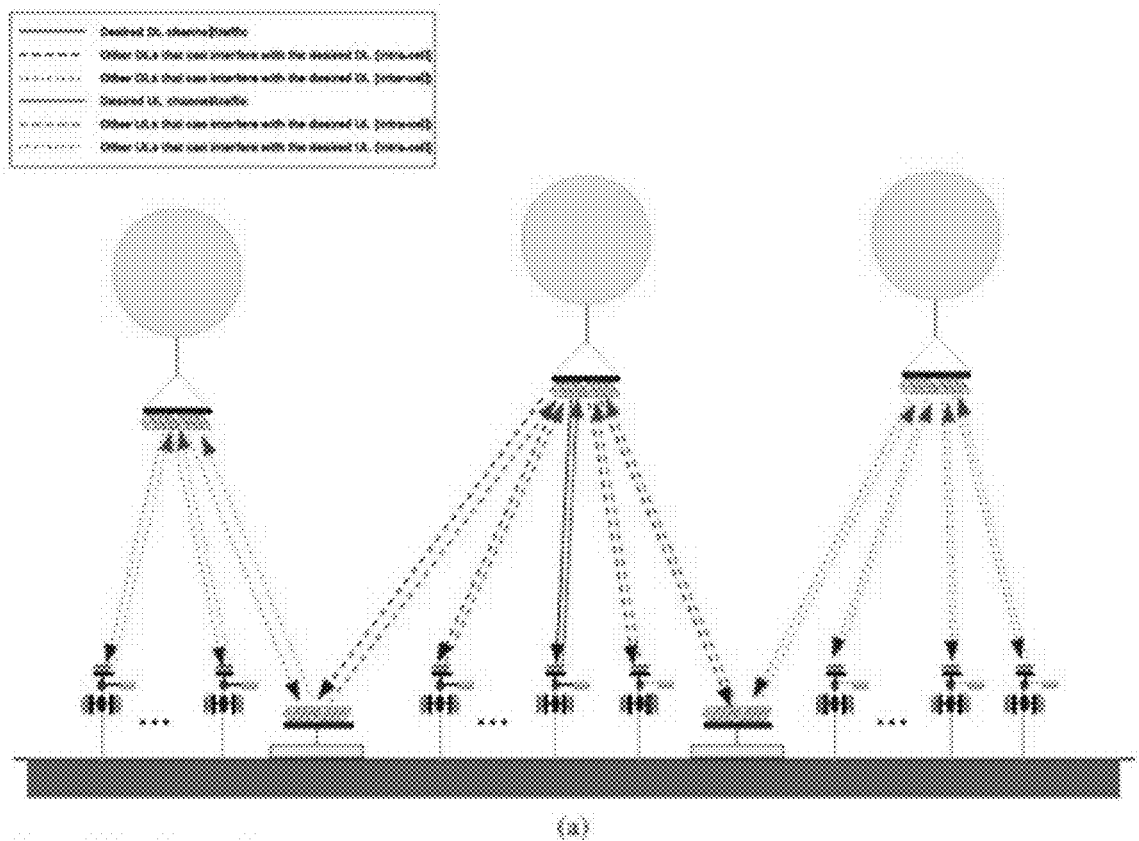
FIGS. 41A-41B illustrate mini-SAT to mini-SAT interference.
Figure 41B:
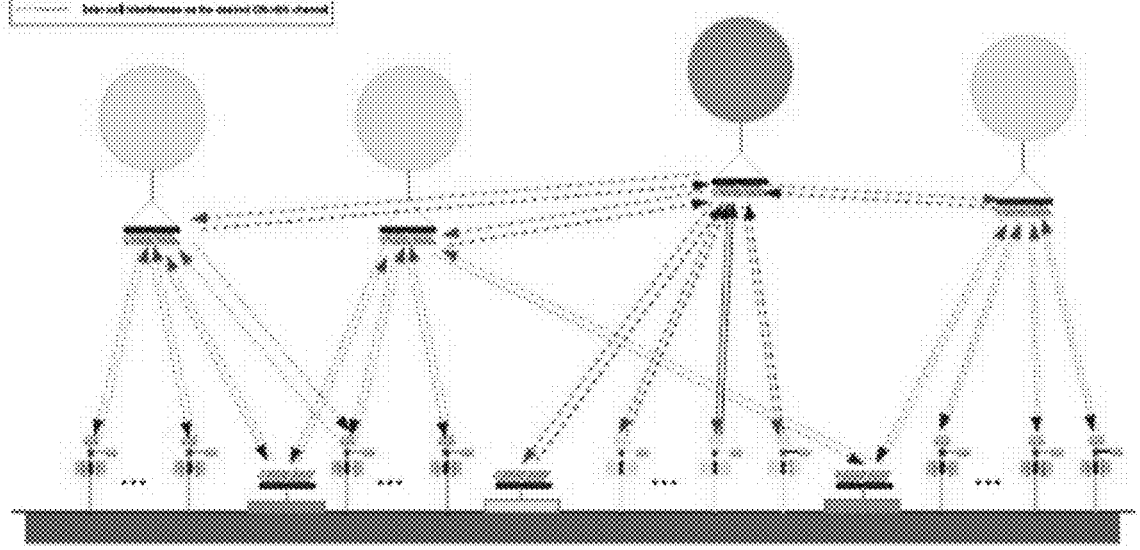

FIG. 40 illustrates an all-aerial PtP network of mini-SATs for handling intra-network traffic. There still is a major issue that needs to be resolved in order to enable a PtP network of mini-SATs in a single channel network. Using a conventional duplexing technique like TDD or FDD (or even dual-TDD), a network can be viewed as a bipartite graph, where each node can be assigned one of two colors, say yellow and green. This may not be necessary for ADD (full-duplexing) or asynchronous-TDD. Asynchronous-TDD is not an attractive option since it is not very spectrally efficient in highly contentious networks. Full-duplexing is discussed elsewhere. Nodes can only communicate directly with other nodes as long as they have a different color. Nodes with the same color require at least two hops to communicate with one another. Nodes with same color only communicate with another in an even number of hops, while nodes with different colors communicate using an odd number of hops. In the standard CN-EN star(s) configuration shown in FIG. 20, it is implicitly assumed that for a given channel resource, CNs are assigned the same color (yellow), while ENs are assigned the other color. Therefore, in order to enable direct mini-SAT to mini-SAT communication, some mini-SATs need to become ENs. This should not have much impact on the network structure since the star topology in FIG. 20 allows ENs to connect to multiple CNs (there is no limit on the number of CNs, to which an EN can connect to). However, this color re-assignment will have some impact on the interference patterns. In the standard CN-EN star(s) configuration, the EN receiver sees interference only from transmitters on CNs, while the CN receiver only sees interference from transmitters on ENs. If all mini-SATs are CNs (FIG. 41*a*), they only see interference from ground nodes (ground nodes only interference from mini-SATs). On the other hand, when some mini-SATs become ENs or colored green (FIG. 41*b*), the interference not only comes from ground nodes (the ones with different color), but also from mini-SATs with different color. Ground nodes will also potentially experience interference from other ground node with different color as well as mini-SATs with different color.

This interference problem (i.e. CN-CN and EN-EN interference) can be overwhelming in a terrestrial network. For example, if CNs are deployed on towers or high rise buildings, as they typically are, and ENs are deployed in street clutter, as they typically are, the channel response between CNs (especially those nearby) will follow the inverse square law while the channel response between CNs and ENs decreases as $1/r^4$. That means that interference from neighboring CNs with different color can easily overwhelm the EN signal. This is not the case in aerial networks for two reasons. First, both aerial-to-aerial links and aerial-to-ground links follow the inverse square law. Second, aerial-to-aerial beams and aerial-to-ground beams are almost 90° from one another, and thus should be easily separable spatially. Furthermore, mini-SATs are also located in directions that are natural nulls of other mini-SAT antennas. The same thing applies on the ground nodes as well (i.e. ground-ground interference gets automatically filtered by the beam pattern since the antennas are naturally facing upwards).

The mini-SAT network color partitioning need not be even (i.e. half the mini-SATs one color, and the other half one color). The number of mini-SATs that require a different color (i.e. green) is determined by the required inter-network communication capacity. In general, turning a small fraction of mini-SATs green in sufficient to enable an all aerial network (i.e. direct mini-SAT to mini-SAT communication). In theory, a single green aerial node is sufficient. However, for redundancy and performance and load-balancing purposes, multiple green aerial nodes be desirable. Also, due to the superior propagation characteristics for aerial links, the distribution of the green aerial nodes may not matter much. That means that yellow and green aerial nodes do not need to be neighboring one another. However, in order to conserve energy and reduce transmit power and interference, it may be desirable to have them near one another. This technique of reassigning colors to different nodes can also be useful in some terrestrial networks as well. Even though a CN may experience higher interference from other CNs than ENs, the interference from other CNs maybe easier to cancel because these links are either LOS and nLOS (both CNs are expected to be on high towers). So it may require less DOFs. It's important to note that the new coloring of the nodes places an additional restriction: for ground nodes that form multiple beams to connect to several mini-SATs for either performance enhancement or redundancy, these mini-SATs must be of the same color (the same restriction holds for mini-SATs as well).

Figure 44:
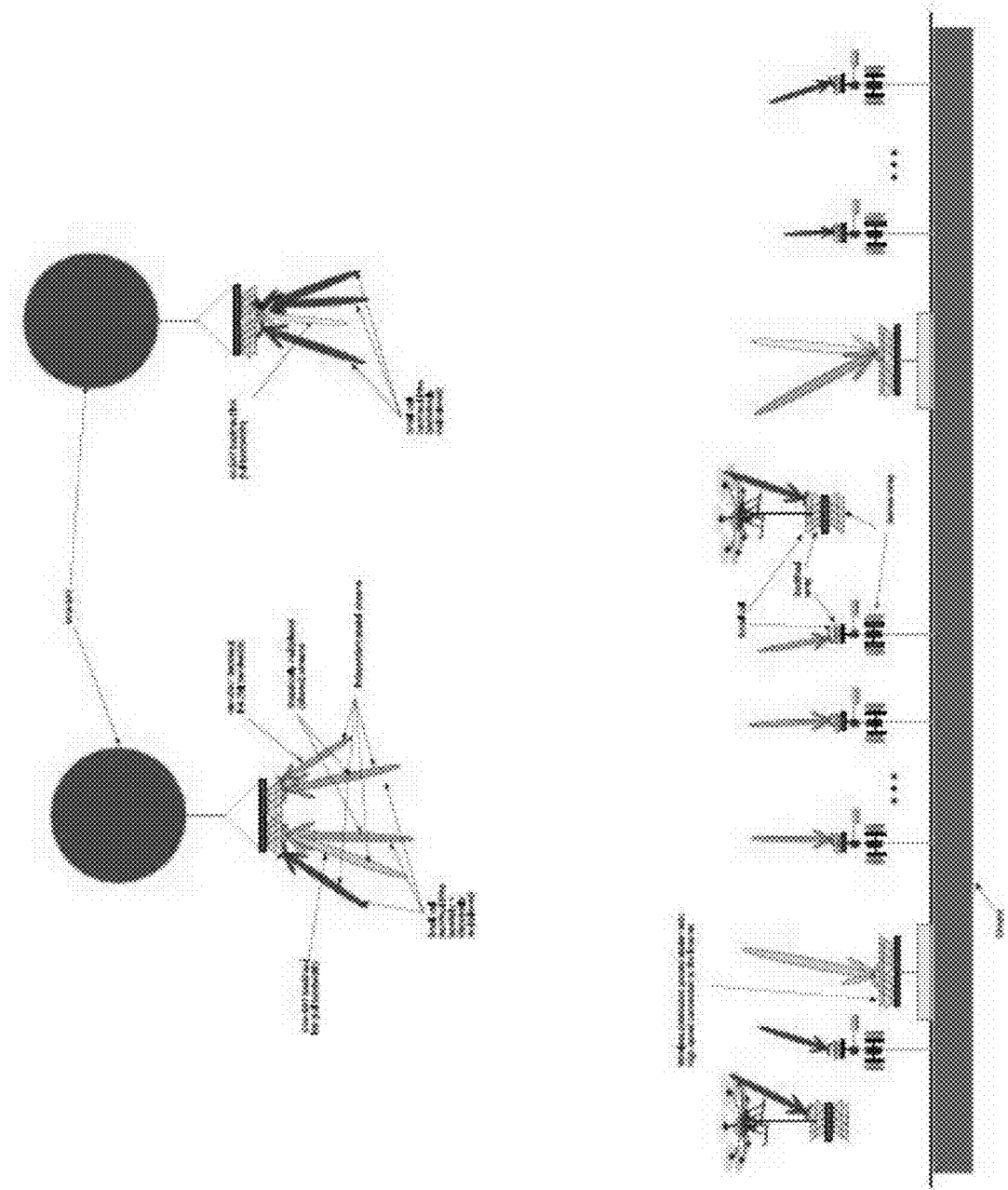
FIG. 44 illustrates the same channel spatially/statistically multiplexed backhaul connections for small cells and mini-SATs.

If the number of small cells per mini-SAT exceeds the number of independent beams each the mini-SAT is capable of supporting, then those beams must be statistically multiplexed in time/frequency. This can is probably more common when mini-SATs are used to directly serve fixed access (e.g. residential) and mobile access links. Statistical multiplexing increases the overhead on the access side, which results in reduction in spectral efficiency. The drop in spectral efficiency to support multiple access can be as high as a factor of 2, and sometimes even higher. In addition to scheduling overhead, if frequency multiplexing is used, the PAPR increases as well, potentially reducing the SINR. The overhead depends on the ratio of number of clients (e.g. small cells) MC to the maximum number of available full bandwidth beams MA. If Mc>>MA, which is usually the case for residential and mobile access, the overhead will be high because the number of connections is too large to maintain. Instead of maintaining a large number of connections, these connections are created and terminated on demand. On the other extreme (e.g. cases like small cell backhaul or enterprise access), the traffic patterns are fairly consistent over time, which makes the channel allocations fairly static, which results in minimal overhead increase. This will reduce the number of required backhaul beams accordingly, which means that the number of required ground stations is also less. This scenario is shown in FIG. 44.

Figure 42A:
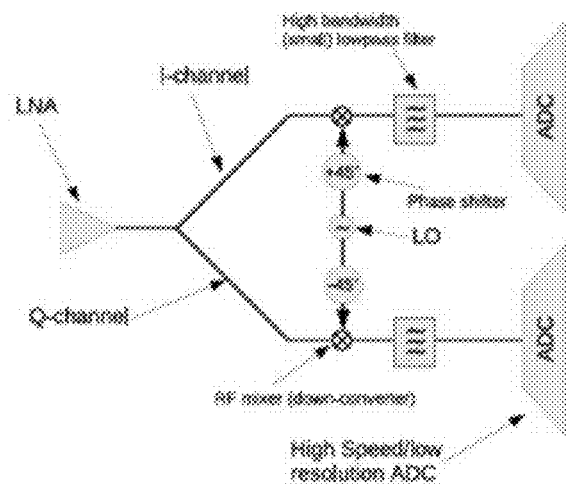
FIGS. 42A-42B illustrate a filter-bank architecture for wideband transceivers.
Figure 42B:
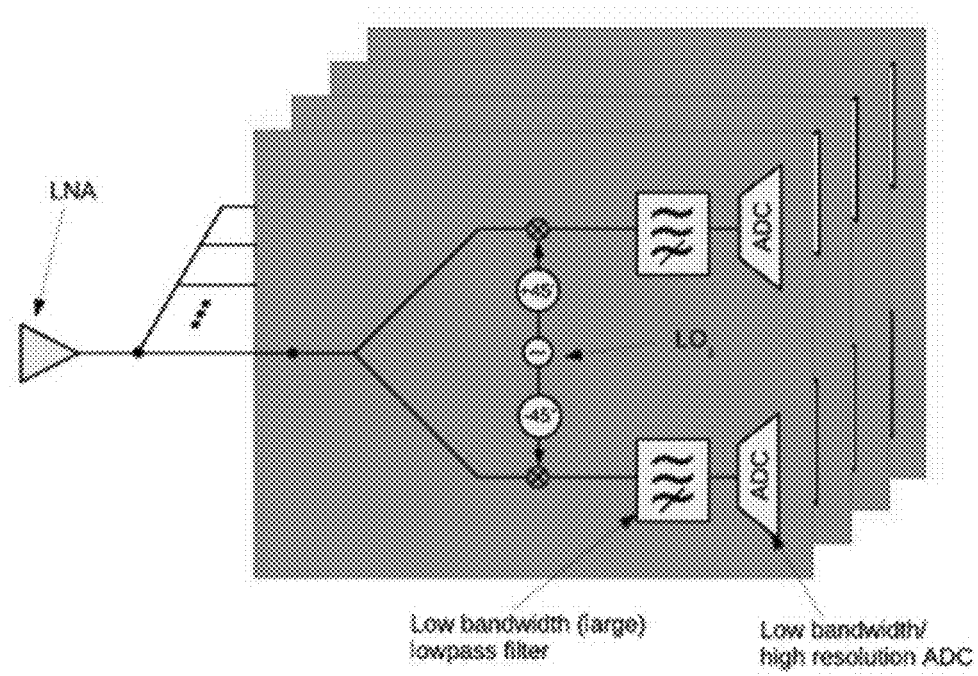
Figure 43A:
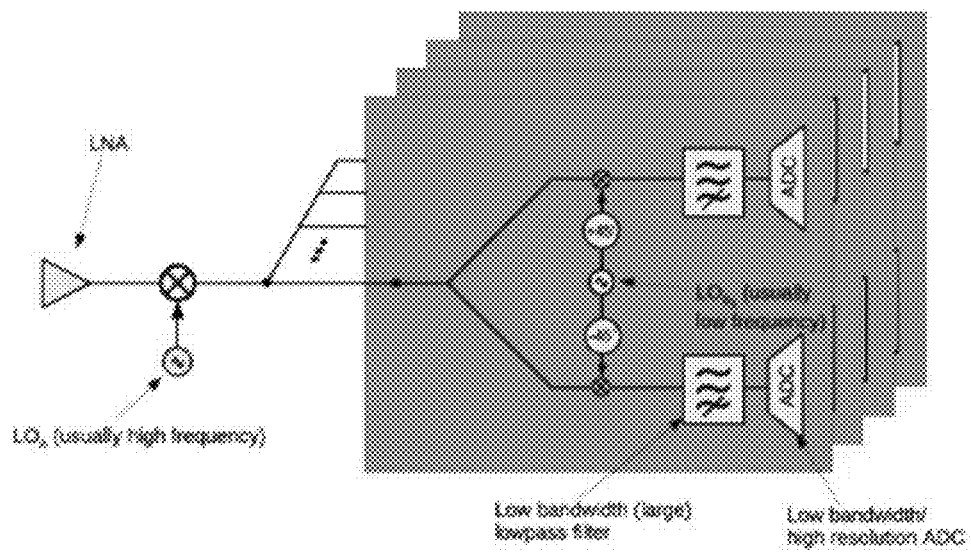
FIGS. 43A-43B illustrate other filter-bank architectures for wideband transceivers.
Figure 43B:
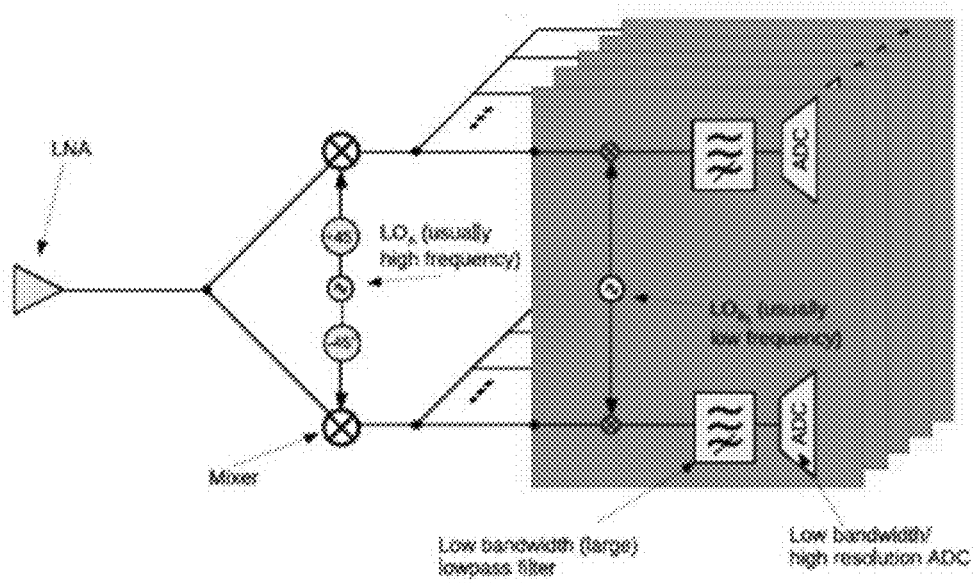

Reusing the same channel for access and backhaul also limits the overall aggregate capacity (for both access and backhaul) because a mini-SAT can only support a finite number of beams (limited by the number of antennas). Increasing the capacity of the mini-SAT can be achieved with one of two ways (or a combination of both): either by increasing the size of the array or using an adjacent channel for the backhaul (i.e. increasing the bandwidth). The total amount of data that needs to be transferred is proportional to the product of the number of antennas N and the aggregate bandwidth used Wt. The incremental amount of processing required is proportional to the product of the total number of streams M (includes both access and backhaul) and the number of antennas N and the signal (stream) bandwidth $W_S$. This assumes a linear adaptive algorithm like gradient descent (e.g. LMS) or a beam sweeping algorithm. Since the channel response is almost flat over frequency, and changes slowly with time, beamforming weight computation can be made negligible (even for an RLS or DMI based algorithm). However, applying the beamforming weights and processing the streams still requires O(M N Ws) operations. Using these metrics to evaluate both schemes, if the baseline number of antennas is N and the base line channel bandwidth is W, and assuming a factor of 2× increase in capacity is required, then for Scheme 1 (increasing the number of antennas/spatial DOFs), the number of antennas $N_1$=2N, and the aggregate bandwidth and the signal bandwidth are the same (i.e. $W_{t1}=W_{s1}$=W), and for Scheme 2 (increasing the bandwidth by using a separate channel for backhaul), the number of antennas $N_2$=N, the aggregate bandwidth $W_{t2}$=2W, and signal bandwidth stays the same $W_{s2}$=W (the total number of streams is the same for both schemes (i.e. $M_1=M_2$=M)). In both schemes, the amount of data required to be transferred and processed is ~2M N W, and the processing rate (computations per second) is ~2M N W. Scheme 2 has a factor advantage in beamforming weight computation over Scheme (~M N W versus~2M N W). However, the beamforming weight computation in a slow changing environment can be made negligible relative to actual data path processing. The key difference between the two schemes is that Scheme 2 results in more compact size and less power consumption (less transceivers), while Scheme 1 is more spectrally efficient (less channel bandwidth). In Scheme 2, the data converters (ADCs and DACs) need to run at higher bandwidths. If the bandwidth is too high such that the desired dynamic range cannot be met, then a single data converter per receiver (or transmitter) can be replaced by a group of smaller (i.e. lower bandwidth) converters with high resolution. This is especially the case for ADCs, where the resolution usually drops with bandwidth. In this case, the access and backhaul share all the components of the transceiver except for the data converters (and potentially up/down converters). This also has the advantage of allowing the access and backhaul channels to be non-contiguous. However, it may require more chip area as it contains more baseband filters. Different ways of implement a multi-channel receiver (same idea can be applied for the transmitter as well) using a bank of filters at baseband are shown in FIGS. 42 and 43.

The above network architecture (FIG. 39), which uses the same channel for both networks (e.g. access and backhaul) and relies on spatial multiplexing to achieve the desired capacity, assumes a reasonable fiber penetration, enough to allow a sufficient density of ground nodes to the support the desired backhaul capacity of the for the mini-SAT network. Without a high density deployment, the effective capacity of the system is limited by the number of ground nodes that can be deployed, the workaround for this problem is to use a small number of fat (i.e. wide frequency channel) pipes on the backhaul side to replace the need for a large number of narrow band pipes. This is enabled by the superior propagation characteristics associated with aerial communication (both aerial-to-aerial and aerial-to-ground), described in detail in Section 1.2, which make the channel friendlier to higher frequencies (i.e. 10 GHz or above) that have plenty of available bandwidth and less interference. Some frequencies in the mm-Wave range (e.g. 60 GHz) suffer from O2 or H2 O absorption in the atmosphere. For such frequencies, the channel loss increases exponentially with distance. Such links will have poor performance (at long distance) except possibly for aerial-to-aerial links that are above earth's atmosphere. A same-channel (dual access-backhaul) architecture based on wideband channels has the following features/components (the term wideband is relative, and refers to the ratio of the bandwidth used per connection on one interface (e.g. backhaul) to the bandwidth per connection on another interface (e.g. access). If this ratio (or the reciprocal of it) is much larger than 1, then the larger channel is referred to a wideband):

- The mini-SAT network utilizes a single wideband channel.
- The backhaul for each mini-SAT utilized the entire channel or a large chunk of it. The mini-SAT does not require many backhaul connections to the ground. One connection/beam per mini-SAT may be sufficient.
- The access connections (e.g. small cell backhaul) are narrow band average.
- The entire access channel the entire channel or a large chunk of it. The access and backhaul channel can fully or partially overlap (i.e. spatial multiplexing) or not overlap (i.e. frequency multiplexing).
- The access channel is primarily multiplexed in time/frequency, with some spatial multiplexing if necessary. Time/frequency multiplexing (either intra-cell or inter-cell) is preferable because it creates less intra-cell and inter-cell interference. Performance gains for spatial multiplexing have diminishing returns since backhaul becomes the bottleneck. That means that each connection (e.g. small cell) is allocated a narrow chunk of the channel (i.e. frequency multiplexing) or a time slice of a large chunk of the channel (i.e. time multiplexing) or a combination of both e.g. OFDMA). The allocation can be dynamic to accommodate traffic variations and bursts.
- This architecture has the highest speed requirements on data converters because of the high bandwidth nature of the channel. However, the amount processing required in the data path remains the same compared to the narrow channel case, since each stream has the same bandwidth on average, and the total capacity remains the same. In one case, many ground nodes are used, each using a narrow band channel, while in the other case few ground nodes are used, each using a wider channel. The overall capacity remains the same.

The wideband mini-SAT network is shown in FIG. 45. It's important to note that the network architectures described in this section can co-exist and run in parallel. For example, nodes/networks using a single narrow band channel for both access and backhaul can co-exist and even communicate nodes/networks that use wideband channels or different channels for the access and backhaul interfaces. A single node can support both wide and narrow band architectures or multiple instances of each. A single node can also support one, two, or more network interfaces on the same band/channel or different bands.

Dual Access/Backhaul Summary and Notes

Mini-SATs can support multiple frequency bands using wideband or multi-band or multiple single band AASs.

This Section proposes different modes/architectures for making best use of spectrum resources available to a mini-SAT (i.e. by reusing the same resources across multiple networks like access and backhaul).

Aerial networks that require a few narrow band channels are well-positioned to take advantage of some AWS, WCS, L-band and unlicensed frequency bands. Some AWS/WCS bands have very strict spectral mask rules to avoid power leakage (due to non-linearity) into adjacent channels. In terrestrial networks, this means that transmitters must have narrow band filters with sharp cutoff. This type of filters tend to be both expensive and bulky, which does not make it a good fit for AASs that require a large number of transmitters. The other options to meet the spectral mask restrictions is to either reduce the Tx power and/or apply aggressive pre-distortion algorithms, both of which negatively affect performance or cost. The lower Tx power may be acceptable in very dense networks, where the node coverage is expected to be small. Similarly, some L-band spectrum is of little use in terrestrial networks as it can easily leak into GPS spectrum and jam GPS devices. Even if there is no spectrum leakage into GPS bands, GPS devices are not equipped to handle strong or even modest signals in neighboring bands due to weak filtering and non-linearity of these devices that is a direct result of their low cost. These rules, however, have little impact on aerial networks since nodes are either up in the sky or pointing towards the sky. Therefore, the probability of jamming a terrestrial or leaking into the band of another terrestrial or aerial receiver is low. This also makes it possible to use bands that are designated for FDD in TDD, dual-TDD, and ADD modes without jamming or getting jammed by terrestrial networks. Similarly, because the antennas are aligned vertically at both ends, aerial networks are less sensitive to interference from terrestrial networks in unlicensed or lightly licensed bands like 2.4 GHz, 3.6 GHz, 5 GHz, and 24 GHz (ISM+U-NII bands), which makes those bands good candidates for aerial communication. Unlicensed spectrum at 900 MHz can also be used as well. However, lower frequency bands are better suited for coverage than high capacity networks due to superior propagation characteristics coupled with spectrum scarcity at those bands.

Aerial networks that require wideband channels can either use high frequencies (e.g. 10 GHz, 24 GHz, mm-Wave) or take advantage of unlicensed bands at lower frequencies like 5 GHz (ISM+U-NII). There are hundreds of MHz of available unlicensed spectrum at 5 GHz. Due to the superior propagation characteristics, aerial links can easily achieve good performance and decent link budgets while meeting the transmit power restrictions set for those bands.

In both wideband and narrow band networks, spectrum that is dedicated to microwave P2P links can be utilized without disrupting existing microwave links. These bands are licensed and have very strict (narrow) beam requirements in order to avoid/minimize interference across links. Aerial networks can avoid interference without necessarily having to meet those requirements. For aerial networks, the interference can be better controlled when the communication is between a mini-SAT and another small cell or macro-cell on the ground or in the air, rather than communicating directly with mobile clients since the antennas can be better aligned vertically at both ends of the link.

Most of the techniques described in this section work best when the DL and UL are symmetric (i.e. DL:UL is 1:1).

The mini-SAT to mini-SAT network described in this section can also be used to backhaul mini-SATs that lack access to a terrestrial backhaul or as redundant link for extra capacity and/or reliability.

The ground stations used to backhaul mini-SATs have less restriction on size and cost than small cells. The rank of channel matrix representing a link between a ground station and a mini-SAT is limited because the channel is almost LOS. The only conventional way to increase the rank of the channel is by adding more polarizations. However, since the polarization space has only two dimensions, the maximum number of orthogonal polarizations is two, which makes the capacity of a link between a ground station and a mini-SAT limited by channel bandwidth. OAM, on the other hand, can have an infinite number of modes in theory, but higher order modes are harder to achieve in practice as they require more area and volume. The size flexibility at the ground station can enable more creative 2-dimensional and 3-dimensional antenna structures and array geometries that can potentially exploit higher OAM modes and other antenna properties to increase the number of DOFs per link.

Given the more relaxed size requirements, the ground stations can use full-duplexing as described in Section 3.8.3 in order to roughly double the throughput of each mini-SAT backhaul link, and thus, cutting down the number of required ground station in half.

Providing fiber (high speed Internet access) to mini-SATs is not the only function of ground stations.

Ground stations can also be deployed without access to fiber. The purpose of such deployment could be to act as a relay between different mini-SATs. Such deployment can further simplify the mini-SAT design by eliminating the need for mini-SATs to communicate directly with one another.

The transceiver architecture is critical as well, especially for wideband communication. Power efficiency improves when multiple bands share as many RF components as possible. Breaking a single wideband channel into a group of smaller narrow band channels using a bank of filter and ADCs/DACs improves the dynamic range. It also enables the array operate on non-contiguous bands/channels more efficiently.

Several or the architectures and techniques described in this section apply to terrestrial networks as well. Techniques discussed in this section and other sections in this disclosure pertaining to aerial communications include satellite networks as well (especially LEOs). For example, the yellow/green coloring of CNs and ENs can potentially improve interference cancellation and reduce interference levels. If a CN color is changed (e.g. from yellow to green), then all of the ENs connected to this CN must switch color as well (i.e. become yellow). This means that neighboring CNs that are yellow will start experiencing interference from the green CN instead of the ENs (now yellow) that connect to it. In cases where CNs are mounted in high locations like towers or tall buildings, which is usually the case, the channel between CNs is mostly LOS or nLOS. So while the interference from ENs can come from all the directions, the interference from a CN (includes all streams) come from approximate one direction. So although the interference from the green CN is going to be much stronger than its yellow ENs, it only takes a few DOFs to suppress that interference. Another advantage of this scheme is that nodes do not necessarily have to sacrifice DOFs in the azimuth (horizontal) dimension when canceling interference from nodes of the same type. Since the ENs are at different elevations from the CNs, the antennas in vertical dimension of the array can be used for this purpose. Sometimes a static down/up-tilt can help as well. The performance won't be as good as the case with aerial links since terrestrial CNs (ENs) don't necessarily have natural nulls towards one another.

Satellite Networks with STAP

Satellite technology used for data networks (LEOs in particular) use phased array antennas in order to create spot beams. Spot beams enable better frequency reuse that can dramatically increase the capacity of a satellite network. However, because the beams are static, it limits the reuse factor. The spot beams must overlap in order provide a continuous coverage area. The beams that overlap must use different channel resources in order to avoid interference. The channel resources can be divided using TDMA, FDMA, OFDMA, or CDMA. However, for satellite networks CDMA and FDMA are more common. This reduces the reuse factor by at least a factor of three. Since the non-overlap area of the beams is comparable in size (if not larger) to the overlap area, the spectrum remains under-utilized by at least a factor of 2. Examples of spot beam frequency reuse are shown in FIGS. 46A, 46B and 47.

Figure 46A:
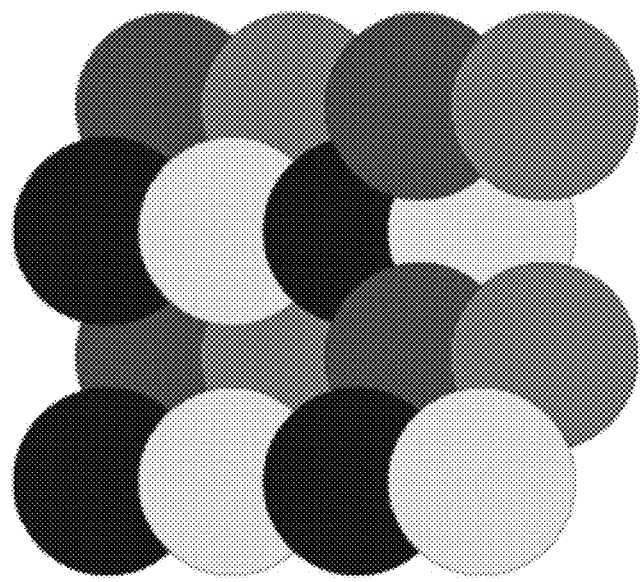
FIGS. 46A-46B illustrate spot beam frequency reuse.
Figure 46B:
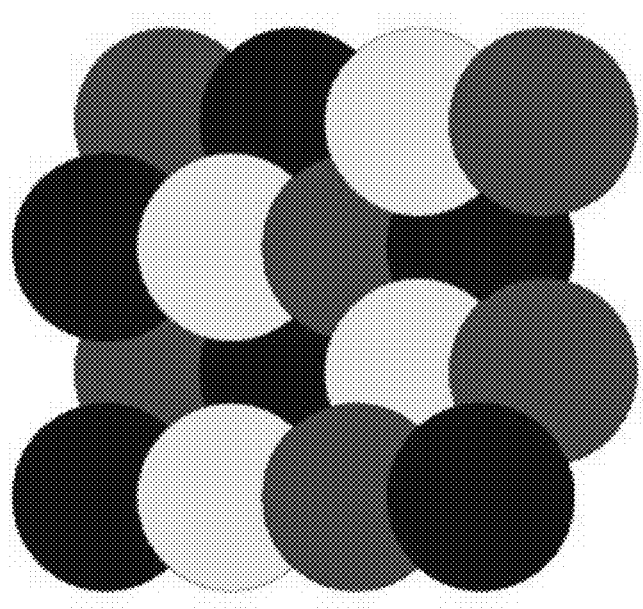
Figure 47:
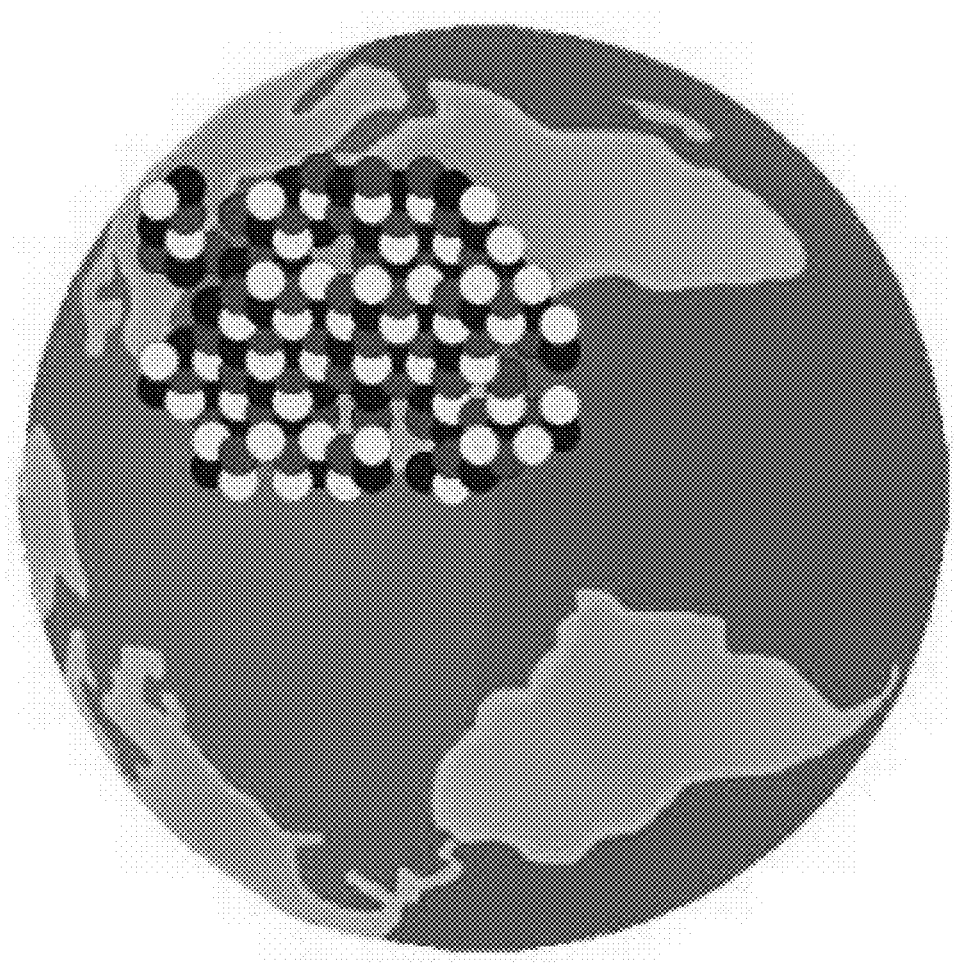
FIG. 47 illustrates satellite spot beam coverage.
Figure 48:
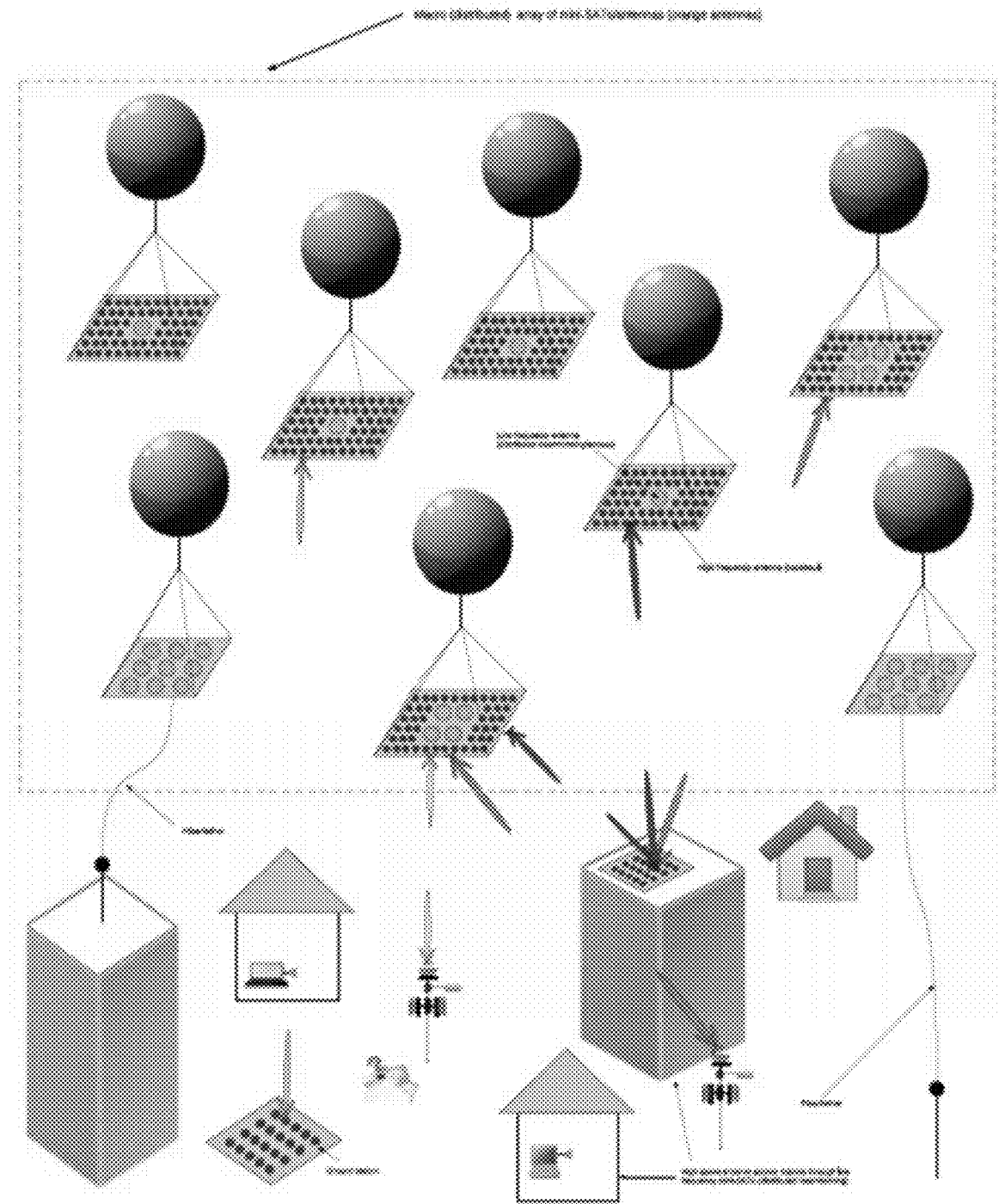
FIG. 48 illustrates distributed beamforming architecture with mini-SATs.

FIG. 46A shows a spot beam with a reuse factor k=¼ (i.e. using four non-overlapping frequency channels each denoted with a different color) and FIG. 46B show a more efficient frequency reuse scheme that requires only three non-overlapping channels (i.e. k=⅓). In both figures, it is clear that no two circles with the same color overlap.

The spatial reuse factor can be improved by employing STFAP in the satellite antenna array. The frequency dispersion is expected to negligible in these networks since the links are aerial. The adaptive processing allows the satellite to dynamically assign channel resources such that end nodes that can be spatially separated are assigned the same or overlapping channel resources while those that cannot be separated spatially are assigned orthogonal or semi-orthogonal channel resources. If the ENs themselves are equipped with multiple antennas, then they can potentially use STAP to connect to some spatially multiplex their connections to satellites provided that more than one satellite exists within their field of view (i.e. by either connecting to the multiple satellites simultaneously or beaming towards some while nulling out others).

STAP also simplifies satellite to satellite and satellite to ground station communication. The key feature at play here is automatic beam pointing, which eliminates the need for precise alignment and/or mechanical beam steering. This improves efficiency connection-handoff from one satellite to another. The handoff process can also be further improved by incorporating STAP in the ENs and ground stations.

In addition to the ground stations, incorporating STAP into ENs and client devices increases the efficiency of satellite networks used for fixed/mobile access as well as mobile backhaul. A STAP capable EN or client device can connect to multiple satellite simultaneously to increase its capacity/reliability.

Distributed Beamforming for Aerial Networks

Bandwidth is generally more abundant at higher frequencies. This abundance comes with a price. Propagation characteristics also generally degrade at higher frequencies. Propagation characteristics include LOS propagation, the ability to penetrate objects (e.g. walls), and the ability to reflect and diffract off of surfaces. This would present a challenge to aerial networks that are intended to provide connectivity directly to end-user devices that usually operate indoors. Using lower frequencies, while solving the propagation problem, comes with a different set of challenges. In addition to spectrum scarcity, spatial reuse and multiplexing won't be as efficient because of the superior propagation characteristics and large wavelength. The wavelength dictates the minimum spacing between antennas. 124At 600 MHz for example, the minimal practical spacing between antennas is $\lambda/2=0.25$ m. At this frequency, 16 antenna ° elements arranged in a single dimension would take up to 4 m, resulting in a beamwidth of approximately 10-20

At a height of 5 km, the radius of the spot beam is about 1 km, which is pretty large for an antenna with this size, in that dimension. Therefore, each mini-SAT will have a wide beam and a large coverage area, which only allows sparse deployments.

This problem can be overcome with distributed beamforming. Distributed beamforming, means that a collection of nodes act together as one larger array whose DOFs are jointly processed. Distributed beam-forming allows aerial nodes (mini-SATs) to be deployed at arbitrary densities (provided they are at least half a wavelength apart) while removing some of the constraints on the size of individual antennas/arrays. It also allows the network to leverage very low frequencies, that were previously used for applications like radio/television broadcast due to their poor spectral efficiency. Distributed beamforming, however, has its own set of challenges. One of these challenges is the backhaul. With distributed beamforming, the data that needs to be backhauled are the outputs/inputs of ADCs/DACs, which is usually one or two orders of magnitude more than the actual (effective) data being transferred. For example, if the UL channel band-width is 20 MHz. and the ADC produces 12 bits per sample for each I and Q channels, then the minimum backhaul requirement per antenna for the UL is 480 Mbps, and similarly for the DL. In general, the capacity requirements per UL (or DL) per antenna is twice the product of the sampling rate (in samples/sec) of the ADC (or DAC) and its resolution (in bits). The backhaul also has tight latency requirements and must have very low jitter. These requirements are very difficult to satisfy outside of fiber or high bandwidth wireless (e.g. mm-Wave). Since most of the links to mini-SATs are going to be LOS or nLOS, in most cases only 2 spatial streams are available per link. Therefore, bandwidth is extremely important to achieve the desired capacity of the backhaul links. For example, in the 20 MHz UL example above, a 60 MHz backhaul requires at 8 bits/sec/Hz or spectral efficiency for per antenna. Furthermore, the DL backhaul requires a frequency channel that is separate from the UL backhaul. Also, since antenna are spaced far apart in a distributed array, the array pattern is expected to change very rapidly with frequency. This rules out FDD for this application.

Distributed Beamforming for Aerial Networks

Bandwidth is generally more abundant at higher frequencies. This abundance comes at a price. Propagation characteristics also generally degrade at higher frequencies. Further, the propagation characteristics include LOS propagation, the ability to penetrate objects (e.g. walls), and the ability to reflect and diffract off of surfaces. This would present a challenge to aerial networks that are intended to provide connectivity directly to end-user devices that usually operate indoors. 1528 Using lower frequencies, while solving the propagation problem, comes with a different set of challenges. In addition to spectrum scarcity, spatial reuse and multiplexing won't be as efficient because of the superior propagation characteristics and large wavelength. The wavelength dictates the minimum spacing between antennas. At 600 MHz for example, the minimal practical spacing between antennas is $\lambda/2=0.25$ m. At this frequency, 16 antenna elements arranged in a single dimension would take up to 4 m, resulting in a beamwidth of approximately 10-20° in that dimension. At a height of 5 km, the radius of the spot beam is about 1 km, which is pretty large for an antenna with this size. Therefore, each mini-SAT will have a wide beam and a large coverage area, which only allows sparse deployments.

This problem can be overcome with distributed beamforming. Distributed beamforming, means that a collection of nodes act together as one larger array whose DOFs are jointly processed. Distributed beamforming allows aerial nodes (mini-SATs) to be deployed at arbitrary densities (provided they are at least half a wavelength apart) while removing some of the constraints on the size of individual antennas/arrays. It also allows the network to leverage very low frequencies, that were previously used for applications like radio/television broadcast due to their poor spectral efficiency.

Distributed beamforming, however, has its own set of challenges. One of these challenges is the backhaul. With distributed beamforming, the data that needs to be backhauled are the outputs/inputs of ADCs/DACs, which are usually one or two orders of magnitude more than the actual (effective) data being transferred. For example, if the UL channel bandwidth is 20 MHz, and the ADC produces 12 bits per sample for each I and Q channels, then the minimum backhaul requirement per antenna for the UL is 480 Mbps, and similarly for the DL. In general, the capacity requirements per UL (or DL) per antenna is twice the product of the sampling rate (in samples/sec) of the ADC (or DAC) and its resolution (in bits). The backhaul also has tight latency requirements and must have very low jitter. These requirements are very difficult to satisfy outside of fiber or high bandwidth wireless (e.g. mm-Wave) or free-space optics. Since most of the links to mini-SATs are going to be LOS or nLOS, in most cases only 2 spatial streams are available per link. Therefore, bandwidth is extremely important to achieve the desired capacity of the backhaul links. For example, in the 20 MHz UL example above, a 60 MHz backhaul requires at 8 bits/sec/Hz or spectral efficiency for per antenna! Furthermore, the DL backhaul requires a frequency channel that is separate from the UL backhaul. Also, since antennas are spaced far apart in a distributed array, the array pattern is expected to change very rapidly with frequency. This rules out FDD for this application.

These challenges make it difficult to incorporate distributed beamforming techniques into terrestrial wireless networks. On the other hand, using distributed beamforming in aerial networks can alleviate some of those challenges. First, most of the aerial to ground communication is LOS or nLOS, which simplifies the STAP processing (lower complexity and lower TBP requirements). Second, aerial to ground communication using mini-SATs has much lower channel variations and Doppler rates. The channel variation is even less if mini-SATs communicate with fixed terminals rather than mobile user devices. However, even when communicating with mobile devices, the channel varies at a much lower rate compared to terrestrial links.

The lower channel variation rate alleviates the requirements on the beamforming-weight computation latency, and thus enables the use of longer frames. Third, since the position of mini-SATs changes slowly, the ground stations can effectively track their GPS locations. A low frequencies, changes or errors in those GPS locations over short periods can be insignificant if the wavelength is large enough. Thus, ground stations can use those locations, along with locations of the terrestrial nodes, for weight computation. Ground stations can be connected to each other via fiber or standard mini-SATs. Finally, in addition to TDD, and dual-TDD frame configurations, FDD can also be used since the channels are LOS or nLOS.

When mini-SATs are used collectively as one mega-array, the antennas that make up that array are distributed among different mini-SATs (each mini-SAT can have more than one antenna). Distributed beamforming mini-SAT networks operating at low frequencies (e.g. 50 MHz-1000 MHz) can be used to complement standard-beamforming mini-SAT networks operating at higher frequencies (e.g. 5 GHz, 20 GHz, 80 GHz).

Other Applications

Integrating mini-SATs and/or STAP beamforming technology into wireless network infrastructure opens up opportunities for many new applications. This section presents some examples of applications that are enabled by or benefit from the SFTAP system/network architecture described in this disclosure.

High Mobility Networks

Objects moving at high velocities present a challenge to wireless networks, especially if these moving objects host wireless nodes. Even though the fastest moving objects around today are usually aerial (e.g. planes/satellites), terrestrial moving objects present a bigger challenge and are the focus of this section. High speed aerial objects are discussed below. With aerial objects, the channel is mostly LOS. Therefore, the impact of the movement of these objects is merely a Doppler shift and potential change in the DOA. The Doppler shift, while may affect the SFTAP processing, should not have any impact on the optimum SFTAP weights, and can be compensated for. The optimum beamforming weights in a channel with a strong LOS component is a function of the DOA (AOA) only. The Doppler shift only results in shifting the spectrum slightly to the left or to the right. This shift in frequency is independent of the DOA/AOA. However, this shift in frequency is a non-linear change in the channel and can corrupt the data or reference symbols, and thus, must be compensated for prior to any SFTAP processing. Also, at long distances. DOAs should not change rapidly even when nodes are moving at high velocities. The challenge in terrestrial wireless networks is that high speed changes in the physical environment are usually coupled with multipath and frequency selectivity. This not only increases TBP requirements, but also limits the maximum available TBP since nodes much adapt their beamforming weights at much higher rates. The net impact may not only be additional overhead, but also a reduction in the effective number of DOFs in order to meet TBP constraints, which leads to further capacity reduction. Therefore, nodes with high mobility reduce overall network performance for every other node in the network. In fact, all it takes is a few nodes with high mobility for the entire network to feel the effect. More importantly, Doppler rates increase with frequency. This means that the problem becomes worse at higher frequency bands, which usually have more available bandwidths. The mobility issue is also further amplified in dense networks since the average rate of handoffs required by mobile nodes increases when base stations (access points) are close to one another. This leads to additional overhead. Therefore, mobility can severely limit the effectiveness of key techniques for scaling network capacity: spatial reuse (i.e. increasing network density), spatial multiplexing/SFTAP, and wideband communication (i.e. high frequencies).

Mobility is mainly a result of wireless users using the network while riding high speed vehicles like cars, buses, or high speed trains. Moving objects like cars and trucks can also act as moving reflectors for some wireless links, introducing time variations even when the both ends of the link are static. Like moving cars and trucks, trees can also induce Doppler effects on links with static or slowly moving end nodes, especially during storms and high speed winds. Even though mobility presents a challenge to wireless networks, mobile traffic actually represents a small fraction of the entire traffic. Most of the network usage usually occurs indoor (or outdoors with low mobility). Therefore, it make more sense to have separate networks, tailored specifically for handling mobile traffic, rather than let a small number of users drag down the entire network for the majority. The key thing to note is that any solution for addressing mobility does not require high capacity.

Figure 49:
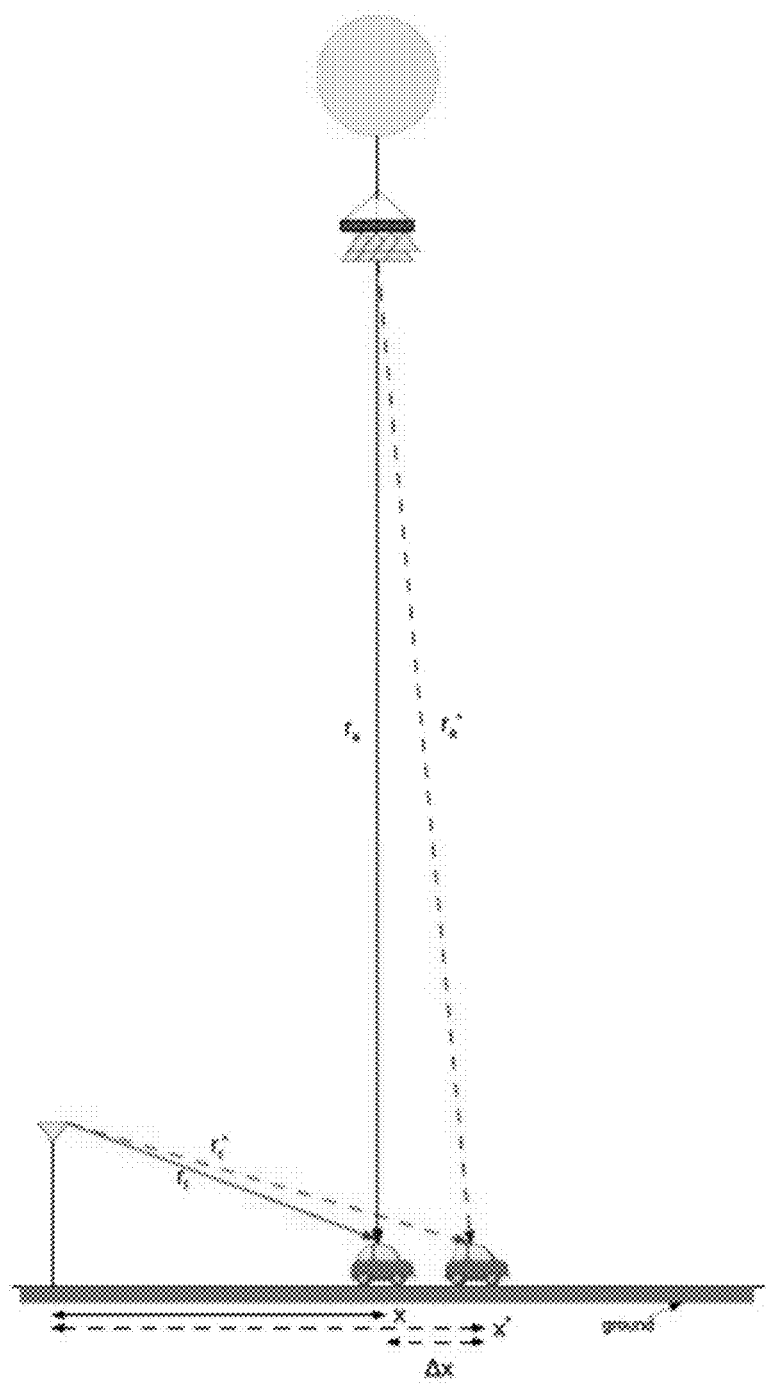
FIG. 49 illustrates mobility in terrestrial and aerial networks.

In order to improve performance of mobile links, and network must reduce the Doppler rates and the frequency of handoffs. These two requirements are not mutually exclusive. Doppler rates depend not only on the velocity of the mobile unit, but also on the coherence distance. The definition of the coherence distance varies. Most commonly it is defined as the minimum distance required for a channel to move from a peak (i.e. constructive interference) to a valley (i.e. destructive interference) or deep fade. However, independent of the definition, the coherence distance is always a linear function of the carrier wavelength. The different definitions only differ by a constant. Also, the coherence distance is always defined with respect to a direction. So depending on the direction the coherence distance can be different. The coherence is a function of the wavelength $\lambda$ and the scattering in the environment. The smallest the coherence distance can be is $\lambda/4$, and this usually takes place in a multipath environment where the angular spread is large. When the angular spread is small (LOS is the extreme case), the coherence distance can become arbitrarily large. Therefore, to reduce the Doppler spread, the coherence distance needs to be made large, either by increasing the wavelength or reducing the angular spread. Increasing the wavelength is done by moving to lower carrier frequencies (e.g. sub-1 GHz). For example, at 300 MHz, $\lambda/4 \approx 0.25$ m. For a vehicle moving at 100 Km/h ($\approx 27.8$ m/s), the maximum Doppler spread is approximately 111 Hz, which may still be on the high side, even at this low frequency. The reduction of the angular spread is best done with an aerial network. As mentioned earlier, with aerial communication, wireless channels are mostly LOS or nLOS. Also, at the height of the min-SAT, the signal path from the mini-SAT to the ground node is nearly perpendicular to the direction of motion of the ground node, which means that the path length does not change rapidly as a function of the position of the ground node. Consider the simple scenario shown in FIG. 49, where the path between an aerial node and a ground node is assumed to be orthogonal to the direction of motion of the ground node. The initial distance between the two nodes is $r_a$ when the ground node is at position x (the aerial node is assumed to be much slower than the ground node). When the ground node travels a distance $\Delta x$ to point x*, the path length becomes $r^* = r_a + \Delta r$. $\Delta r$ can be computed as a function of $\Delta x$ using the right triangle equation (or Law of Cosines):

$$\Delta x^2 + r_a^2 = \qquad (10)$$
$$(r_a + \Delta r)^2 = r_a^2 + 2r_a\Delta r + \Delta r^2 \Rightarrow \Delta x^2 + 2r_a\Delta r + \Delta r^2 \approx 2r_a\Delta r$$
$$\text{assuming } r_a \gg \Delta r \Rightarrow \Delta x = \sqrt{2r_a\Delta r}$$

Equation 10 relates the distance $\Delta x$ that needs to be traveled by the ground node for the path length to change by approximately $\Delta r$ (for a given height of the aerial node). For example, if a mini-SAT is floating at a relatively low height of approximately 1 Km, then the amount of distance that needs to be traveled for the path length to change by 1 mm (less than $\lambda/4$ at 60 GHz) is $$\Delta x = \sqrt{2 \times 1000.001} = \sqrt{2_m}$$

Therefore, if a ground node is moving at a velocity v=100 Km/h$\approx$27.8 m/s, the maximum Doppler "shift" at 60 GHz is less tan 20 Hz, which is more than 5 times les than the average Doppler "spread" at 300 MHz in a terrestrial environment with rich multipath! If the same calculation is repeated for a terrestrial case (shown in FIG. 49 with the red arrows), assuming a base station height of 300 m (relatively high for a terrestrial node) and initial distance x=300 m from the tower, then the initial path length is $r_i = 300 \times \sqrt{2} \approx 424.26$ m. If the mobile node travels a distance $$\Delta x = \sqrt{2},$$

then path length becomes $$r_i^o = \sqrt{300^3 + (300 + \sqrt{2})^2} \approx 425.26$$

m, a difference of approximately 1 m, which is a 1000 times more than the aerial case!.

Both techniques for reducing Doppler rates (using low frequency bands and/or mini-SATs) serves the other requirements (lowering the rate of handoffs) as well. To reduce the reduce of handoffs, as sparse deployment of cells with high coverage is required. The easiest way to achieve high coverage is either with terrestrial macro cells using lower frequency bands or aerial mega/macro cells. The advantage of using mini-SATs is that they can achieve better Doppler performance than terrestrial cells while using higher frequency bands. So they can effectively deliver higher capacities, and take advantage of more spectrum options. Another option is to partition channel resources into multiple partitions each optimized for a particular type of traffic.

Of course the biggest challenge with all this is how to classify/identify a wireless node as fixed/quasi-fixed or mobile. The problem here is that the same devices (i.e. smart phone, tablets, laptops) can be both fixed and mobile (not at the same time of course). When they are fixed or quasi-fixed, they usually follow traffic patterns of fixed systems (i.e. high Internet usage), and similarly when they are mobile. They can switch from fixed to mobile and vice versa in a matter of seconds. Therefore, the network needs a mechanism(s) for learning/identifying behavior(s) of wireless node in order to dynamically assign them the appropriate channel resources and QoS.

The tracking of user/device behavior can take place either on the device itself or on the network or a combination of both. The term device is used to refer any node on the network be it a CN or an EN. The process is more efficient when performed on the device itself. However, sometimes devices, especially when they are mobile, are power constrained, in which case, they may require some assistance from the network. Before discussing mechanisms for detecting channel variation, it is important to note that Doppler can result either from the movement of either ends of the link or the movement or the surroundings (e.g. trees, cars, trucks), and this Doppler effect can either be transient or long term. Only long term high Doppler rates (i.e. fast channel variation) is of interest because adapting to short term changes might increase the overhead to a point where it defeats the purpose of this whole process. High Doppler rates can be detected with one of the following techniques:

Tracking Channel Variations from Pilot and Reference Signals

Both ends of the links transmit some type of known signals (e.g. preambles/pilots/reference) as a part of each frame. These signals can be used to track the rate of variation in the wireless channel at either ends of the link. This is the most general type of tracking as it detects any type of channel variation including those that do not involve mobility at either or both ends of the link (i.e. moving reflectors like cars and trucks and tree leaves).

Tracking Rates of Change of GPS Positioning and Rotation

Almost every device today is equipped with a GPS receiver, and sometimes with a digital compass as well. With GPS, the position of a radio can be tracked within a few meters accuracy, while the compass is used to determine the orientation of the node. Both position and rotation impact the wireless, but in most circumstances position is more important and more accurately determined. The node/device can use its GPS unit to measure the position/coordinates on regular time intervals. The average velocity can then be estimated using these measurements. Based on the velocity, the node can request the appropriate channel resources. Alternatively, these measurements can be sent to the network, where the computation of the parameters of interest (e.g. velocity) and channel resource allocation takes place.

Tracking Frequency of Handoffs

Even without the assistance of GPS, a network can still track the velocity of its nodes. This can be done using the network itself by tracking the associations of these nodes with BSs (CNs) and changes in those associations. The association between a potentially mobile node and a BS gives a rough estimate of the nodes location since the locations and coverage areas of BSs are known a priori.

Multi-Tier Access Networks

The concept of using small cells (pseudolites) and relays as intermediate hops to enhance network capacity was discussed above. The same concept can be applied to enhance the performance of networks with high mobility. In general, high mobility devices are going to be small and energy constrained. The small form factor restricts the number of antennas and antenna gain. This will stress out both mini-SATs and mobile devices as the loss in link budget will be made up for either by loss in performance or increase in Tx power, which also leads to loss in network performance and reduction in battery life. Therefore, a network built on direct communication between macro-cells, whether mounted on mini-SATs or towers, and mobile devices is not optimal.

Figure 50A:
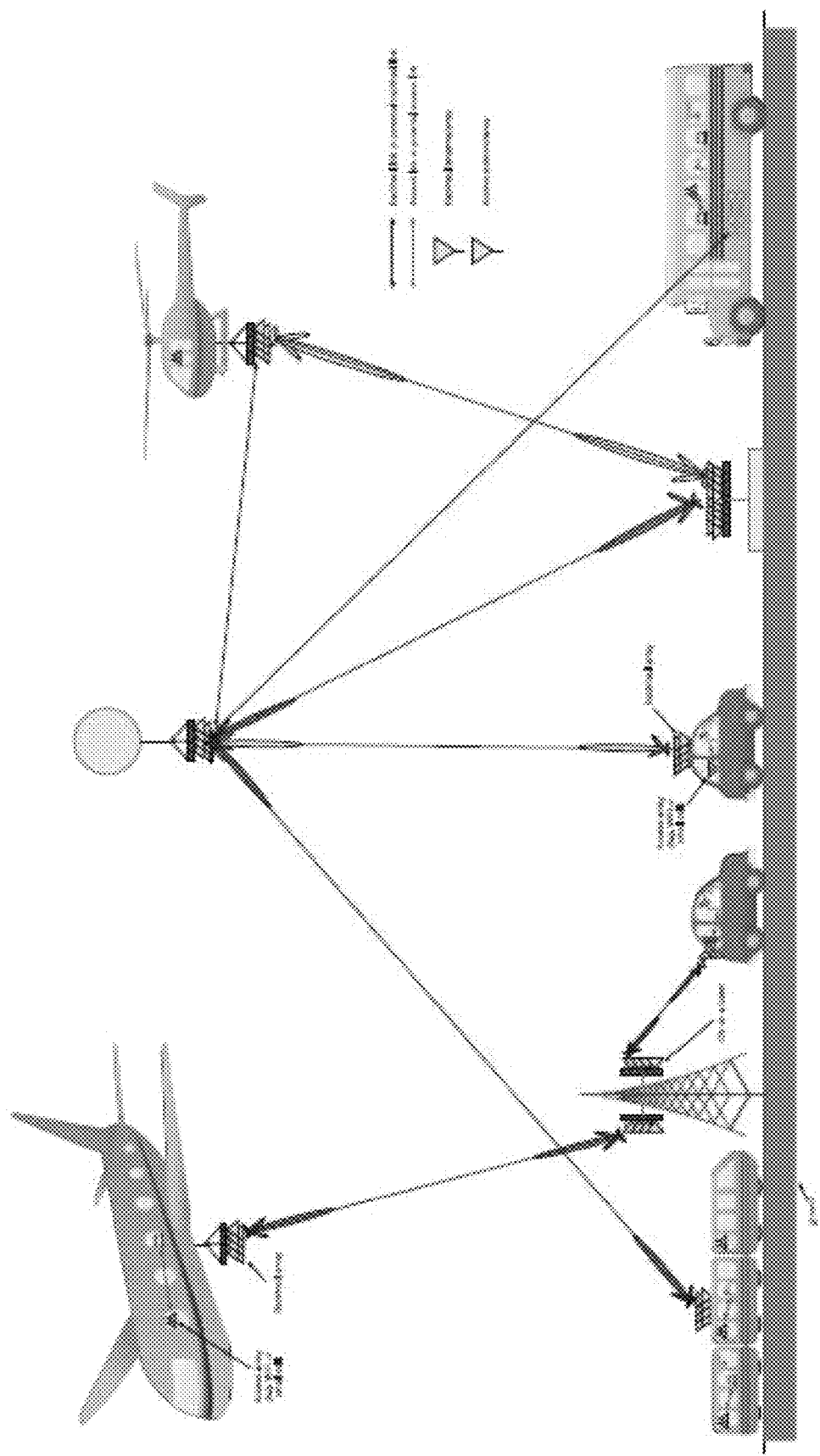
FIGS. 50A-50B illustrate multi-tier access networks.
Figure 50B:
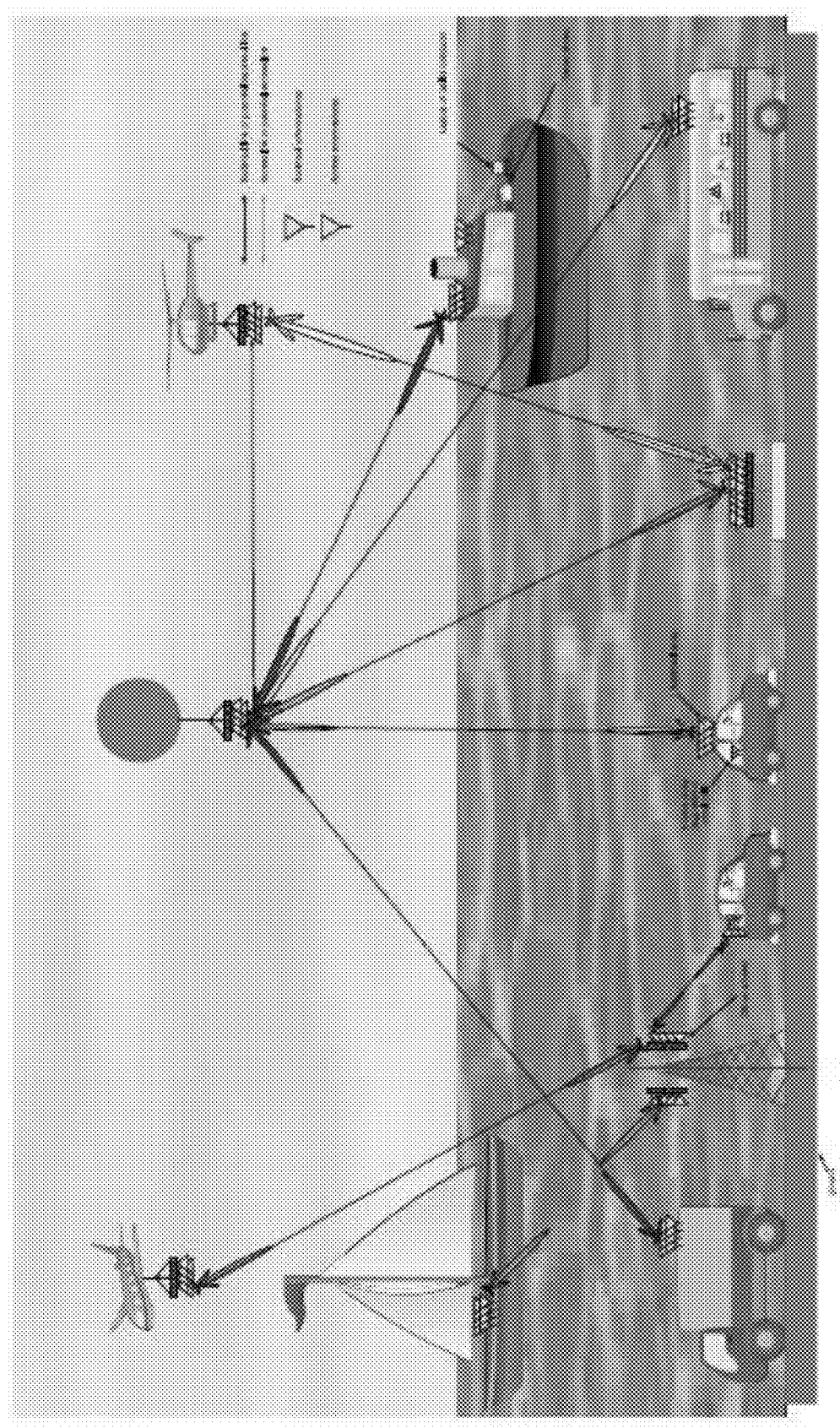
Figure 51:
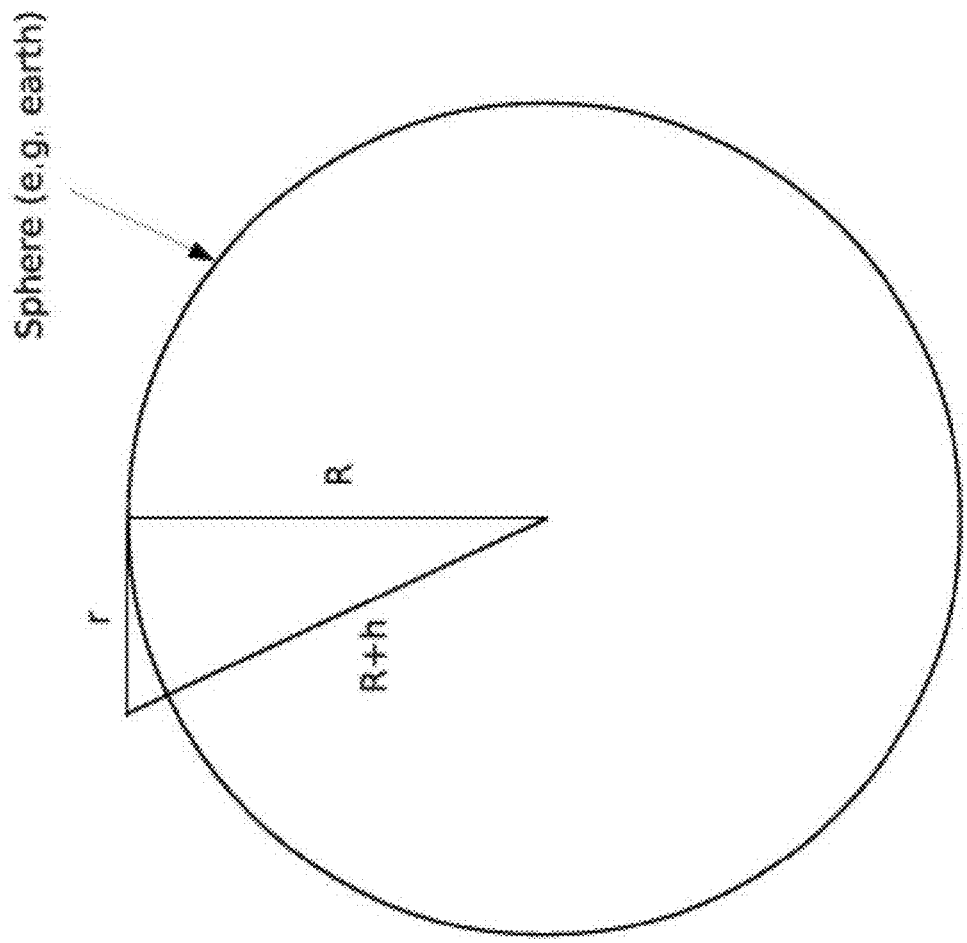
FIG. 51 illustrates LOS coverage radius vs antenna height.

An alternative topology is one that leverages small cells by placing them directly on mobile objects (e.g. cars, buses, trains, planes, ships). The small cells mounted on moving objects/vehicles would be backhauled using mini-SATs or terrestrial towers as shown in FIG. 50 (i.e. the EN would also be mounted on the vehicle to backhaul the small cell, and the CN would be mounted on the tower/building or the mini-SAT). The small cell would then offer connectivity to other devices on or inside the vehicle (e.g. via WiFi or LTE). The link between the EN on the moving object and the CN on the tower and the mini-SAT is a lot more energy and spectrally efficient than a direct link from a mobile device to the macro-cell because the EN can accommodate a lot more DOFs and more sophisticated signal processing (e.g. compensating for multipath and Doppler shifts) which takes some of the processing burden off of the mini-SAT. The link between the small cell and the mobile device (e.g. cell phone, tablet, laptop) is also more efficient due to the close proximity, relative channel stationarity, and higher channel rank. The channel between the mobile small cell and mobile device resembles and indoors channel. Since both devices (as well as the major reflectors) are moving at the same relative velocity, the channel is almost static. Furthermore, there are reflectors around both ends of the link. This enables high rank MIMO communication that would not be possible in a direct link between a mobile device and a macro base station. Also, the improved range of communication between the EN and the CN also reduces the frequency of handoffs.

Delay Tolerant Networking (DTN) and Broadcast/Multicast

While most networks today, especially the Internet, are designed and optimized for realtime/unicast traffic even though a large chunk of the traffic is not realtime and/or can be served more efficiently with other modes of transport like broadcast or multicast. These non-realtime applications do not require high network availability, and can be served with intermittent networks. Examples, include web-publishing, file download, asynchronous messaging (text, voice, and video). Such applications are sometimes referred to as asynchronous or delay-tolerant applications. Developing architectures and network protocols that are optimized for these type of applications is a subject of ongoing research known as delay-tolerant networking or DTN. The main driver for DTN are rural and underserved areas, where 90% of the networking needs can be served with DTN at orders of magnitude lower cost than traditional networks that are designed and optimized for real-time applications. This has led to many new protocols and network architectures that can support high delays than can extend to hours and even days. Such networks rely and proxies and caches for storing large amounts of data, and sometimes cars and buses that travel to areas with little or no connectivity to collect/deliver data (e.g. via WiFi), similar to the conventional mail/postal system.

Conventional DTN designs that previously relied on cars and buses, can be made significantly more efficient by leveraging satellites and mini-SATs. Both Satellites and mini-SATs are ideal for DTN applications due to their large coverage areas. Building a satellite and mini-SAT network that is optimized to serve non-realtime/delay-tolerant content is significantly cheaper than a real-time network. First, since time-continuous coverage is not required for any given area, the number of satellites/mini-SATs required is significantly lower. Second, since the satellite/mini-SAT does not need to be on all the time, the power requirements can be significantly reduced/optimized, making it easier and cheaper to build and maintain.

In-Flight High Speed Internet Access

Providing commercial passenger airplanes with high speed Internet connectivity presents a major challenge to existing wireless technology and infrastructure. Air-jets travel at much higher speeds and cover much larger areas than traditional networks are designed to handle. Current attempts to solve this problem have followed one of two approaches, either use traditional satellite infrastructure or use traditional terrestrial infrastructure. The satellite approach faces capacity issues if GEO or MEO SATs are used. If LEOs are used instead, challenges include high Doppler rates, high frequency handoffs, and beam-alignment. The conventional terrestrial approach (i.e. no beamforming) also faces beam alignment challenges which limits the coverage area of a base station. The limited coverage area increases the frequency of handoffs.

Incorporating AAS and SFTAP technology helps mitigate most of these issues. SFTAP allows automatic beam alignment and multiple simultaneous beams and interference cancellation. Automatic beam alignment makes it possible to leverage LEO and MEO satellites more effectively for this application, creating more system capacity since LEOs and MEOs have much smaller footprints than GEOs. It also increases the range/coverage area of both satellites and ground base stations, which reduces the frequency of handoffs. Providing high speed Internet access in-flight does not require a high density network. The number of planes that are simultaneously in the air over a continent like North America or Europe in the order of thousands at most. So the number of base stations (ground or aerial) that need to be deployed would be in that order as well. If the average number of planes in the air at any given moment is M, and the number of base stations is N, and the average capacity of per base station is C b/s, then the expected capacity per plane is N C/M or roughly C since it is expected that M≈N. The coverage area per base station must be small enough to meet the capacity/density requirement, but large enough to reduce the frequency of handoffs. Multiple beams or spatial multiplexing increases the capacity of both base stations (both satellites and ground stations) and planes. The planes can form multiples beams to multiple base stations to increases the capacity and smooth the handoff process.

Mini-SAT technology is cheaper alternative to LEO satellites and provides better coverage than ground base station. Two factors place an upper bound on the coverage area of a base station in an LOS environment: channel propagation characteristics and the curvature of the earth. The channel will roughly follow Equation 1 and degrade as $1/r^2$, while the curvature of the earth makes the maximum LOS distance r a function of $\sqrt{h}$, where h is the height of the base station in meters (see FIG. 50 and Equation 11)[133]. Equation 11 derives the coverage radius of a base station as a function of its height off of the surface of the earth using simple right triangle identities:

$$r^2 + R^2 = \quad (11)$$

$$(R+h)^2 = R^2 + 2Rh + h^2 \Rightarrow r^2 = 2Rh + h^2 \approx 2Rh \Rightarrow r \approx \sqrt{2Rh} \approx$$

$$3569.59\sqrt{h} \text{ (in meters when } R \text{ is average radius}$$

of the earth)

The maximum LOS distance between two nodes is the sum of their coverage radii:

$$r_{12} \approx \sqrt{2R}\left(\sqrt{h_1} + \sqrt{h_2}\right) \approx \quad (12)$$

$$3569.59(\sqrt{h_1} + \sqrt{h_2})\text{(in meters when } R$$

is average radius of the earth)

Assuming that aircrafts have average altitudes of 10000 m, then based on Eq. 11 and 12, the coverage of a ground base station is roughly 300 Km, while mini-SATs at 20000 m altitudes can communicate with planes at distances up to 700 Km. The results from equations 11 and 12 need to be reduced in order to avoid 1/r4 zones. Therefore, mini-SATs have almost twice the coverage radius of ground stations.

Figure 9:
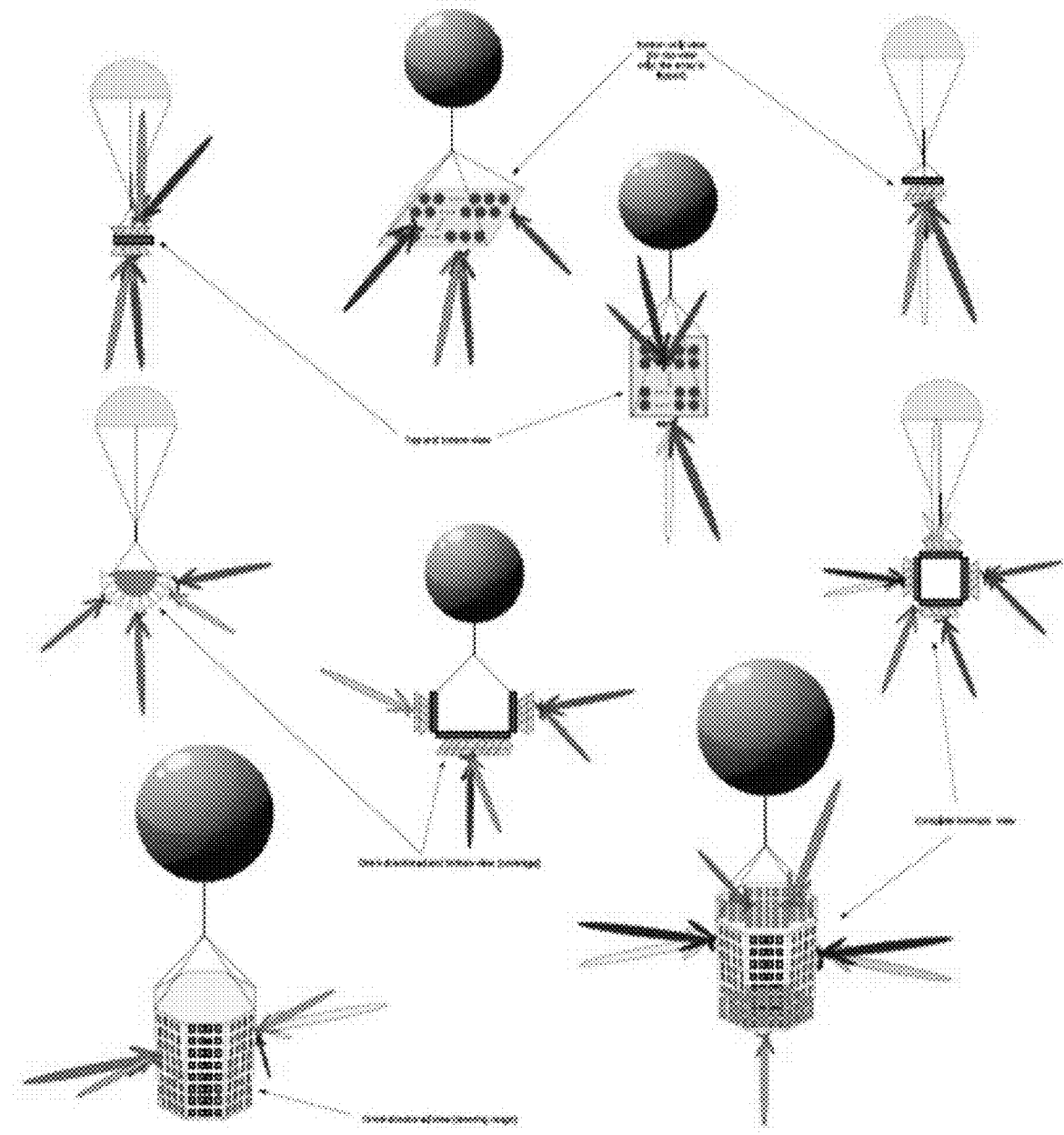
FIG. 9 illustrates mini-satellite adaptive antenna configurations.

Like other aerial networks discussed in this document, a network for providing high speed Internet access in flight is well suited for unlicensed spectrum as it is relatively isolated from activities in these bands that take place in terrestrial network (isolation even better when base stations or CNs are mounted on mini-SATs). Because the average distance separating a CN (base station) from the EN (on the plane) is relatively large (tens to hundreds of kilometers), TDD is not optimal (high TTG/RTG). To amortize for the long time guards, the frame size needs to be made bigger, which increases the latency. However, since this type of communication is mostly LOS, more than one alternative exists (e.g. FDD, dual-TDD, ADD, and ZDD). Furthermore, since the communication is mostly LOS, the high speeds of aircrafts result mostly in Doppler shifts rather than Doppler spreads. Doppler shifts result is a slight change in carrier frequency that can be easily compensated for in baseband or RF or a combination or both at either the EN or CN or both. The EN can be composed of multiple panels (preferably flat) mounted on different areas of the plane to cover multiple directions. These panels can either be jointly or independently processed (i.e. multiple ENs), and can communicate to different CNs independently. The plane can have a central processor to coordinate and communicate with the panels (e.g. over WiFi). The central processor also distributes the data received by the ENs within the plane (e.g. over WiFi). The base station network is composed of CNs on the ground (e.g. towers), on mini-SATs, or on satellites (or a combination of each). Both ENs and CNs are capable of multiple simultaneous beams. The multiple beams are either used to enhance capacity and/or reliability and/or the handoff process. If CNs are mounted on mini-SATs, then the antenna array must have sufficient gain in the horizontal direction. This is especially critical for this application since the distances are larger than usual. FIG. 9 shows some mini-SAT architectures that may be suitable for applications like this. Any aerial-to-aerial communication like mini-SAT backhaul would have similar requirements on antenna/array radiation patterns. As shown in FIG. 9, mini-satellites must employ adaptive antenna arrays to achieve the performance levels in the presence of constant movement. The antenna array geometry can be configured to achieve any type of coverage (e.g. isotropic, omni-directional, or directional) depending on the application requirements.

Ship-to-Ship and Ship-to-Shore Communication

Communicating to/from and between ships is another problem that presents challenges to existing wire-less infrastructure, and can benefit greatly from the network architectures described in this document. Like aircrafts, ships move constantly (albeit at much lower speeds), which makes it difficult to achieve the required data rates at the required distances without some form of beamforming technology, preferably in combination with some form of aerial communication technology like mini-SATs.

Wireless networks built for ship and airplane connectivity, whether they rely on terrestrial or aerial infrastructure (or a hybrid), have a lot more options when it comes to spectrum bands than conventional terrestrial networks since they can operate without interfering with existing infrastructure operating in these bands. This includes unlicensed and lightly licensed bands (e.g. 900 MHz, 2.4 GHz, 3.6 MHz, 5 GHz), bands reserved for P2P microwave links, and near GPS bands. In particular, 900 MHz is attractive due to its superior range and propagation characteristics. Network operators that own licenses to frequency bands can also use those licensed bands for those applications. This is especially attractive for AWS and WCS bands that have strict transmission rules. FDD bands can also be used either in standard FDD mode (as specified by the rules) or TDD, dual-TDD, or ADD modes because the propagation environment is expected to LOS. Higher frequency bands (i.e. 10 GHz) are always available as an option, but they are not very attractive for these applications because of distance requirements.

Latency Reduction Techniques

In addition to capacity, latency is another metric that also needs to optimized for wireless networks. Latency or delay refers to the time period from when data is available at the transmitter until they are processed by the receiver. Many realtime applications such as live streaming video and on-line gaming have strong delay constraints. Latency is affected by several factors including channel duplexing, waveform (modulation), and error recovery mechanism (for example, error recovery techniques based on coding and error correction (e.g. FER) have a lower latency than techniques based on error detection and retransmission). For example, error recovery techniques based on coding and error correction (e.g. FER) have a lower latency than techniques based on error detection and retransmission. There is usually a compromise between capacity and latency. This section focuses mainly on duplexing techniques for reducing latency. For example, using more sophisticated beamforming algorithms and multipass/data-directed beamforming improves capacity, but usually increases latency. Similarly, using large code blocks also improves capacity at the expense of latency.

Impact of Channel Duplexing on Latency

Many wireless systems are beginning to shift from FDD to TDD. In addition to not requiring paired spectrum. TDD has two distinct advantages over FDD. The first advantage is more control over the DL and UL ratios. This capability is important since the DL and UL traffic patterns are usually asymmetric. The second advantage is channel reciprocity, which is critical for beamforming systems that operate in multipath environments. The main drawback with TDD is latency, which is a function of the frame size and structure. There two different latency metrics: one-way latency and round-trip latency. The one-way latency can be different for the CN (master) and the EN (slave). For the CN, the minimum achievable one-way latency is the length of the UL. For the EN, the minimum achievable one-way latency is the length of the DL. The round-trip latency is the sum of the two one-way latencies. The minimum achievable round-trip latency is the length. If latency is mentioned without specifying the type, then is usually refers to round-trip latency by default. The latency can be made smaller by reducing the frame size. However, this come at the expense of extra overhead. The guard times as well as the frame control data become more significant as the frame gets smaller.

Latency Reduction Using Multiple TDD Bands

Figure 52A:
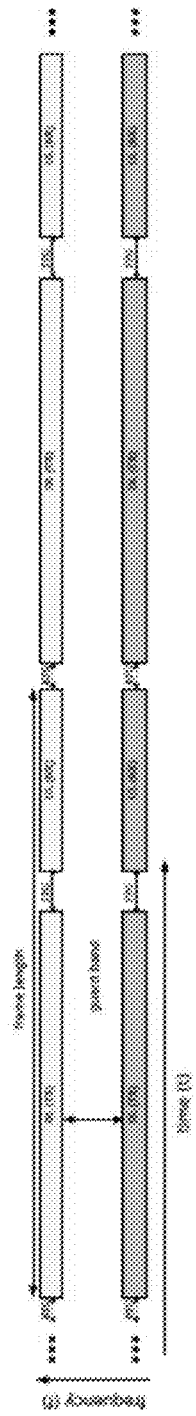
FIGS. 52A-52E illustrate time division duplexing with two bands.
Figure 52B:
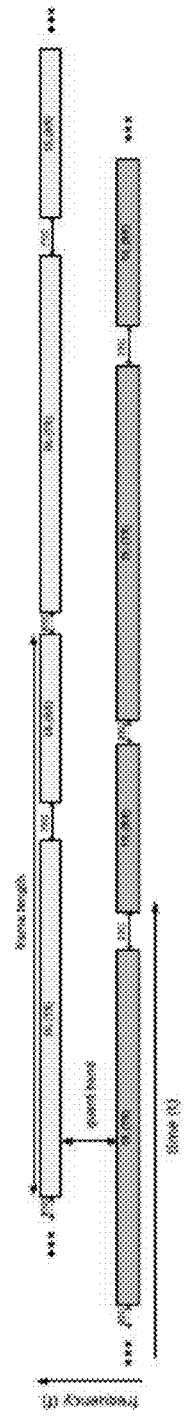
Figure 52C:
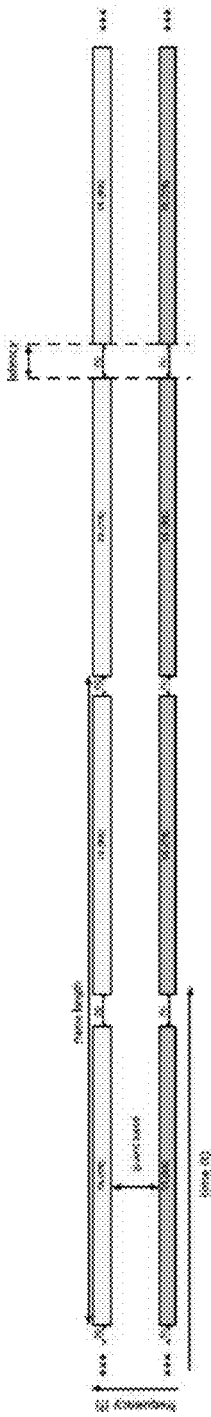
Figure 52D:
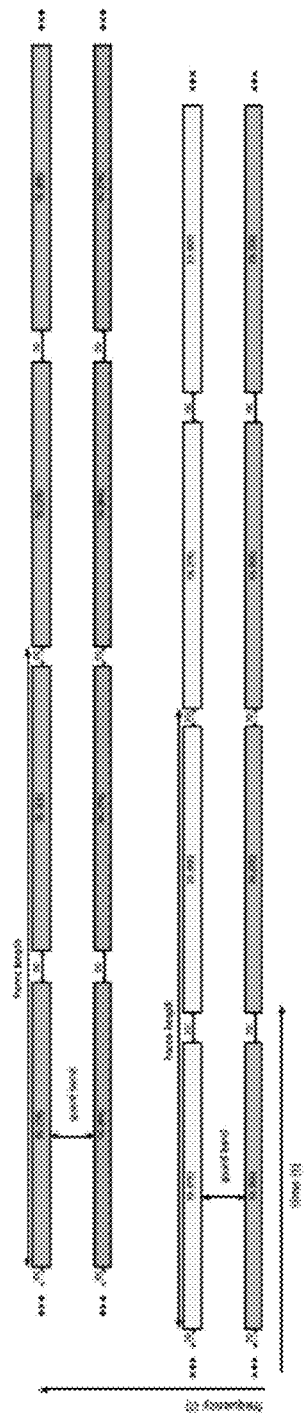
Figure 52E:
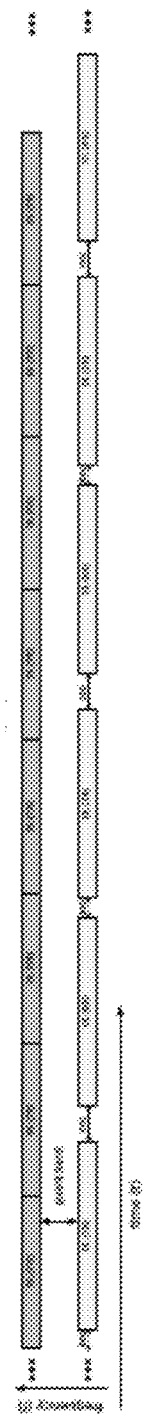

The latency can be significantly reduced without additional overhead by using a pair (or more) of spectrum bands similar to FDD. Using a pair of bands while aligning their DLs and ULs, as shown in FIG. 52a, does nothing to reduce latency. However, sliding the frame in one band relative to other creates overlap between the DL in one of the bands and the UL in the other as shown in FIG. 52b, which results in latency reduction (both round-trip and one way). The lowest latency is achieved when the DL of the first frequency band (marked in purple) has the same length as the UL of the second band (marked in yellow), they always overlap in time as shown in FIG. 52c. In FIG. 52c, the same guard periods are used for DL/UL on both bands. This is not necessary. In this scheme, the theoretical minimum latency is the length of the guard times between the DL and UL, and is independent of the frame length. This can be further reduced by using another pair of channels whose transmission and reception overlap with the guard times of the original two channels as shown in FIG. 52d. Since latency is independent of the frame length, the DL and UL slots can be made larger in order increase the TBP and reduce the overhead of the time guards and the frame control data. This is another advantage of this scheme. The main disadvantage of this scheme is that the UL and DL ratio is always 1:1 regardless of the length the DL and UL slots.

Figure 53A:
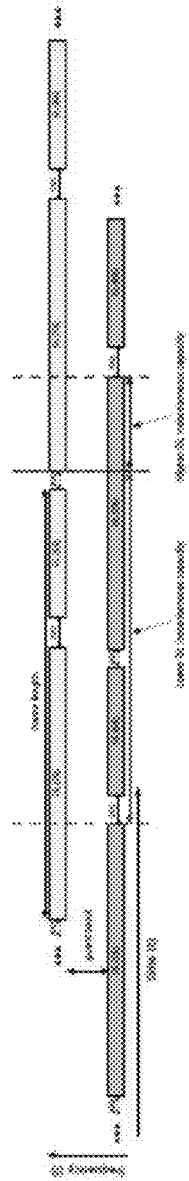
FIGS. 53A-53C illustrate increasing the DL:UL ratio in a dual TDD system.
Figure 53B:
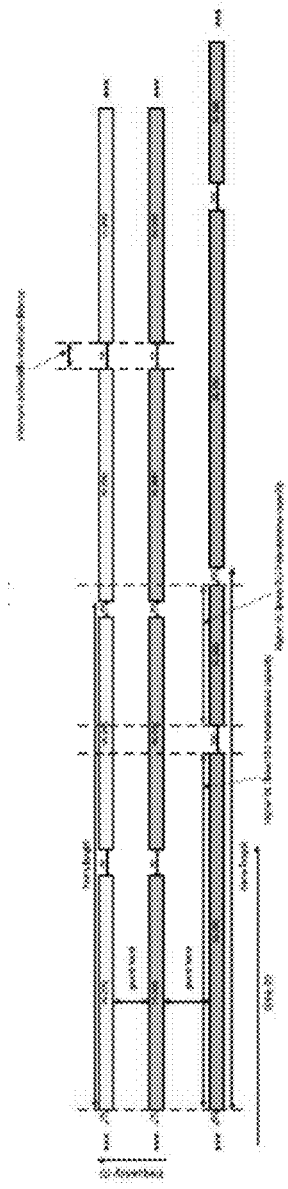
Figure 53C:
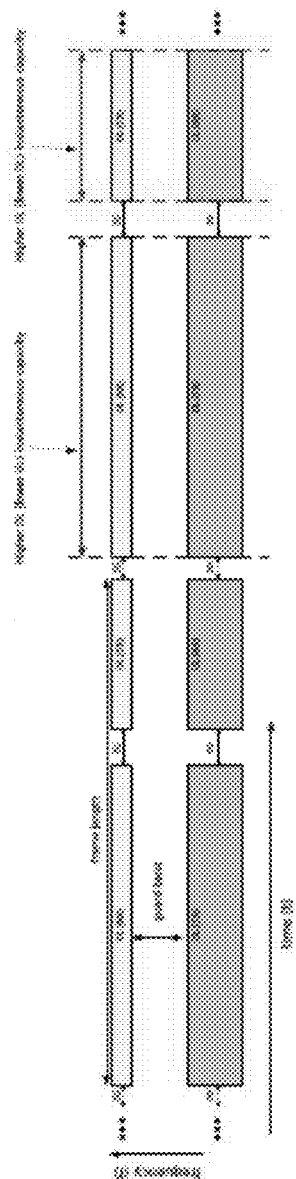

There are several techniques that can employed to get higher DL:UL ratios while keeping the latency low. One way this can be accomplished is by using the sliding frame technique shown in FIG. 52b. First, the desired DL:UL ratio is chosen. Given the DL:UL ratio (assuming without loss of generality that DL>UL, the minimum latency is achieved when the UL in the yellow band fully overlaps with the DL in the purple band (and vice-versa) as shown in FIG. 53a. In this case, the DL latency is virtually non-existent (similar to the FDD case), while the UL latency is maximum distance (i.e. delay) between two consecutive ULs (taking both bands into consideration). The round-trip latency is almost equal to the UL latency. The second technique (shown in FIG. 53b) involves using a third band. In this technique, two bands (yellow and purple) would operate in a minimum latency (dual TDD) configuration, similar to FIG. 52c, and the third (green) would operate as a conventional TDD channel, similar to FIG. 16a. In this case, the ratio of the DL to UL capacity is controlled by changing the DL:UL ratio on the third (green) band. The absolute lengths of the DL and UL slots in the green band can be made larger than a conventional TDD scheme since they have less impact on the latency. The disadvantage of this scheme is that is requires three different (and well-separated) bands). Also, the maximum achievable DL:UL capacity ratio depends on the relative bandwidth of the three different channels. The third technique is to simply apply the dual TDD technique in FIG. 52c using two channels with different bandwidths as shown in FIG. 53c. In this case, the ratio of the DL and UL capacities can be varied by varying the slot lengths. When the bandwidth of one channel is much larger than the bandwidth of the other, the traffic pattern or frame structure approaches that of conventional TDD.

There clearly is a tradeoff between latency and DL:UL capacity ratio. Essentially, all of the techniques shown in FIG. 53 introduce non-uniformity in the DL and UL capacity. The instantaneous maximum achievable one-way latency is not constant, but increases/decreases when the DL/UL overlap. Therefore, the effective latency is a relative metric that must be weighted by throughput.

FIG. 53 discloses increasing the DL:UL ratio in a dual TDD system: (a) Increasing the DL slot in both bands relative to the UL slot, and completely overlapping the DL slot in one band with the UL and part of the DL slots of the other, gets rid of the latency in the DL and minimizes it at the UL. (b) Using three different bands: two bands with the same TDD frame structure and timing, but with alternating and fully overlapping DL and UL slots, and a third band with an independent conventional TDD frame structure with a larger DL slot relative to the UL. (c) Two asymmetric dual-TDD bands with overlapping DL and UL. The DL (UL) slot in the wider (narrower) band is larger than the UL (DL) slot.

It's also important to note that the dual-TDD scheme can be used with asynchronous-TDD as well. The contention for each channel can either be done synchronously or independently (i.e. channel resources on both bands are either reserved simultaneously or separately).

Enabling Full Duplexing with Aerial Links

Mini-SATs (or aerial communication in general) enable more channel duplexing options for beamforming systems, mainly due to the LOS or nLOS nature of those links, which makes channel reciprocity frequency neutral. So in addition to dual-TDD, FDD is also available as a low-latency alternative to TDD. However, both dual-TDD and FDD require paired spectrum, with sufficient frequency separation. This section presents a system/network architecture that utilizes aerial communication, mini-SATs in particular, that enables another low-latency duplexing technique, full duplexing (or ADD/ZDD), and makes it more realizable in practical network environments. Full duplexing can potentially deliver FDD performance in TDD spectrum.

An overview is provided of the concept of full-duplexing, including recent advances in the area. It also outlines major challenges realizing the technology in practical network settings. The challenges are both economic, mainly dominated by the analog self-cancellation circuit as well as the computational complexity of the digital baseband canceler (both of which don't scale well with adaptive antenna arrays), and technical (the increase in interference levels). The interference problem arises in terrestrial networks, as both CNs and ENs simultaneously interfere with one another.

The dynamics are quite different in aerial networks (examples illustrated in FIGS. 39, 40, and 54). The first key difference is that the spatial channels between CNs (i.e. mini-SATs) are naturally orthogonal to the channels between CNs and ENs (e.g. small cells). Similarly, the spatial channels between ENs are orthogonal to the channels between ENs and CNs. This is a natural consequence of the antenna alignments: CN/EN arrays are mostly pointing vertically downwards/upwards. So while the CN-EN (EN-CN) links are near vertical, the CN-CN (EN-EN) links are near horizontal, which places them at the natural nulls of the antennas. Therefore, the amount of interference of CN-CN interference and EN-EN interference in aerial networks is expected to be much lower than terrestrial networks, which makes them better candidates for full-duplexing. A large amount of CN-CN and EN-EN interference is attenuated by the pattern of the antenna elements before reaching the RF front-end of the receiver, which helps the overall linearity of the system.

With the external interference problem partially or fully resolved, there are several options for implementing ADD or ZDD on both ground and aerial nodes. The first, and most straightforward, is to use the standard two-stage analog/digital self-interference canceler described elsewhere, which is neither scalable nor cost effective. However, the properties of aerial networks enable different options for system architecture that are more cost effective, and better scale with the number of antennas.

The analog component of the self-interference canceler represents the most challenging part is terms of size and cost. The analog canceler is required to bring the signal from the transmitter down to a level that is within the linear range of the receiver, and to ensure that no significant increase in the noise floor takes place at the receiver, as a result of the transmitted signal leaking in. As a consequence, the Tx signal needs to be attenuated by at least 60-70 dB before hitting the first active component in at receiver. Since the Tx signal power typically ranges between 10-30 dBm on small devices and access points. Even on systems that employ large arrays of antennas, the Tx power per antenna is usually on the low end (similar to a handset). The Tx power per antenna does not need to be high since the overall power is the sum of the individual powers of each antenna. In order to handle this type of power levels, the analog canceler needs to be highly linear. These linearity levels cannot be achieved, without consuming too much power, except with passive components. Passive components require more area and a lot of difficult to integrate than active components, and thus the bulk of the canceler consists of passive RF components. Furthermore, the requirement for the circuit to be broadband increases size and cost. In an antenna array, it's not sufficient to replicate this circuit for each antenna; for each antenna, every other antenna in its neighbor requires cancellation in analog domain. The coupling between antennas drops with the square of the distance. Every pair of antennas with coupling loss less than 60 dB require some form of cross-talk cancellation in the analog domain. However, the required complexity (i.e. number of filter taps) to avoid analog cancellation altogether), antennas must be spaced at least $100\lambda$ apart ($\lambda$ is the carrier wavelength). In a typical array with $\lambda/2$-$3\lambda/4$ average spacing between elements, coupling between neighboring elements ranges between 15-20 dB, which is similar to the Tx/Rx isolation on the same antenna provided by a circulator. In a 2-dimensional arrangement of antenna elements, there can be up to eight antennas with coupling loss no worse than 20 dB, and thus requiring each requiring and a full separate analog canceler to suppress the cross talk. That means that beyond a few antennas, this architecture simply won't scale.

A simpler and more cost-effective approach for attenuating the transmit signal before reaching the receiver is to use to partition the array into two or more groups. The different groups must be positioned such that, in the worst case, the isolation between an antenna in one group and the sum of all the antennas in a another group is greater than 60 dB. If this can be achieved, then it eliminates the need for the analog self-interference canceler. Equation 1 serves as a guide for achieving the desired isolation. Based on Eq. 1, the coupling is a function of distance, antenna gains (in the respective directions), and wavelength. The designer has more control over the first two parameters, and less so on the third since it is a function of spectrum availability. Using these two parameters, the desired isolation can be achieved with a combination of the following:

Distance

While the target isolation can be achieved with distance alone if it is sufficiently large. On the other hand, the size constraints place an upper bound on the distance (note that the distance between two groups of antennas should have little impact of weight and cost since it is mostly empty space.) To achieve 60 dB isolation based on distance alone requires at least r=100λ of separation. This translates to r>10 m at 2.5 GHz, and r≥5 m at 6 GHz, both of which are not acceptable. It becomes acceptable at 30 GHz or above.

Therefore, if r<1 m is used as an upper bound, the isolation (from distance only) cannot exceed 40 dB at 2.5 GHz or 46 dB at 6 GHz. The remaining 25-30 dB must be obtained through other means.

Antenna and Array Geometry

Figure 55A:
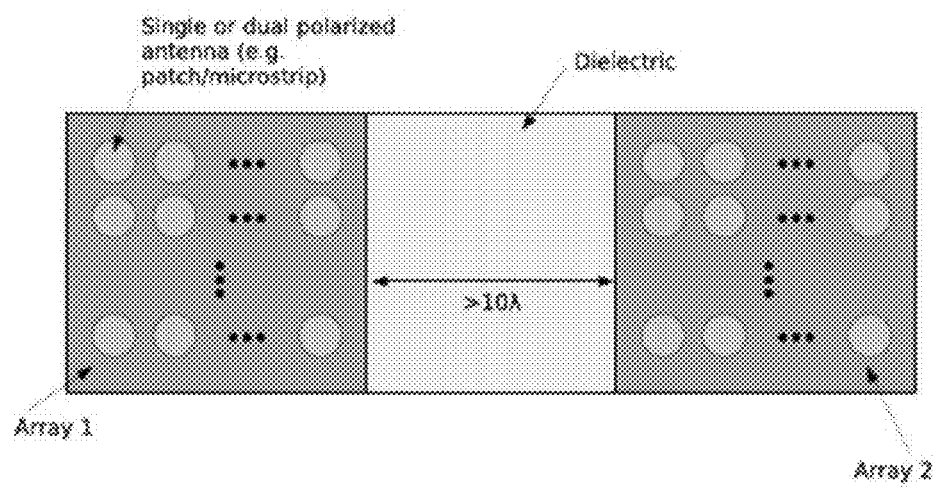
FIGS. 55A-55E illustrate 2-way array partitioning.
Figure 55B:
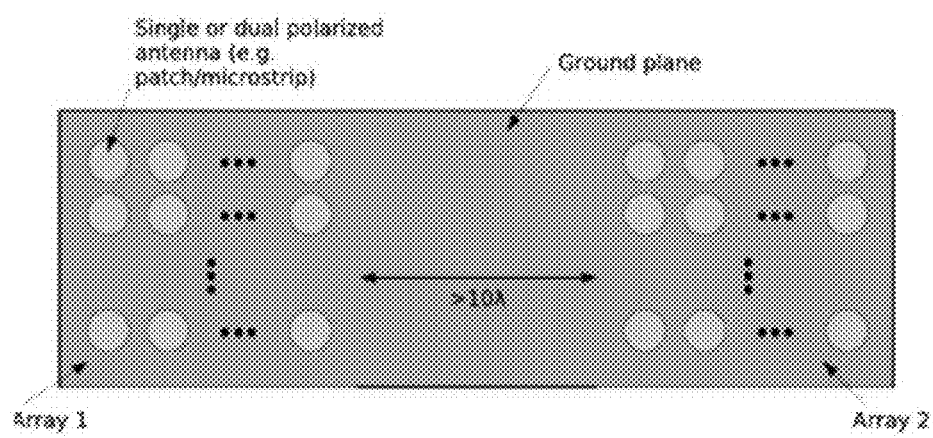
Figure 55C:
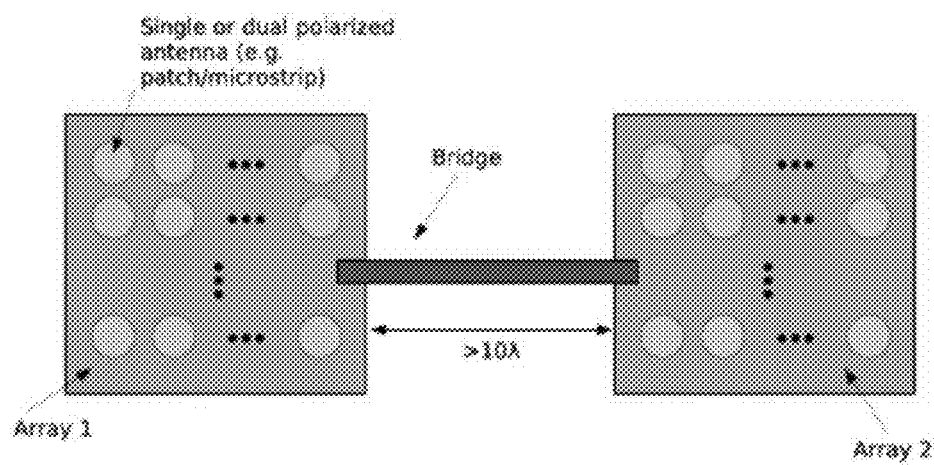
Figure 55D:
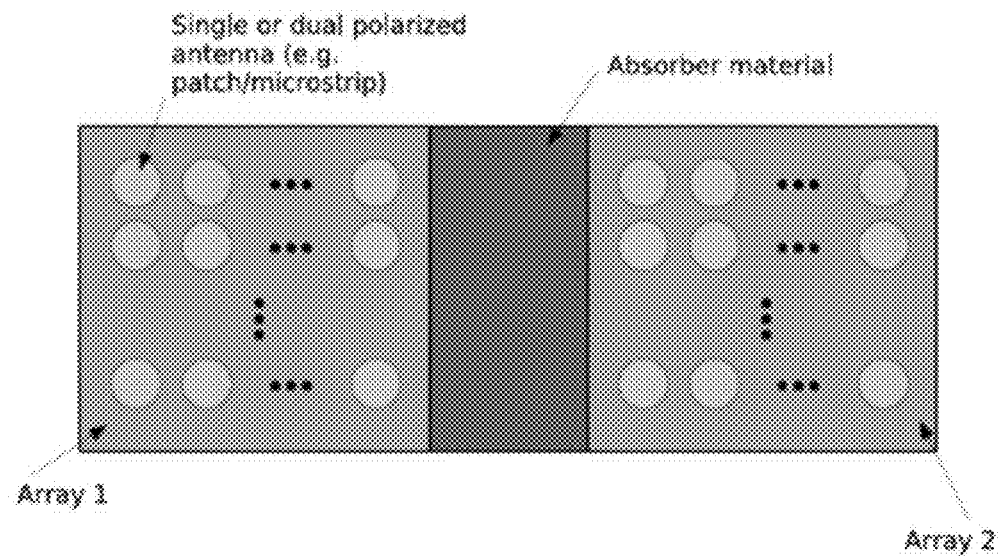
Figure 55E:
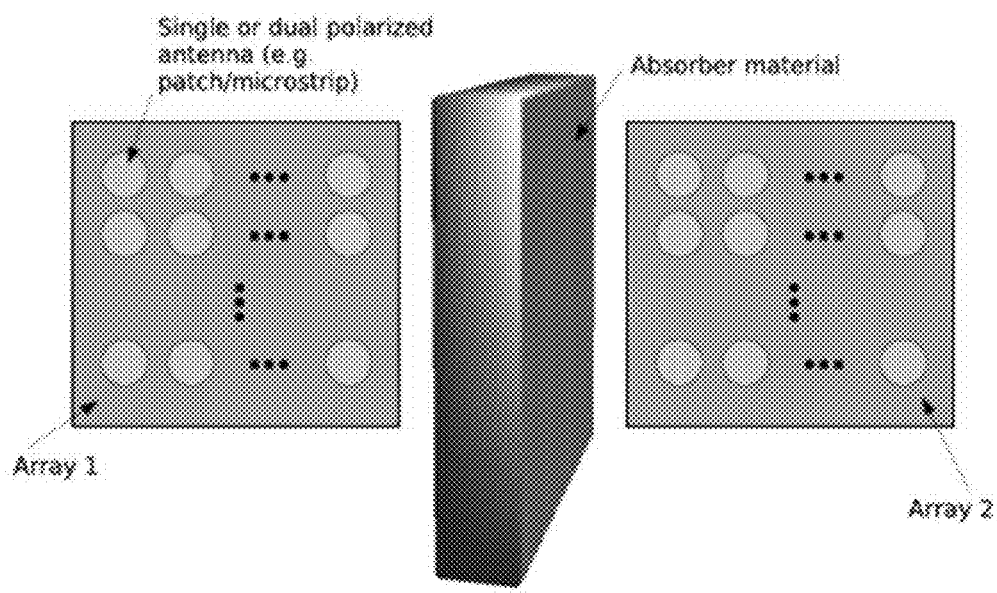
Figure 56A:
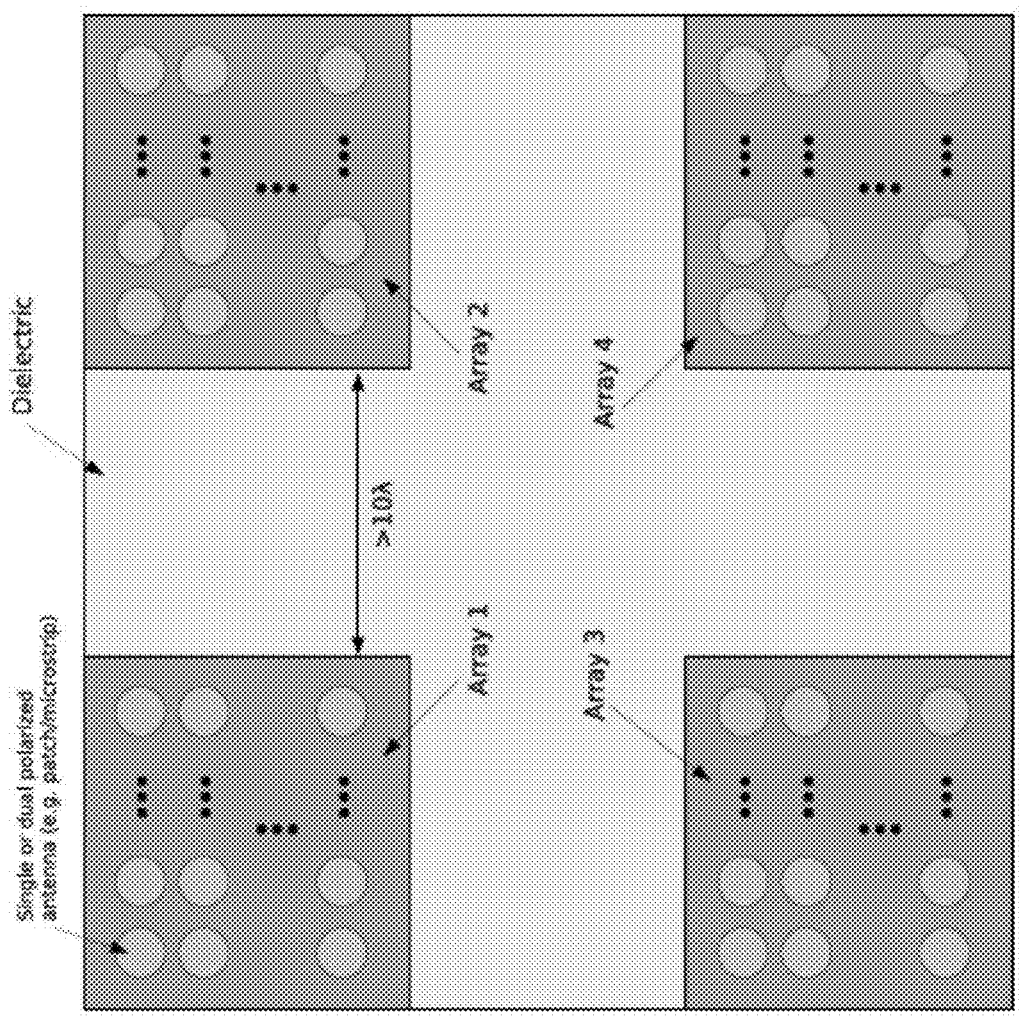
FIGS. 56A-56C illustrate 4-way array partitioning.
Figure 56B:
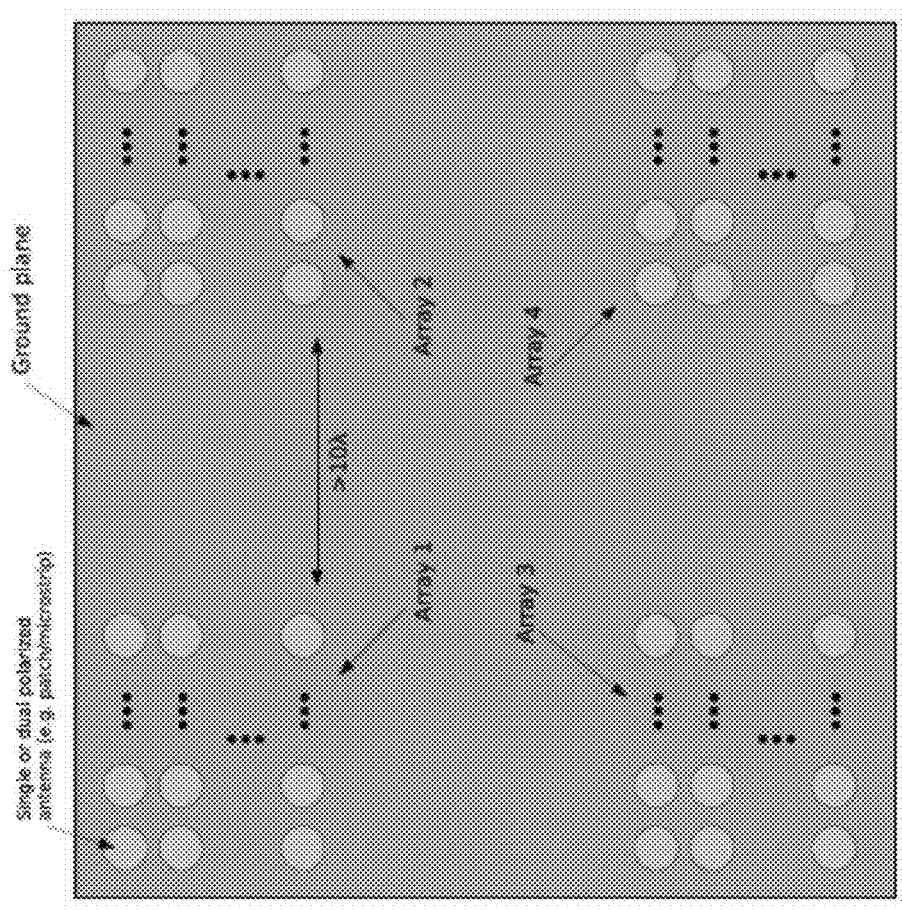
Figure 56C:
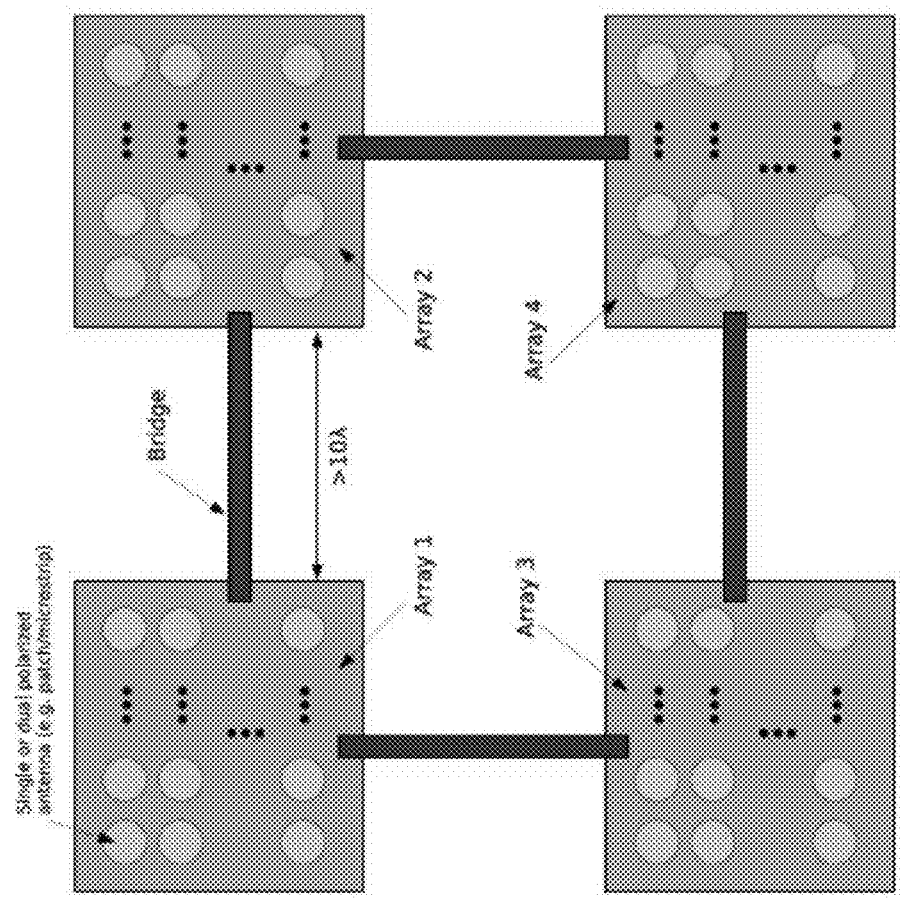
Figure 57A:
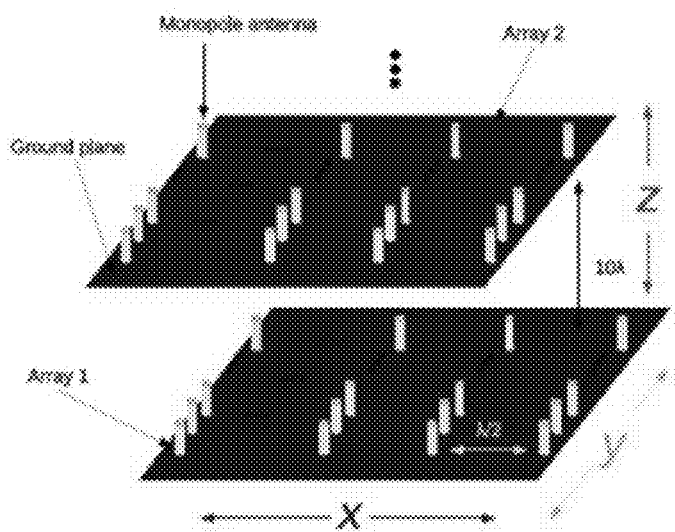
FIGS. 57A-57C illustrate different ways of array partitioning.
Figure 57B:
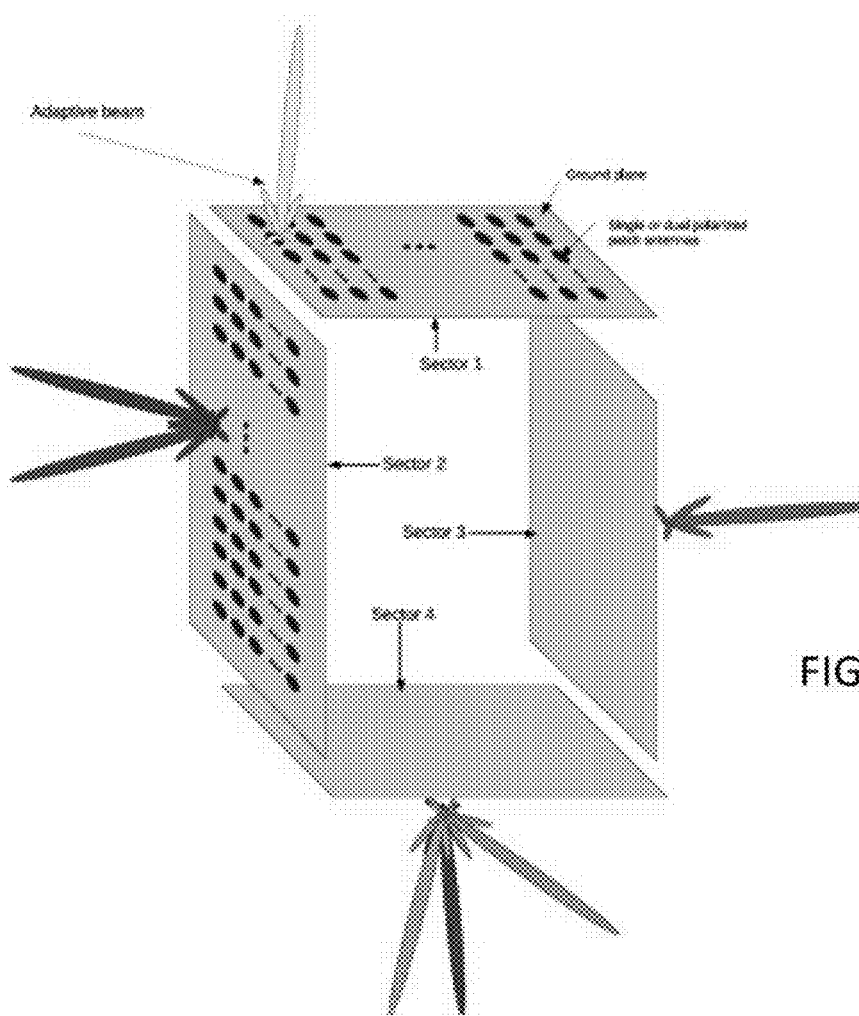
Figure 57C:
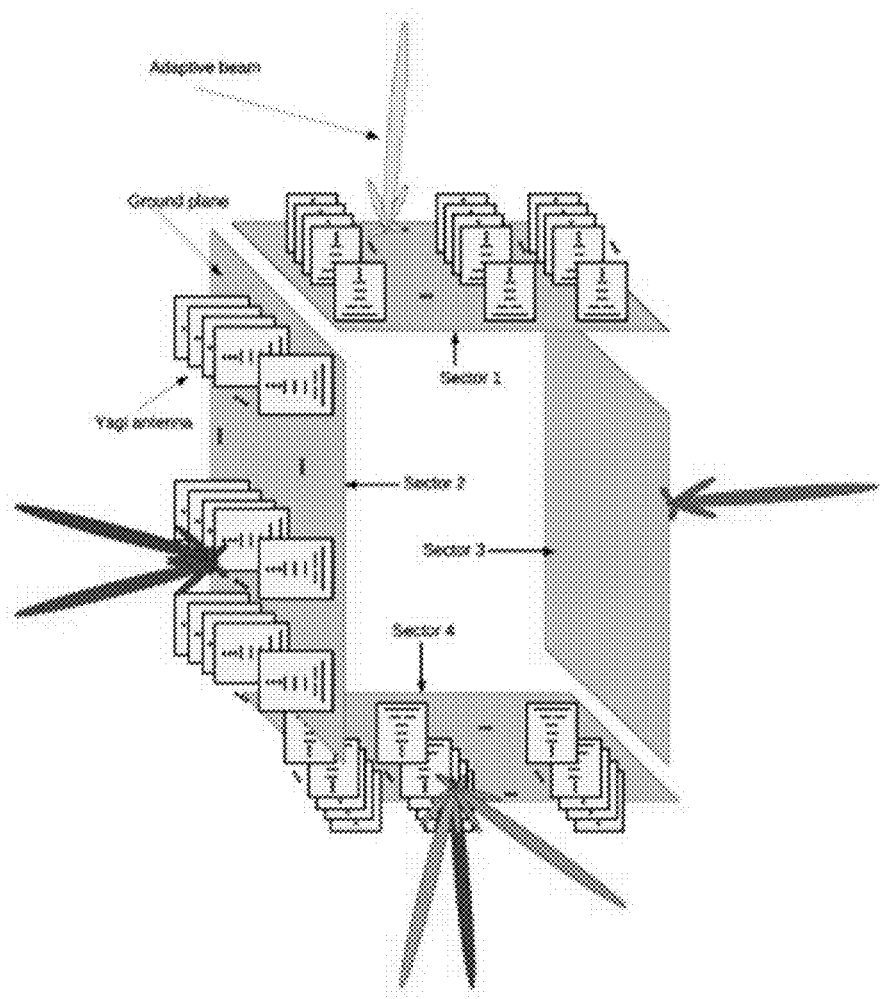
Figure 58:
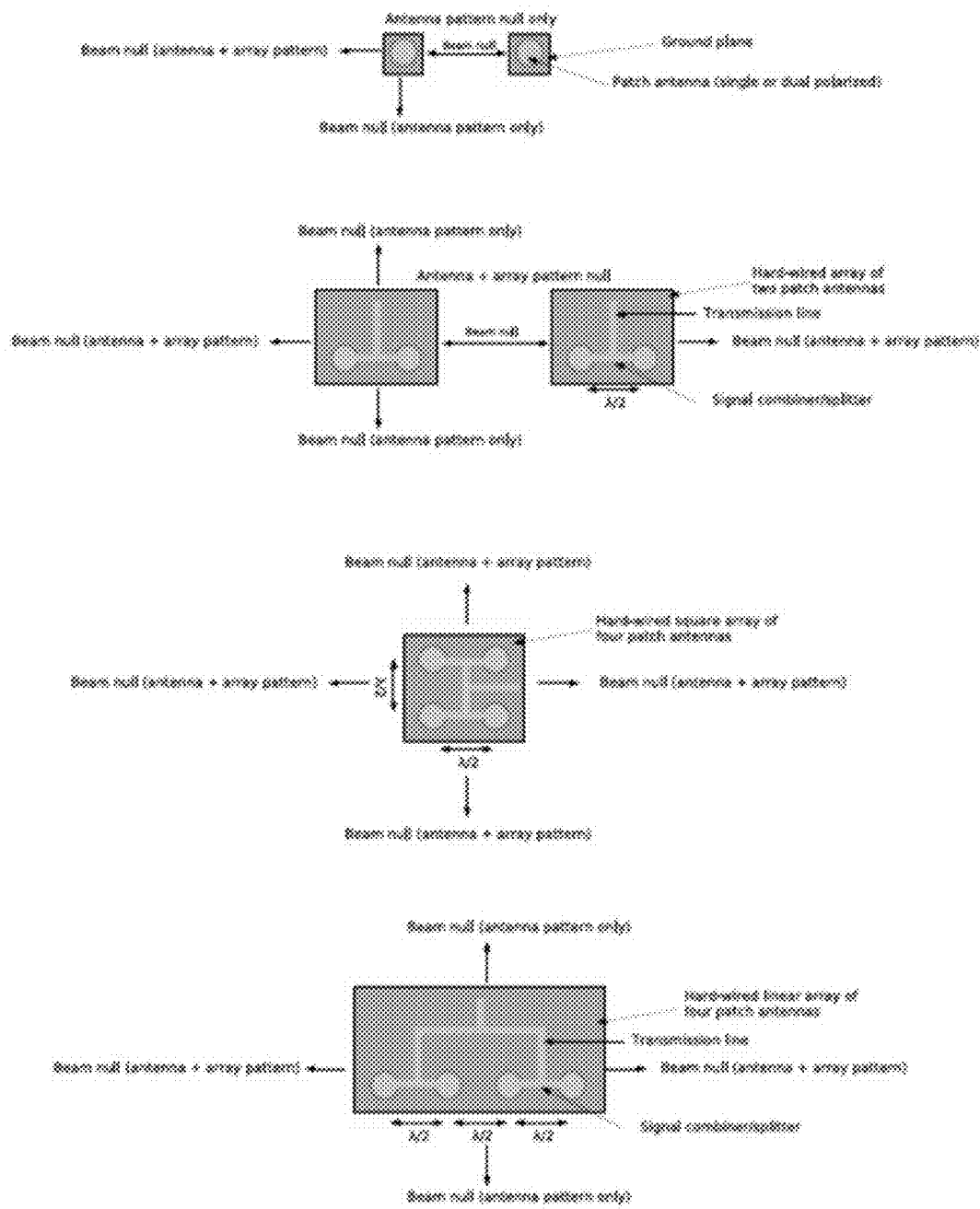
FIG. 58 illustrates re-enforcing antenna beam nulls.

Additional isolation between antennas can be achieved by placing antennas in low gain regions (preferably at the null-space) of one another. For example, patch (i.e. microstrip) antennas have radiation patterns that peak at the bore-sight, and almost disappear on the back and sides. Since patch antennas are usually placed side-by-side as in FIG. 55, an additional 20 dB in isolation can be picked up from this arrangement. The null depth of the antenna elements can be increased by constructing each antenna element as a static array of smaller sub-elements (FIG. 58). The null patterns of the static array re-enforce the nulls of the sub-elements, resulting in better null depths and high signal attenuation prior to hitting transceiver electronics. If monopole antennas are used instead, then they need to be stacked on top of one another as shown in FIG. 57a in order to reach the desired isolation level. Other examples are shown in FIGS. 56 and 57. The array geometry can also be arranged to re-enforce the nulls of the individual antennas as well. The isolation is highest when there is no shared metal ground plane between the two partitions (i.e. FIG. 55acde). In fact, some of those configurations can achieve isolation levels exceeding 100 dB even at distances smaller than 0λ.

Null-Steering

In most cases, distance and antenna/array geometries are sufficient to achieve the desired isolation. In cases, where additional isolation is required, transmit null steering can be used to fill the gap. Transmit of the analog canceler drops as the coupling loss increases (i.e. with distance) since the required amount (accuracy) of cancellation drops proportionately as well. The coupling depends both on distance and antenna properties. For example, if antennas are in the null space of each other, then the coupling is expected to be lower, as opposed to when they are facing one another (the other extreme). However, on average, in order to get 60 dB isolation between antennas (i.e. null-steering can re-enforce that natural nulls of the individual antennas. Transmit null steering works by steering a null in the array pattern towards the general directions of the array partitions. However, it does not place nulls at the individual antennas, the average null depth will be degraded. Placing a separate null per antenna would deplete the available spatial DOFs. Not more than 10 dB can be expected from this method, which may be sufficient for most practical applications.

Metal/Absorber Material

The Friis (square law) Equation for path loss assumes free space propagation. Air is a good approximation for free space at reasonable distances However, in material other than air or free space, the loss will be higher. This can be taken advantage of to further increase the isolation by placing light-weight absorber material between arrays. Absorber material is usually made of light-weight foam. Alternatively, a thing sheet of metal can also be used to provide isolation. The metal sheet can also be meshed to further reduce the weight. The absorber material can either increase the isolation or reduce the required distance to meet the target.

Sample array configurations are shown in FIGS. 55,56 and 57. There are many more array geometries that achieve high isolation, while maintaining reasonable distance, between partitions. This architecture of array partitioning has an impact on the digital component of the self-interference cancellation circuit as well. This technique can be used to enable general ADD (i.e. any degree of overlap or proximity between the DL and UL in time and frequency domains), which includes FDD and dual-TDD without any restriction on frequency separation.

Several properties of aerial links also simplify the self-interference cancellation process in the digital domain. The signal suppression in the analog domain using the array partitioning scheme can be large enough to eliminate the need for digital domain self-interference cancellation all together. First, from an aerial node's perspective, knowledge of the DOA, which does not change rapidly, due to the low time and frequency dispersion of the channel, is sufficient to capture most if not all of the CSI. That means that the adaptive filter coefficients to be applied to the transmit signal that is subtracted at each receiver do not have to be adapted as often, which reduces the computational complexity. Also, because the aerial channel is relatively flat in the frequency domain due to the low frequency dispersion (i.e. no ISI), the beamforming weights are expected to have a flat frequency response, and the transmit signals are expected to be more linear (lower PAPR), which means that the baseband digital self-interference canceler can have fewer taps. The linearity of the Tx signals can also be improved using DPD at each transmitter, which can also lead to additional reduction in the complexity of the digital self-interference canceler. Furthermore, only aggregate signal(s) from the Tx antennas need to be canceled from each receiver, as opposed to the signal from each individual antenna. Instead, each independent stream needs to get canceled at each receiver (since each stream has an independent beamforming weight vector). So if the total number of independent streams is M, then only M<N signals needs to be canceled per receiver, where N is the number of transmitting antennas. Receive beamforming/nulling-steering can also cleanup some of the remaining self-interference at the output of the beamformer. If additional cancellation is required to improve the receiver linearity in the analog domain, it can be accomplished by injecting an approximation of the transmit signal (with the opposite polarity) in the analog baseband stage.

Antenna array architectures similar to those in FIGS. 55,56 and 57, and in general the ADD (full-duplexing) capability, can operate in several different modes depending on the network topology and application requirements. While the different modes yield the same theoretical capacity. Each most performs better in different situations:

Mode (1): A Single Large Array with Conventional Duplexing at Each Element

This is the simplest most straightforward mode, where the entire array is used in a conventional duplexing mechanism like FDD or TDD (or dual-TDD). While the array can only transmit or receive at a given channel at any given time, twice the number of antennas is available compared to the full-duplexing (ZDD) case, which increases the number of streams that can potentially be transmitted by roughly 2×, and can potentially improve the link budget as well. So the factor of 2 that is lost by not being able to transmit and receive simultaneously, is regained by virtually doubling the number of streams. In order to realize the gain in capacity, there needs to be a sufficient number of ground nodes and aerial nodes that sufficiently separated in space. A system running in true ZDD mode does not have that a requirement (a 2× increase in capacity can be potentially achieved with a single link). On the other hand, if the DL and UL traffic patterns are asymmetric in a dense network environment, using the entire array in TDD mode is more beneficial than partitioning the array and running it in ZDD mode.

Mode (2): A Single Large Array with Full Duplexing at Each Element

This mode uses the standard self-interference cancellation architecture, shown in FIGS. 18A and 18B and discussed in more detail below. FIG. 18A shows two-stage analog/digital hybrid self-interference canceler and FIG. 18B shows an analog self-interference canceler using programmable attenuators and multi-tap delay lines.

In additional canceling the self-interference at each antenna, each antenna must also cancel interference from neighboring antennas. It has been shown in a previous work that the number of filter taps (both analog and digital) go down as the isolation between the antennas increases. This mode allows maximum flexibility since it enables the entire array to transmit and receive simultaneously. However, as mentioned earlier, this architecture not scale in cost or complexity.

Mode (3): Transmit and Receive Only Partitions

This mode is also straightforward, where the array is partitioned into multiple sub-arrays. Each sub-array is either transmitting all the time or receiving all the time. This mode is the most basic ZDD scenario, and performs best in aerial networks (both aerial-to-aerial and aerial-to-ground). Channel reciprocity is broken since a different set of antennas is used for Tx and Rx. However, since aerial links are either LOS and nLOS (i.e. have a strong path or multiple paths with similar delay profiles and DOAs), the weights computed on Rx partitions can be translated to the Tx partitions, and still would be a good approximation for the true Tx weights. This mode provides some control over the DL:UL ratios by adjusting the number of antennas in Tx partitions to the number of antennas in Rx partitions. Note, however, that the allocation of antennas is static and cannot be changed dynamically because it takes place in hardware.

Mode (4): All Partitions Transmit and Receive Using a Conventional Duplexing Mode The antennas in each partition are connected to full transceivers. The partitions are split into two groups. Both groups run in a conventional duplexing mode like FDD or TDD (or dual-TDD). While it's possible to use a different duplexing method for each group, it is recommended that both groups use the same duplexing method in a complementary fashion. For example, if TDD (FDD) is used, then Group 1 transmits in the slot (band) where Group 2 receives. If both groups simultaneously transmit/receive on the same band and slot, then this becomes Mode 1 or Mode 2 depending on the hardware design. Similarly in dual-TDD, the roles of the bands in use is reversed from one group to another. This takes care of any remaining reciprocity issues from Mode 3.

Figure 59:
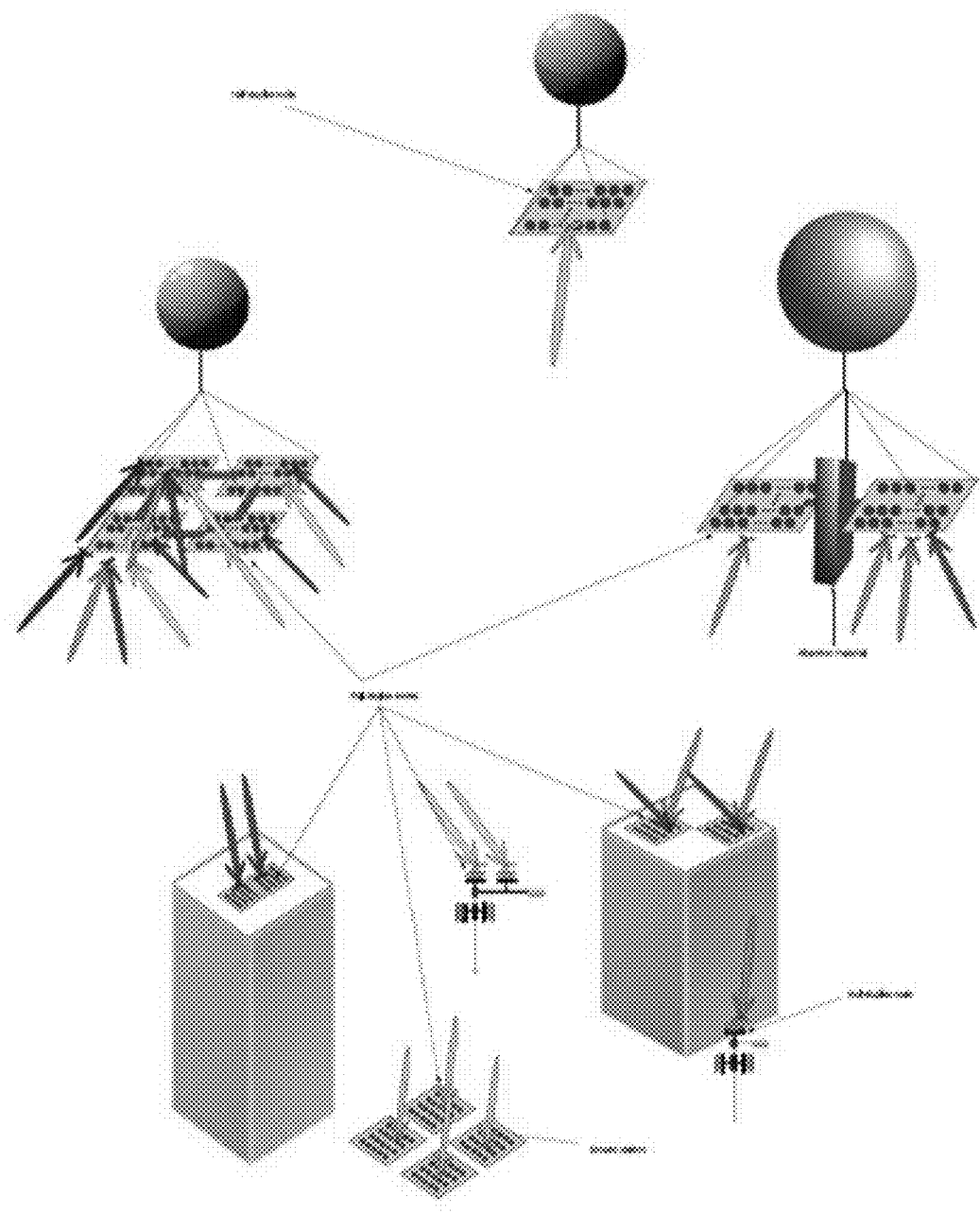
FIG. 59 illustrates full duplexing in aerial networks.

All modes listed above can co-exist with one another (FIG. 59). Any two nodes can communicate with one another even if they are using different modes. A node (aerial or terrestrial) can the full-duplexing feature either to double the capacity of its existing links or double the number of links it can support. The second feature is helpful when communicating with nodes that have size and/or cost restrictions that make it difficult to implement full duplexing, especially if they cannot be separated spatially. This could be the case with handsets, residential nodes, and some small cells, especially those mounted on lightposts for example. A different way of thinking about this is that the array partitioning presented in this section does not require both partitions to belong to a single node. If two arrays do not belong to the same node, then the most practical way to cancel the residual signal in the digital domain via null steering since the receiver now has no prior knowledge of transmitted signal (can't be counted as self-interference anymore). However, in order not to stress the receiver or deplete the DOFs or negatively impact the power-control loop, the attenuation of the transmit signal such that it is not much larger than other signals at the receiver. This can be achieved by placing nodes in the direction of natural nulls at other nodes. This is one of the major strengths of aerial networks. The other option is to maintain a large enough distance between nodes, which somewhat defeats the original purpose of building a high density network. In either case, Mode 4 with dual-TDD, is recommended since it has the best channel reciprocity, and allows both antenna groups to transmit and receive simultaneously using a low latency protocol.

Figure 4:
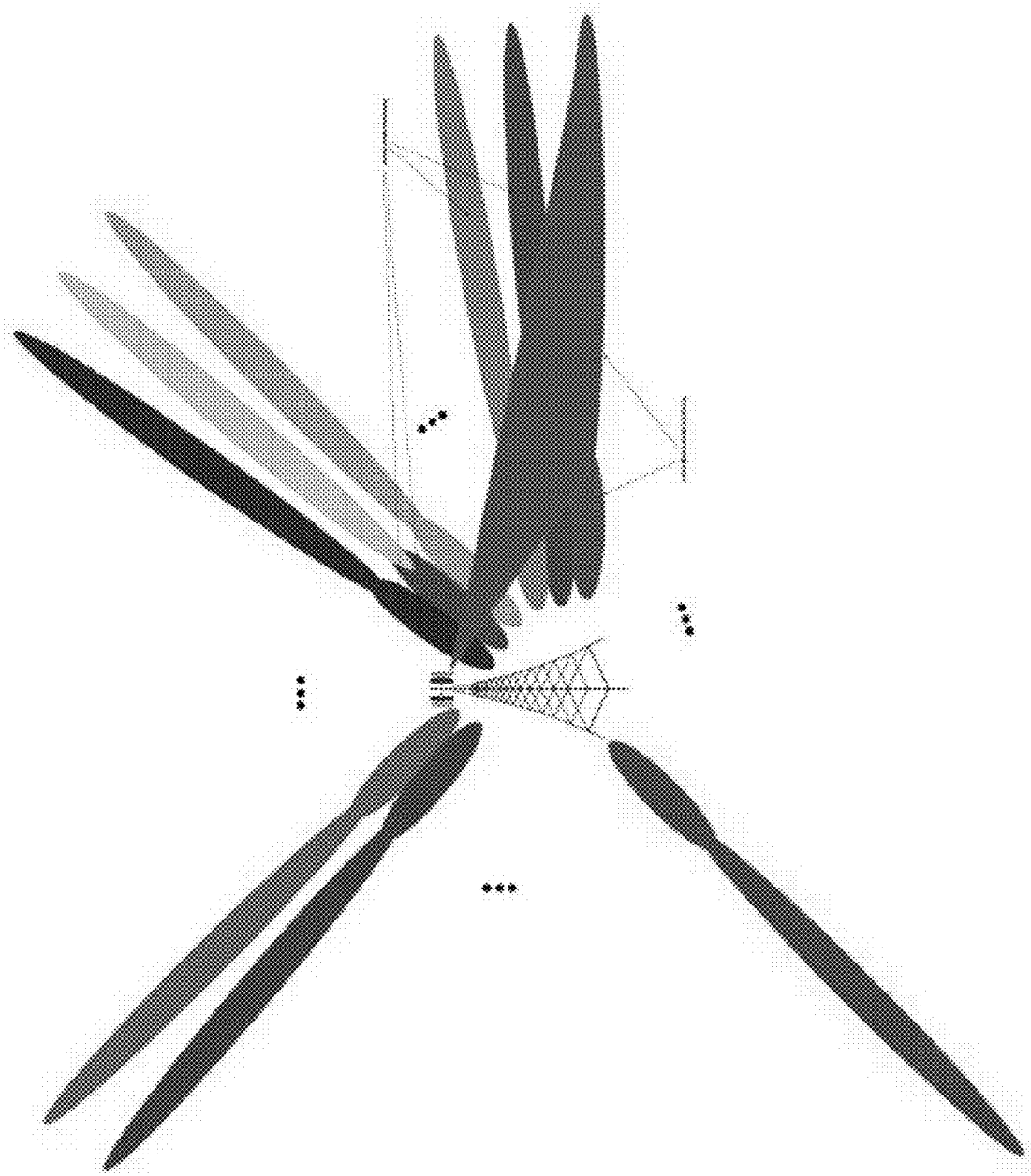
FIG. 4 illustrates beamforming in conventional terrestrial networks.
Figure 5:
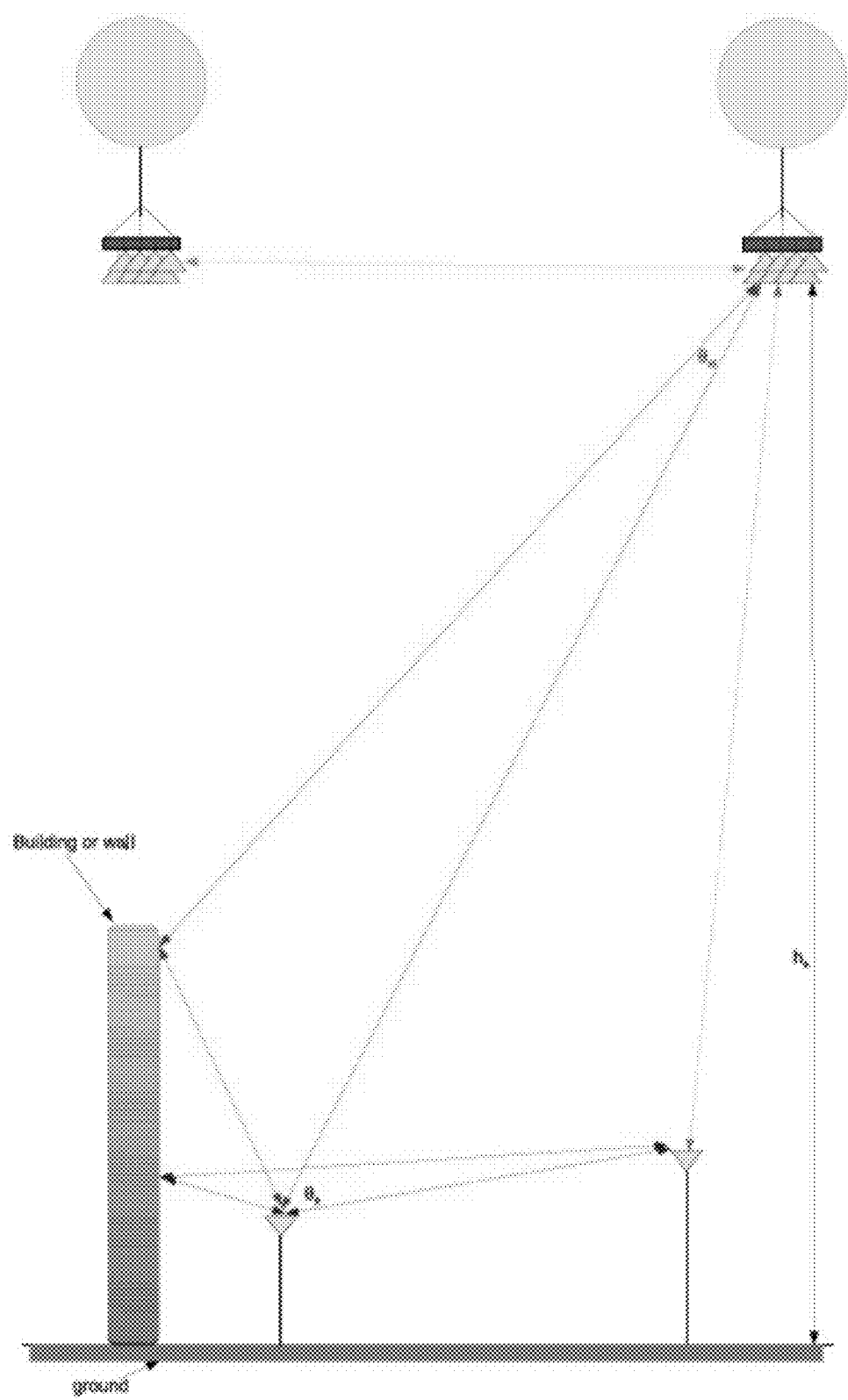
FIG. 5 illustrates an angular spread in terrestrial and aerial links.
Figure 6:
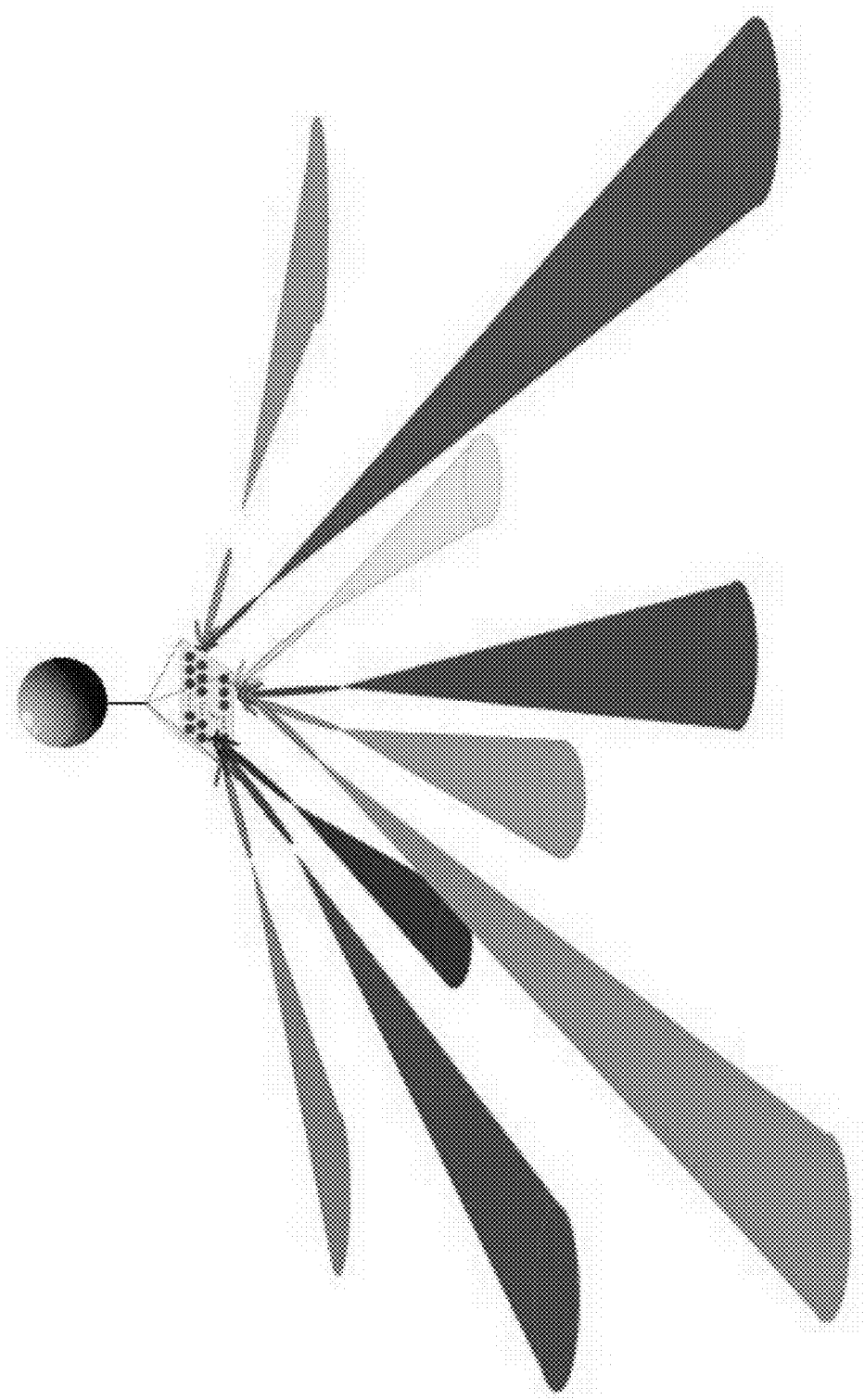
FIG. 6 illustrates beamforming in two spatial dimensions.
Figure 60:
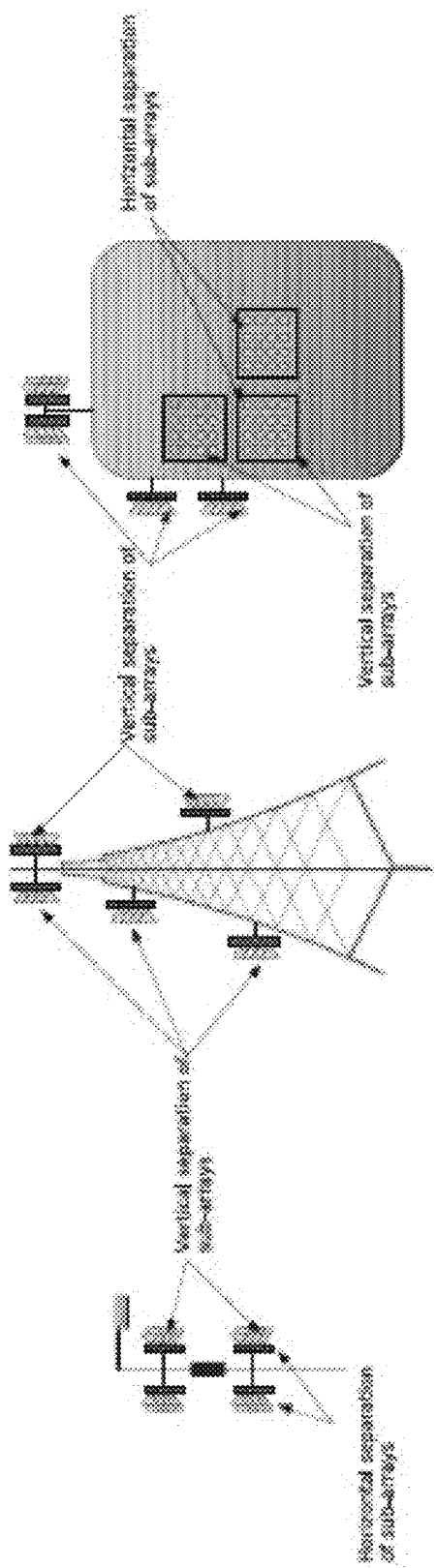
FIG. 60 illustrates array partitioning in terrestrial links.

The array splitting technique described in this section can be used to enable general ADD (i.e. allowing partial and non-overlap between the DL and UL channels in addition to full overlap). It can also be used to enable full-duplexing/ADD in large array systems in terrestrial networks as well. For example, if those arrays are mounted on towers/poles/buildings or walls, then the different partitions can either be stacked on top of one another or side by side as shown in FIG. 60. Vertical stacking is usually preferred for a terrestrial network since client radios are usually much harder to spatial separate/isolate in the elevation domain (see FIG. 4), making the vertical dimension of the array less effective the its horizontal counterpart when it comes to spatial diversity/multiplexing. Thus, sacrificing a fraction of the vertical dimension for full-duplexing is more desirable. However, unlike the case with aerial networks, the rise in interference levels will be more significant. Also, the beamforming weight vectors are expected to changing more often in the terrestrial case. Therefore, the digital domain self-interference cancellation will be more complex.

Radio Architecture for Universal Duplexing

Figure 61:
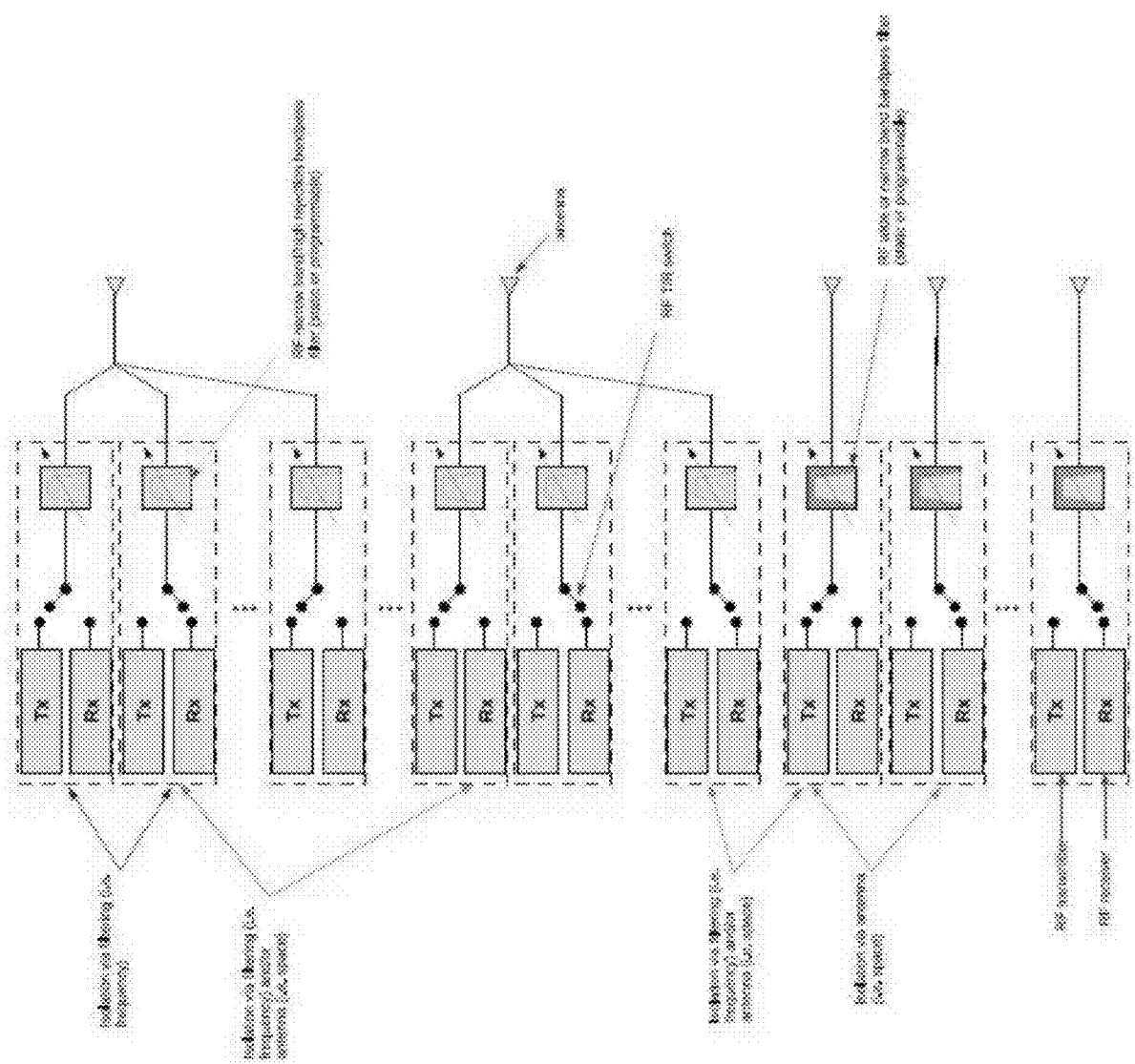
FIG. 61 illustrates radio architecture for universal duplexing.
Figure 62A:
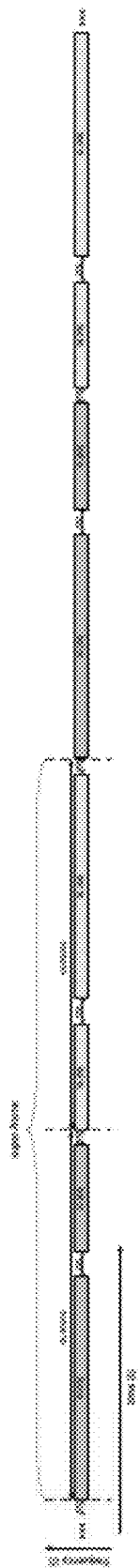
FIGS. 62A-62C illustrate DL/UL frame partitioning in TDD.
Figure 62B:
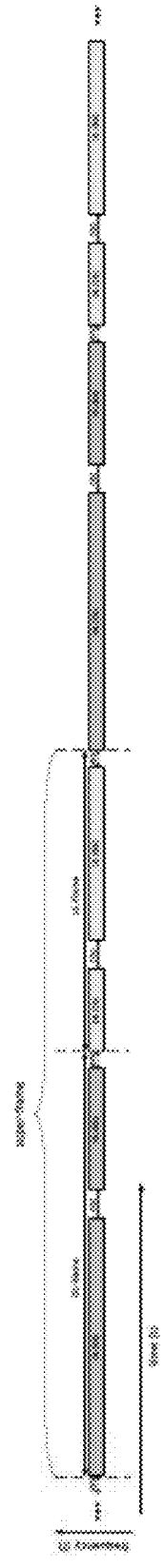
Figure 62C:
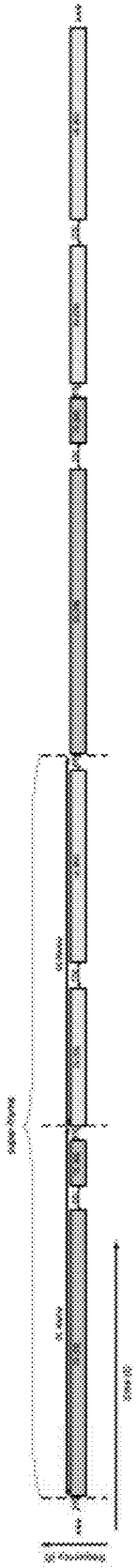

The different channel duplexing techniques discussed in this disclosure can be combined in a single unified radio architecture. FIG. 61 shows a radio transceiver circuit topology that can support all duplexing techniques discussed in this section. The transition from one duplexing scheme to another can be done via software without requiring any hardware changes. The system consists of the several components. First, there is an array of radio transceivers that are standard in most digital beamforming systems. The number of transceivers is at least the number of require DOFs. Some of transceivers may share a single antenna. In order for transceivers sharing an antenna to transmit and receive simultaneously (i.e. some transceivers transmit while others are receiving), some form of filtering must be present in order to provide the necessary channel isolation. The architecture supports the following modes of operations:

TDD Mode

The TDD mode of operation, both synchronous and asynchronous, can be turned on by switching all transceivers to the same state (i.e. Tx/Rx) at the same time.

FDD Mode

To use the array in FDD mode, a subset of the receivers and a subset of transmitters must be first identified such that there is sufficient isolation between the transmitters and receivers. The isolation can be achieved either via filtering or spatial separation or a combination of both. The set of frequency channels used for Rx and the set of frequency channels used for Tx are assumed to be disjoint and non-overlapping. The set of transmitters and set of receivers can operate simultaneously.

Dual-TDD Mode

Similar to the FDD mode, two subsets (A and B) of transceivers must first be identified. The transceivers in both subsets are going to be used in TDD mode. There must be sufficient isolation (in frequency) between the receivers in Group A (B) and the transmitters in Group B (A) and vice-versa. The transceivers in each subset are synchronized in time (i.e. transmit and receive simultaneously). However, no synchronization is required across the different groups. Once this is established, the two groups operate independently on different frequency channels. This technique can be extended to more than two groups/subsets.

ADD/ZDD Mode

This is similar to the FDD and dual-TDD mode, except that in this case, the isolation has to happen strictly in the spatial domain. That means that the transceivers in different groups have to be connected to different antennas, and the isolation between different antennas in different groups must be large enough to enable interference cancellation in the baseband. The different modes can be supported simultaneously by dividing the transceivers into multiple subgroups, with each subgroup supporting a different duplexing mode, provided that there is sufficient isolation in either time or frequency or space between and within the different subgroups.

The different modes can be supported simultaneously by dividing the transceivers into multiple subgroups, with each subgroup supporting a different duplexing mode, provided that there is sufficient isolation in either time or frequency or space between and within the different subgroups.

DU/UL Channel Allocation

Channel or resource allocation on both the DL and UL is a dynamic process that optimizes the use of resources in systems/networks with statistical traffic patterns, most likely found in access systems. As mentioned in earlier sections, access networks where ENs represent residential nodes or end-user devices are usually over-subscribed (i.e. the total number of ENs is larger than what the CN(s) can handle if they were all using the network simultaneously). Thus, the channel resources need to be multiplexed in both time/frequency and/or code in addition to space/polarization etc. These resources need to be dynamically allocated especially since a lot of these nodes may not be using the network all the time. However, when the ENs are aggregation points (i.e. aggregating several traffic flows into a single stream) as in the case with backhaul, channel allocation can be done in a static or quasi-static fashion. In conventional wireless systems that do not employ retro-directive Tx beamforming, resource allocation is simple and straightforward and can be done on the DL and UL independently. For the purposes of this document, retro-directive Tx beamforming is defined as the process of computing the Tx weights as a function of the Rx weights by mapping the Rx channel response into Tx, relying either on channel reciprocity or on strong directional components (e.g. LOS) in the beam or eigen beam. This is not the only possible mode of beamforming in a wireless system. For example, wireless nodes can beamform on the receive end of the link only. This common in most MIMO systems today, whether they use FDD (e.g. LTE) or TDD (e.g. LTE/WiMAX/WiFi). Even nodes that do employ Tx beamforming can compute the Tx beamforming weights using explicit feedback from the other end of the link. This technique is more common in FDD networks that employ Tx beamforming, where channel reciprocity does not hold, and is sometimes used in some TDD systems (e.g. WiFi). TDD systems that rely on explicit channel feedback do so either to correct for calibration errors or eliminate the need for calibration all together. In a general retro-directive Tx beamforming system, resource allocation on the DL and UL cannot be independent because each slice in the frequency domain must be allocated to the same link (stream) on both UL and DL. For example, a frequency slice allocated to one user on the DL slot cannot be allocate cannot be allocated to a different user on the associated (preceding) UL slot since the DL beamforming weights are computed from the UL (assuming DL=Tx and UL=Rx). For systems with static or quasi-static allocations (i.e. deterministic or semi-deterministic traffic patterns, this would not be an issue since each link would be allocated a fixed slice of the channel. However, this can be problematic in statistical systems, especially if DL and UL traffic patterns are independent. For example, if one user's traffic is mostly on the DL while another user's traffic is mostly on the UL, then both these users must be allocated two separate full bandwidth spatial channels even though their combined traffic can, in theory, be carried by a single full bandwidth spatial channel. This is also an issue in static channel allocations when those allocations are asymmetric (i.e. when traffic on some links is mostly downstream while on other links it is mostly upstream).

The UL/DL channel allocation consistency must hold within a coherence bandwidth. That means that whenever a resource block is allocated on the DL (or UL), then another resource block must be allocated on the UL (or DL). These two resource blocks (not necessarily the same size) must be within a coherent bandwidth of each other. The block sizes on the DU/UL must be chosen large enough to ensure sufficient TBP. This is not an issue for aerial links where channel response is expected to be mostly flat, and TBP requirements are expected to be low.

There are multiple ways for dealing with this problem and potentially improve resource utilization in the presence of traffic asymmetry (or non-uniform asymmetry). As mentioned before, if a node's traffic is mostly on the DL, then this node must also be assigned resources on the UL to enable beamforming weight computation (and vice-versa). Even though this node will probably use very little of the UL payload, it still forces other nodes on the network to burn some DOFs on UL in order to place the appropriate nulls. The first way to deal with this traffic asymmetry is by taking advantage of the fact that the reference symbols are known a priori. Since these symbols are known, they can be subtracted from the received symbol prior to performing STAP processing. So the STAP computation is performed multiple times on different combination of reference symbols producing different sets of weights to be used in the appropriate occasions (i.e. time/frequency slots). The second method takes advantage of the fact that the payload remains mostly unused even if there are reference symbols present. This can be done either with decision-directed-beamforming (i.e. using the decoded payload symbols as training symbols) or by injecting reference symbols at arbitrary points within a frame (e.g. after the node with low number of payload symbols stops transmitting). This process can help free-up some of the DOFs to serve other links/streams in the remainder of the frame.

Figure 63A:
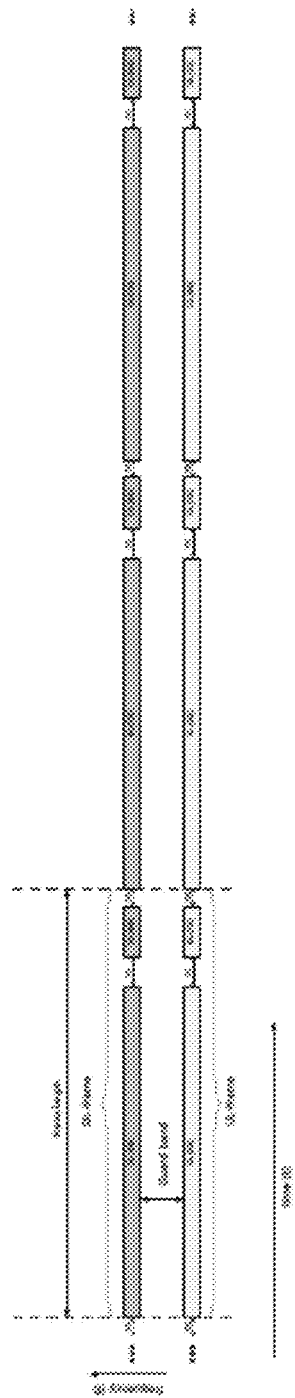
FIGS. 63A-63B illustrate DL/UL frame partitioning in dual-TDD systems.

Another way of addressing this problem is by modifying the frame structure of the duplexing schemes discussed in this disclosure (i.e. TDD, FDD, dual-TDD, ADD, ZDD). This new frame structure distinguishes two types of data frames (PHY layer frames): a DL-dominant frame (or a DL-frame) and a UL-dominant frame (or-UL-frame). As the name suggests, a DL-dominant frame is one where the DL partition is larger than the UL partition. Similarly, a UL-dominant frame is one where the UL partition is larger than the DL-partition. An example of such structure is shown in FIG. 63a for a TDD system. The DL-frames and UL-frames can be thought of either as even and odd frames or as subframes of a larger super frame. Each user (i.e. stream) is allocated resources (i.e. subcarriers/subbands/time slots/spreading codes) on DL-frames and UL-frames proportionate to their capacity demands in both directions. For example, if DL-frames are partitioned to be 80% DL and 20% UL, and UL-frames are partitioned to be 20% DL and 80% UL, then all traffic with DL:UL≥4:1 is allocated resources on DL frames, while all traffic with DL:UL≤1:4 is allocated resources on UL frames. Traffic with 1:4<DL:UL<4:1, are assigned resources on both DL-frames and UL-frames; the weighted combination of the DL-frame resources and the UL-frame resources should reflect the desired DL:UL ratio. For example, if the desired DL:UL ratio for a stream is 2:1, then the ratio of the resources allocated on the DL to the resources allocated on the UL is 7/2.

Figure 63B:
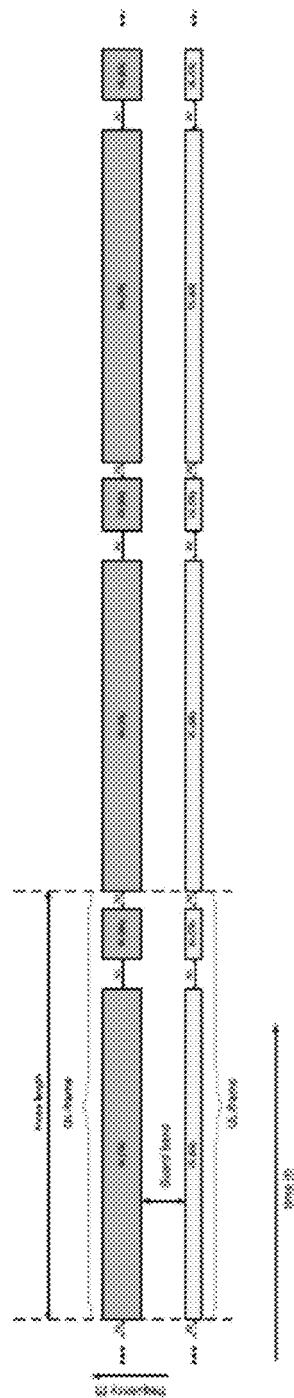
Figure 63C:
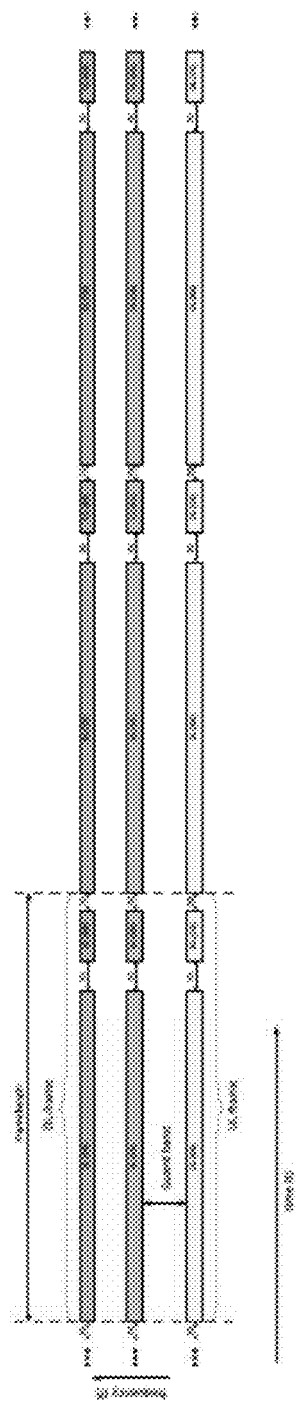

In FIG. 63a, the ratio of the aggregate DL to the aggregate UL in a superframe is 1:1. However, the frame structure can be chosen to accommodate different DL:UL ratios. This can be done in several different ways. One way is to partition the DL-frames and UL-frames such that the DL:UL ratios in both frame types are not reciprocal (FIG. 63b). Another way is choose the DI-frames and UL frames to have different lengths (FIG. 63c). A combination of these two techniques is also possible.

Figure 63D:
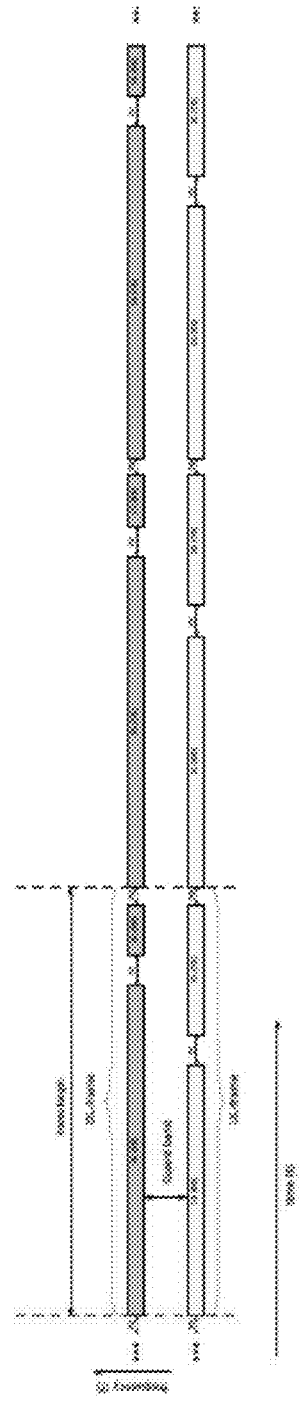
Figure 64A:
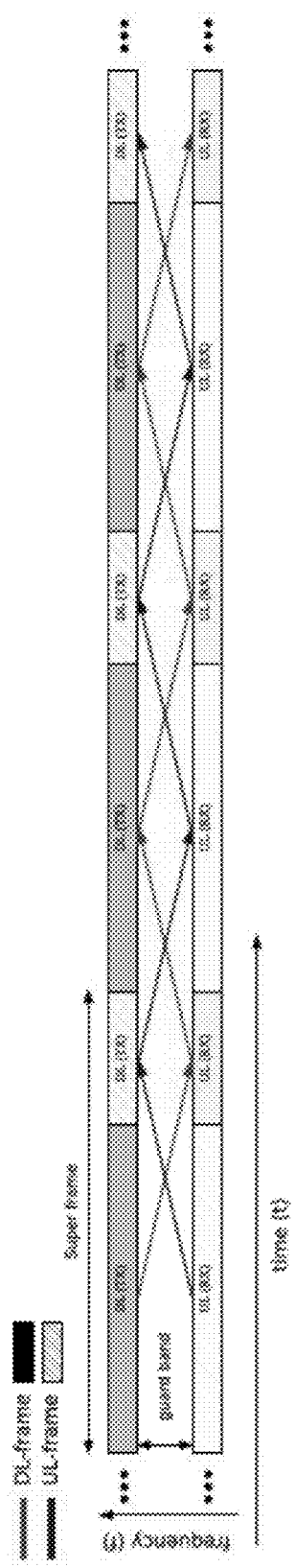
FIGS. 64A-64D illustrate DL/UL frame partitioning in FDD systems.
Figure 64B:
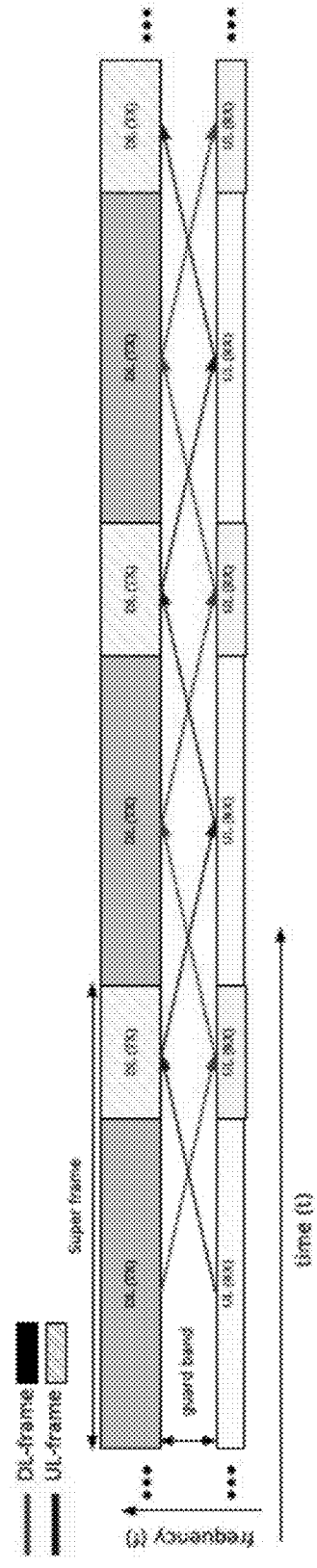
Figure 64C:
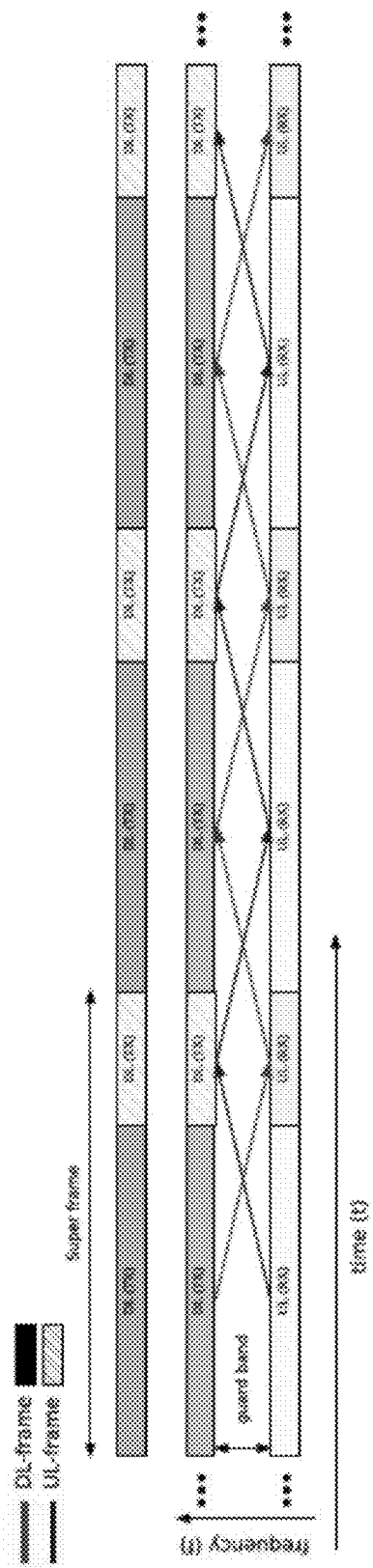
Figure 64D:
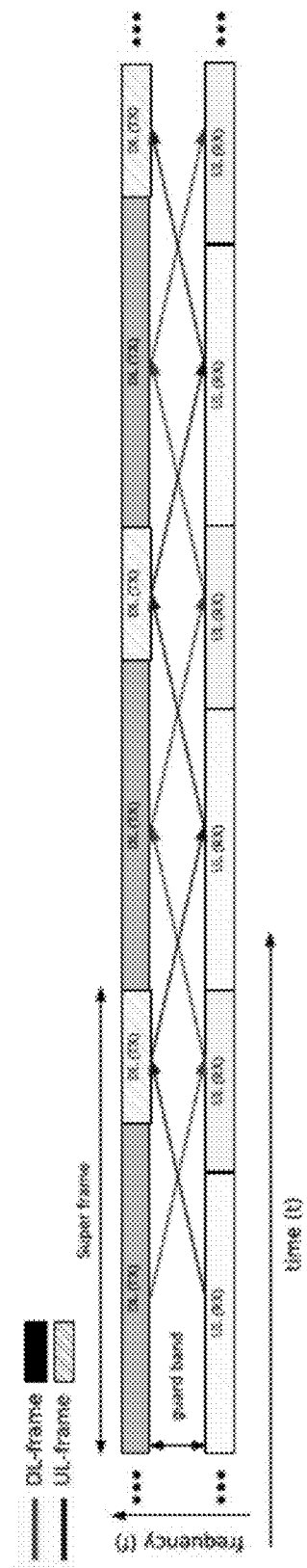
Figure 65A:
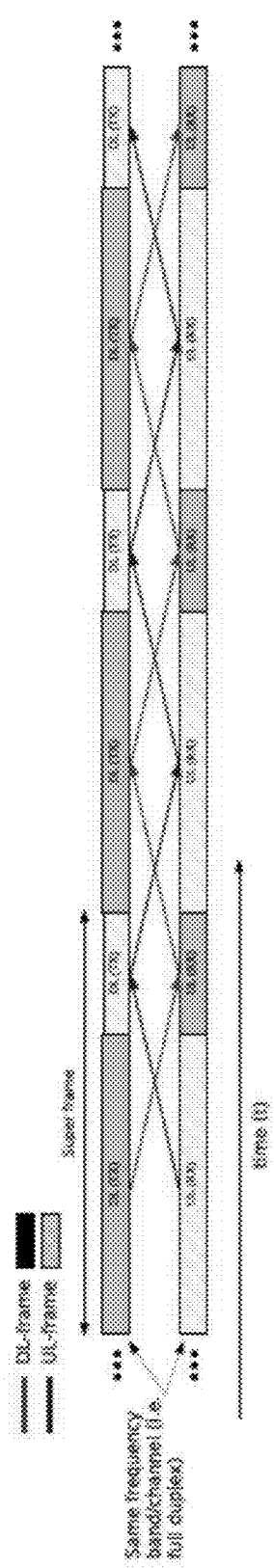
FIGS. 65A and 65B illustrate DL/UL frame partitioning in ADD.
Figure 65B:
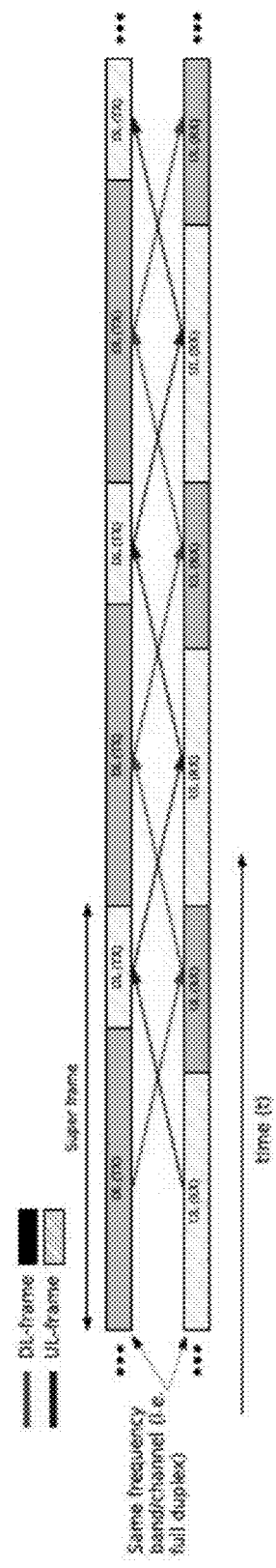
Figure 66A:
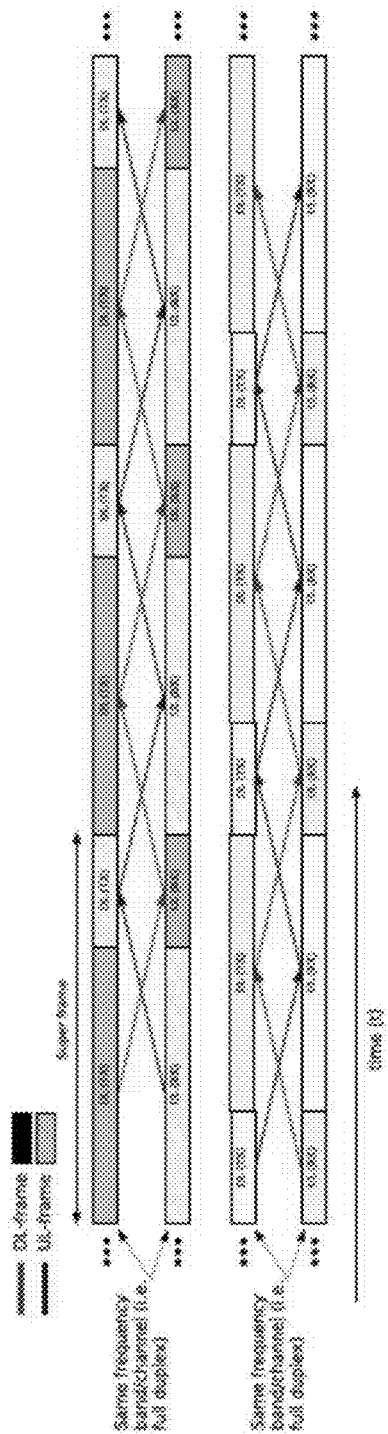
FIGS. 66A-66D illustrate DL/UL frame partitioning in ADD with multiple channels.
Figure 66B:
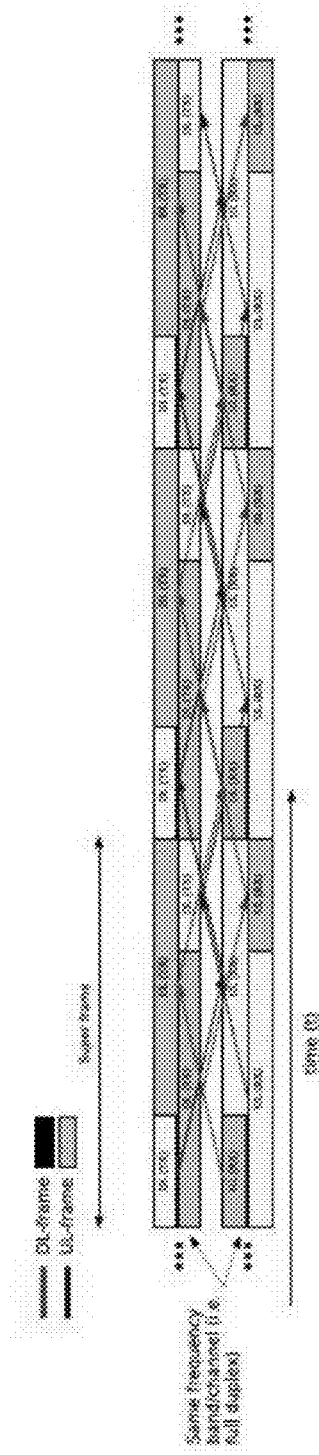
Figure 66C:
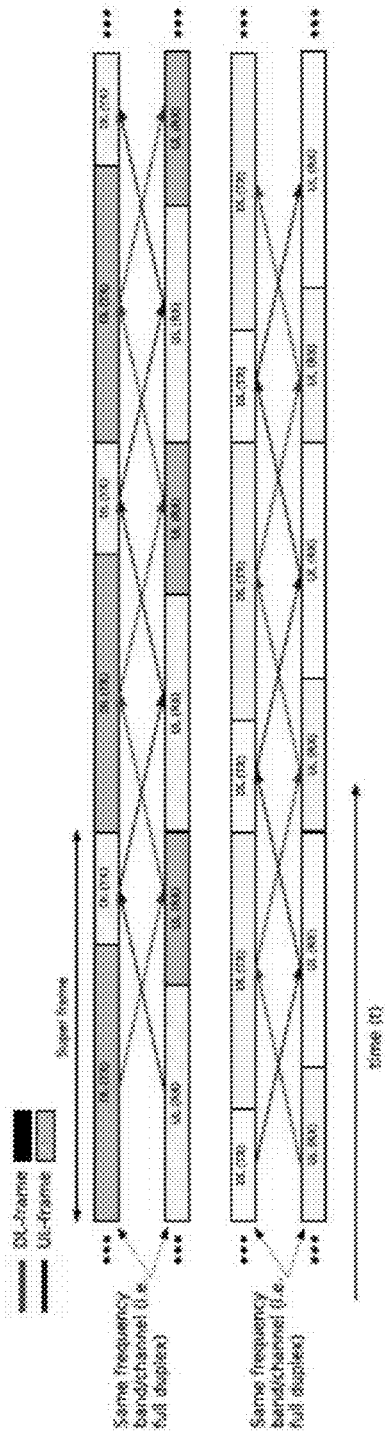
Figure 66D:
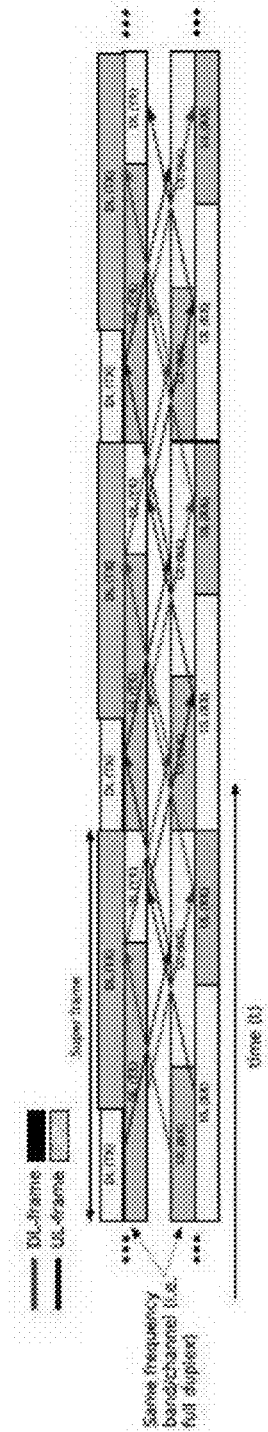

In FIG. 63abc, the separation (isolation) between DL-frames and UL-frames happens in time. This separation can also be in frequency. FIGS. 64 and 65 are the analogs of FIG. 63 for dual-TDD and FDD systems respectively. Controlling the overall DL and UL ratios in dual-TDD can be done either in time domain or the frequency domain. In the frequency domain, this can be accomplished by changing the bandwidth of one channel relative to the other, or using more bands (see FIG. 63bc). In the time domain, this can be accomplished by changing the relative DL/UL ratios in DL-frames and/or UL-frames (see FIG. 63d). FDD operates similarly in time and frequency domains (see FIG. 64bcd). This concept can also be extended to full duplexing or ADD/ZDD (see FIG. 65). Using dual-TDD, FDD, and or ADD/ZDD has the advantage of lower latency compared to TDD. Adding more bands/channels can help further reduce latency on both DL-frames and UL-frames. FIG. 66 shows some examples on how to do this with ADD (FIG. 66cd show the asymmetric DU/UL case). The advantage of ADD is that latency can be reduced by adding an additional frequency band/channel (FIG. 66ac) or partitioning an existing one (FIG. 66bd).

Because resources are allocated differently in DL-frames and UL-frames (even the nodes that are allocated the resources could be different), both ends of the link must maintain two separate sets of beamformers: one set (Tx+Rx) for DL-frames, and another set for UL-frames. Data from DL-frames should not be included in the computation of beamforming weights for UL-frames and vice versa. Lengths of DL-frames and UL-frames must be chosen to allow sufficient TBP at both ends of the link. Multiple frame beam adaptation can also be leveraged to allow more TBP if necessary (assuming the channel remains stable long enough to allow this).

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A high mobility network, comprising: a plurality of air based communication nodes, wherein each air based communication node is configured to perform techniques for optimizing weight and power consumption, the techniques comprising power/energy consumption techniques, weight/area reduction techniques, or combinations thereof:
   a plurality of computing devices configured to communicate using the plurality of air based communication nodes, wherein the communicating comprises creating a wireless link between the plurality of air based communication nodes and the plurality of computing devices;
   wherein at least one of the plurality of air based communication nodes is configured to communicate with at least one of the plurality of computing devices using low carrier frequencies; and
   wherein a signal path from the at least one of the plurality of air based communication nodes to the at least one of the plurality of computing devices is orthogonal to a motion of the at least one of the plurality of computing devices.

2. The network of claim 1, wherein the plurality of air based communication nodes are configured to track channel variations to reduce Doppler shift.

3. The network of claim 1, wherein the plurality of air based communication nodes are configured to track GPS positioning and rotation to reduce Doppler shift.

4. The network of claim 1, wherein the plurality of air based communication nodes are configured to track a frequency of handoffs.

5. The network of claim 1, wherein a weight and power consumption optimization technique comprises performing low complexity space-time adaptive processing (STAP)

algorithms, wherein a STAP algorithm comprises Gradient Descent, least mean square, or combinations thereof.

6. The network of claim 1, wherein a weight and power consumption optimization technique comprises using lower order adaptive filters for channel equalization.

7. The network of claim 1, wherein a weight and power consumption optimization technique comprises using software on ship (SOC) integration, application specific integrated circuit (ASIC) integration, or combinations thereof.

8. The network of claim 1, wherein a weight and power consumption optimization technique comprises restricting aerial communication for backhaul access, fixed access, or combinations thereof, and minimizing aerial communication for mobile access.

9. The network of claim 1, wherein each air based communication node of the plurality of air based communication nodes comprises a mini-satellite, a low earth orbit (LEO) satellite, a balloon, a drone, a plane, or combinations thereof, and wherein the balloon is tethered, floating, free, or combinations thereof.

10. The network of claim 1, wherein the low carrier frequencies and orthogonal positioning of the signal path from the at least one of the plurality of air based communication nodes to the at least one of the plurality of computing devices are selected to reduce Doppler shift and handoffs between the at least one of the plurality of air based communication nodes and the at least one of the plurality of computing devices to provide a high mobility network.

11. The network of claim 1, wherein the low carrier frequencies and orthogonal positioning of the signal path from the at least one of the plurality of air based communication nodes to the at least one of the plurality of computing devices are selected to reduce an angular spread between the at least one of the plurality of air based communication nodes and the at least one of the plurality of computing devices to provide a high mobility network.

12. The network of claim 1, wherein each computing device of the plurality of computing devices is a terrestrial node.

13. The network of claim 1, wherein the low carrier frequencies are sub-1 GHz frequencies.

14. A high mobility network, comprising:
a plurality of air based communication nodes, wherein each air based communication node of the plurality of air based communication nodes comprises a radio architecture having an antenna sub-array configured to perform a selected channel duplexing technique of a plurality of channel duplexing techniques, wherein the plurality of channel duplexing techniques comprises, time duplexing, full duplexing, dual-time duplexing, any division duplexing, zero division duplexing, or combinations thereof;
a plurality of computing devices configured to communicate using the plurality of air based communication nodes, wherein the communicating comprises creating a wireless link between the plurality of air based communication nodes and the plurality of computing devices;
wherein at least one of the plurality of air based communication nodes is configured to communicate with at least one of the plurality of computing devices using low carrier frequencies; and
wherein a signal path from the at least one of the plurality of air based communication nodes to the at least one of the plurality of computing devices is orthogonal to a motion of the at least one of the plurality of computing devices.

15. The network of claim 14, wherein the full duplexing includes simultaneous transmit and receive in a same time slot for the wireless link.

16. A method comprising:
communicating, by a plurality of air based communication nodes, and to a plurality of computing devices, wherein the communicating comprises creating a wireless link between the plurality of air based communication nodes and the plurality of computing devices, and wherein each air based communication node of the plurality of air based communication nodes performs techniques for optimizing weight and power consumption, the weight and power consumption optimization techniques comprising power/energy consumption techniques, weight/area reduction techniques, or combination thereof;
wherein the communicating further comprises using, by at least one of the plurality of air based communication nodes, low carrier frequencies, to communicate to at least one of the plurality of computing devices; and
wherein the communicating further comprises using, by the at least of the plurality of air based communication nodes, a signal path from the at least one of the plurality of air based communication nodes to the at least one of the plurality of computing devices, wherein the signal path is orthogonal to a motion of the at least one of the plurality of computing devices.

17. The method of claim 16, further comprising tracking, by the plurality of air based communication nodes, channel variations to reduce Doppler shift.

18. The method of claim 16, further comprising tracking, by the plurality of air based communication nodes, GPS positioning and rotation to reduce Doppler shift.

19. The method of claim 16, further comprising tracking, by the plurality of air based communication nodes, a frequency of handoffs.

20. The method of claim 16, wherein a weight and power consumption optimization technique comprises performing low complexity space-time adaptive processing (STAP) algorithms, wherein a STAP algorithm comprises Gradient Descent, least mean square, or combinations thereof.

21. A method comprising:
communicating, by a plurality of air based communication nodes, to a plurality of computing devices, wherein the communicating comprises creating a wireless link between the plurality of air based communication nodes and the plurality of computing devices,
wherein the communicating further comprises using, by at least one of the plurality of air based communication nodes, low carrier frequencies, to communicate to at least one of the plurality of computing devices,
wherein the communicating further comprises using, by the at least of the plurality of air based communication nodes, a signal path from the at least one of the plurality of air based communication nodes to the at least one of the plurality of computing devices, wherein the signal path is orthogonal to a motion of the at least one of the plurality of computing devices; and
performing, by an air based communication node, of the plurality of air based communication nodes, the air based communication node having a radio architecture comprising an antenna sub-array, a selected channel duplexing technique of a plurality of channel duplexing techniques, wherein the plurality of channel duplexing techniques comprises, time duplexing, full duplexing, dual-time duplexing, any division duplexing, zero division duplexing, or combinations thereof.

22. The method of claim 21, wherein the full duplexing includes simultaneous transmit and receive, by the air based communication node, in a same time slot for the wireless link.

\* \* \* \* \*